United States Patent
Zhang et al.

(10) Patent No.: US 12,503,513 B2
(45) Date of Patent: Dec. 23, 2025

(54) IL1RAP ANTIBODIES

(71) Applicant: City of Hope, Duarte, CA (US)

(72) Inventors: Bin Zhang, Walnut, CA (US); Weixu Meng, Azusa, CA (US); Guido Marcucci, Azusa, CA (US)

(73) Assignee: CITY OF HOPE, Duarte, CA (US)

( * ) Notice: Subject to any disclaimer, the term of this patent is extended or adjusted under 35 U.S.C. 154(b) by 817 days.

(21) Appl. No.: 17/634,895

(22) PCT Filed: Aug. 12, 2020

(86) PCT No.: PCT/US2020/046001
§ 371 (c)(1),
(2) Date: Feb. 11, 2022

(87) PCT Pub. No.: WO2021/030484
PCT Pub. Date: Feb. 18, 2021

(65) Prior Publication Data
US 2022/0306750 A1    Sep. 29, 2022

Related U.S. Application Data

(60) Provisional application No. 62/885,724, filed on Aug. 12, 2019.

(51) Int. Cl.
*C07K 16/28* (2006.01)

(52) U.S. Cl.
CPC ...... *C07K 16/2866* (2013.01); *C07K 16/2809* (2013.01); *C07K 2317/31* (2013.01); *C07K 2317/622* (2013.01); *C07K 2317/73* (2013.01); *C07K 2317/92* (2013.01); *C07K 2319/02* (2013.01); *C07K 2319/03* (2013.01)

(58) Field of Classification Search
CPC ............ C07K 16/2866; C07K 16/2809; C07K 2317/31; C07K 2317/622; C07K 2317/73; C07K 2317/92; C07K 2319/02; C07K 2319/03; C07K 2317/21; C07K 2317/32; C07K 2317/76
See application file for complete search history.

(56) References Cited

U.S. PATENT DOCUMENTS

| | | |
|---|---|---|
| 2003/0124129 A1 | 7/2003 | Oliner |
| 2009/0117095 A1 | 5/2009 | Messmer et al. |

FOREIGN PATENT DOCUMENTS

| | | |
|---|---|---|
| CA | 3 084 459 A1 | 4/2018 |
| CN | 106459195 A | 2/2017 |
| WO | WO-2012/098407 A1 | 7/2012 |
| WO | WO-2015/132602 A1 | 9/2015 |
| WO | WO-2018/231827 A1 | 12/2018 |
| WO | WO-2018/231827 A9 | 12/2018 |
| WO | WO-2019/028190 A1 | 2/2019 |

OTHER PUBLICATIONS

Extended European Search Report mailed on Oct. 20, 2023, for EP Patent Application No. 20852629.3, 14 pages.
International Search Report mailed on Mar. 11, 2021 for PCT Application No. PCT/US2020/046001, filed Aug. 12, 2020, 5 pages.
Partial Supplementary European Search Report mailed on Jul. 19, 2023, for EP Patent Application No. 20852629.3, 15 pages.
UniProtKB A0A367Q9K8_9NOSO. Methionine—tRNA ligase, May 8, 2019, 6 pages.
Written Opinion mailed on Mar. 11, 2021 for PCT Application No. PCT/US2020/046001, filed Aug. 12, 2020, 5 pages.

*Primary Examiner* — Misook Yu
*Assistant Examiner* — Grace H Lunde
(74) *Attorney, Agent, or Firm* — Mintz, Levin, Cohn, Ferris, Glovsky and Popeo, P.C.

(57) ABSTRACT

Provided herein are, inter alia, Interleukin-1 receptor accessory protein (IL1RAP) antibodies and fragments thereof which may form part of chimeric antigen receptors or bispsecific antibodies and are useful for treating IL1RAP-expressing cancers.

26 Claims, 4 Drawing Sheets
Specification includes a Sequence Listing.

SEQUENCE LISTING

```
<160> NUMBER OF SEQ ID NOS: 180

<210> SEQ ID NO 1
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 1

Gly Phe Pro Phe Asn Met Tyr Gly
1               5

<210> SEQ ID NO 2
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 2

Ile Ser Ala Tyr Asn Gly Arg Thr
1               5

<210> SEQ ID NO 3
<211> LENGTH: 16
<212> TYPE: PRT
<213> ORGANISM: Artificial sequence
<220> FEATURE:
<223> OTHER INFORMATION: Synthetic polypeptide

<400> SEQUENCE: 3

Ala Arg Ser Gly Lys Gln Gln Leu Gly Ser Ala Gln Pro Leu Asp Ser
1               5                   10                  15

<210> SEQ ID NO 4
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 4

Ser Ser Asn Ile Gly Ser Asn Thr
1               5

<210> SEQ ID NO 5
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 5
```

Ser Asn Asn
1

<210> SEQ ID NO 6
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 6

Ala Ala Trp Asp Asp Ser Leu Asn Gly Leu
1               5                   10

<210> SEQ ID NO 7
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 7

Gly Tyr Arg Phe Thr Asp Tyr Trp
1               5

<210> SEQ ID NO 8
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 8

Ile Tyr Leu Gly Asp Ser Glu Thr
1               5

<210> SEQ ID NO 9
<211> LENGTH: 13
<212> TYPE: PRT
<213> ORGANISM: Artificial sequence
<220> FEATURE:
<223> OTHER INFORMATION: Synthetic polypeptide

<400> SEQUENCE: 9

Ala Arg Gly Phe Ala Tyr Gly Asp Trp Tyr Phe Asp Leu
1               5                   10

<210> SEQ ID NO 10
<211> LENGTH: 6
<212> TYPE: PRT
<213> ORGANISM: Artificial sequence
<220> FEATURE:
<223> OTHER INFORMATION: Synthetic polypeptide

<400> SEQUENCE: 10

Gln Gly Ile Ala Gly Trp
1               5

<210> SEQ ID NO 11
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 11

Ala Ala Ser

```
<210> SEQ ID NO 12
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 12

Gln Gln Ser Ser Ser Thr Pro His Thr
1               5

<210> SEQ ID NO 13
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 13

Gly Tyr Ser Phe Ser Ser His Trp
1               5

<210> SEQ ID NO 14
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 14

Ile Tyr Pro Gly Asp Ser Asp Thr
1               5

<210> SEQ ID NO 15
<211> LENGTH: 13
<212> TYPE: PRT
<213> ORGANISM: Artificial sequence
<220> FEATURE:
<223> OTHER INFORMATION: Synthetic polypeptide

<400> SEQUENCE: 15

Ala Arg Gly Glu Leu Pro Gly Glu Ala Tyr Tyr Phe Asp
1               5                   10

<210> SEQ ID NO 16
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 16

Gln Ser Leu Leu His Ser Asn Gly Tyr Lys Tyr
1               5                   10

<210> SEQ ID NO 17
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 17

Leu Gly Ser
1
```

<210> SEQ ID NO 18
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 18

Met Gln Ala Leu Gln Thr Pro Leu Thr
1               5

<210> SEQ ID NO 19
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 19

Gly Phe Thr Phe Ser Arg Tyr Trp
1               5

<210> SEQ ID NO 20
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 20

Ile His Thr Asp Gly Ser Ser Ile
1               5

<210> SEQ ID NO 21
<211> LENGTH: 15
<212> TYPE: PRT
<213> ORGANISM: Artificial sequence
<220> FEATURE:
<223> OTHER INFORMATION: Synthetic polypeptide

<400> SEQUENCE: 21

Ala Arg Asp Ile Gly Gly Gly Tyr Ser Tyr Gly Ser Val Asp Tyr
1               5                   10                  15

<210> SEQ ID NO 22
<211> LENGTH: 6
<212> TYPE: PRT
<213> ORGANISM: Artificial sequence
<220> FEATURE:
<223> OTHER INFORMATION: Synthetic polypeptide

<400> SEQUENCE: 22

Asn Ile Gly Ser Lys Ser
1               5

<210> SEQ ID NO 23
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 23

Gly Gly Gly
1

```
<210> SEQ ID NO 24
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 24

Gln Val Trp Asp Gly Ser Thr Asp His Tyr Ile
1               5                   10

<210> SEQ ID NO 25
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 25

Asp Tyr Thr Phe Thr Ser Tyr Gly
1               5

<210> SEQ ID NO 26
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 26

Ile Ser Ala Tyr Asn Gly Asn Thr
1               5

<210> SEQ ID NO 27
<211> LENGTH: 16
<212> TYPE: PRT
<213> ORGANISM: Artificial sequence
<220> FEATURE:
<223> OTHER INFORMATION: Synthetic polypeptide

<400> SEQUENCE: 27

Ala Arg Val His Pro Arg His Ile Ile Gly Ala Gly Tyr Phe Asp Tyr
1               5                   10                  15

<210> SEQ ID NO 28
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 28

Ser Ser Asp Val Gly Val Tyr Asp Tyr
1               5

<210> SEQ ID NO 29
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 29

Asp Val Ser
1
```

```
<210> SEQ ID NO 30
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 30

Cys Ala Tyr Thr Phe Val Phe Gly Thr
1               5

<210> SEQ ID NO 31
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 31

Gly Tyr Thr Phe Thr Ser Tyr Tyr
1               5

<210> SEQ ID NO 32
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 32

Ile Asn Pro Ser Gly Gly Ser Thr
1               5

<210> SEQ ID NO 33
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 33

Ala Ile Phe Ala Pro Pro Asp Tyr Gly Asp Tyr Val Asp Ala Phe Asp
1               5                   10                  15

Ile

<210> SEQ ID NO 34
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 34

Gln Ser Leu Leu His Ser Asn Gly Tyr Asn Tyr
1               5                   10

<210> SEQ ID NO 35
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 35

Leu Gly Ser
1
```

```
<210> SEQ ID NO 36
<211> LENGTH: 13
<212> TYPE: PRT
<213> ORGANISM: Artificial sequence
<220> FEATURE:
<223> OTHER INFORMATION: Synthetic polypeptide

<400> SEQUENCE: 36

Met Gln Ala Leu Gln Thr Pro Arg Gly Thr Lys Val Glu
1               5                   10

<210> SEQ ID NO 37
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 37

Ser Gly Asp Ile Gly Phe Tyr Asn Tyr
1               5

<210> SEQ ID NO 38
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 38

Glu Val Asn
1

<210> SEQ ID NO 39
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 39

Val Ser Tyr Gly Ile Ser Asp Thr Val Leu
1               5                   10

<210> SEQ ID NO 40
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 40

Ser Gly Asp Ile Gly Phe Tyr Asn Tyr
1               5

<210> SEQ ID NO 41
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 41

Glu Val Asn
1
```

```
<210> SEQ ID NO 42
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 42

Val Ser Tyr Gly Ile Ser Asp Thr Val Leu
1               5                   10

<210> SEQ ID NO 43
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 43

Ile Ser Asn Ile Gly Ser Asn Ala
1               5

<210> SEQ ID NO 44
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 44

Ser Asp Asn
1

<210> SEQ ID NO 45
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 45

Ala Ala Trp Asp Asp Ser Leu Asn Gly Asn Val
1               5                   10

<210> SEQ ID NO 46
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 46

Ser Ser Asn Ile Gly Ile Asn Ala
1               5

<210> SEQ ID NO 47
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 47

Ser Asn Asp
1

<210> SEQ ID NO 48
```

```
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 48

Ala Ala Trp Asp Asp Ser Leu Asn Ala Asn Val
1               5                   10

<210> SEQ ID NO 49
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 49

Ser Ser Asn Ile Gly Ser Asn Pro
1               5

<210> SEQ ID NO 50
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 50

Asn Thr Gly
1

<210> SEQ ID NO 51
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 51

Ala Ala Trp Asp Asp Arg Leu Asn Gly Asn Val
1               5                   10

<210> SEQ ID NO 52
<211> LENGTH: 6
<212> TYPE: PRT
<213> ORGANISM: Artificial sequence
<220> FEATURE:
<223> OTHER INFORMATION: Synthetic polypeptide

<400> SEQUENCE: 52

Gln Ser Val Asn Asn Phe
1               5

<210> SEQ ID NO 53
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 53

Ala Val Ser
1

<210> SEQ ID NO 54
<211> LENGTH: 9
```

<212> TYPE: PRT
<213> ORGANISM: Artificial sequence
<220> FEATURE:
<223> OTHER INFORMATION: Synthetic polypeptide

<400> SEQUENCE: 54

Gln Gln Ser Ser Ser Ala Pro Asn Thr
1               5

<210> SEQ ID NO 55
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 55

Ser Gly Ser Val Gly Glu Tyr Tyr
1               5

<210> SEQ ID NO 56
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 56

Glu Asp Tyr
1

<210> SEQ ID NO 57
<211> LENGTH: 9
<212> TYPE: PRT
<213> ORGANISM: Artificial sequence
<220> FEATURE:
<223> OTHER INFORMATION: Synthetic polypeptide

<400> SEQUENCE: 57

Gln Ser Tyr Asp Gly Ser Asn Phe Val
1               5

<210> SEQ ID NO 58
<211> LENGTH: 8
<212> TYPE: PRT
<213> ORGANISM: Artificial sequence
<220> FEATURE:
<223> OTHER INFORMATION: Synthetic polypeptide

<400> SEQUENCE: 58

Gly Ser Asn Ile Gly Ile Asn Pro
1               5

<210> SEQ ID NO 59
<211> LENGTH: 3
<212> TYPE: PRT
<213> ORGANISM: Artificial sequence
<220> FEATURE:
<223> OTHER INFORMATION: Synthetic polypeptide

<400> SEQUENCE: 59

Ser Asp Asp
1

<210> SEQ ID NO 60
<211> LENGTH: 13
<212> TYPE: PRT

<213> ORGANISM: Artificial sequence
<220> FEATURE:
<223> OTHER INFORMATION: Synthetic polypeptide

<400> SEQUENCE: 60

Ala Ala Trp Asp Asp Ser Leu Asn Gly Pro Gly Asn Val
1               5                   10

<210> SEQ ID NO 61
<211> LENGTH: 123
<212> TYPE: PRT
<213> ORGANISM: Artificial sequence
<220> FEATURE:
<223> OTHER INFORMATION: Synthetic polypeptide

<400> SEQUENCE: 61

Pro Gly Pro Leu Val Gln Ser Gly Ala Glu Val Lys Lys Pro Gly Ala
1               5                   10                  15

Ser Val Lys Val Ser Cys Thr Thr Ser Gly Phe Pro Phe Asn Met Tyr
            20                  25                  30

Gly Phe Asn Trp Val Arg Gln Ala Pro Gly Gln Gly Leu Glu Trp Met
        35                  40                  45

Gly Trp Ile Ser Ala Tyr Asn Gly Arg Thr Asn Tyr Ala Gln Lys Phe
    50                  55                  60

Gln Gly Arg Val Thr Met Thr Thr Asp Thr Ser Thr Ser Thr Ser Tyr
65                  70                  75                  80

Val Glu Leu Glu Ser Leu Thr Ser Asp Asp Thr Ala Val Tyr Tyr Cys
                85                  90                  95

Ala Arg Ser Gly Lys Gln Gln Leu Gly Ser Ala Gln Pro Leu Asp Ser
            100                 105                 110

Trp Gly Gln Gly Thr Leu Ile Ile Val Ser Ser
        115                 120

<210> SEQ ID NO 62
<211> LENGTH: 109
<212> TYPE: PRT
<213> ORGANISM: Artificial sequence
<220> FEATURE:
<223> OTHER INFORMATION: Synthetic polypeptide

<400> SEQUENCE: 62

Asn Phe Met Leu Thr Gln Pro Pro Ser Ala Ser Gly Thr Pro Gly Gln
1               5                   10                  15

Arg Val Thr Ile Ser Cys Ser Gly Ser Ser Asn Ile Gly Ser Asn
            20                  25                  30

Thr Val Asn Trp Tyr Gln Gln Leu Pro Gly Thr Ala Pro Lys Leu Leu
        35                  40                  45

Ile Tyr Ser Asn Asn Gln Arg Pro Ser Gly Val Pro Asp Arg Phe Ser
    50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Asp Ser Leu
                85                  90                  95

Asn Gly Leu Phe Gly Gly Gly Thr Lys Leu Thr Val Leu
            100                 105

<210> SEQ ID NO 63
<211> LENGTH: 119
<212> TYPE: PRT
<213> ORGANISM: Artificial sequence
<220> FEATURE:
<223> OTHER INFORMATION: Synthetic polypeptide

<400> SEQUENCE: 63

Gln Val Gln Leu Val Gln Ser Gly Ala Glu Val Lys Lys Pro Gly Glu
1               5                   10                  15

Ser Leu Lys Ile Ser Cys Lys Ala Ser Gly Tyr Arg Phe Thr Asp Tyr
            20                  25                  30

Trp Ile Gly Trp Val Arg Gln Met Pro Gly Lys Gly Leu Glu Trp Met
        35                  40                  45

Gly Ile Ile Tyr Leu Gly Asp Ser Glu Thr Ile Tyr Ser Pro Ser Phe
    50                  55                  60

Gln Gly Gln Val Thr Ile Ser Ala Asp Lys Ser Ile Ser Thr Ala Phe
65                  70                  75                  80

Leu Gln Leu Thr Ser Leu Lys Ala Ser Asp Ser Ala Ile Tyr Ser Cys
                85                  90                  95

Ala Arg Gly Phe Ala Tyr Gly Asp Trp Tyr Phe Asp Leu Trp Gly Arg
            100                 105                 110

Gly Thr Leu Val Ile Val Ser
        115

<210> SEQ ID NO 64
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 64

Asn Ile Gln Met Thr Gln Ser Pro Ser Ser Val Ser Ala Ser Val Gly
1               5                   10                  15

Asp Arg Val Thr Ile Thr Cys Arg Ala Ser Gln Gly Ile Ala Gly Trp
            20                  25                  30

Leu Ala Trp Tyr Gln Gln Lys Pro Gly Lys Arg Pro Asn Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Ser Ser Thr Pro His
                85                  90                  95

Thr Phe Gly Gln Gly Thr Lys Leu Glu Ile Lys
            100                 105

<210> SEQ ID NO 65
<211> LENGTH: 121
<212> TYPE: PRT
<213> ORGANISM: Artificial sequence
<220> FEATURE:
<223> OTHER INFORMATION: Synthetic polypeptide

<400> SEQUENCE: 65

Gln Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Ser Ser His
            20                  25                  30

Trp Ile Gly Trp Val Arg Gln Met Pro Gly Lys Gly Leu Glu Trp Met
        35                  40                  45

Gly Ile Ile Tyr Pro Gly Asp Ser Asp Thr Arg Tyr Ser Pro Ser Phe
        50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Gly Glu Leu Pro Gly Glu Ala Tyr Tyr Phe Asp Asn Trp Gly
            100                 105                 110

Gln Gly Thr Leu Val Thr Val Ser Ser
            115                 120

<210> SEQ ID NO 66
<211> LENGTH: 112
<212> TYPE: PRT
<213> ORGANISM: Artificial sequence
<220> FEATURE:
<223> OTHER INFORMATION: Synthetic polypeptide

<400> SEQUENCE: 66

Glu Ile Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Leu His Ser
            20                  25                  30

Asn Gly Tyr Lys Tyr Leu Asp Trp Tyr Leu Gln Lys Pro Gly Gln Ser
        35                  40                  45

Pro Gln Leu Leu Ile Tyr Leu Gly Ser Asn Arg Ala Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Ala
                85                  90                  95

Leu Gln Thr Pro Leu Thr Phe Gly Gly Gly Thr Lys Val Glu Ile Lys
            100                 105                 110

<210> SEQ ID NO 67
<211> LENGTH: 122
<212> TYPE: PRT
<213> ORGANISM: Artificial sequence
<220> FEATURE:
<223> OTHER INFORMATION: Synthetic polypeptide

<400> SEQUENCE: 67

Pro Gly Ala Ala Ala Gly Val Gly Gly Leu Val Gln Pro Gly Gly
1               5                   10                  15

Ser Leu Arg Leu Ser Cys Glu Ala Ser Gly Phe Thr Phe Ser Arg Tyr
            20                  25                  30

Trp Met His Trp Val Arg Gln Ala Pro Gly Lys Gly Leu Val Trp Val
        35                  40                  45

Ser Arg Ile His Thr Asp Gly Ser Ser Ile Ser Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Ile Gly Gly Gly Tyr Ser Tyr Gly Ser Val Asp Tyr Trp
            100                 105                 110

Gly Gln Gly Thr Leu Val Thr Val Ser Ser
            115                 120

<210> SEQ ID NO 68
<211> LENGTH: 108
<212> TYPE: PRT
<213> ORGANISM: Artificial sequence
<220> FEATURE:
<223> OTHER INFORMATION: Synthetic polypeptide

<400> SEQUENCE: 68

```
Gln Pro Val Leu Thr Gln Ser Pro Ser Val Ser Val Ala Pro Gly Lys
1               5                   10                  15

Thr Thr Arg Ile Thr Cys Gly Gly Asp Asn Ile Gly Ser Lys Ser Val
            20                  25                  30

His Trp Phe Gln Gln Lys Pro Gly Gln Ala Pro Val Leu Val Val Phe
        35                  40                  45

Gly Gly Gly Asp Arg Pro Ser Gly Ile Pro Glu Arg Phe Ser Gly Ser
    50                  55                  60

Asn Ser Gly Asn Thr Ala Thr Leu Ile Ile Ser Gly Val Glu Gly Gly
65                  70                  75                  80

Asp Glu Ala Asp Tyr Tyr Cys Gln Val Trp Asp Gly Ser Thr Asp His
                85                  90                  95

Tyr Ile Phe Gly Ala Gly Thr Met Val Thr Val Leu
            100                 105
```

<210> SEQ ID NO 69
<211> LENGTH: 123
<212> TYPE: PRT
<213> ORGANISM: Artificial sequence
<220> FEATURE:
<223> OTHER INFORMATION: Synthetic polypeptide

<400> SEQUENCE: 69

```
Gln Val Lys Leu Val Glu Ser Gly Pro Glu Val Lys Lys Pro Gly Ala
1               5                   10                  15

Ser Val Lys Val Ser Cys Lys Ala Ser Asp Tyr Thr Phe Thr Ser Tyr
            20                  25                  30

Gly Ile Ser Trp Val Arg Leu Ala Pro Gly Gln Gly Leu Glu Trp Met
        35                  40                  45

Gly Trp Ile Ser Ala Tyr Asn Gly Asn Thr Asn Tyr Pro Gln Lys Leu
    50                  55                  60

Gln Gly Arg Val Thr Val Thr Thr Asp Thr Ser Thr Ser Thr Ala Tyr
65                  70                  75                  80

Met Glu Leu Arg Ser Leu Thr Ser Asp Asp Thr Ala Val Tyr Tyr Cys
                85                  90                  95

Ala Arg Val His Pro Arg His Ile Ile Gly Ala Gly Tyr Phe Asp Tyr
            100                 105                 110

Trp Gly Gln Gly Thr Met Val Thr Val Ser Ser
        115                 120
```

<210> SEQ ID NO 70
<211> LENGTH: 105
<212> TYPE: PRT
<213> ORGANISM: Artificial sequence
<220> FEATURE:
<223> OTHER INFORMATION: Synthetic polypeptide

<400> SEQUENCE: 70

```
Leu Pro Val Leu Thr Gln Pro Arg Ser Val Ala Gly Ser Pro Gly Gln
1               5                   10                  15
```

```
Ser Val Thr Ile Ser Cys Thr Gly Ser Ser Asp Val Gly Val Tyr
            20                  25                  30

Asp Tyr Val Ser Trp Tyr Gln Gln His Pro Gly Lys Val Pro Arg Leu
        35                  40                  45

Met Ile Tyr Asp Val Ser Lys Arg Pro Pro Gly Val Pro Asp Arg Phe
 50                  55                  60

Ser Gly Ser Arg Ser Gly Asn Thr Ala Ser Leu Thr Ile Ser Gly Leu
 65                  70                  75                  80

Gln Thr Glu Asp Glu Ala Asp Tyr Tyr Cys Ala Tyr Thr Phe Val Phe
                85                  90                  95

Gly Thr Gly Thr Asn Val Ser Val Leu
            100                 105

<210> SEQ ID NO 71
<211> LENGTH: 124
<212> TYPE: PRT
<213> ORGANISM: Artificial sequence
<220> FEATURE:
<223> OTHER INFORMATION: Synthetic polypeptide

<400> SEQUENCE: 71

Pro Ser Phe Val Val Gln Ser Gly Ala Glu Val Lys Lys Pro Gly Ala
 1               5                  10                  15

Ser Val Lys Val Ser Cys Lys Ala Ser Gly Tyr Thr Phe Thr Ser Tyr
            20                  25                  30

Tyr Met His Trp Val Arg Gln Ala Pro Gly Gln Gly Leu Glu Trp Met
        35                  40                  45

Gly Ile Ile Asn Pro Ser Gly Gly Ser Thr Ser Tyr Ala Gln Lys Phe
 50                  55                  60

Gln Gly Arg Val Pro Met Thr Arg Asp Thr Ser Thr Ser Thr Val Tyr
 65                  70                  75                  80

Leu Glu Leu Asn Ser Leu Arg Ser Glu Asp Thr Ala Val Tyr Tyr Cys
                85                  90                  95

Ala Ile Phe Ala Pro Pro Asp Tyr Gly Asp Tyr Val Asp Ala Phe Asp
            100                 105                 110

Ile Trp Gly Gln Gly Thr Leu Ile Ile Val Ser Ser
        115                 120

<210> SEQ ID NO 72
<211> LENGTH: 108
<212> TYPE: PRT
<213> ORGANISM: Artificial sequence
<220> FEATURE:
<223> OTHER INFORMATION: Synthetic polypeptide

<400> SEQUENCE: 72

Asp Val Val Met Thr Gln Ser Pro Leu Ser Leu Pro Val Thr Pro Gly
 1               5                  10                  15

Glu Pro Ala Ser Ile Ser Cys Arg Ser Ser Gln Ser Leu Leu His Ser
            20                  25                  30

Asn Gly Tyr Asn Tyr Leu Asp Trp Tyr Leu Gln Lys Pro Gly Gln Ser
        35                  40                  45

Pro Gln Leu Leu Ile Tyr Leu Gly Ser Asn Arg Ala Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Met Gln Ala
                85                  90                  95
```

```
Leu Gln Thr Pro Arg Gly Thr Lys Val Glu Ile Lys
            100                 105
```

```
<210> SEQ ID NO 73
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 73

Gln Ser Ala Leu Asn Gln Pro Pro Ser Ala Ser Gly Ser Pro Gly Gln
1               5                   10                  15

Ala Val Thr Ile Ser Cys Thr Gly Ser Ser Gly Asp Ile Gly Phe Tyr
            20                  25                  30

Asn Tyr Val Ser Trp Tyr Gln Gln His Pro Gly Lys Ala Pro Lys Leu
        35                  40                  45

Leu Ile Phe Glu Val Asn Gln Arg Pro Ser Gly Val Pro Asp Arg Phe
    50                  55                  60

Ser Gly Ser Arg Ser Gly Ser Thr Ala Ser Leu Thr Val Ser Gly Leu
65                  70                  75                  80

Gln Ala Asp Asp Glu Ala Asp Tyr Tyr Cys Val Ser Tyr Gly Ile Ser
                85                  90                  95

Asp Thr Val Leu Phe Gly Gly Gly Thr Arg Leu Thr Val Leu
            100                 105                 110
```

```
<210> SEQ ID NO 74
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 74

Gln Ser Ala Leu Thr Gln Pro Pro Ser Ala Ser Gly Ser Pro Gly Gln
1               5                   10                  15

Ala Val Thr Ile Ser Cys Thr Gly Ser Ser Gly Asp Ile Gly Phe Tyr
            20                  25                  30

Asn Tyr Val Ser Trp Tyr Gln Gln His Pro Gly Lys Ala Pro Lys Leu
        35                  40                  45

Leu Ile Phe Glu Val Asn Gln Arg Pro Ser Gly Val Pro Asp Arg Phe
    50                  55                  60

Ser Gly Ser Lys Ser Gly Thr Thr Ala Ser Leu Thr Val Ser Gly Leu
65                  70                  75                  80

Gln Ala Asp Asp Glu Ala His Tyr Tyr Cys Val Ser Tyr Gly Ile Ser
                85                  90                  95

Asp Thr Val Leu Phe Gly Gly Gly Thr Lys Leu Thr Val Leu
            100                 105                 110
```

```
<210> SEQ ID NO 75
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 75

Gln Ser Val Leu Thr Gln Pro Pro Ser Ala Ser Gly Thr Pro Gly Gln
1               5                   10                  15
```

```
Arg Val Thr Phe Ser Cys Ser Gly Ser Ile Ser Asn Ile Gly Ser Asn
            20                  25                  30

Ala Val Asn Trp Tyr Gln Gln Leu Pro Gly Thr Ala Pro Ser Leu Leu
        35                  40                  45

Ile Tyr Ser Asp Asn Gln Arg Pro Ser Gly Val Pro Asp Arg Phe Ser
    50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Asp Ser Leu
                85                  90                  95

Asn Gly Asn Val Phe Gly Thr Gly Thr Lys Val Thr Val Leu
            100                 105                 110

<210> SEQ ID NO 76
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 76

Gln Ser Val Leu Thr Gln Pro Pro Ser Val Ser Gly Ala Pro Gly Gln
1               5                   10                  15

Arg Val Thr Ile Ser Cys Ser Gly Ser Ser Asn Ile Gly Ile Asn
            20                  25                  30

Ala Val Asn Trp Tyr Gln Gln Val Pro Gly Thr Ala Pro Lys Leu Leu
        35                  40                  45

Met Tyr Ser Asn Asp Gln Arg Pro Ser Gly Val Pro Ala Arg Phe Ser
    50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Asp Ser Leu
                85                  90                  95

Asn Ala Asn Val Phe Gly Thr Gly Thr Lys Val Thr Val Leu
            100                 105                 110

<210> SEQ ID NO 77
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 77

Gln Ser Val Leu Thr Gln Ser Pro Ser Ala Ser Gly Thr Pro Gly Gln
1               5                   10                  15

Arg Val Thr Ile Ser Cys Ser Gly Ser Ser Asn Ile Gly Ser Asn
            20                  25                  30

Pro Val Asn Trp Tyr Gln Gln Leu Pro Gly Thr Val Pro Thr Leu Leu
        35                  40                  45

Ile Phe Asn Thr Gly Gln Arg Pro Ser Gly Val Pro Asp Arg Phe Ser
    50                  55                  60

Gly Ser Arg Ser Gly Thr Ser Ala Ser Leu Ala Ile Ser Gly Leu Gln
65                  70                  75                  80

Ser Glu Asp Glu Ala Asp Tyr Tyr Cys Ala Ala Trp Asp Asp Arg Leu
                85                  90                  95

Asn Gly Asn Val Phe Gly Thr Gly Thr Lys Val Thr Val Leu
            100                 105                 110
```

<210> SEQ ID NO 78
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 78

```
Asp Ile Val Met Thr Gln Ser Pro Ser Ser Leu Ser Ala Ser Val Gly
1               5                   10                  15

Asp Arg Val Thr Ile Thr Cys Arg Ala Ser Gln Ser Val Asn Asn Phe
            20                  25                  30

Leu Asn Trp Tyr Gln His Arg Pro Gly Lys Ala Pro Lys Leu Leu Ile
        35                  40                  45

Tyr Ala Val Ser Ser Leu Gln Ser Gly Val Pro Ser Arg Phe Ser Gly
    50                  55                  60

Ser Gly Phe Gly Thr Asp Phe Thr Leu Thr Ile Ser Ser Leu Gln Pro
65                  70                  75                  80

Glu Asp Phe Ala Thr Tyr Tyr Cys Gln Gln Ser Ser Ser Ala Pro Asn
                85                  90                  95

Thr Phe Gly Gln Gly Thr Lys Leu Glu Ile Lys
            100                 105
```

<210> SEQ ID NO 79
<211> LENGTH: 110
<212> TYPE: PRT
<213> ORGANISM: Artificial sequence
<220> FEATURE:
<223> OTHER INFORMATION: Synthetic polypeptide

<400> SEQUENCE: 79

```
Asn Phe Met Leu Thr Gln Pro His Ser Val Ser Glu Ser Pro Gly Lys
1               5                   10                  15

Thr Val Thr Ile Ser Cys Thr Arg Ser Ser Gly Ser Val Gly Glu Tyr
            20                  25                  30

Tyr Val Gln Trp Tyr Gln His Arg Pro Gly Ser Ile Pro Thr Phe Val
        35                  40                  45

Ile Tyr Glu Asp Tyr Lys Arg Pro Ser Gly Val Pro Val Arg Phe Ser
    50                  55                  60

Gly Ser Val Asp Ser Ala Ser Asn Ser Ala Thr Leu Ile Ile Ser Gly
65                  70                  75                  80

Leu Ile Pro Glu Asp Glu Ala Asp Tyr Tyr Cys Gln Ser Tyr Asp Gly
                85                  90                  95

Ser Asn Phe Val Phe Gly Thr Gly Thr Arg Val Thr Val Leu
            100                 105                 110
```

<210> SEQ ID NO 80
<211> LENGTH: 112
<212> TYPE: PRT
<213> ORGANISM: Artificial sequence
<220> FEATURE:
<223> OTHER INFORMATION: Synthetic polypeptide

<400> SEQUENCE: 80

```
Gln Ala Val Leu Thr Gln Pro Pro Ser Ala Ser Gly Thr Pro Gly Gln
1               5                   10                  15

Arg Val Thr Ile Ser Cys Ser Gly Ser Gly Ser Asn Ile Gly Ile Asn
            20                  25                  30
```

```
Pro Val Asn Trp Tyr Gln Gln Leu Pro Gly Thr Ala Pro Lys Leu Leu
            35                  40                  45

Ile Tyr Ser Asp Asp Gln Arg Pro Ser Gly Val Pro Asp Arg Phe Ser
 50                  55                  60

Gly Ser Lys Ser Gly Thr Ser Ala Ser Leu Ala Ile Ser Gly Leu Gln
 65                  70                  75                  80

Ser Glu Asp Glu Ala Asp Tyr Tyr Cys Ala Ala Trp Asp Asp Ser Leu
                 85                  90                  95

Asn Gly Pro Gly Asn Val Phe Gly Thr Gly Thr Lys Val Thr Val Leu
                100                 105                 110

<210> SEQ ID NO 81
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 81

Pro Gly Pro Leu Val Gln Ser Gly Ala Glu Val Lys Lys Pro Gly Ala
 1               5                  10                  15

Ser Val Lys Val Ser Cys Thr Thr Ser
                 20                  25

<210> SEQ ID NO 82
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 82

Phe Asn Trp Val Arg Gln Ala Pro Gly Gln Gly Leu Glu Trp Met Gly
 1               5                  10                  15

Trp

<210> SEQ ID NO 83
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 83

Asn Tyr Ala Gln Lys Phe Gln Gly Arg Val Thr Met Thr Thr Asp Thr
 1               5                  10                  15

Ser Thr Ser Thr Ser Tyr Val Glu Leu Glu Ser Leu Thr Ser Asp Asp
                 20                  25                  30

Thr Ala Val Tyr Tyr Cys
        35

<210> SEQ ID NO 84
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 84

Trp Gly Gln Gly Thr Leu Ile Ile Val Ser Ser
 1               5                  10
```

<210> SEQ ID NO 85
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 85

Asn Phe Met Leu Thr Gln Pro Pro Ser Ala Ser Gly Thr Pro Gly Gln
1               5                   10                  15

Arg Val Thr Ile Ser Cys Ser Gly Ser
            20                  25

<210> SEQ ID NO 86
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 86

Val Asn Trp Tyr Gln Gln Leu Pro Gly Thr Ala Pro Lys Leu Leu Ile
1               5                   10                  15

Tyr

<210> SEQ ID NO 87
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 87

Gln Arg Pro Ser Gly Val Pro Asp Arg Phe Ser Gly Ser Lys Ser Gly
1               5                   10                  15

Thr Ser Ala Ser Leu Ala Ile Ser Gly Leu Gln Ser Glu Asp Glu Ala
            20                  25                  30

Asp Tyr Tyr Cys
        35

<210> SEQ ID NO 88
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 88

Phe Gly Gly Gly Thr Lys Leu Thr Val Leu
1               5                   10

<210> SEQ ID NO 89
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 89

Gln Val Gln Leu Val Gln Ser Gly Ala Glu Val Lys Lys Pro Gly Glu
1               5                   10                  15

Ser Leu Lys Ile Ser Cys Lys Ala Ser
            20                  25

```
<210> SEQ ID NO 90
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 90

Ile Gly Trp Val Arg Gln Met Pro Gly Lys Gly Leu Glu Trp Met Gly
1               5                   10                  15

Ile

<210> SEQ ID NO 91
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 91

Ile Tyr Ser Pro Ser Phe Gln Gly Gln Val Thr Ile Ser Ala Asp Lys
1               5                   10                  15

Ser Ile Ser Thr Ala Phe Leu Gln Leu Thr Ser Leu Lys Ala Ser Asp
            20                  25                  30

Ser Ala Ile Tyr Ser Cys
        35

<210> SEQ ID NO 92
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 92

Trp Gly Arg Gly Thr Leu Val Ile Val Ser
1               5                   10

<210> SEQ ID NO 93
<211> LENGTH: 26
<212> TYPE: PRT
<213> ORGANISM: Artificial sequence
<220> FEATURE:
<223> OTHER INFORMATION: Synthetic polypeptide

<400> SEQUENCE: 93

Asn Ile Gln Met Thr Gln Ser Pro Ser Ser Val Ser Ala Ser Val Gly
1               5                   10                  15

Asp Arg Val Thr Ile Thr Cys Arg Ala Ser
            20                  25

<210> SEQ ID NO 94
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 94

Leu Ala Trp Tyr Gln Gln Lys Pro Gly Lys Arg Pro Asn Leu Leu Ile
1               5                   10                  15

Tyr

<210> SEQ ID NO 95
```

```
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 95

Thr Leu Gln Ser Gly Val Pro Ser Arg Phe Ser Gly Ser Gly Ser Gly
1               5                   10                  15

Thr Asp Phe Thr Leu Thr Ile Ser Ser Leu Gln Pro Glu Asp Phe Ala
            20                  25                  30

Thr Tyr Tyr Cys
        35

<210> SEQ ID NO 96
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 96

Phe Gly Gln Gly Thr Lys Leu Glu Ile Lys
1               5                   10

<210> SEQ ID NO 97
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 97

Gln Val Gln Leu Val Gln Ser Gly Ala Glu Val Lys Lys Pro Gly Glu
1               5                   10                  15

Ser Leu Lys Ile Ser Cys Lys Gly Ser
            20                  25

<210> SEQ ID NO 98
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 98

Ile Gly Trp Val Arg Gln Met Pro Gly Lys Gly Leu Glu Trp Met Gly
1               5                   10                  15

Ile

<210> SEQ ID NO 99
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 99

Arg Tyr Ser Pro Ser Phe Gln Gly Gln Val Thr Ile Ser Ala Asp Lys
1               5                   10                  15

Ser Ile Ser Thr Ala Tyr Leu Gln Trp Ser Ser Leu Lys Ala Ser Asp
            20                  25                  30

Thr Ala Met Tyr Tyr Cys
        35
```

```
<210> SEQ ID NO 100
<211> LENGTH: 12
<212> TYPE: PRT
<213> ORGANISM: Artificial sequence
<220> FEATURE:
<223> OTHER INFORMATION: Synthetic polypeptide

<400> SEQUENCE: 100

Asn Trp Gly Gln Gly Thr Leu Val Thr Val Ser Ser
1               5                   10

<210> SEQ ID NO 101
<211> LENGTH: 26
<212> TYPE: PRT
<213> ORGANISM: Artificial sequence
<220> FEATURE:
<223> OTHER INFORMATION: Synthetic polypeptide

<400> SEQUENCE: 101

Glu Ile Val Met Thr Gln Ser Pro Leu Ser Leu Pro Val Thr Pro Gly
1               5                   10                  15

Glu Pro Ala Ser Ile Ser Cys Arg Ser Ser
            20                  25

<210> SEQ ID NO 102
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 102

Leu Asp Trp Tyr Leu Gln Lys Pro Gly Gln Ser Pro Gln Leu Leu Ile
1               5                   10                  15

Tyr

<210> SEQ ID NO 103
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 103

Asn Arg Ala Ser Gly Val Pro Asp Arg Phe Ser Gly Ser Gly Ser Gly
1               5                   10                  15

Thr Asp Phe Thr Leu Lys Ile Ser Arg Val Glu Ala Glu Asp Val Gly
            20                  25                  30

Val Tyr Tyr Cys
        35

<210> SEQ ID NO 104
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 104

Phe Gly Gly Gly Thr Lys Val Glu Ile Lys
1               5                   10

<210> SEQ ID NO 105
```

```
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 105

Pro Gly Ala Ala Ala Gly Val Gly Gly Leu Val Gln Pro Gly Gly
1               5                   10                  15

Ser Leu Arg Leu Ser Cys Glu Ala Ser
            20                  25

<210> SEQ ID NO 106
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 106

Met His Trp Val Arg Gln Ala Pro Gly Lys Gly Leu Val Trp Val Ser
1               5                   10                  15

Arg

<210> SEQ ID NO 107
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 107

Ser Tyr Ala Asp Ser Val Lys Gly Arg Phe Thr Ile Ser Arg Asp Asn
1               5                   10                  15

Ala Lys Asn Thr Leu Tyr Leu Gln Met Asn Ser Leu Arg Ala Glu Asp
            20                  25                  30

Thr Ala Val Tyr Tyr Cys
            35

<210> SEQ ID NO 108
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 108

Trp Gly Gln Gly Thr Leu Val Thr Val Ser Ser
1               5                   10

<210> SEQ ID NO 109
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 109

Gln Pro Val Leu Thr Gln Ser Pro Ser Val Ser Val Ala Pro Gly Lys
1               5                   10                  15

Thr Thr Arg Ile Thr Cys Gly Gly Asp
            20                  25

<210> SEQ ID NO 110
```

```
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 110

Val His Trp Phe Gln Gln Lys Pro Gly Gln Ala Pro Val Leu Val Val
1               5                   10                  15

Phe

<210> SEQ ID NO 111
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 111

Asp Arg Pro Ser Gly Ile Pro Glu Arg Phe Ser Gly Ser Asn Ser Gly
1               5                   10                  15

Asn Thr Ala Thr Leu Ile Ile Ser Gly Val Glu Gly Gly Asp Glu Ala
            20                  25                  30

Asp Tyr Tyr Cys
        35

<210> SEQ ID NO 112
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 112

Phe Gly Ala Gly Thr Met Val Thr Val Leu
1               5                   10

<210> SEQ ID NO 113
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 113

Gln Val Lys Leu Val Glu Ser Gly Pro Glu Val Lys Lys Pro Gly Ala
1               5                   10                  15

Ser Val Lys Val Ser Cys Lys Ala Ser
            20                  25

<210> SEQ ID NO 114
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 114

Ile Ser Trp Val Arg Leu Ala Pro Gly Gln Gly Leu Glu Trp Met Gly
1               5                   10                  15

Trp

<210> SEQ ID NO 115
<211> LENGTH: 38
```

```
<212> TYPE: PRT
<213> ORGANISM: Artificial sequence
<220> FEATURE:
<223> OTHER INFORMATION: Synthetic polypeptide

<400> SEQUENCE: 115

Asn Tyr Pro Gln Lys Leu Gln Gly Arg Val Thr Val Thr Thr Asp Thr
1               5                   10                  15
Ser Thr Ser Thr Ala Tyr Met Glu Leu Arg Ser Leu Thr Ser Asp Asp
            20                  25                  30
Thr Ala Val Tyr Tyr Cys
        35

<210> SEQ ID NO 116
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 116

Trp Gly Gln Gly Thr Met Val Thr Val Ser Ser
1               5                   10

<210> SEQ ID NO 117
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 117

Leu Pro Val Leu Thr Gln Pro Arg Ser Val Ala Gly Ser Pro Gly Gln
1               5                   10                  15
Ser Val Thr Ile Ser Cys Thr Gly Ser
            20                  25

<210> SEQ ID NO 118
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 118

Val Ser Trp Tyr Gln Gln His Pro Gly Lys Val Pro Arg Leu Met Ile
1               5                   10                  15
Tyr

<210> SEQ ID NO 119
<211> LENGTH: 35
<212> TYPE: PRT
<213> ORGANISM: Artificial sequence
<220> FEATURE:
<223> OTHER INFORMATION: Synthetic polypeptide

<400> SEQUENCE: 119

Lys Arg Pro Pro Gly Val Pro Asp Arg Phe Ser Gly Ser Arg Ser Gly
1               5                   10                  15
Asn Thr Ala Ser Leu Thr Ile Ser Gly Leu Gln Thr Glu Asp Glu Ala
            20                  25                  30
Asp Tyr Tyr
        35
```

<210> SEQ ID NO 120
<211> LENGTH: 7
<212> TYPE: PRT
<213> ORGANISM: Artificial sequence
<220> FEATURE:
<223> OTHER INFORMATION: Synthetic polypeptide

<400> SEQUENCE: 120

Gly Thr Asn Val Ser Val Leu
1               5

<210> SEQ ID NO 121
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 121

Pro Ser Phe Val Val Gln Ser Gly Ala Glu Val Lys Lys Pro Gly Ala
1               5                   10                  15

Ser Val Lys Val Ser Cys Lys Ala Ser
            20                  25

<210> SEQ ID NO 122
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 122

Met His Trp Val Arg Gln Ala Pro Gly Gln Gly Leu Glu Trp Met Gly
1               5                   10                  15

Ile

<210> SEQ ID NO 123
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 123

Ser Tyr Ala Gln Lys Phe Gln Gly Arg Val Pro Met Thr Arg Asp Thr
1               5                   10                  15

Ser Thr Ser Thr Val Tyr Leu Glu Leu Asn Ser Leu Arg Ser Glu Asp
            20                  25                  30

Thr Ala Val Tyr Tyr Cys
        35

<210> SEQ ID NO 124
<211> LENGTH: 11
<212> TYPE: PRT
<213> ORGANISM: Artificial sequence
<220> FEATURE:
<223> OTHER INFORMATION: Synthetic polypeptide

<400> SEQUENCE: 124

Trp Gly Gln Gly Thr Leu Ile Ile Val Ser Ser
1               5                   10

<210> SEQ ID NO 125
<211> LENGTH: 26

```
<212> TYPE: PRT
<213> ORGANISM: Artificial sequence
<220> FEATURE:
<223> OTHER INFORMATION: Synthetic polypeptide

<400> SEQUENCE: 125

Asp Val Val Met Thr Gln Ser Pro Leu Ser Leu Pro Val Thr Pro Gly
1               5                   10                  15

Glu Pro Ala Ser Ile Ser Cys Arg Ser Ser
            20                  25

<210> SEQ ID NO 126
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 126

Leu Asp Trp Tyr Leu Gln Lys Pro Gly Gln Ser Pro Gln Leu Leu Ile
1               5                   10                  15

Tyr

<210> SEQ ID NO 127
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 127

Asn Arg Ala Ser Gly Val Pro Asp Arg Phe Ser Gly Ser Gly Ser Gly
1               5                   10                  15

Thr Asp Phe Thr Leu Lys Ile Ser Arg Val Glu Ala Glu Asp Val Gly
            20                  25                  30

Val Tyr Tyr Cys
        35

<210> SEQ ID NO 128
<211> LENGTH: 2
<212> TYPE: PRT
<213> ORGANISM: Artificial sequence
<220> FEATURE:
<223> OTHER INFORMATION: Synthetic polypeptide

<400> SEQUENCE: 128

Ile Lys
1

<210> SEQ ID NO 129
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 129

Gln Ser Ala Leu Asn Gln Pro Pro Ser Ala Ser Gly Ser Pro Gly Gln
1               5                   10                  15

Ala Val Thr Ile Ser Cys Thr Gly Ser
            20                  25

<210> SEQ ID NO 130
<211> LENGTH: 17
```

```
<212> TYPE: PRT
<213> ORGANISM: Artificial sequence
<220> FEATURE:
<223> OTHER INFORMATION: Synthetic polypeptide

<400> SEQUENCE: 130

Val Ser Trp Tyr Gln Gln His Pro Gly Lys Ala Pro Lys Leu Leu Ile
1               5                   10                  15

Phe

<210> SEQ ID NO 131
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 131

Gln Arg Pro Ser Gly Val Pro Asp Arg Phe Ser Gly Ser Arg Ser Gly
1               5                   10                  15

Ser Thr Ala Ser Leu Thr Val Ser Gly Leu Gln Ala Asp Asp Glu Ala
            20                  25                  30

Asp Tyr Tyr Cys
            35

<210> SEQ ID NO 132
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 132

Phe Gly Gly Gly Thr Arg Leu Thr Val Leu
1               5                   10

<210> SEQ ID NO 133
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 133

Gln Ser Ala Leu Thr Gln Pro Pro Ser Ala Ser Gly Ser Pro Gly Gln
1               5                   10                  15

Ala Val Thr Ile Ser Cys Thr Gly Ser
            20                  25

<210> SEQ ID NO 134
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 134

Val Ser Trp Tyr Gln Gln His Pro Gly Lys Ala Pro Lys Leu Leu Ile
1               5                   10                  15

Phe

<210> SEQ ID NO 135
<211> LENGTH: 36
<212> TYPE: PRT
```

<213> ORGANISM: Artificial sequence
<220> FEATURE:
<223> OTHER INFORMATION: Synthetic polypeptide

<400> SEQUENCE: 135

Gln Arg Pro Ser Gly Val Pro Asp Arg Phe Ser Gly Ser Lys Ser Gly
1               5                   10                  15

Thr Thr Ala Ser Leu Thr Val Ser Gly Leu Gln Ala Asp Asp Glu Ala
            20                  25                  30

His Tyr Tyr Cys
        35

<210> SEQ ID NO 136
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 136

Phe Gly Gly Gly Thr Lys Leu Thr Val Leu
1               5                   10

<210> SEQ ID NO 137
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 137

Gln Ser Val Leu Thr Gln Pro Pro Ser Ala Ser Gly Thr Pro Gly Gln
1               5                   10                  15

Arg Val Thr Phe Ser Cys Ser Gly Ser
            20                  25

<210> SEQ ID NO 138
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 138

Val Asn Trp Tyr Gln Gln Leu Pro Gly Thr Ala Pro Ser Leu Leu Ile
1               5                   10                  15

Tyr

<210> SEQ ID NO 139
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 139

Gln Arg Pro Ser Gly Val Pro Asp Arg Phe Ser Gly Ser Lys Ser Gly
1               5                   10                  15

Thr Ser Ala Ser Leu Ala Ile Ser Gly Leu Gln Ser Glu Asp Glu Ala
            20                  25                  30

Asp Tyr Tyr Cys
        35

```
<210> SEQ ID NO 140
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 140

Phe Gly Thr Gly Thr Lys Val Thr Val Leu
1               5                   10

<210> SEQ ID NO 141
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 141

Gln Ser Val Leu Thr Gln Pro Pro Ser Val Ser Gly Ala Pro Gly Gln
1               5                   10                  15

Arg Val Thr Ile Ser Cys Ser Gly Ser
            20                  25

<210> SEQ ID NO 142
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 142

Val Asn Trp Tyr Gln Gln Val Pro Gly Thr Ala Pro Lys Leu Leu Met
1               5                   10                  15

Tyr

<210> SEQ ID NO 143
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 143

Gln Arg Pro Ser Gly Val Pro Ala Arg Phe Ser Gly Ser Lys Ser Gly
1               5                   10                  15

Thr Ser Ala Ser Leu Ala Ile Ser Gly Leu Gln Ser Glu Asp Glu Ala
            20                  25                  30

Asp Tyr Tyr Cys
        35

<210> SEQ ID NO 144
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 144

Phe Gly Thr Gly Thr Lys Val Thr Val Leu
1               5                   10

<210> SEQ ID NO 145
<211> LENGTH: 25
<212> TYPE: PRT
```

<213> ORGANISM: Artificial sequence
<220> FEATURE:
<223> OTHER INFORMATION: Synthetic polypeptide

<400> SEQUENCE: 145

Gln Ser Val Leu Thr Gln Ser Pro Ala Ser Gly Thr Pro Gly Gln
1               5                   10                  15

Arg Val Thr Ile Ser Cys Ser Gly Ser
            20                  25

<210> SEQ ID NO 146
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 146

Val Asn Trp Tyr Gln Gln Leu Pro Gly Thr Val Pro Thr Leu Leu Ile
1               5                   10                  15

Phe

<210> SEQ ID NO 147
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 147

Gln Arg Pro Ser Gly Val Pro Asp Arg Phe Ser Gly Ser Arg Ser Gly
1               5                   10                  15

Thr Ser Ala Ser Leu Ala Ile Ser Gly Leu Gln Ser Glu Asp Glu Ala
            20                  25                  30

Asp Tyr Tyr Cys
        35

<210> SEQ ID NO 148
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 148

Phe Gly Thr Gly Thr Lys Val Thr Val Leu
1               5                   10

<210> SEQ ID NO 149
<211> LENGTH: 26
<212> TYPE: PRT
<213> ORGANISM: Artificial sequence
<220> FEATURE:
<223> OTHER INFORMATION: Synthetic polypeptide

<400> SEQUENCE: 149

Asp Ile Val Met Thr Gln Ser Pro Ser Ser Leu Ser Ala Ser Val Gly
1               5                   10                  15

Asp Arg Val Thr Ile Thr Cys Arg Ala Ser
            20                  25

<210> SEQ ID NO 150
<211> LENGTH: 17
<212> TYPE: PRT

<213> ORGANISM: Artificial sequence
<220> FEATURE:
<223> OTHER INFORMATION: Synthetic polypeptide

<400> SEQUENCE: 150

```
Leu Asn Trp Tyr Gln His Arg Pro Gly Lys Ala Pro Lys Leu Leu Ile
1               5                   10                  15

Tyr
```

<210> SEQ ID NO 151
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 151

```
Ser Leu Gln Ser Gly Val Pro Ser Arg Phe Ser Gly Ser Gly Phe Gly
1               5                   10                  15

Thr Asp Phe Thr Leu Thr Ile Ser Ser Leu Gln Pro Glu Asp Phe Ala
            20                  25                  30

Thr Tyr Tyr Cys
        35
```

<210> SEQ ID NO 152
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 152

```
Phe Gly Gln Gly Thr Lys Leu Glu Ile Lys
1               5                   10
```

<210> SEQ ID NO 153
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 153

```
Asn Phe Met Leu Thr Gln Pro His Ser Val Ser Glu Ser Pro Gly Lys
1               5                   10                  15

Thr Val Thr Ile Ser Cys Thr Arg Ser
            20                  25
```

<210> SEQ ID NO 154
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 154

```
Val Gln Trp Tyr Gln His Arg Pro Gly Ser Ile Pro Thr Phe Val Ile
1               5                   10                  15

Tyr
```

<210> SEQ ID NO 155
<211> LENGTH: 38
<212> TYPE: PRT
<213> ORGANISM: Artificial sequence
<220> FEATURE:
<223> OTHER INFORMATION: Synthetic polypeptide

<400> SEQUENCE: 155

Lys Arg Pro Ser Gly Val Pro Val Arg Phe Ser Gly Ser Val Asp Ser
1               5                   10                  15

Ala Ser Asn Ser Ala Thr Leu Ile Ile Ser Gly Leu Ile Pro Glu Asp
            20                  25                  30

Glu Ala Asp Tyr Tyr Cys
        35

<210> SEQ ID NO 156
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 156

Phe Gly Thr Gly Thr Arg Val Thr Val Leu
1               5                   10

<210> SEQ ID NO 157
<211> LENGTH: 25
<212> TYPE: PRT
<213> ORGANISM: Artificial sequence
<220> FEATURE:
<223> OTHER INFORMATION: Synthetic polypeptide

<400> SEQUENCE: 157

Gln Ala Val Leu Thr Gln Pro Pro Ser Ala Ser Gly Thr Pro Gly Gln
1               5                   10                  15

Arg Val Thr Ile Ser Cys Ser Gly Ser
            20                  25

<210> SEQ ID NO 158
<211> LENGTH: 17
<212> TYPE: PRT
<213> ORGANISM: Artificial sequence
<220> FEATURE:
<223> OTHER INFORMATION: Synthetic polypeptide

<400> SEQUENCE: 158

Val Asn Trp Tyr Gln Gln Leu Pro Gly Thr Ala Pro Lys Leu Leu Ile
1               5                   10                  15

Tyr

<210> SEQ ID NO 159
<211> LENGTH: 36
<212> TYPE: PRT
<213> ORGANISM: Artificial sequence
<220> FEATURE:
<223> OTHER INFORMATION: Synthetic polypeptide

<400> SEQUENCE: 159

Gln Arg Pro Ser Gly Val Pro Asp Arg Phe Ser Gly Ser Lys Ser Gly
1               5                   10                  15

Thr Ser Ala Ser Leu Ala Ile Ser Gly Leu Gln Ser Glu Asp Glu Ala
            20                  25                  30

Asp Tyr Tyr Cys
        35

<210> SEQ ID NO 160

```
<211> LENGTH: 10
<212> TYPE: PRT
<213> ORGANISM: Artificial sequence
<220> FEATURE:
<223> OTHER INFORMATION: Synthetic polypeptide

<400> SEQUENCE: 160

Phe Gly Thr Gly Thr Lys Val Thr Val Leu
1               5                   10

<210> SEQ ID NO 161
<211> LENGTH: 370
<212> TYPE: DNA
<213> ORGANISM: Artificial sequence
<220> FEATURE:
<223> OTHER INFORMATION: Synthetic polynucleotide

<400> SEQUENCE: 161
ccaggtccgc tggtgcagtc tggagctgag gtgaagaagc tggggcctc agtgaaggtc      60 tcctgcacaa cctctggatt ccctttaac atgtatggtt tcaactgggt gcgacaggcc    120
cctggacaag gtcttgagtg gatgggatgg atcagcgctt acaatggtcg cacaaattat    180
gcacagaagt tccagggcag agtcaccatg accacagaca catccacgag cacatcttat    240
gtggaactgg agagcctcac atctgacgac acggccgttt attactgtgc gaggagcgga    300
aagcagcagc tgggttccgc gcaacctctt gactcgtggg gccagggaac cctgatcatc    360
gtctcttcag                                                          370

<210> SEQ ID NO 162
<211> LENGTH: 327
<212> TYPE: DNA
<213> ORGANISM: Artificial sequence
<220> FEATURE:
<223> OTHER INFORMATION: Synthetic polynucleotide

<400> SEQUENCE: 162
aattttatgc tgactcagcc accctcagcg tctgggaccc ccgggcagag ggtcaccatc     60
tcttgttctg gaagcagctc caacatcgga agtaatactg taaactggta ccagcagctc    120
ccaggaacgg cccccaaact cctcatctat agtaataatc agcggccctc aggggtccct    180
gaccgattct ctggctccaa gtctggcacc tcagcctccc tggccatcag tgggctccag    240
tctgaggatg aggctgatta ttactgtgca gcatgggatg acagcctgaa tggcctattc    300
ggcggaggga ccaagctgac cgtccta                                        327

<210> SEQ ID NO 163
<211> LENGTH: 356
<212> TYPE: DNA
<213> ORGANISM: Artificial sequence
<220> FEATURE:
<223> OTHER INFORMATION: Synthetic polynucleotide

<400> SEQUENCE: 163
caggtgcagc tggtgcagtc tggagcagag gtgaaaaagc ccggggagtc tctgaagatc     60
tcctgtaagg cttctggata tcgctttacc gactattgga tcggctgggt gcgccagatg    120
cccgggaaag cctggagtg atggggatc atctatcttg gtgactctga aaccatatac      180
agtccgtcct tccaaggcca ggtcaccatc tcagccgaca gtccatcag caccgccttc     240 ctgcagttga ccagcctgaa ggcctcggac agcgccattt attcctgtgc gagaggattc    300
gcttatgggg actggtactt cgatctctgg ggccgtggca cctggtcat cgtctc         356
```

<210> SEQ ID NO 164
<211> LENGTH: 322
<212> TYPE: DNA
<213> ORGANISM: Artificial sequence
<220> FEATURE:
<223> OTHER INFORMATION: Synthetic polynucleotide

<400> SEQUENCE: 164

| | | | | | |
|---|---|---|---|---|---|
| aacatccaga | tgacccagtc | tccatcttct | gtgtctgcat | ctgtaggaga | cagagtcacc | 60 |
| atcacttgtc | gggcgagtca | gggtattgcc | ggctggttag | cctggtatca | gcagaaacct | 120 |
| gggaaacgcc | ctaacctcct | gatctatgct | gcatccactt | tgcaaagtgg | ggtcccatca | 180 |
| aggttcagtg | gcagtggatc | tgggacagat | ttcactctca | ccatcagcag | tctgcaacct | 240 |
| gaagattttg | caacttacta | ctgtcaacag | agttccagta | cccctcacac | ttttggccag | 300 |
| gggaccaagc | tggagatcaa | ac | | | | 322 |

<210> SEQ ID NO 165
<211> LENGTH: 287
<212> TYPE: DNA
<213> ORGANISM: Artificial sequence
<220> FEATURE:
<223> OTHER INFORMATION: Synthetic polynucleotide

<400> SEQUENCE: 165

| | | | | | |
|---|---|---|---|---|---|
| atacagcttt | agcagccact | ggatcggctg | ggtgcgccag | atgcccggga | aaggcctgga | 60 |
| gtggatgggg | atcatctatc | ctggtgactc | tgataccaga | tacagtccgt | ccttccaagg | 120 |
| ccaggtcacc | atctcagccg | acaagtccat | cagcaccgcc | tacctgcagt | ggagtagcct | 180 |
| gaaggcctcg | gacaccgcca | tgtattattg | tgcgagaggg | gagttaccgg | gagaggcgta | 240 |
| ctactttgac | aactggggcc | agggaaccct | ggtcaccgtc | tcctcag | | 287 |

<210> SEQ ID NO 166
<211> LENGTH: 336
<212> TYPE: DNA
<213> ORGANISM: Artificial sequence
<220> FEATURE:
<223> OTHER INFORMATION: Synthetic polynucleotide

<400> SEQUENCE: 166

| | | | | | |
|---|---|---|---|---|---|
| gaaattgtaa | tgacacagtc | tccactctcc | ctgcccgtca | cccctggaga | gccggcctcc | 60 |
| atctcctgca | ggtctagtca | gagcctcctg | catagtaatg | gatacaagta | tttggattgg | 120 |
| tatctgcaga | agccagggca | gtctccacag | ctcctgatct | acttgggctc | taatcgggcc | 180 |
| tccggggtcc | ctgacaggtt | cagtggcagt | ggatcaggca | cagattttac | actgaaaatc | 240 |
| agcagagtgg | aggctgagga | tgttggggtt | tattactgca | tgcaagctct | acaaactcct | 300 |
| ctcactttcg | gcggagggac | caaggtggag | atcaaa | | | 336 |

<210> SEQ ID NO 167
<211> LENGTH: 367
<212> TYPE: DNA
<213> ORGANISM: Artificial sequence
<220> FEATURE:
<223> OTHER INFORMATION: Synthetic polynucleotide

<400> SEQUENCE: 167

| | | | | | |
|---|---|---|---|---|---|
| ccaggtgcag | ctgcaggagt | cgggggaggc | ttagttcagc | ctgggggtc | cctgagactc | 60 |
| tcctgtgaag | cctctggatt | caccttcagt | aggtactgga | tgcactgggt | ccgccaagct | 120 |
| ccagggaagg | ggctggtgtg | ggtctcacgt | attcatactg | atgggagtag | cataagttat | 180 |

```
gcggactccg tgaagggccg attcaccatc tccagagaca acgccaagaa cacgctgtat    240
ctgcaaatga acagtctgag agccgaggac acggctgtgt attactgtgc aagagatata    300
gggggtggat acagctatgg ttcggttgac tactggggcc agggaaccct ggtcaccgtc    360
tcctcag                                                              367

<210> SEQ ID NO 168
<211> LENGTH: 324
<212> TYPE: DNA
<213> ORGANISM: Artificial sequence
<220> FEATURE:
<223> OTHER INFORMATION: Synthetic polynucleotide

<400> SEQUENCE: 168
cagcctgtgc tgactcaatc accctctgtg tcagtggccc caggaaagac gaccaggatt     60
acctgtgggg gagacaacat tggaagtaaa agtgtgcact ggttccagca gaagccaggc    120
caggcccctg tcctggtcgt ctttggtggt ggcgaccggc cctcaggat ccctgagcga    180 ttctctggct ccaactctgg gaatacggcc accctaatca tcagtggggt cgaaggcggg    240
gatgaggccg actattactg tcaggtttgg gatggtagta ctgatcatta tcttcgga     300 gctgggacca tggtcaccgt ccta                                           324

<210> SEQ ID NO 169
<211> LENGTH: 370
<212> TYPE: DNA
<213> ORGANISM: Artificial sequence
<220> FEATURE:
<223> OTHER INFORMATION: Synthetic polynucleotide

<400> SEQUENCE: 169
caggtgaagc tggtggagtc tggacctgag gtgaagaagc ctggggcctc agtgaaggtc     60
tcctgcaagg cttctgatta caccttacc agttatggta tcagctgggt gcggctggcc    120
cctggacaag gcttgagtg gatgggatgg atcagcgctt acaatggtaa cacaaactat    180
ccacagaagc tccagggcag agtcaccgtg accacagaca catccacgag cacagcctac    240
atggagctga ggagcctgac atctgacgac acggccgtgt attactgtgc gagagtccat    300
ccccgccaca taatcggggc ggggtacttt gactactggg gccaggggac aatggtcacc    360
gtctcctcag                                                           370

<210> SEQ ID NO 170
<211> LENGTH: 315
<212> TYPE: DNA
<213> ORGANISM: Artificial sequence
<220> FEATURE:
<223> OTHER INFORMATION: Synthetic polynucleotide

<400> SEQUENCE: 170
ctgcctgtgc tgactcagcc tcgctcagtg gccgggtctc tggacagtc agtcaccatc      60 tcctgcactg ggtccagcag tgatgttggt gtttatgact atgtctcctg gtaccaacaa    120 cacccccggca aagtccccg actcatgatt tatgatgtca gtaagcggcc ccagggtc     180 ccggatcgct tctctggctc caggtctgga aacacggcc ccctgaccat ctctggcctc    240
cagactgagg atgaggctga ttattactgc gcctacacct tgtcttcgg aactgggacc    300 aatgtctccg tccta                                                     315

<210> SEQ ID NO 171
```

```
<211> LENGTH: 372
<212> TYPE: DNA
<213> ORGANISM: Artificial sequence
<220> FEATURE:
<223> OTHER INFORMATION: Synthetic polynucleotide

<400> SEQUENCE: 171
cccagtttcg tggtgcagtc tggggctgag gtgaagaagc ctggggcctc agtgaaggtt      60
tcctgcaagg catctggata caccttcacc agctactata tgcactgggt gcgacaggcc     120
cctggacaag ggcttgagtg gatgggaata atcaaccctg gtggtggtag cacaagctac     180
gcacagaagt tccagggcag agtccccatg accagggaca cgtccacgag cacagtctac     240
ctggagctga acagcctgag atctgaggac acggccgtgt attactgtgc tatttttgcc     300
ccaccggact acgtgactac cgttgatgct tttgatatct ggggccaagg gacattgatc     360
atcgtctctt ca                                                         372

<210> SEQ ID NO 172
<211> LENGTH: 324
<212> TYPE: DNA
<213> ORGANISM: Artificial sequence
<220> FEATURE:
<223> OTHER INFORMATION: Synthetic polynucleotide

<400> SEQUENCE: 172
gatgttgtga tgacacagtc tccactctcc ctgcccgtca cccctggaga gccggcctcc      60
atctcctgca ggtctagtca gagcctcctg catagtaatg gatacaacta tttggattgg     120
tacctgcaga agccagggca gtctccacag ctcctgatct atttgggttc taatcgggcc     180
tccggggtcc ctgacaggtt cagtggcagt ggatcaggca cagatttac actgaaaatc      240 agcagagtgg aggctgagga tgttggggtt tattactgca tgcaagctct acaaactcct     300
cgagggacca aggtggagat caaa                                            324

<210> SEQ ID NO 173
<211> LENGTH: 331
<212> TYPE: DNA
<213> ORGANISM: Artificial sequence
<220> FEATURE:
<223> OTHER INFORMATION: Synthetic polynucleotide

<400> SEQUENCE: 173
cagtctgccc tgaatcagcc tccctccgcg tccgggtctc ctggacaggc agtcaccatc      60
tcctgcactg gctccagcgg cgacattggg ttttataatt atgtctcgtg gtaccagcag     120
cacccaggca aggcccccaa actcctgatc tttgaggtca atcagcgacc ctcaggggtc     180
cctgatcgct tctcagggtc caggtctggc agcacggcct ccctgaccgt ctcgggctc     240 caggctgacg atgaggctga ctattactgc gtctcatatg gaatttccga cactgttctt     300
ttcggcggag gcaccaggtt gaccgtccta g                                    331

<210> SEQ ID NO 174
<211> LENGTH: 331
<212> TYPE: DNA
<213> ORGANISM: Artificial sequence
<220> FEATURE:
<223> OTHER INFORMATION: Synthetic polynucleotide

<400> SEQUENCE: 174
cagtctgccc tgactcagcc tccctccgcg tccgggtctc ctggacaggc agtcaccatc      60
tcctgcactg gctccagcgg cgacattggg ttttataatt atgtctcctg gtaccagcaa     120
```

```
cacccaggca aagcccccaa actcctcatc tttgaggtca atcagcgacc ctcaggggtc    180
cctgatcgct tctctggctc caagtctggc accacgcct ccctcaccgt ctcgggactc     240
caggctgacg atgaggctca ctattactgc gtctcatatg gaatctccga cactgttctt    300
ttcggcggag gcaccaagtt gaccgtccta g                                   331

<210> SEQ ID NO 175
<211> LENGTH: 331
<212> TYPE: DNA
<213> ORGANISM: Artificial sequence
<220> FEATURE:
<223> OTHER INFORMATION: Synthetic polynucleotide

<400> SEQUENCE: 175
cagtctgtgc tgactcagcc accctcagcg tctgggaccc ccgggcagag ggtcaccttc    60
tcttgttctg gaagcatctc caacatcggg agtaatgctg taaactggta ccagcagctc    120
ccaggaacgg ccccccagtct cctcatctat agtgataatc agcggccctc aggggtccct   180
gaccgattct ctggctccaa gtctggcacc tcagcctccc tggccatcag tgggctccag    240
tctgaggatg aggctgatta ttactgtgca gcatgggatg acagcctgaa tggtaatgtc    300
ttcggaactg ggaccaaggt caccgtccta g                                   331

<210> SEQ ID NO 176
<211> LENGTH: 331
<212> TYPE: DNA
<213> ORGANISM: Artificial sequence
<220> FEATURE:
<223> OTHER INFORMATION: Synthetic polynucleotide

<400> SEQUENCE: 176
cagtctgtgc tgacgcagcc gccctcagtg tctggggccc cagggcagag ggtcaccatc    60
tcttgttctg gaagcagctc caacatcgga attaatgctg taaactggta ccagcaggtc    120
ccaggaacgg ccccccaaact cctcatgtat agtaatgatc agcggccctc aggggtccct   180
gcccgatttt ctggctccaa gtccggcacc tcagcctccc tggccatcag tgggctccag    240
tctgaggatg aggctgatta ttactgtgca gcatgggatg acagcctgaa tgccaatgtc    300
ttcggaaccg ggaccaaggt caccgtccta g                                   331

<210> SEQ ID NO 177
<211> LENGTH: 331
<212> TYPE: DNA
<213> ORGANISM: Artificial sequence
<220> FEATURE:
<223> OTHER INFORMATION: Synthetic polynucleotide

<400> SEQUENCE: 177
cagtctgtgc tgactcagtc accctcagcg tctgggaccc ccgggcagag ggtcaccatc    60
tcttgctcag gaagcagctc caacatcgga agtaatcctg taaactggta ccaacagctc    120
ccaggaacgg tccccacact cctcatcttt aatactggtc agcggccctc aggggtccct   180
gaccgattct ctggctccag gtctggcacc tcagcctccc tggccatcag tgggctccag    240
tctgaggatg aggctgacta ttactgtgca gcatgggatg accgcctgaa tggtaatgtc    300
ttcggaactg ggaccaaggt caccgtccta g                                   331

<210> SEQ ID NO 178
<211> LENGTH: 321
<212> TYPE: DNA
```

<213> ORGANISM: Artificial sequence
<220> FEATURE:
<223> OTHER INFORMATION: Synthetic polynucleotide

<400> SEQUENCE: 178

```
gacatcgtga tgacccagtc tccatcctcc ctgtctgcat ctgtaggaga cagagtgacc    60
atcacttgcc gggcaagcca gagcgttaac aattttttaa attggtatca acacagacca   120
gggaaagccc ctaagctcct gatctatgct gtatccagtt tgcaaagtgg ggtcccatca   180
aggttcagtg gcagtggatt tgggacagat ttcactctca ccatcagcag tctgcaacct   240
gaagattttg caacttatta ttgtcaacag agttccagtg cccctaacac ttttggccag   300
gggaccaagc tggagatcaa a                                             321
```

<210> SEQ ID NO 179
<211> LENGTH: 330
<212> TYPE: DNA
<213> ORGANISM: Artificial sequence
<220> FEATURE:
<223> OTHER INFORMATION: Synthetic polynucleotide

<400> SEQUENCE: 179

```
aattttatgc tgactcagcc acactctgtg tcggagtctc cggggaagac ggtgaccatc    60
tcctgcaccc gcagcagtgg cagcgttggc gaatattatg tgcagtggta ccaacaccgc   120
ccgggcagta ttcccacctt tgtcatctat gaggactaca aaagaccctc tggggtccct   180
gttcggtttt ctggctctgt cgacagcgcc tccaactccg ccaccctcat catctctggg   240
ctgatacctg aggacgaggc tgactactac tgtcagtctt atgatggctc aactttgtc    300 ttcggaactg ggaccagggt caccgtccta                                    330
```

<210> SEQ ID NO 180
<211> LENGTH: 336
<212> TYPE: DNA
<213> ORGANISM: Artificial sequence
<220> FEATURE:
<223> OTHER INFORMATION: Synthetic polynucleotide

<400> SEQUENCE: 180

```
caggctgtgc tgactcagcc accctcagcg tctgggaccc ccgggcagag ggtcaccatc    60
tcttgttctg gaagcggctc caacatcgga attaatcctg taaactggta ccagcagctc   120
ccaggaacgg cccccaaact cctcatctat agtgatgatc agcggccctc agggggtccct   180 gaccgattct ctggctccaa gtctggcacc tcagcctccc tggccattag tgggctccag   240
tctgaggatg aggctgatta ttactgtgca gcatgggatg acagcctgaa tggtccgggg   300
aatgtcttcg gaactgggac caaggtcacc gtccta                             336
```

IL1RAP ANTIBODIES

CROSS-REFERENCES TO RELATED APPLICATIONS

This application is the national stage filing under 35 U.S.C. § 371 of International Application No. PCT/US2020/046001 filed Aug. 12, 2020, which claims priority to U.S. Application No. 62/885,724 filed Aug. 12, 2019, the disclosure of which are incorporated by reference herein in their entirety.

REFERENCE TO A "SEQUENCE LISTING," A TABLE, OR A COMPUTER PROGRAM LISTING APPENDIX SUBMITTED AS AN ASCII FILE

The Sequence Listing written in file 048440-720N01US Sequence Listing ST25.TXT, created on Aug. 27, 2025, 70,086 bytes, machine format IBM-PC, MS Windows operating system, is incorporated herein by reference.

BACKGROUND

Acute myeloid leukemia (AML) is a devastating hematopoietic malignancy that can lead to hematopoiesis failure and death. Despite increasing knowledge of the disease, current treatment options benefit only a minority of AML patients. The limited success of treatments is believed to be at least partially due to the inability of chemotherapy and/or other molecular targeting therapeutics to eliminate so-called leukemia stem cells (LSCs). Thus, there is a need in the art for treatments, which specifically eliminate LSCs while sparing normal hematopoietic stem cells.

Immunotherapeutic approaches hold promise as an effective means of treating patients suffering from AML. In order to be successful, however, immunotherapy must allow for the selective targeting and destruction of LSCs. Provided herein are compositions and methods which cure this and other needs in the art.

BRIEF SUMMARY

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:1, a CDR H2 as set forth in SEQ ID NO:2 and a CDR H3 as set forth in SEQ ID NO:3; and wherein the light chain variable domain includes: a CDR L1 as set forth in SEQ ID NO:4, a CDR L2 as set forth in SEQ ID NO:5, and a CDR L3 as set forth in SEQ ID NO:6.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:7, a CDR H2 as set forth in SEQ ID NO:8 and a CDR H3 as set forth in SEQ ID NO:9; and wherein the light chain variable domain includes: a CDR L1 as set forth in SEQ ID NO:10, a CDR L2 as set forth in SEQ ID NO:11, and a CDR L3 as set forth in SEQ ID NO:12.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:19, a CDR H2 as set forth in SEQ ID NO:20 and a CDR H3 as set forth in SEQ ID NO:21; and wherein the light chain variable domain includes: a CDR L1 as set forth in SEQ ID NO:22, a CDR L2 as set forth in SEQ ID NO:23, and a CDR L3 as set forth in SEQ ID NO:24.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:25, a CDR H2 as set forth in SEQ ID NO:26 and a CDR H3 as set forth in SEQ ID NO:27; and wherein the light chain variable domain includes: a CDR L1 as set forth in SEQ ID NO:28, a CDR L2 as set forth in SEQ ID NO:29, and a CDR L3 as set forth in SEQ ID NO:30.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:31, a CDR H2 as set forth in SEQ ID NO:32 and a CDR H3 as set forth in SEQ ID NO:33; and wherein the light chain variable domain includes: a CDR L1 as set forth in SEQ ID NO:34, a CDR L2 as set forth in SEQ ID NO:35, and a CDR L3 as set forth in SEQ ID NO:36.

In an aspect is provided an anti-interleukin-1 receptor accessory protein (IL1RAP) antibody including a light chain variable domain, wherein the light chain variable domain includes: a CDR L1 as set forth in SEQ ID NO:37, a CDR L2 as set forth in SEQ ID NO:38, and a CDR L3 as set forth in SEQ ID NO:39.

In an aspect is provided an anti-interleukin-1 receptor accessory protein (IL1RAP) antibody including a light chain variable domain, wherein the light chain variable domain includes: a CDR L1 as set forth in SEQ ID NO:40, a CDR L2 as set forth in SEQ ID NO:41, and a CDR L3 as set forth in SEQ ID NO:42.

In an aspect is provided an anti-interleukin-1 receptor accessory protein (IL1RAP) antibody including a light chain variable domain, wherein the light chain variable domain includes: a CDR L1 as set forth in SEQ ID NO:43, a CDR L2 as set forth in SEQ ID NO:44, and a CDR L3 as set forth in SEQ ID NO:45.

In an aspect is provided an anti-interleukin-1 receptor accessory protein (IL1RAP) antibody including a light chain variable domain, wherein the light chain variable domain includes: a CDR L1 as set forth in SEQ ID NO:46, a CDR L2 as set forth in SEQ ID NO:47, and a CDR L3 as set forth in SEQ ID NO:48.

In an aspect is provided an anti-interleukin-1 receptor accessory protein (IL1RAP) antibody including a light chain variable domain, wherein the light chain variable domain includes: a CDR L1 as set forth in SEQ ID NO:49, a CDR L2 as set forth in SEQ ID NO:50, and a CDR L3 as set forth in SEQ ID NO:51.

In an aspect is provided an anti-interleukin-1 receptor accessory protein (IL1RAP) antibody including a light chain variable domain, wherein the light chain variable domain includes: a CDR L1 as set forth in SEQ ID NO:52, a CDR L2 as set forth in SEQ ID NO:53, and a CDR L3 as set forth in SEQ ID NO:54.

In an aspect is provided an anti-interleukin-1 receptor accessory protein (IL1RAP) antibody including a light chain variable domain, wherein the light chain variable domain includes: a CDR L1 as set forth in SEQ ID NO:55, a CDR L2 as set forth in SEQ ID NO:56, and a CDR L3 as set forth in SEQ ID NO:57.

In an aspect is provided an anti-interleukin-1 receptor accessory protein (IL1RAP) antibody including a light chain variable domain, wherein the light chain variable domain includes: a CDR L1 as set forth in SEQ ID NO:58, a CDR L2 as set forth in SEQ ID NO:59, and a CDR L3 as set forth in SEQ ID NO:60.

In an aspect, an isolated nucleic acid encoding an antibody provided herein including embodiments thereof is provided.

In another aspect, a pharmaceutical composition including a therapeutically effective amount of an antibody provided herein including embodiments thereof and a pharmaceutically acceptable excipient is provided.

In another aspect, a method of treating cancer in a subject in need thereof is provided. The method includes administering to a subject a therapeutically effective amount of an antibody provided herein including embodiments thereof, thereby treating cancer in the subject.

In an aspect is provided a recombinant protein including: (i) an antibody region including: (a) a heavy chain variable domain including a CDR H1 as set forth in SEQ ID NO:1, a CDR H2 as set forth in SEQ ID NO:2 and a CDR H3 as set forth in SEQ ID NO:3; and (b) a light chain variable domain including a CDR L1 as set forth in SEQ ID NO:4, a CDR L2 as set forth in SEQ ID NO:5, and a CDR L3 as set forth in SEQ ID NO:6; and (ii) a transmembrane domain.

In another aspect is provided a recombinant protein including: (i) an antibody region including: (a) a heavy chain variable domain including a CDR H1 as set forth in SEQ ID NO:7, a CDR H2 as set forth in SEQ ID NO:8 and a CDR H3 as set forth in SEQ ID NO:9; and (b) a light chain variable domain including a CDR L1 as set forth in SEQ ID NO:10, a CDR L2 as set forth in SEQ ID NO:11, and a CDR L3 as set forth in SEQ ID NO:12; and (ii) a transmembrane domain.

In another aspect is provided a recombinant protein including: (i) an antibody region including: (a) a heavy chain variable domain including a CDR H1 as set forth in SEQ ID NO:19, a CDR H2 as set forth in SEQ ID NO:20 and a CDR H3 as set forth in SEQ ID NO:21; and (b) a light chain variable domain including a CDR L1 as set forth in SEQ ID NO:22, a CDR L2 as set forth in SEQ ID NO:23, and a CDR L3 as set forth in SEQ ID NO:24; and (ii) a transmembrane domain.

In another aspect is provided a recombinant protein including: (i) an antibody region including: (a) a heavy chain variable domain including a CDR H1 as set forth in SEQ ID NO:25, a CDR H2 as set forth in SEQ ID NO:26 and a CDR H3 as set forth in SEQ ID NO:27; and (b) a light chain variable domain including a CDR L1 as set forth in SEQ ID NO:28, a CDR L2 as set forth in SEQ ID NO:29, and a CDR L3 as set forth in SEQ ID NO:30; and (ii) a transmembrane domain.

In another aspect is provided a recombinant protein including: (i) an antibody region including: (a) a heavy chain variable domain including a CDR H1 as set forth in SEQ ID NO:31, a CDR H2 as set forth in SEQ ID NO:32 and a CDR H3 as set forth in SEQ ID NO:33; and (b) a light chain variable domain including a CDR L1 as set forth in SEQ ID NO:34, a CDR L2 as set forth in SEQ ID NO:35, and a CDR L3 as set forth in SEQ ID NO:36; and (ii) a transmembrane domain.

In an aspect is provided a recombinant protein including: (i) an antibody region including: (a) a light chain variable domain including a CDR L1 as set forth in SEQ ID NO:37, a CDR L2 as set forth in SEQ ID NO:38 and a CDR L3 as set forth in SEQ ID NO:39; and (ii) a transmembrane domain.

In another aspect is provided a recombinant protein including: (i) an antibody region including: (a) a light chain variable domain including a CDR L1 as set forth in SEQ ID NO:40, a CDR L2 as set forth in SEQ ID NO:41 and a CDR L3 as set forth in SEQ ID NO:42; and (ii) a transmembrane domain.

In another aspect is provided a recombinant protein including: (i) an antibody region including: (a) a light chain variable domain including a CDR L1 as set forth in SEQ ID NO:43, a CDR L2 as set forth in SEQ ID NO:44 and a CDR L3 as set forth in SEQ ID NO:45; and (ii) a transmembrane domain.

In another aspect is provided a recombinant protein including: (i) an antibody region including: (a) a light chain variable domain including a CDR L1 as set forth in SEQ ID NO:46, a CDR L2 as set forth in SEQ ID NO:47 and a CDR L3 as set forth in SEQ ID NO:48; and (ii) a transmembrane domain.

In another aspect is provided a recombinant protein including: (i) an antibody region including: (a) a light chain variable domain including a CDR L1 as set forth in SEQ ID NO:49, a CDR L2 as set forth in SEQ ID NO:50 and a CDR L3 as set forth in SEQ ID NO:51; and (ii) a transmembrane domain.

In another aspect is provided a recombinant protein including: (i) an antibody region including: (a) a light chain variable domain including a CDR L1 as set forth in SEQ ID NO:52, a CDR L2 as set forth in SEQ ID NO:53 and a CDR L3 as set forth in SEQ ID NO:54; and (ii) a transmembrane domain.

In another aspect is provided a recombinant protein including: (i) an antibody region including: (a) a light chain variable domain including a CDR L1 as set forth in SEQ ID NO:55, a CDR L2 as set forth in SEQ ID NO:56 and a CDR L3 as set forth in SEQ ID NO:57; and (ii) a transmembrane domain.

In another aspect is provided a recombinant protein including: (i) an antibody region including: (a) a light chain variable domain including a CDR L1 as set forth in SEQ ID NO:58, a CDR L2 as set forth in SEQ ID NO:59 and a CDR L3 as set forth in SEQ ID NO:60; and (ii) a transmembrane domain.

In another aspect, an isolated nucleic acid encoding a recombinant protein provided herein including embodiments thereof is provided.

In another aspect, a pharmaceutical composition including a therapeutically effective amount of a recombinant protein provided herein including embodiments thereof and a pharmaceutically acceptable excipient is provided.

In another aspect, a method of treating cancer in a subject in need thereof is provided. The method includes administering to a subject a therapeutically effective amount of a recombinant protein provided herein including embodiments thereof, thereby treating cancer in the subject.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:1, a CDR H2 as set forth in SEQ ID NO:2, and a CDR H3 as set forth in SEQ ID NO:3; and (b) a light chain variable domain including a CDR L1 as set forth in SEQ ID NO:4, a CDR L2 as set forth in SEQ ID NO:5 and a CDR L3 as set forth in SEQ ID NO:6.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:7, a CDR H2 as set forth in SEQ ID NO:8, and a CDR H3 as set forth in SEQ ID NO:9; and (b) a light chain variable domain including a CDR L1 as set forth in SEQ ID NO:10, a CDR L2 as set forth in SEQ ID NO:11 and a CDR L3 as set forth in SEQ ID NO:12.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:19, a CDR H2 as set forth in SEQ ID NO:20, and a CDR H3 as set forth in SEQ ID NO:21; and (b) a light chain variable domain including a CDR L1 as set forth in SEQ ID NO:22, a CDR L2 as set forth in SEQ ID NO:23 and a CDR L3 as set forth in SEQ ID NO:24.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:25, a CDR H2 as set forth in SEQ ID NO:26, and a CDR H3 as set forth in SEQ ID NO:27; and (b) a light chain variable domain including a CDR L1 as set forth in SEQ ID NO:28, a CDR L2 as set forth in SEQ ID NO:29 and a CDR L3 as set forth in SEQ ID NO:30.

In another aspect is provided a recombinant protein including: (i) a first antibody region capable of binding an effector cell ligand; and (ii) a second antibody region, including: (a) a heavy chain variable domain a CDR H1 as set forth in SEQ ID NO:31, a CDR H2 as set forth in SEQ ID NO:32, and a CDR H3 as set forth in SEQ ID NO:33; and (b) a light chain variable domain including a CDR L1 as set forth in SEQ ID NO:34, a CDR L2 as set forth in SEQ ID NO:35 and a CDR L3 as set forth in SEQ ID NO:36.

In another aspect is provided a recombinant protein including: (i) a first antibody region capable of binding an effector cell ligand; and (ii) a second antibody region including: (a) a light chain variable domain including a CDR L1 as set forth in SEQ ID NO:37, a CDR L2 as set forth in SEQ ID NO:38 and a CDR L3 as set forth in SEQ ID NO:39.

In another aspect is provided a recombinant protein including: (i) a first antibody region capable of binding an effector cell ligand; and (ii) a second antibody region, including: (a) a light chain variable domain including a CDR L1 as set forth in SEQ ID NO:40, a CDR L2 as set forth in SEQ ID NO:41 and a CDR L3 as set forth in SEQ ID NO:42.

In another aspect is provided a recombinant protein including: (i) a first antibody region capable of binding an effector cell ligand; and (ii) a second antibody region, including: (a) a light chain variable domain including a CDR L1 as set forth in SEQ ID NO:43, a CDR L2 as set forth in SEQ ID NO:44 and a CDR L3 as set forth in SEQ ID NO:45.

In another aspect is provided a recombinant protein including: (i) a first antibody region capable of binding an effector cell ligand; and (ii) a second antibody region, including: (a) a light chain variable domain including a CDR L1 as set forth in SEQ ID NO:46, a CDR L2 as set forth in SEQ ID NO:47 and a CDR L3 as set forth in SEQ ID NO:48.

In another aspect is provided a recombinant protein including: (i) a first antibody region capable of binding an effector cell ligand; and (ii) a second antibody region, including: (a) a light chain variable domain including a CDR L1 as set forth in SEQ ID NO:49, a CDR L2 as set forth in SEQ ID NO:50 and a CDR L3 as set forth in SEQ ID NO:51.

In another aspect is provided a recombinant protein including: (i) a first antibody region capable of binding an effector cell ligand; and (ii) a second antibody region, including: (a) a light chain variable domain including a CDR L1 as set forth in SEQ ID NO:52, a CDR L2 as set forth in SEQ ID NO:53 and a CDR L3 as set forth in SEQ ID NO:54.

In another aspect is provided a recombinant protein including: (i) a first antibody region capable of binding an effector cell ligand; and (ii) a second antibody region, including: (a) a light chain variable domain including a CDR L1 as set forth in SEQ ID NO:55, a CDR L2 as set forth in SEQ ID NO:56 and a CDR L3 as set forth in SEQ ID NO:57.

In another aspect is provided a recombinant protein including: (i) a first antibody region capable of binding an effector cell ligand; and (ii) a second antibody region, including: (a) a light chain variable domain including a CDR L1 as set forth in SEQ ID NO:58, a CDR L2 as set forth in SEQ ID NO:59 and a CDR L3 as set forth in SEQ ID NO:60.

In another aspect, an isolated nucleic acid encoding a recombinant protein provided herein including embodiments thereof is provided.

In another aspect, a pharmaceutical composition including a therapeutically effective amount of a recombinant protein provided herein including embodiments thereof and a pharmaceutically acceptable excipient is provided.

In another aspect, a method of treating cancer in a subject in need thereof is provided. The method includes administering to a subject a therapeutically effective amount of a recombinant protein provided herein including embodiments thereof, thereby treating cancer in the subject.

DETAILED DESCRIPTION

Figure 1:
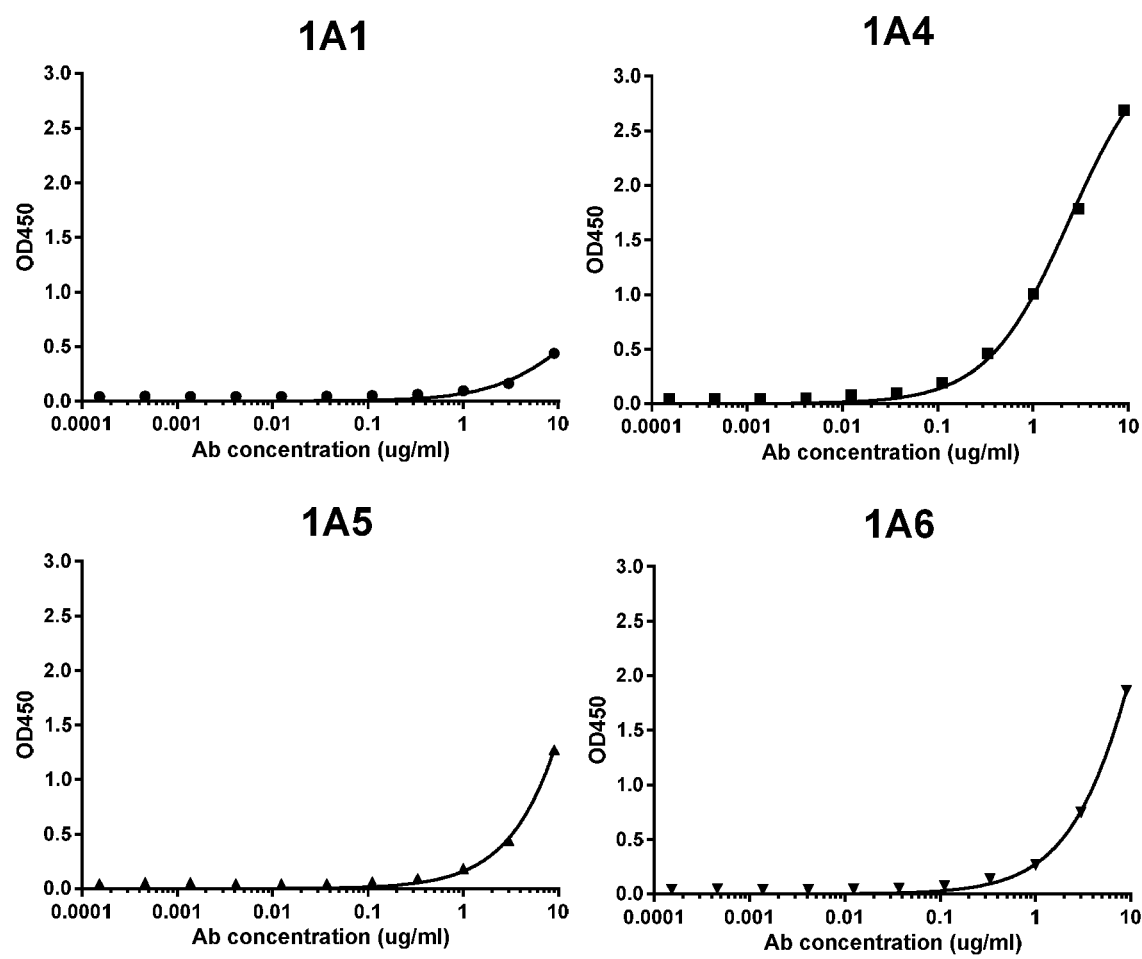
FIG. 1. Shown are the graphs for determining $EC_{50}$ of the human anti-IL1RAP monoclonal antibody clones 1A1 (upper left) having a CDR L1 sequence of SEQ ID NO:46, a CDR L2 sequence of SEQ ID NO:47, and a CDR L3 sequence of SEQ ID NO:48, 1A4 (upper right) having a CDR L1 sequence of SEQ ID NO:49, a CDR L2 sequence of SEQ ID NO:50, and a CDR L3 sequence of SEQ ID NO:51, 1A5 (lower left) having a CDR L1 sequence of SEQ ID NO:40, a CDR L2 sequence of SEQ ID NO:41, and a CDR L3 sequence of SEQ ID NO:42, and 1A6 (lower right) having a CDR L1 sequence of SEQ ID NO:43, a CDR L2 sequence of SEQ ID NO:44, and a CDR L3 sequence of SEQ ID NO: 45. $EC_{50}$ were determined by ELISA.
Figure 2:
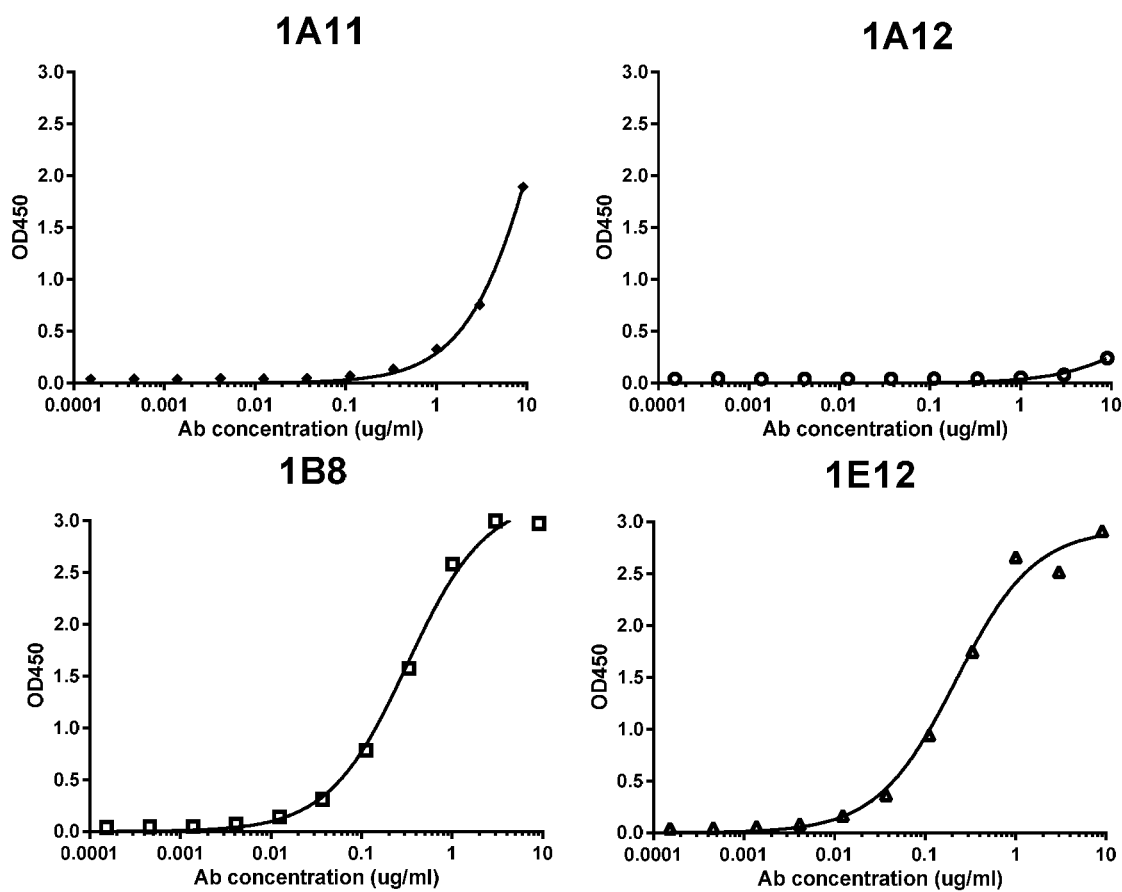
FIG. 2. Shown are the graphs for determining $EC_{50}$ of the human anti-IL1RAP monoclonal antibody clones 1A11, 1A12 (upper right) having a CDR L1 sequence of SEQ ID NO:37, a CDR L2 sequence of SEQ ID NO:38, and a CDR L3 sequence of SEQ ID NO:39, 1B8 (lower left) having a CDR H1 sequence of SEQ ID NO:31, a CDR H2 sequence of SEQ ID NO:32, and a CDR H3 sequence of SEQ ID NO:33, a CDR L1 sequence of SEQ ID NO:34, a CDR L2 sequence of SEQ ID NO:35, and a CDR L3 sequence of SEQ ID NO: 36, and 1E12 (lower right) having a CDR L1 sequence of SEQ ID NO:55, a CDR L2 sequence of SEQ ID NO:56, and a CDR L3 sequence of SEQ ID NO: 57. $EC_{50}$ were determined by ELISA.
Figure 3:
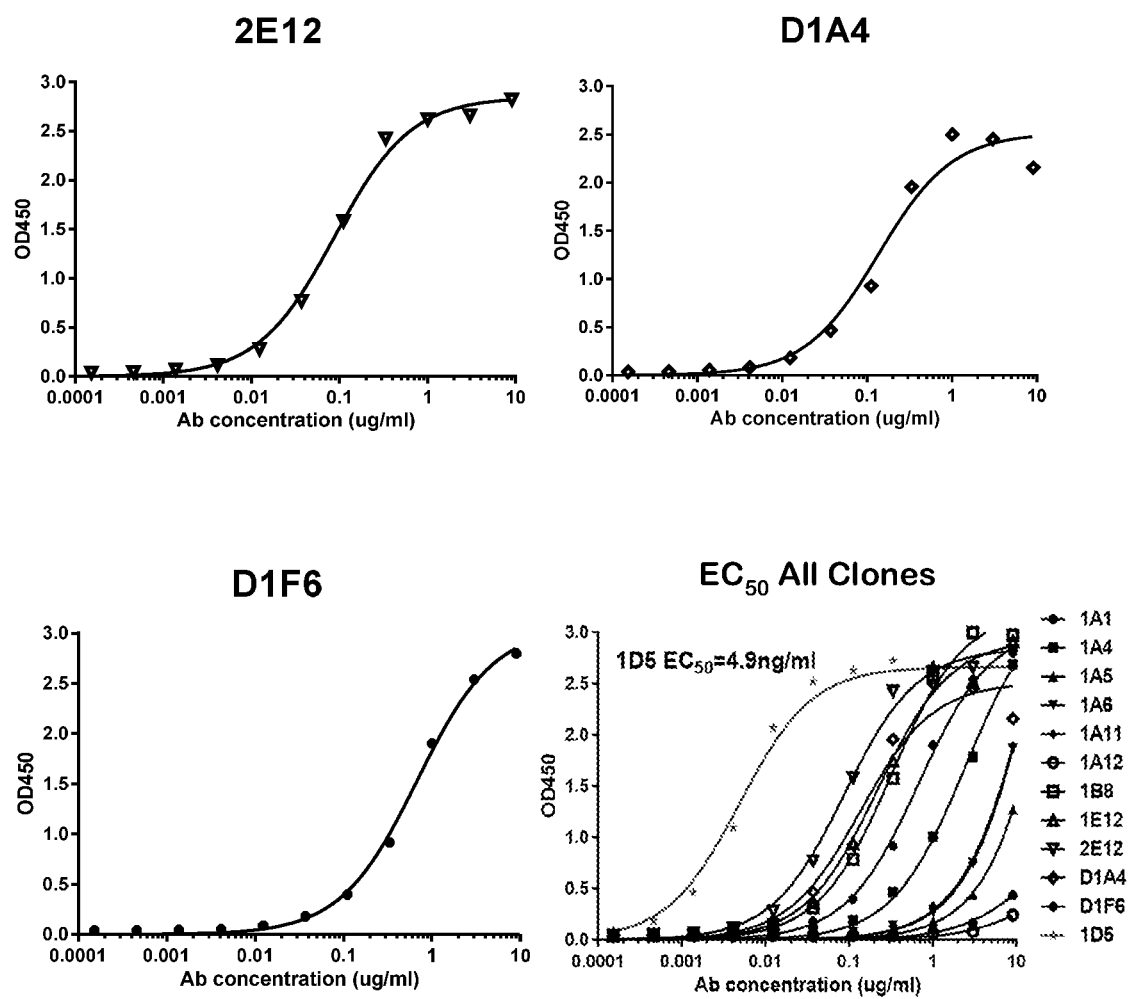
FIG. 3. Shown are the graphs for determining $EC_{50}$ of the human anti-IL1RAP monoclonal antibody clones 2E12 (upper left) having a CDR H1 sequence of SEQ ID NO:19, a CDR H2 sequence of SEQ ID NO:20, and a CDR H3 sequence of SEQ ID NO:21, a CDR L1 sequence of SEQ ID NO:22, a CDR L2 sequence of SEQ ID NO:23, and a CDR L3 sequence of SEQ ID NO: 24, D1A4 (upper right) having a CDR H1 sequence of SEQ ID NO:1, a CDR H2 sequence of SEQ ID NO:2, and a CDR H3 sequence of SEQ ID NO:3, a CDR L1 sequence of SEQ ID NO:4, a CDR L2 sequence of SEQ ID NO:5, and a CDR L3 sequence of SEQ ID NO: 6, and D1F6 (lower left) having a CDR L1 sequence of SEQ ID NO:58, a CDR L2 sequence of SEQ ID NO:59, and a CDR L3 sequence of SEQ ID NO:60. Lower right: Human anti-IL1RAP monoclonal antibody $EC_{50}$ of 12 clones as indicated are shown. The clones tested are 1A1, 1A4, 1A5, 1A6, 1A11, 1A12, 1B8, 1E12, 2E,12, D1A4, D1F6 and 1D5 having a CDR H1 sequence of SEQ ID NO:13, a CDR H2 sequence of SEQ ID NO:14, and a CDR H3 sequence of SEQ ID NO:15, a CDR L1 sequence of SEQ ID NO:16, a CDR L2 sequence of SEQ ID NO:17, and a CDR L3 sequence of SEQ ID NO:18. $EC_{50}$ of the antibodies was determined by ELISA.
Figure 4:
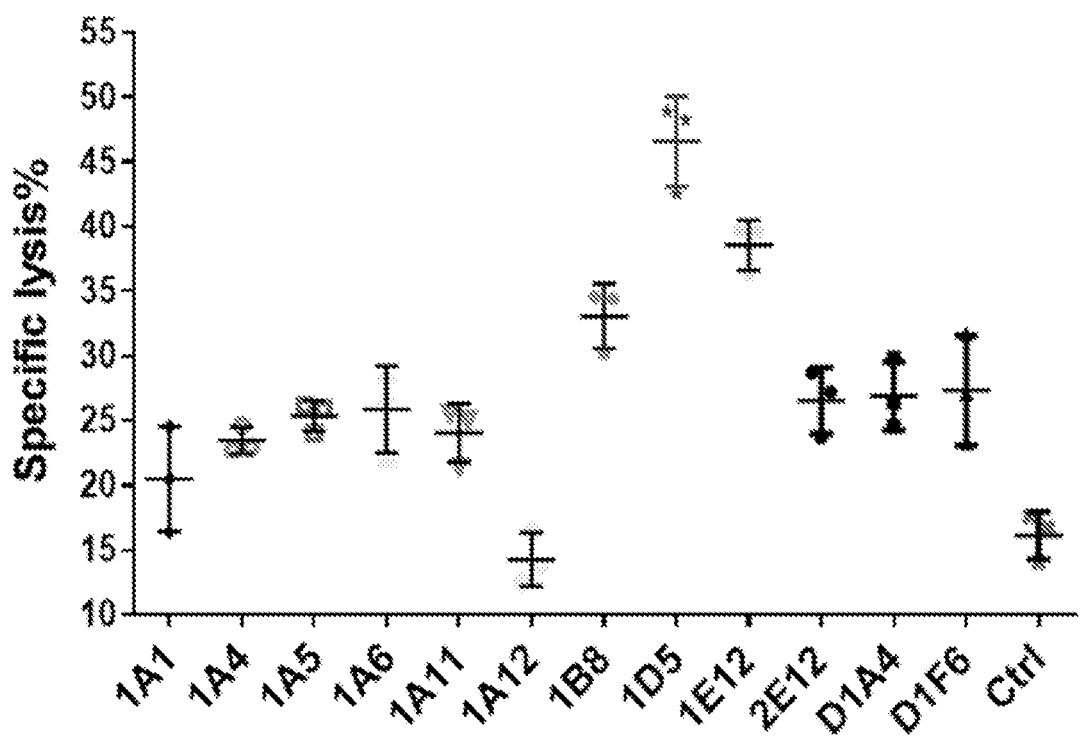
FIG. 4. Antibody-dependent cellular cytotoxicity (ADCC) analysis of exemplary anti-IL1RAP antibodies provided herein. The percentage of specific lysis induced by the twelve clones was determined by ADCC assay.

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Definitions

Unless defined otherwise, technical and scientific terms used herein have the same meaning as commonly understood by a person of ordinary skill in the art. See, e.g., Singleton et al., DICTIONARY OF MICROBIOLOGY AND MOLECULAR BIOLOGY 2nd ed., J. Wiley & Sons (New York, NY 1994); Sambrook et al., MOLECULAR CLONING, A LABORATORY MANUAL, Cold Springs Harbor Press (Cold Springs Harbor, NY 1989). Any methods, devices and materials similar or equivalent to those described herein can be used in the practice of this invention. The following definitions are provided to facilitate understanding of certain terms used frequently herein and are not meant to limit the scope of the present disclosure.

"Nucleic acid" refers to deoxyribonucleotides or ribonucleotides and polymers thereof in either single- or double-stranded form, and complements thereof. The term "polynucleotide" refers to a linear sequence of nucleotides. The term "nucleotide" typically refers to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA (including siRNA), and hybrid molecules having mixtures of single and double stranded DNA and RNA. Nucleic acid as used herein also refers to nucleic acids that have the same basic chemical structure as a naturally occurring nucleic acid. Such analogues have modified sugars and/or modified ring substituents, but retain the same basic chemical structure as the naturally occurring nucleic acid. A nucleic acid mimetic refers to chemical compounds that have a structure that is different the general chemical structure of a nucleic acid, but that functions in a manner similar to a naturally occurring nucleic acid. Examples of such analogues include, without limitation, phosphorothioates, phosphoramidates, methyl phosphonates, chiral-methyl phosphonates, 2-O-methyl ribonucleotides, and peptide-nucleic acids (PNAs).

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid Amino acid mimetics refers to chemical compounds that have a structure that is different from the general chemical structure of an amino acid, but that functions in a manner similar to a naturally occurring amino acid.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

An amino acid or nucleotide base "position" is denoted by a number that sequentially identifies each amino acid (or nucleotide base) in the reference sequence based on its position relative to the N-terminus (or 5'-end). Due to deletions, insertions, truncations, fusions, and the like that may be taken into account when determining an optimal alignment, in general the amino acid residue number in a test sequence determined by simply counting from the N-terminus will not necessarily be the same as the number of its corresponding position in the reference sequence. For example, in a case where a variant has a deletion relative to an aligned reference sequence, there will be no amino acid in the variant that corresponds to a position in the reference sequence at the site of deletion. Where there is an insertion in an aligned reference sequence, that insertion will not correspond to a numbered amino acid position in the reference sequence. In the case of truncations or fusions there can be stretches of amino acids in either the reference or aligned sequence that do not correspond to any amino acid in the corresponding sequence.

The terms "numbered with reference to" or "corresponding to," when used in the context of the numbering of a given amino acid or polynucleotide sequence, refers to the numbering of the residues of a specified reference sequence when the given amino acid or polynucleotide sequence is compared to the reference sequence. An amino acid residue in a protein "corresponds" to a given residue when it occupies the same essential structural position within the protein as the given residue. For example, a selected residue in a selected antibody (or Fab domain) corresponds to light chain threonine at Kabat position 40, when the selected residue occupies the same essential spatial or other structural relationship as a light chain threonine at Kabat position 40. In some embodiments, where a selected protein is aligned for maximum homology with the light chain of an antibody (or Fab domain), the position in the aligned selected protein aligning with threonine 40 is said to correspond to threonine 40. Instead of a primary sequence alignment, a three dimensional structural alignment can also be used, e.g., where the structure of the selected protein is aligned for maximum correspondence with the light chain threonine at Kabat position 40, and the overall structures compared. In this case, an amino acid that occupies the same essential position as threonine 40 in the structural model is said to correspond to the threonine 40 residue.

"Conservatively modified variants" applies to both amino acid and nucleic acid sequences. With respect to particular nucleic acid sequences, "conservatively modified variants" refers to those nucleic acids that encode identical or essentially identical amino acid sequences. Because of the degeneracy of the genetic code, a number of nucleic acid sequences will encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine, and TGG, which is ordinarily the only codon for tryptophan) can be modified to yield a functionally identical molecule. Accordingly, each silent variation of a nucleic acid which encodes a polypeptide is implicit in each described sequence.

As to amino acid sequences, one of skill will recognize that individual substitutions, deletions or additions to a nucleic acid, peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Such conservatively modified variants are in addition to and do not exclude polymorphic variants, interspecies homologs, and alleles of the invention.

The following eight groups each contain amino acids that are conservative substitutions for one another:
1) Alanine (A), Glycine (G);
2) Aspartic acid (D), Glutamic acid (E);
3) Asparagine (N), Glutamine (Q);
4) Arginine (R), Lysine (K);
5) Isoleucine (I), Leucine (L), Methionine (M), Valine (V);
6) Phenylalanine (F), Tyrosine (Y), Tryptophan (W);
7) Serine (S), Threonine (T); and
8) Cysteine (C), Methionine (M)

(see, e.g., Creighton, Proteins (1984)).

The terms "identical" or percent "identity," in the context of two or more nucleic acids or polypeptide sequences, refer to two or more sequences or subsequences that are the same or have a specified percentage of amino acid residues or nucleotides that are the same (i.e., 60% identity, optionally 65%, 70%, 75%, 80%, 85%, 90%, 95%, 98%, or 99% identity over a specified region, e.g., of the entire polypeptide sequences of the invention or individual domains of the polypeptides of the invention), when compared and aligned for maximum correspondence over a comparison window, or designated region as measured using one of the following sequence comparison algorithms or by manual alignment and visual inspection. Such sequences are then said to be "substantially identical." This definition also refers to the complement of a test sequence. Optionally, the identity exists over a region that is at least about 50 nucleotides in length, or more preferably over a region that is 100 to 500 or 1000 or more nucleotides in length.

"Percentage of sequence identity" is determined by comparing two optimally aligned sequences over a comparison window, wherein the portion of the polynucleotide or polypeptide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

A "comparison window", as used herein, includes reference to a segment of any one of the number of contiguous positions selected from the group consisting of, e.g., a full length sequence or from 20 to 600, about 50 to about 200, or about 100 to about 150 amino acids or nucleotides in which a sequence may be compared to a reference sequence of the same number of contiguous positions after the two sequences are optimally aligned. Methods of alignment of sequences for comparison are well-known in the art. Optimal alignment of sequences for comparison can be conducted, e.g., by the local homology algorithm of Smith and Waterman (1970) Adv. Appl. Math. 2:482c, by the homology alignment algorithm of Needleman and Wunsch (1970) J. Mol. Biol. 48:443, by the search for similarity method of Pearson and Lipman (1988) Proc. Nat'l. Acad. Sci. USA 85:2444, by computerized implementations of these algorithms (GAP, BESTFIT, FASTA, and TFASTA in the Wisconsin Genetics Software Package, Genetics Computer Group, 575 Science Dr., Madison, WI), or by manual alignment and visual inspection (see, e.g., Ausubel et al., Current Protocols in Molecular Biology (1995 supplement)).

An example of an algorithm that is suitable for determining percent sequence identity and sequence similarity are the BLAST and BLAST 2.0 algorithms, which are described in Altschul et al. (1977) *Nuc. Acids Res.* 25:3389-3402, and Altschul et al. (1990) *J. Mol. Biol.* 215:403-410, respectively. Software for performing BLAST analyses is publicly available through the National Center for Biotechnology Information (http://www.ncbi.nlm.nih.gov/). This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al., supra). These initial neighborhood word hits act as seeds for initiating searches to find longer HSPs containing them. The word hits are extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a word length (W) of 11, an expectation (E) or 10, M=5, N=−4 and a comparison of both strands. For amino acid sequences, the BLASTP program uses as defaults a word length of 3, and expectation (E) of 10, and the BLOSUM62 scoring matrix (see Henikoff and Henikoff (1989) *Proc. Natl. Acad. Sci. USA* 89:10915) alignments (B) of 50, expectation (E) of 10, M=5, N=−4, and a comparison of both strands.

The BLAST algorithm also performs a statistical analysis of the similarity between two sequences (see, e.g., Karlin and Altschul (1993) *Proc. Natl. Acad. Sci. USA* 90:5873-5787). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.2, more preferably less than about 0.01, and most preferably less than about 0.001.

An indication that two nucleic acid sequences or polypeptides are substantially identical is that the polypeptide encoded by the first nucleic acid is immunologically cross reactive with the antibodies raised against the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules or their complements hybridize to each other under stringent conditions, as described below. Yet another indication that two nucleic acid sequences are substantially identical is that the same primers can be used to amplify the sequence.

Antibodies are large, complex molecules (molecular weight of ~150,000 or about 1320 amino acids) with intricate internal structure. A natural antibody molecule contains two identical pairs of polypeptide chains, each pair having one light chain and one heavy chain. Each light chain and heavy chain in turn consists of two regions: a variable ("V") region, involved in binding the target antigen, and a constant ("C") region that interacts with other components of the immune system. The light and heavy chain variable regions (also referred to herein as light chain variable (VL) domain and heavy chain variable (VH) domain, respectively) come together in 3-dimensional space to form a variable region that binds the antigen (for example, a receptor on the surface of a cell). Within each light or heavy chain variable region, there are three short segments (averaging 10 amino acids in length) called the complementarity determining regions ("CDRs"). The six CDRs in an antibody variable domain (three from the light chain and three from the heavy chain) fold up together in 3-dimensional space to form the actual antibody binding site which docks onto the target antigen. The position and length of the CDRs have been precisely defined by Kabat, E. et al., Sequences of Proteins of Immunological Interest, U.S. Department of Health and Human Services, 1983, 1987. The part of a variable region not contained in the CDRs is called the framework ("FR"), which forms the environment for the CDRs.

An "antibody variant" as provided herein refers to a polypeptide capable of binding to an antigen and including one or more structural domains (e.g., light chain variable domain, heavy chain variable domain) of an antibody or fragment thereof. Non-limiting examples of antibody variants include single-domain antibodies or nanobodies, monospecific $Fab_2$, bispecific $Fab_2$, trispecific $Fab_3$, monovalent IgGs, scFv, bispecific antibodies, bispecific diabodies, trispecific triabodies, scFv-Fc, minibodies, IgNAR, V-NAR, hcIgG, VhH, or peptibodies. A "peptibody" as provided herein refers to a peptide moiety attached (through a covalent or non-covalent linker) to the Fc domain of an antibody. Further non-limiting examples of antibody variants known in the art include antibodies produced by cartilaginous fish or camelids. A general description of antibodies from camelids and the variable regions thereof and methods for their production, isolation, and use may be found in references WO97/49805 and WO 97/49805 which are incorporated by reference herein in their entirety and for all purposes. Likewise, antibodies from cartilaginous fish and the variable regions thereof and methods for their production, isolation, and use may be found in WO2005/118629, which is incorporated by reference herein in its entirety and for all purposes.

The terms "CDR L1", "CDR L2" and "CDR L3" as provided herein refer to the complementarity determining regions (CDR) 1, 2, and 3 of the variable light (L) chain of an antibody. In embodiments, the variable light chain provided herein includes in N-terminal to C-terminal direction a CDR L1, a CDR L2 and a CDR L3. Likewise, the terms "CDR H1", "CDR H2" and "CDR H3" as provided herein refer to the complementarity determining regions (CDR) 1, 2, and 3 of the variable heavy (H) chain of an antibody. In embodiments, the variable heavy chain provided herein includes in N-terminal to C-terminal direction a CDR H1, a CDR H2 and a CDR H3.

The terms "FR L1", "FR L2", "FR L3" and "FR L4" as provided herein are used according to their common meaning in the art and refer to the framework regions (FR) 1, 2, 3 and 4 of the variable light (L) chain of an antibody. In embodiments, the variable light chain provided herein includes in N-terminal to C-terminal direction a FR L1, a FR L2, a FR L3 and a FR L4. Likewise, the terms "FR H1", "FR H2", "FR H3" and "FR H4" as provided herein are used according to their common meaning in the art and refer to the framework regions (FR) 1, 2, 3 and 4 of the variable heavy (H) chain of an antibody. In embodiments, the variable heavy chain provided herein includes in N-terminal to C-terminal direction a FR H1, a FR H2, a FR H3 and a FR H4.

An exemplary immunoglobulin (antibody) structural unit comprises a tetramer. Each tetramer is composed of two identical pairs of polypeptide chains, each pair having one "light" (about 25 kD) and one "heavy" chain (about 50-70 kD). The N-terminus of each chain defines a variable region of about 100 to 110 or more amino acids primarily responsible for antigen recognition. The terms variable light chain (VL), variable light chain (VL) domain or light chain variable region and variable heavy chain (VH), variable heavy chain (VH) domain or heavy chain variable region refer to these light and heavy chain regions, respectively. The terms variable light chain (VL), variable light chain (VL) domain and light chain variable region as referred to herein may be used interchangeably. The terms variable heavy chain (VH), variable heavy chain (VH) domain and heavy chain variable region as referred to herein may be used interchangeably. The Fc (i.e. fragment crystallizable region) is the "base" or "tail" of an immunoglobulin and is typically composed of two heavy chains that contribute two or three constant domains depending on the class of the antibody. By binding to specific proteins, the Fc region ensures that each antibody generates an appropriate immune response for a given antigen. The Fc region also binds to various cell receptors, such as Fc receptors, and other immune molecules, such as complement proteins.

The term "antibody" is used according to its commonly known meaning in the art. Antibodies exist, e.g., as intact immunoglobulins or as a number of well-characterized fragments produced by digestion with various peptidases. Thus, for example, pepsin digests an antibody below the disulfide linkages in the hinge region to produce F(ab)'$_2$, a dimer of Fab which itself is a light chain joined to $V_H$-$C_{H1}$ by a disulfide bond. The F(ab)'$_2$ may be reduced under mild conditions to break the disulfide linkage in the hinge region, thereby converting the F(ab)'$_2$ dimer into an Fab' monomer. The Fab' monomer is essentially Fab with part of the hinge region (see Fundamental Immunology (Paul ed., 3d ed. 1993). While various antibody fragments are defined in terms of the digestion of an intact antibody, one of skill will appreciate that such fragments may be synthesized de novo either chemically or by using recombinant DNA methodology. Thus, the term antibody, as used herein, also includes antibody fragments either produced by the modification of whole antibodies, or those synthesized de novo using recombinant DNA methodologies (e.g., single chain Fv) or those identified using phage display libraries (see, e.g., McCafferty et al., *Nature* 348:552-554 (1990)). The term "antibody" as referred to herein further includes antibody variants such as single domain antibodies. Thus, in embodiments an antibody includes a single monomeric variable antibody domain. Thus, in embodiments, the antibody, includes a variable light chain (VL) domain or a variable heavy chain (VH) domain. In embodiments, the antibody is a variable light chain (VL) domain or a variable heavy chain (VH) domain.

For preparation of monoclonal or polyclonal antibodies, any technique known in the art can be used (see, e.g., Kohler & Milstein, *Nature* 256:495-497 (1975); Kozbor et al., *Immunology Today* 4:72 (1983); Cole et al., pp. 77-96 in *Monoclonal Antibodies and Cancer Therapy* (1985)). "Monoclonal" antibodies (mAb) refer to antibodies derived from a single clone. Techniques for the production of single chain antibodies (U.S. Pat. No. 4,946,778) can be adapted to produce antibodies to polypeptides of this invention. Also, transgenic mice, or other organisms such as other mammals, may be used to express humanized antibodies. Alternatively, phage display technology can be used to identify antibodies and heteromeric Fab fragments that specifically bind to selected antigens (see, e.g., McCafferty et al., *Nature* 348: 552-554 (1990); Marks et al., *Biotechnology* 10:779-783 (1992)).

The epitope of a mAb is the region of its antigen to which the mAb binds. Two antibodies bind to the same or overlapping epitope if each competitively inhibits (blocks) binding of the other to the antigen. That is, a 1×, 5×, 10×, 20× or 100× excess of one antibody inhibits binding of the other by at least 30% but preferably 50%, 75%, 90% or even 99% as measured in a competitive binding assay (see, e.g., Junghans et al., Cancer Res. 50:1495, 1990). Alternatively, two antibodies have the same epitope if essentially all amino acid mutations in the antigen that reduce or eliminate binding of one antibody reduce or eliminate binding of the other. Two antibodies have overlapping epitopes if some amino acid mutations that reduce or eliminate binding of one antibody reduce or eliminate binding of the other.

A single-chain variable fragment (scFv) is typically a fusion protein of the variable regions of the heavy (VH) and light chains (VL) of immunoglobulins, connected with a short linker peptide of 10 to about 25 amino acids. The linker may usually be rich in glycine for flexibility, as well as serine or threonine for solubility. The linker can either connect the N-terminus of the VH with the C-terminus of the VL, or vice versa.

For preparation of suitable antibodies of the invention and for use according to the invention, e.g., recombinant, monoclonal, or polyclonal antibodies, many techniques known in the art can be used (see, e.g., Kohler & Milstein, Nature 256:495-497 (1975); Kozbor et al., Immunology Today 4: 72 (1983); Cole et al., pp. 77-96 in Monoclonal Antibodies and Cancer Therapy, Alan R. Liss, Inc. (1985); Coligan, Current Protocols in Immunology (1991); Harlow & Lane, Antibodies, A Laboratory Manual (1988); and Goding, Monoclonal Antibodies: Principles and Practice (2d ed. 1986)). The genes encoding the heavy and light chains of an antibody of interest can be cloned from a cell, e.g., the genes encoding a monoclonal antibody can be cloned from a hybridoma and used to produce a recombinant monoclonal antibody. Gene libraries encoding heavy and light chains of monoclonal antibodies can also be made from hybridoma or plasma cells. Random combinations of the heavy and light chain gene products generate a large pool of antibodies with different antigenic specificity (see, e.g., Kuby, Immunology (3rd ed. 1997)). Techniques for the production of single chain antibodies or recombinant antibodies (U.S. Pat. Nos. 4,946,778, 4,816,567) can be adapted to produce antibodies to polypeptides of this invention. Also, transgenic mice, or other organisms such as other mammals, may be used to express humanized or human antibodies (see, e.g., U.S. Pat. Nos. 5,545,807; 5,545,806; 5,569,825; 5,625,126; 5,633, 425; 5,661,016, Marks et al., Bio/Technology 10:779-783 (1992); Lonberg et al., Nature 368:856-859 (1994); Morrison, Nature 368:812-13 (1994); Fishwild et al., Nature Biotechnology 14:845-51 (1996); Neuberger, Nature Biotechnology 14:826 (1996); and Lonberg & Huszar, Intern. Rev. Immunol. 13:65-93 (1995)). Alternatively, phage display technology can be used to identify antibodies and heteromeric Fab fragments that specifically bind to selected antigens (see, e.g., McCafferty et al., Nature 348:552-554 (1990); Marks et al., Biotechnology 10:779-783 (1992)). Antibodies can also be made bispecific, i.e., able to recognize two different antigens (see, e.g., WO 93/08829, Traunecker et al., EMBO J. 10:3655-3659 (1991); and Suresh et al., Methods in Enzymology 121:210 (1986)). Antibodies can also be heteroconjugates, e.g., two covalently joined antibodies, or immunotoxins (see, e.g., U.S. Pat. No. 4,676, 980, WO 91/00360; WO 92/200373; and EP 03089).

Methods for humanizing or primatizing non-human antibodies are well known in the art (e.g., U.S. Pat. Nos. 4,816,567; 5,530,101; 5,859,205; 5,585,089; 5,693,761; 5,693,762; 5,777,085; 6,180,370; 6,210,671; and 6,329,511; WO 87/02671; EP Patent Application 0173494; Jones et al. (1986) Nature 321:522; and Verhoyen et al. (1988) Science 239:1534). Humanized antibodies are further described in, e.g., Winter and Milstein (1991) Nature 349:293. Generally, a humanized antibody has one or more amino acid residues introduced into it from a source which is non-human. These non-human amino acid residues are often referred to as import residues, which are typically taken from an import variable domain. Humanization can be essentially performed following the method of Winter and co-workers (see, e.g., Morrison et al., PNAS USA, 81:6851-6855 (1984), Jones et al., Nature 321:522-525 (1986); Riechmann et al., Nature 332:323-327 (1988); Morrison and Oi, Adv. Immunol., 44:65-92 (1988), Verhoeyen et al., Science 239:1534-1536 (1988) and Presta, Curr. Op. Struct. Biol. 2:593-596 (1992), Padlan, Molec. Immun., 28:489-498 (1991); Padlan, Molec. Immun., 31(3):169-217 (1994)), by substituting rodent CDRs or CDR sequences for the corresponding sequences of a human antibody. Accordingly, such humanized antibodies are chimeric antibodies (U.S. Pat. No. 4,816, 567), wherein substantially less than an intact human variable domain has been substituted by the corresponding sequence from a non-human species. In practice, humanized antibodies are typically human antibodies in which some CDR residues and possibly some FR residues are substituted by residues from analogous sites in rodent antibodies. For example, polynucleotides comprising a first sequence coding for humanized immunoglobulin framework regions and a second sequence set coding for the desired immunoglobulin complementarity determining regions can be produced synthetically or by combining appropriate cDNA and genomic DNA segments. Human constant region DNA sequences can be isolated in accordance with well known procedures from a variety of human cells.

A "chimeric antibody" is an antibody molecule in which (a) the constant region, or a portion thereof, is altered, replaced or exchanged so that the antigen binding site (variable region) is linked to a constant region of a different or altered class, effector function and/or species, or an entirely different molecule which confers new properties to the chimeric antibody, e.g., an enzyme, toxin, hormone, growth factor, drug, etc.; or (b) the variable region, or a portion thereof, is altered, replaced or exchanged with a variable region having a different or altered antigen specificity. The preferred antibodies of, and for use according to the invention include humanized and/or chimeric monoclonal antibodies.

Techniques for conjugating therapeutic agents to antibodies are well known (see, e.g., Arnon et al., "Monoclonal Antibodies For Immunotargeting Of Drugs In Cancer Therapy", in Monoclonal Antibodies And Cancer Therapy, Reisfeld et al. (eds.), pp. 243-56 (Alan R. Liss, Inc. 1985); Hellstrom et al., "Antibodies For Drug Delivery" in Controlled Drug Delivery ($2^{nd}$ Ed.), Robinson et al. (eds.), pp. 623-53 (Marcel Dekker, Inc. 1987); Thorpe, "Antibody Carriers Of Cytotoxic Agents In Cancer Therapy: A Review" in Monoclonal Antibodies '84: Biological And Clinical Applications, Pinchera et al. (eds.), pp. 475-506 (1985); and Thorpe et al., "The Preparation And Cytotoxic Properties Of Antibody-Toxin Conjugates", Immunol. Rev., 62:119-58 (1982)). As used herein, the term "antibody-drug conjugate" or "ADC" refers to a therapeutic agent conjugated or otherwise covalently bound to an antibody.

A "therapeutic agent" as referred to herein, is a composition useful in treating or preventing a disease such as cancer (e.g., leukemia). In embodiments, the therapeutic agent is an anti-cancer agent. "Anti-cancer agent" is used in accordance with its plain ordinary meaning and refers to a composition (e.g. compound, drug, antagonist, inhibitor, modulator) having antineoplastic properties or the ability to inhibit the growth or proliferation of cells. In embodiments, an anti-cancer agent is a chemotherapeutic. In embodiments, an anti-cancer agent is an agent identified herein having utility in methods of treating cancer. In embodiments, an anti-cancer agent is an agent approved by the FDA or similar regulatory agency of a country other than the USA, for treating cancer.

The phrase "specifically (or selectively) binds" to an antibody or "specifically (or selectively) immunoreactive with," when referring to a protein or peptide, refers to a binding reaction that is determinative of the presence of the protein, often in a heterogeneous population of proteins and other biologics. Thus, under designated immunoassay conditions, the specified antibodies bind to a particular protein at least two times the background and more typically more than 10 to 100 times background. Specific binding to an antibody under such conditions requires an antibody that is selected for its specificity for a particular protein. For example, polyclonal antibodies can be selected to obtain only a subset of antibodies that are specifically immunoreactive with the selected antigen and not with other proteins. This selection may be achieved by subtracting out antibodies that cross-react with other molecules. A variety of immunoassay formats may be used to select antibodies specifically immunoreactive with a particular protein. For example, solid-phase ELISA immunoassays are routinely used to select antibodies specifically immunoreactive with a protein (see, e.g., Harlow & Lane, Using Antibodies, A Laboratory Manual (1998) for a description of immunoassay formats and conditions that can be used to determine specific immunoreactivity).

A "ligand" refers to an agent, e.g., a polypeptide or other molecule, capable of binding to a receptor or antibody, antibody variant, antibody region or fragment thereof.

The term "IL1RAP" as used herein refers to any recombinant or naturally-occurring forms of interleukin-1 receptor accessory protein (IL1RAP) or variants or homologs thereof that maintain IL1RAP activity (e.g. within at least 50%, 80%, 90%, 95%, 96%, 97%, 98%, 99% or 100% activity compared to IL1RAP). In some aspects, the variants or homologs have at least 90%, 95%, 96%, 97%, 98%, 99% or 100% amino acid sequence identity across the whole sequence or a portion of the sequence (e.g. a 10, 20, 50, 100, 150 or 200 continuous amino acid portion) compared to a naturally occurring IL1RAP polypeptide. In embodiments, IL1RAP is substantially identical to the protein identified by the UniProt reference number Q9NPH3 or a variant or homolog having substantial identity thereto.

A "label" or a "detectable moiety" is a composition detectable by spectroscopic, photochemical, biochemical, immunochemical, chemical, or other physical means. For example, useful labels include 32P, fluorescent dyes, electron-dense reagents, enzymes (e.g., as commonly used in an ELISA), biotin, digoxigenin, or haptens and proteins or other entities which can be made detectable, e.g., by incorporating a radiolabel into a peptide or antibody specifically reactive with a target peptide. Any appropriate method known in the art for conjugating an antibody to the label may be employed, e.g., using methods described in Hermanson, Bioconjugate Techniques 1996, Academic Press, Inc., San Diego.

"Contacting" is used in accordance with its plain ordinary meaning and refers to the process of allowing at least two distinct species (e.g. antibodies and antigens) to become sufficiently proximal to react, interact, or physically touch. It should be appreciated; however, that the resulting reaction product can be produced directly from a reaction between the added reagents or from an intermediate from one or more of the added reagents which can be produced in the reaction mixture.

The term "contacting" may include allowing two species to react, interact, or physically touch, wherein the two species may be, for example, a pharmaceutical composition as provided herein and a cell. In embodiments contacting includes, for example, allowing a pharmaceutical composition as described herein to interact with a cell.

A "cell" as used herein, refers to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaryotic cells. Prokaryotic cells include but are not limited to bacteria. Eukaryotic cells include, but are not limited to, yeast cells and cells derived from plants and animals, for example mammalian, insect (e.g., spodoptera) and human cells.

A "stem cell" as provided herein refers to a cell characterized by the ability of self-renewal through mitotic cell division and the potential to differentiate into a tissue or an organ. Among mammalian stem cells, embryonic stem cells (ES cells) and somatic stem cells (e.g., HSC) can be distinguished. Embryonic stem cells reside in the blastocyst and give rise to embryonic tissues, whereas somatic stem cells reside in adult tissues for the purpose of tissue regeneration and repair. In embodiments, the stem cell is a leukemia stem cell (LSC). A "leukemia stem cell or "LSC" as provided herein refers to a cell capable of initiating the disease (leukemia) when transplanted into immunodeficient animals and can self-renew by giving rise to leukemia in serial transplantations and also partially differentiate into non-LSC bulk blasts that resemble the original disease but are unable to self-renew. An LSC may carry a gene mutation and be able to self-renew through mitotic cell division and differentiate into the hematopoietic lineage carrying said gene mutant or an LSC may remain as immature progenitor cells, also known as blast cells. In embodiments, the LSC expresses CD34.

The term "CD34" as referred to herein includes any of the recombinant or naturally-occurring forms of the cluster of differentiation 34 protein, or variants or homologs thereof that maintain CD34 activity (e.g. within at least 50%, 80%, 90%, 95%, 96%, 97%, 98%, 99% or 100% activity compared to CD34). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD34 protein. In embodiments, the CD34 protein is substantially identical to the protein identified by the UniProt reference number P28906 or a variant or homolog having substantial identity thereto.

The term "recombinant" when used with reference, e.g., to a cell, nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all. Transgenic cells and plants are those that express a heterologous gene or coding sequence, typically as a result of recombinant methods.

The term "heterologous" when used with reference to portions of a nucleic acid indicates that the nucleic acid comprises two or more subsequences that are not found in the same relationship to each other in nature. For instance, the nucleic acid is typically recombinantly produced, having two or more sequences from unrelated genes arranged to make a new functional nucleic acid, e.g., a promoter from one source and a coding region from another source. Similarly, a heterologous protein indicates that the protein comprises two or more subsequences that are not found in the same relationship to each other in nature (e.g., a fusion protein).

The term "exogenous" refers to a molecule or substance (e.g., a compound, nucleic acid or protein) that originates from outside a given cell or organism. For example, an "exogenous promoter" as referred to herein is a promoter that does not originate from the cell or organism it is expressed by. Conversely, the term "endogenous" or "endogenous promoter" refers to a molecule or substance that is native to, or originates within, a given cell or organism.

As defined herein, the term "inhibition", "inhibit", "inhibiting" and the like in reference to cell proliferation (e.g., cancer cell proliferation) means negatively affecting (e.g., decreasing proliferation) or killing the cell. In some embodiments, inhibition refers to reduction of a disease or symptoms of disease (e.g., cancer, cancer cell proliferation). Thus, inhibition includes, at least in part, partially or totally blocking stimulation, decreasing, preventing, or delaying activation, or inactivating, desensitizing, or down-regulating signal transduction or enzymatic activity or the amount of a protein. Similarly an "inhibitor" is a compound or protein that inhibits a receptor or another protein, e.g., by binding, partially or totally blocking, decreasing, preventing, delaying, inactivating, desensitizing, or down-regulating activity (e.g., a receptor activity or a protein activity).

"Biological sample" or "sample" refer to materials obtained from or derived from a subject or patient. A biological sample includes sections of tissues such as biopsy and autopsy samples, and frozen sections taken for histological purposes. Such samples include bodily fluids such as blood and blood fractions or products (e.g., serum, plasma, platelets, red blood cells, and the like), sputum, tissue, cultured cells (e.g., primary cultures, explants, and transformed cells) stool, urine, synovial fluid, joint tissue, synovial tissue, synoviocytes, fibroblast-like synoviocytes, macrophage-like synoviocytes, immune cells, hematopoietic cells, fibroblasts, macrophages, T cells, etc. A biological sample is typically obtained from a eukaryotic organism, such as a mammal such as a primate e.g., chimpanzee or human; cow; dog; cat; a rodent, e.g., guinea pig, rat, mouse; rabbit; or a bird; reptile; or fish.

A "control" or "standard control" refers to a sample, measurement, or value that serves as a reference, usually a known reference, for comparison to a test sample, measurement, or value. For example, a test sample can be taken from a patient suspected of having a given disease (e.g. cancer) and compared to a known normal (non-diseased) individual (e.g. a standard control subject). A standard control can also represent an average measurement or value gathered from a population of similar individuals (e.g. standard control subjects) that do not have a given disease (i.e. standard control population), e.g., healthy individuals with a similar medical background, same age, weight, etc. A standard control value can also be obtained from the same individual, e.g. from an earlier-obtained sample from the patient prior to disease onset. For example, a control can be devised to compare therapeutic benefit based on pharmacological data (e.g., half-life) or therapeutic measures (e.g., comparison of side effects). Controls are also valuable for determining the significance of data. For example, if values for a given parameter are widely variant in controls, variation in test samples will not be considered as significant. One of skill will recognize that standard controls can be designed for assessment of any number of parameters (e.g. RNA levels, protein levels, specific cell types, specific bodily fluids, specific tissues, synoviocytes, synovial fluid, synovial tissue, fibroblast-like synoviocytes, macrophagelike synoviocytes, etc).

One of skill in the art will understand which standard controls are most appropriate in a given situation and be able to analyze data based on comparisons to standard control values. Standard controls are also valuable for determining the significance (e.g. statistical significance) of data. For example, if values for a given parameter are widely variant in standard controls, variation in test samples will not be considered as significant.

"Patient" or "subject in need thereof" refers to a living organism suffering from or prone to a disease or condition that can be treated by administration of a composition or pharmaceutical composition as provided herein. Non-limiting examples include humans, other mammals, bovines, rats, mice, dogs, monkeys, goat, sheep, cows, deer, and other non-mammalian animals. In some embodiments, a patient is human.

The terms "disease" or "condition" refer to a state of being or health status of a patient or subject capable of being treated with the compounds or methods provided herein. The disease may be a cancer. In some further instances, "cancer" refers to human cancers and carcinomas, sarcomas, adenocarcinomas, lymphomas, leukemias, including solid and lymphoid cancers, kidney, breast, lung, bladder, colon, ovarian, prostate, pancreas, stomach, brain, head and neck, skin, uterine, testicular, glioma, esophagus, and liver cancer, including hepatocarcinoma, lymphoma, including B-acute lymphoblastic lymphoma, non-Hodgkin's lymphomas (e.g., Burkitt's, Small Cell, and Large Cell lymphomas), Hodgkin's lymphoma, leukemia (including acute myeloid leukemia (AML), ALL, and CML), or multiple myeloma.

As used herein, the term "cancer" refers to all types of cancer, neoplasm or malignant tumors found in mammals (e.g., humans), including leukemia, carcinomas and sarcomas. Exemplary cancers that may be treated with a compound or method provided herein include breast cancer, colon cancer, kidney cancer, leukemia, lung cancer, melanoma, ovarian cancer, prostate cancer, pancreatic cancer, brain cancer, liver cancer, gastric cancer or a sarcoma.

The term "leukemia" refers broadly to progressive, malignant diseases of the blood-forming organs and is generally characterized by a distorted proliferation and development of leukocytes and their precursors in the blood and bone marrow. Leukemia is generally clinically classified on the basis of (1) the duration and character of the disease-acute or chronic; (2) the type of cell involved; myeloid (myelogenous), lymphoid (lymphogenous), or monocytic; and (3) the increase or non-increase in the number abnormal cells in the blood-leukemic or aleukemic (subleukemic). Exemplary leukemias that may be treated with a compound or method provided herein include, for example, acute myeloid leukemia, acute nonlymphocytic leukemia, chronic lymphocytic leukemia, acute granulocytic leukemia, chronic granulocytic leukemia, acute promyelocytic leukemia, adult T-cell leukemia, aleukemic leukemia, a leukocythemic leukemia, basophylic leukemia, blast cell leukemia, bovine leukemia, chronic myelocytic leukemia, leukemia cutis, embryonal leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, multiple myeloma, plasmacytic leukemia, promyelocytic leukemia, Rieder cell leukemia, Schilling's leukemia, stem cell leukemia, subleukemic leukemia, or undifferentiated cell leukemia.

The term "sarcoma" generally refers to a tumor which is made up of a substance like the embryonic connective tissue and is generally composed of closely packed cells embedded in a fibrillar or homogeneous substance. Sarcomas that may be treated with a compound or method provided herein include a chondrosarcoma, fibrosarcoma, lymphosarcoma, melanosarcoma, myxosarcoma, osteosarcoma, Abernethy's sarcoma, adipose sarcoma, liposarcoma, alveolar soft part sarcoma, ameloblastic sarcoma, botryoid sarcoma, chloroma sarcoma, chorio carcinoma, embryonal sarcoma, Wilms' tumor sarcoma, endometrial sarcoma, stromal sarcoma, Ewing's sarcoma, fascial sarcoma, fibroblastic sarcoma, giant cell sarcoma, granulocytic sarcoma, Hodgkin's sarcoma, idiopathic multiple pigmented hemorrhagic sarcoma, immunoblastic sarcoma of B cells, lymphoma, immunoblastic sarcoma of T-cells, Jensen's sarcoma, Kaposi's sarcoma, Kupffer cell sarcoma, angiosarcoma, leukosarcoma, malignant mesenchymoma sarcoma, parosteal sarcoma, reticulocytic sarcoma, Rous sarcoma, serocystic sarcoma, synovial sarcoma, or telangiectaltic sarcoma.

The term "melanoma" is taken to mean a tumor arising from the melanocytic system of the skin and other organs. Melanomas that may be treated with a compound or method provided herein include, for example, acral-lentiginous melanoma, amelanotic melanoma, benign juvenile melanoma, Cloudman's melanoma, S91 melanoma, Harding-Passey melanoma, juvenile melanoma, lentigo maligna melanoma, malignant melanoma, nodular melanoma, subungal melanoma, or superficial spreading melanoma.

The term "carcinoma" refers to a malignant new growth made up of epithelial cells tending to infiltrate the surrounding tissues and give rise to metastases. Exemplary carcinomas that may be treated with a compound or method provided herein include, for example, medullary thyroid carcinoma, familial medullary thyroid carcinoma, acinar carcinoma, acinous carcinoma, adenocystic carcinoma, adenoid cystic carcinoma, carcinoma adenomatosum, carcinoma of adrenal cortex, alveolar carcinoma, alveolar cell carcinoma, basal cell carcinoma, carcinoma basocellulare, basaloid carcinoma, basosquamous cell carcinoma, bronchioalveolar carcinoma, bronchiolar carcinoma, bronchogenic carcinoma, cerebriform carcinoma, cholangiocellular carcinoma, chorionic carcinoma, colloid carcinoma, comedo carcinoma, corpus carcinoma, cribriform carcinoma, carcinoma en cuirasse, carcinoma cutaneum, cylindrical carcinoma, cylindrical cell carcinoma, duct carcinoma, carcinoma durum, embryonal carcinoma, encephaloid carcinoma, epiermoid carcinoma, carcinoma epitheliale adenoides, exophytic carcinoma, carcinoma ex ulcere, carcinoma fibrosum, gelatiniforni carcinoma, gelatinous carcinoma, giant cell carcinoma, carcinoma gigantocellulare, glandular carcinoma, granulosa cell carcinoma, hair-matrix carcinoma, hematoid carcinoma, hepatocellular carcinoma, Hurthle cell carcinoma, hyaline carcinoma, hypernephroid carcinoma, infantile embryonal carcinoma, carcinoma in situ, intraepidermal carcinoma, intraepithelial carcinoma, Krompecher's carcinoma, Kulchitzky-cell carcinoma, large-cell carcinoma, lenticular carcinoma, carcinoma lenticulare, lipomatous carcinoma, lymphoepithelial carcinoma, carcinoma medullare, medullary carcinoma, melanotic carcinoma, carcinoma molle, mucinous carcinoma, carcinoma muciparum, carcinoma mucocellulare, mucoepidermoid carcinoma, carcinoma mucosum, mucous carcinoma, carcinoma myxomatodes, nasopharyngeal carcinoma, oat cell carcinoma, carcinoma ossificans, osteoid carcinoma, papillary carcinoma, periportal carcinoma, preinvasive carcinoma, prickle cell carcinoma, pultaceous carcinoma, renal cell carcinoma of kidney, reserve cell carcinoma, carcinoma sarcomatodes, schneiderian carcinoma, scirrhous carcinoma, carcinoma scroti, signet-ring cell carcinoma, carcinoma simplex, small-cell carcinoma, solanoid carcinoma, spheroidal cell carcinoma, spindle cell carcinoma, carcinoma spongiosum, squamous carcinoma, squamous cell carcinoma, string carcinoma, carcinoma telangiectaticum, carcinoma telangiectodes, transitional cell carcinoma, carcinoma tuberosum, tuberous carcinoma, verrucous carcinoma, or carcinoma villosum.

As used herein, the terms "metastasis," "metastatic," and "metastatic cancer" can be used interchangeably and refer to the spread of a proliferative disease or disorder, e.g., cancer, from one organ or another non-adjacent organ or body part. Cancer occurs at an originating site, e.g., breast, which site is referred to as a primary tumor, e.g., primary breast cancer. Some cancer cells in the primary tumor or originating site acquire the ability to penetrate and infiltrate surrounding normal tissue in the local area and/or the ability to penetrate the walls of the lymphatic system or vascular system circulating through the system to other sites and tissues in the body. A second clinically detectable tumor formed from cancer cells of a primary tumor is referred to as a metastatic or secondary tumor. When cancer cells metastasize, the metastatic tumor and its cells are presumed to be similar to those of the original tumor. Thus, if lung cancer metastasizes to the breast, the secondary tumor at the site of the breast consists of abnormal lung cells and not abnormal breast cells. The secondary tumor in the breast is referred to a metastatic lung cancer. Thus, the phrase metastatic cancer refers to a disease in which a subject has or had a primary tumor and has one or more secondary tumors. The phrases non-metastatic cancer or subjects with cancer that is not metastatic refers to diseases in which subjects have a primary tumor but not one or more secondary tumors. For example, metastatic lung cancer refers to a disease in a subject with or with a history of a primary lung tumor and with one or more secondary tumors at a second location or multiple locations, e.g., in the breast.

The term "associated" or "associated with" in the context of a substance or substance activity or function associated with a disease (e.g., cancer (e.g. leukemia, acute myeloid leukemia)) means that the disease (e.g., cancer (e.g. leukemia, acute myeloid leukemia)) is caused by (in whole or in part), or a symptom of the disease is caused by (in whole or in part) the substance or substance activity or function. Alternatively, the substance (e.g., IL1RAP) may be an indicator of the disease (e.g., cancer (e.g. leukemia, acute myeloid leukemia)). Thus, an associated substance may serve as a means of targeting disease tissue (e.g., cancer cells (e.g., leukemia stem cells, acute myeloid leukemia cells)).

As used herein, "treating" or "treatment of" a condition, disease or disorder or symptoms associated with a condition, disease or disorder refers to an approach for obtaining beneficial or desired results, including clinical results. Beneficial or desired clinical results can include, but are not limited to, alleviation or amelioration of one or more symptoms or conditions, diminishment of extent of condition, disorder or disease, stabilization of the state of condition, disorder or disease, prevention of development of condition, disorder or disease, prevention of spread of condition, disorder or disease, delay or slowing of condition, disorder or disease progression, delay or slowing of condition, disorder or disease onset, amelioration or palliation of the condition, disorder or disease state, and remission, whether partial or total. "Treating" can also mean prolonging survival of a subject beyond that expected in the absence of treatment. "Treating" can also mean inhibiting the progression of the condition, disorder or disease, slowing the progression of the condition, disorder or disease temporarily, although in some instances, it involves halting the progression of the condition, disorder or disease permanently. As used herein the terms treatment, treat, or treating refers to a method of reducing the effects of one or more symptoms of a disease or condition characterized by expression of the protease or symptom of the disease or condition characterized by expression of the protease. Thus in the disclosed method, treatment can refer to a 10%, 20%, 30%, 40%, 50%, 60%, 70%, 80%, 90%, or 100% reduction in the severity of an established disease, condition, or symptom of the disease or condition. For example, a method for treating a disease is considered to be a treatment if there is a 10% reduction in one or more symptoms of the disease in a subject as compared to a control. Thus the reduction can be a 10%, 20%, 30%, 40%, 50%, 60%, 70%, 80%, 90%, 100%, or any percent reduction in between 10% and 100% as compared to native or control levels. It is understood that treatment does not necessarily refer to a cure or complete ablation of the disease, condition, or symptoms of the disease or condition. Further, as used herein, references to decreasing, reducing, or inhibiting include a change of 10%, 20%, 30%, 40%, 50%, 60%, 70%, 80%, 90% or greater as compared to a control level and such terms can include but do not necessarily include complete elimination.

The terms "dose" and "dosage" are used interchangeably herein. A dose refers to the amount of active ingredient given to an individual at each administration. The dose will vary depending on a number of factors, including the range of normal doses for a given therapy, frequency of administration; size and tolerance of the individual; severity of the condition; risk of side effects; and the route of administration. One of skill will recognize that the dose can be modified depending on the above factors or based on therapeutic progress. The term "dosage form" refers to the particular format of the pharmaceutical or pharmaceutical composition, and depends on the route of administration. For example, a dosage form can be in a liquid form for nebulization, e.g., for inhalants, in a tablet or liquid, e.g., for oral delivery, or a saline solution, e.g., for injection.

By "therapeutically effective dose or amount" as used herein is meant a dose that produces effects for which it is administered (e.g. treating or preventing a disease). The exact dose and formulation will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Remington: The Science and Practice of Pharmacy, 20th Edition, Gennaro, Editor (2003), and Pickar, Dosage Calculations (1999)). For example, for the given parameter, a therapeutically effective amount will show an increase or decrease of at least 5%, 10%, 15%, 20%, 25%, 40%, 50%, 60%, 75%, 80%, 90%, or at least 100%. Therapeutic efficacy can also be expressed as "-fold" increase or decrease. For example, a therapeutically effective amount can have at least a 1.2-fold, 1.5-fold, 2-fold, 5-fold, or more effect over a standard control. A therapeutically effective dose or amount may ameliorate one or more symptoms of a disease. A therapeutically effective dose or amount may prevent or delay the onset of a disease or one or more symptoms of a disease when the effect for which it is being administered is to treat a person who is at risk of developing the disease.

As used herein, the term "administering" means oral administration, administration as a suppository, topical contact, intravenous, intraperitoneal, intramuscular, intralesional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc. By "co-administer" it is meant that a composition described herein is administered at the same time, just prior to, or just after the administration of one or more additional therapies, for example cancer therapies such as chemotherapy, hormonal therapy, radiotherapy, or immunotherapy. The compounds of the invention can be administered alone or can be coadministered to the patient. Coadministration is meant to include simultaneous or sequential administration of the compounds individually or in combination (more than one compound). Thus, the preparations can also be combined, when desired, with other active substances (e.g. to reduce metabolic degradation). The compositions of the present invention can be delivered by transdermally, by a topical route, formulated as applicator sticks, solutions, suspensions, emulsions, gels, creams, ointments, pastes, jellies, paints, powders, and aerosols.

The compositions of the present invention may additionally include components to provide sustained release and/or comfort. Such components include high molecular weight, anionic mucomimetic polymers, gelling polysaccharides and finely-divided drug carrier substrates. These components are discussed in greater detail in U.S. Pat. Nos. 4,911,920; 5,403,841; 5,212,162; and 4,861,760. The entire contents of these patents are incorporated herein by reference in their entirety for all purposes. The compositions of the present invention can also be delivered as microspheres for slow release in the body. For example, microspheres can be administered via intradermal injection of drug-containing microspheres, which slowly release subcutaneously (see Rao, J. Biomater Sci. Polym. Ed. 7:623-645, 1995; as biodegradable and injectable gel formulations (see, e.g., Gao Pharm. Res. 12:857-863, 1995); or, as microspheres for oral administration (see, e.g., Eyles, J. Pharm. Pharmacol. 49:669-674, 1997). In embodiments, the formulations of the compositions of the present invention can be delivered by the use of liposomes which fuse with the cellular membrane or are endocytosed, i.e., by employing receptor ligands attached to the liposome, that bind to surface membrane protein receptors of the cell resulting in endocytosis. By using liposomes, particularly where the liposome surface carries receptor ligands specific for target cells, or are otherwise preferentially directed to a specific organ, one can focus the delivery of the compositions of the present invention into the target cells in vivo. (See, e.g., Al-Muhammed, J. Microencapsul. 13:293-306, 1996; Chonn, Curr. Opin. Biotechnol. 6:698-708, 1995; Ostro, Am. J. Hosp. Pharm. 46:1576-1587, 1989). The compositions of the present invention can also be delivered as nanoparticles.

As used herein, the term "pharmaceutically acceptable" is used synonymously with "physiologically acceptable" and "pharmacologically acceptable". A pharmaceutical composition will generally comprise agents for buffering and preservation in storage, and can include buffers and carriers for appropriate delivery, depending on the route of administration.

"Pharmaceutically acceptable excipient" and "pharmaceutically acceptable carrier" refer to a substance that aids the administration of an active agent to and absorption by a subject and can be included in the compositions of the present invention without causing a significant adverse toxicological effect on the patient. Non-limiting examples of pharmaceutically acceptable excipients include water, NaCl, normal saline solutions, lactated Ringer's, normal sucrose, normal glucose, binders, fillers, disintegrants, lubricants, coatings, sweeteners, flavors, salt solutions (such as Ringer's solution), alcohols, oils, gelatins, carbohydrates such as lactose, amylose or starch, fatty acid esters, hydroxymethycellulose, polyvinyl pyrrolidine, and colors, and the like. Such preparations can be sterilized and, if desired, mixed with auxiliary agents such as lubricants, preservatives, stabilizers, wetting agents, emulsifiers, salts for influencing osmotic pressure, buffers, coloring, and/or aromatic substances and the like that do not deleteriously react with the compounds of the invention. One of skill in the art will recognize that other pharmaceutical excipients are useful in the present invention.

The term "pharmaceutically acceptable salt" refers to salts derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate and the like.

The term "preparation" is intended to include the formulation of the active compound with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

The pharmaceutical preparation is optionally in unit dosage form. In such form the preparation is subdivided into unit doses containing appropriate quantities of the active component. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form. The unit dosage form can be of a frozen dispersion.

Antibody Compositions

Provided herein are, inter alia, antibodies and antibody variants (e.g., single domain antibodies) capable of binding Interleukin-1 receptor accessory protein (IL1RAP). The antibodies provided herein include novel light chain and heavy chain sequences and bind IL1RAP with high efficiency and specificity, thereby effectively targeting IL1RAP expressing cells. The light and heavy chains of the antibodies and antibody variants (e.g., single domain antibodies) provided herein may form part of recombinant proteins (e.g., chimeric antigen receptors or bispecific antibodies). Through the recruitment of effector cells, the anti-ILRAP1 antibodies and antibody variants (e.g., single domain antibodies) provided herein are able to induce cell killing of IL1RAP-expressing cells. IL1RAP is expressed on a variety of cell types, for example, on candidate leukemic stem cells acute myeloid leukemia (AML) patients, but not on normal hematopoietic stem cells. Thus, the anti-IL1RAP antibodies and antibody variants (e.g., single domain antibodies) provided herein are, inter alia, useful for the treatment of IL1RAP-expressing cancers such as AML.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:1, a CDR H2 as set forth in SEQ ID NO:2 and a CDR H3 as set forth in SEQ ID NO:3; and wherein the light chain variable domain includes: a CDR L1 as set forth in SEQ ID NO:4, a CDR L2 as set forth in SEQ ID NO:5, and a CDR L3 as set forth in SEQ ID NO:6.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:7, a CDR H2 as set forth in SEQ ID NO:8 and a CDR H3 as set forth in SEQ ID NO:9; and wherein the light chain variable domain includes: a CDR L1 as set forth in SEQ ID NO:10, a CDR L2 as set forth in SEQ ID NO:11, and a CDR L3 as set forth in SEQ ID NO:12.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:19, a CDR H2 as set forth in SEQ ID NO:20 and a CDR H3 as set forth in SEQ ID NO:21; and wherein the light chain variable domain includes: a CDR L1 as set forth in SEQ ID NO:22, a CDR L2 as set forth in SEQ ID NO:23, and a CDR L3 as set forth in SEQ ID NO:24.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:25, a CDR H2 as set forth in SEQ ID NO:26 and a CDR H3 as set forth in SEQ ID NO:27; and wherein the light chain variable domain includes: a CDR L1 as set forth in SEQ ID NO:28, a CDR L2 as set forth in SEQ ID NO:29, and a CDR L3 as set forth in SEQ ID NO:30.

In an aspect is provided an anti-interleukin-1 receptor accessory protein (IL1RAP) antibody including a heavy chain variable domain and a light chain variable domain, wherein the heavy chain variable domain includes: a CDR H1 as set forth in SEQ ID NO:31, a CDR H2 as set forth in SEQ ID NO:32 and a CDR H3 as set forth in SEQ ID NO:33; and wherein the light chain variable domain includes: a CDR L1 as set forth in SEQ ID NO:34, a CDR L2 as set forth in SEQ ID NO:35, and a CDR L3 as set forth in SEQ ID NO:36.

As described above, a "light chain variable (VL) domain" as provided herein refers to the variable region of the light chain of an antibody, an antibody variant or fragment thereof. Likewise, the "heavy chain variable (VH) domain" as provided herein refers to the variable region of the heavy chain of an antibody, an antibody variant or fragment thereof. The light chain variable domain and the heavy chain variable domain together form the paratope, which binds an antigen (epitope). The paratope or antigen-binding site is formed at the N-terminus of an antibody, an antibody variant or fragment thereof. In embodiments, the light chain variable (VL) domain includes CDR L1, CDR L2, CDR L3 and FR L1, FR L2, FR L3 and FR L4 (framework regions) of an antibody light chain. In embodiments, the heavy chain variable (VH) domain includes CDR H1, CDR H2, CDR H3 and FR H1, FR H2, FR H3 and FR H4 (framework regions) of an antibody heavy chain. In embodiments, the light chain variable (VL) domain and a light chain constant (CL) domain form part of an antibody light chain. In embodiments, the heavy chain variable (VH) domain and a heavy chain constant (CH1) domain form part of an antibody heavy chain. In embodiments, the heavy chain variable (VH) domain and one or more heavy chain constant (CH1, CH2, or CH3) domains form part of an antibody heavy chain. Thus, in embodiments, the light chain variable (VL) domain forms part of an antibody. In embodiments, the heavy chain variable (VH) domain forms part of an antibody. In embodiments, the light chain variable (VL) domain forms part of a therapeutic antibody. In embodiments, the heavy chain variable (VH) domain forms part of a therapeutic antibody. In embodiments, the light chain variable (VL) domain forms part of a human antibody. In embodiments, the heavy chain variable (VH) domain forms part of a human antibody. In embodiments, the light chain variable (VL) domain forms part of a humanized antibody. In embodiments, the heavy chain variable (VH) domain forms part of a humanized antibody. In embodiments, the light chain variable (VL) domain forms part of a chimeric antibody. In embodiments, the heavy chain variable (VH) domain forms part of a chimeric antibody. In embodiments, the light chain variable (VL) domain forms part of an antibody fragment. In embodiments, the heavy chain variable (VH) domain forms part of an antibody fragment. In embodiments, the light chain variable (VL) domain forms part of an antibody variant. In embodiments, the heavy chain variable (VH) domain forms part of an antibody variant. In embodiments, the light chain variable (VL) domain forms part of a Fab. In embodiments, the heavy chain variable (VH) domain forms part of a Fab. In embodiments, the light chain variable (VL) domain forms part of a scFv. In embodiments, the heavy chain variable (VH) domain forms part of a scFv. In embodiments, the light chain variable (VL) domain forms part of a single domain antibody. In embodiments, the heavy chain variable (VH) domain forms part of a single domain antibody.

In embodiments, the heavy chain variable domain includes the sequence of SEQ ID NO:61. In embodiments, the heavy chain variable domain is the sequence of SEQ ID NO:61. In embodiments, the light chain variable domain includes the sequence of SEQ ID NO:62. In embodiments, the light chain variable domain is the sequence of SEQ ID NO:62. In embodiments, the heavy chain variable domain includes the sequence of SEQ ID NO:63. In embodiments, the heavy chain variable domain is the sequence of SEQ ID NO:63. In embodiments, the light chain variable domain includes the sequence of SEQ ID NO:64. In embodiments, the light chain variable domain is the sequence of SEQ ID NO:64. In embodiments, the heavy chain variable domain includes the sequence of SEQ ID NO:67. In embodiments, the heavy chain variable domain is the sequence of SEQ ID NO:67. In embodiments, the light chain variable domain includes the sequence of SEQ ID NO:68. In embodiments, the light chain variable domain is the sequence of SEQ ID NO:68. In embodiments, the heavy chain variable domain includes the sequence of SEQ ID NO:69. In embodiments, the heavy chain variable domain is the sequence of SEQ ID NO:69. In embodiments, the light chain variable domain includes the sequence of SEQ ID NO:70. In embodiments, the light chain variable domain is the sequence of SEQ ID NO:70. In embodiments, the heavy chain variable domain includes the sequence of SEQ ID NO:71. In embodiments, the heavy chain variable domain is the sequence of SEQ ID NO:71. In embodiments, the light chain variable domain includes the sequence of SEQ ID NO:72. In embodiments, the light chain variable domain is the sequence of SEQ ID NO:72.

In embodiments, the heavy chain variable domain includes a FR H1 as set forth in SEQ ID NO:81, a FR H2 as set forth in SEQ ID NO:82, a FR H3 as set forth in SEQ ID NO:83 and a FR H4 as set forth in SEQ ID NO:84. In embodiments, the light chain variable domain includes a FR L1 as set forth in SEQ ID NO:85, a FR L2 as set forth in SEQ ID NO:86, a FR L3 as set forth in SEQ ID NO:87 and a FR L4 as set forth in SEQ ID NO:88.

In embodiments, the heavy chain variable domain includes a FR H1 as set forth in SEQ ID NO:89, a FR H2 as set forth in SEQ ID NO:90, a FR H3 as set forth in SEQ ID NO:91 and a FR H4 as set forth in SEQ ID NO:92. In embodiments, the light chain variable domain includes a FR L1 as set forth in SEQ ID NO:93, a FR L2 as set forth in SEQ ID NO:94, a FR L3 as set forth in SEQ ID NO:95 and a FR L4 as set forth in SEQ ID NO:96.

In embodiments, the heavy chain variable domain includes a FR H1 as set forth in SEQ ID NO:105, a FR H2 as set forth in SEQ ID NO:106, a FR H3 as set forth in SEQ ID NO:107 and a FR H4 as set forth in SEQ ID NO:108. In embodiments, the light chain variable domain includes a FR L1 as set forth in SEQ ID NO:109, a FR L2 as set forth in SEQ ID NO:110, a FR L3 as set forth in SEQ ID NO:111 and a FR L4 as set forth in SEQ ID NO:112.

In embodiments, the heavy chain variable domain includes a FR H1 as set forth in SEQ ID NO:113, a FR H2 as set forth in SEQ ID NO:114, a FR H3 as set forth in SEQ ID NO:115 and a FR H4 as set forth in SEQ ID NO:116. In embodiments, the light chain variable domain includes a FR L1 as set forth in SEQ ID NO:117, a FR L2 as set forth in SEQ ID NO:118, a FR L3 as set forth in SEQ ID NO:119 and a FR L4 as set forth in SEQ ID NO:120.

In embodiments, the heavy chain variable domain includes a FR H1 as set forth in SEQ ID NO:121, a FR H2 as set forth in SEQ ID NO:122, a FR H3 as set forth in SEQ ID NO:123 and a FR H4 as set forth in SEQ ID NO:124. In embodiments, the light chain variable domain includes a FR L1 as set forth in SEQ ID NO:125, a FR L2 as set forth in SEQ ID NO:126, a FR L3 as set forth in SEQ ID NO:127 and a FR L4 as set forth in SEQ ID NO:128.

In one embodiment, the antibody includes (i) a heavy chain variable domain including a CDR H1 as set forth in SEQ ID NO:1, a CDR H2 as set forth in SEQ ID NO:2; a CDR H3 as set forth in SEQ ID NO:3; a FR H1 as set forth in SEQ ID NO:81, a FR H2 as set forth in SEQ ID NO:82, a FR H3 as set forth in SEQ ID NO:83 and a FR H4 as set forth in SEQ ID NO:84; and (ii) a light chain variable domain including a CDR L1 as set forth in SEQ ID NO:4, a CDR L2 as set forth in SEQ ID NO:5, a CDR L3 as set forth in SEQ ID NO:6; a FR L1 as set forth in SEQ ID NO:85, a FR L2 as set forth in SEQ ID NO:86, FR L3 as set forth in SEQ ID NO:87 and a FR L4 as set forth in SEQ ID NO:88. In one further embodiment, the antibody is antibody D1A4.

In one embodiment, the antibody includes (i) a heavy chain variable domain including a CDR H1 as set forth in SEQ ID NO:7, a CDR H2 as set forth in SEQ ID NO:8; a CDR H3 as set forth in SEQ ID NO:9; a FR H1 as set forth in SEQ ID NO:89, a FR H2 as set forth in SEQ ID NO:90, a FR H3 as set forth in SEQ ID NO:91 and a FR H4 as set forth in SEQ ID NO:92; and (ii) a light chain variable domain including a CDR L1 as set forth in SEQ ID NO:10, a CDR L2 as set forth in SEQ ID NO:11, a CDR L3 as set forth in SEQ ID NO:12; a FR L1 as set forth in SEQ ID NO:93, a FR L2 as set forth in SEQ ID NO:94, a FR L3 as set forth in SEQ ID NO:95 and a FR L4 as set forth in SEQ ID NO:96. In one further embodiment, the antibody is antibody 1C7.

In one embodiment, the antibody includes (i) a heavy chain variable domain including a CDR H1 as set forth in SEQ ID NO:19, a CDR H2 as set forth in SEQ ID NO:20; a CDR H3 as set forth in SEQ ID NO:21; a FR H1 as set forth in SEQ ID NO:105, a FR H2 as set forth in SEQ ID NO:106, a FR H3 as set forth in SEQ ID NO:107 and a FR H4 as set forth in SEQ ID NO:108; and (ii) a light chain variable domain including a CDR L1 as set forth in SEQ ID NO:22, a CDR L2 as set forth in SEQ ID NO:23, a CDR L3 as set forth in SEQ ID NO:24; a FR L1 as set forth in SEQ ID NO:109, a FR L2 as set forth in SEQ ID NO:110, a FR L3 as set forth in SEQ ID NO:111 and a FR L4 as set forth in SEQ ID NO:112. In one further embodiment, the antibody is antibody 2E12.

In one embodiment, the antibody includes (i) a heavy chain variable domain including a CDR H1 as set forth in SEQ ID NO:25, a CDR H2 as set forth in SEQ ID NO:26; a CDR H3 as set forth in SEQ ID NO:27; a FR H1 as set forth in SEQ ID NO:113, a FR H2 as set forth in SEQ ID NO:114, a FR H3 as set forth in SEQ ID NO:115 and a FR H4 as set forth in SEQ ID NO:116; and (ii) a light chain variable domain including a CDR L1 as set forth in SEQ ID NO:28, a CDR L2 as set forth in SEQ ID NO:29, a CDR L3 as set forth in SEQ ID NO:30; a FR L1 as set forth in SEQ ID NO:117, a FR L2 as set forth in SEQ ID NO:118, a FR L3 as set forth in SEQ ID NO:119 and a FR L4 as set forth in SEQ ID NO:120. In one further embodiment, the antibody is antibody 1A7.

In one embodiment, the antibody includes (i) a heavy chain variable domain including a CDR H1 as set forth in SEQ ID NO:31, a CDR H2 as set forth in SEQ ID NO:32; a CDR H3 as set forth in SEQ ID NO:33; a FR H1 as set forth in SEQ ID NO:121, a FR H2 as set forth in SEQ ID NO:122, a FR H3 as set forth in SEQ ID NO:123 and a FR H4 as set forth in SEQ ID NO:124; and (ii) a light chain variable domain including a CDR L1 as set forth in SEQ ID NO:34, a CDR L2 as set forth in SEQ ID NO:35, a CDR L3 as set forth in SEQ ID NO:36; a FR L1 as set forth in SEQ ID NO:125, a FR L2 as set forth in SEQ ID NO:126, a FR L3 as set forth in SEQ ID NO:127 and a FR L4 as set forth in SEQ ID NO:128. In one further embodiment, the antibody is antibody 1B8.

In embodiments, the antibody is an IgG. In embodiments, the antibody is a human IgG. In embodiments, the antibody is an IgG1. In embodiments, the antibody is a human IgG1.

In embodiments, the antibody is a Fab' fragment. In embodiments, the antibody forms part of a Fab' fragment. In embodiments, the antibody is a single chain antibody (scFv). In embodiments, the light chain variable domain and the heavy chain variable domain form part of an scFv. In embodiments, the antibody is a single domain antibody. In embodiments, the single domain antibody includes a light chain variable domain. In embodiments, the single domain antibody includes a heavy chain variable domain.

In embodiments, the scFv includes the sequence of SEQ ID NO:61. In embodiments, the scFv includes the sequence of SEQ ID NO:63. In embodiments, the scFv includes the sequence of SEQ ID NO:67. In embodiments, the scFv includes the sequence of SEQ ID NO:69. In embodiments, the scFv includes the sequence of SEQ ID NO:71.

In embodiments, the scFv includes the sequence of SEQ ID NO:62. In embodiments, the scFv includes the sequence of SEQ ID NO:64. In embodiments, the scFv includes the sequence of SEQ ID NO:68. In embodiments, the scFv includes the sequence of SEQ ID NO:70.

In embodiments, the scFv includes the sequence of SEQ ID NO:72.

In embodiments, the scFv includes the sequence of SEQ ID NO:61 and the sequence of SEQ ID NO:62. In embodiments, the scFv is the sequence of SEQ ID NO:61 and the sequence of SEQ ID NO:62. In embodiments, the scFv includes the sequence of SEQ ID NO:63 and the sequence of SEQ ID NO:64. In embodiments, the scFv is the sequence of SEQ ID NO:63 and the sequence of SEQ ID NO:64. In embodiments, the scFv includes the sequence of SEQ ID NO:67 and the sequence of SEQ ID NO:68. In embodiments, the scFv is the sequence of SEQ ID NO:67 and the sequence of SEQ ID NO:68. In embodiments, the scFv includes the sequence of SEQ ID NO:69 and the sequence of SEQ ID NO:70. In embodiments, the scFv is the sequence of SEQ ID NO:69 and the sequence of SEQ ID NO:70. In embodiments, the scFv includes the sequence of SEQ ID NO:71 and the sequence of SEQ ID NO:72. In embodiments, the scFv is the sequence of SEQ ID NO:71 and the sequence of SEQ ID NO:72.

The antibodies provided herein may be single domain antibodies. Thus, in an aspect is provided an anti-interleukin-1 receptor accessory protein (IL1RAP) antibody including a light chain variable domain, wherein the light chain variable domain includes: a CDR L1 as set forth in SEQ ID NO:37, a CDR L2 as set forth in SEQ ID NO:38, and a CDR L3 as set forth in SEQ In an aspect is provided an anti-interleukin-1 receptor accessory protein (IL1RAP) antibody including a light chain variable domain, wherein the light chain variable domain includes: a CDR L1 as set forth in SEQ ID NO:40, a CDR L2 as set forth in SEQ ID NO:41, and a CDR L3 as set forth in SEQ ID NO:42.

In an aspect is provided an anti-interleukin-1 receptor accessory protein (IL1RAP) antibody including a light chain variable domain, wherein the light chain variable domain includes: a CDR L1 as set forth in SEQ ID NO:43, a CDR L2 as set forth in SEQ ID NO:44, and a CDR L3 as set forth in SEQ ID NO:45.

In an aspect is provided an anti-interleukin-1 receptor accessory protein (IL1RAP) antibody including a light chain variable domain, wherein the light chain variable domain includes: a CDR L1 as set forth in SEQ ID NO:46, a CDR L2 as set forth in SEQ ID NO:47, and a CDR L3 as set forth in SEQ ID NO:48.

In an aspect is provided an anti-interleukin-1 receptor accessory protein (IL1RAP) antibody including a light chain variable domain, wherein the light chain variable domain includes: a CDR L1 as set forth in SEQ ID NO:49, a CDR L2 as set forth in SEQ ID NO:50, and a CDR L3 as set forth in SEQ ID NO:51.

In an aspect is provided an anti-interleukin-1 receptor accessory protein (IL1RAP) antibody including a light chain variable domain, wherein the light chain variable domain includes: a CDR L1 as set forth in SEQ ID NO:52, a CDR L2 as set forth in SEQ ID NO:53, and a CDR L3 as set forth in SEQ ID NO:54.

In an aspect is provided an anti-interleukin-1 receptor accessory protein (IL1RAP) antibody including a light chain variable domain, wherein the light chain variable domain includes: a CDR L1 as set forth in SEQ ID NO:55, a CDR L2 as set forth in SEQ ID NO:56, and a CDR L3 as set forth in SEQ ID NO:57.

In an aspect is provided an anti-interleukin-1 receptor accessory protein (IL1RAP) antibody including a light chain variable domain, wherein the light chain variable domain includes: a CDR L1 as set forth in SEQ ID NO:58, a CDR L2 as set forth in SEQ ID NO:59, and a CDR L3 as set forth in SEQ ID NO:60.

In embodiments, the single domain antibody includes a light chain variable domain. In embodiments, the single domain antibody includes the sequence of SEQ ID NO:73. In embodiments, the single domain antibody includes the sequence of SEQ ID NO:74. In embodiments, the single domain antibody includes the sequence of SEQ ID NO:75. In embodiments, the single domain antibody includes the sequence of SEQ ID NO:76. In embodiments, the single domain antibody includes the sequence of SEQ ID NO:77. In embodiments, the single domain antibody includes the sequence of SEQ ID NO:78. In embodiments, the single domain antibody includes the sequence of SEQ ID NO:79. In embodiments, the single domain antibody includes the sequence of SEQ ID NO:80.

In embodiments, the single domain antibody is a light chain variable domain. In embodiments, the single domain antibody is the sequence of SEQ ID NO:73. In embodiments, the single domain antibody is the sequence of SEQ ID NO:74. In embodiments, the single domain antibody is the sequence of SEQ ID NO:75. In embodiments, the single domain antibody is the sequence of SEQ ID NO:76. In embodiments, the single domain antibody is the sequence of SEQ ID NO:77. In embodiments, the single domain antibody is the sequence of SEQ ID NO:78. In embodiments, the single domain antibody is the sequence of SEQ ID NO:79. In embodiments, the single domain antibody is the sequence of SEQ ID NO:80.

In embodiments, the light chain variable domain includes the sequence of SEQ ID NO:73. In embodiments, the light chain variable domain includes the sequence of SEQ ID NO:74. In embodiments, the light chain variable domain includes the sequence of SEQ ID NO:75. In embodiments, the light chain variable domain includes the sequence of SEQ ID NO:76. In embodiments, the light chain variable domain includes the sequence of SEQ ID NO:77. In embodiments, the light chain variable domain includes the sequence of SEQ ID NO:78. In embodiments, the light chain variable domain includes the sequence of SEQ ID NO:79. In embodiments, the light chain variable domain includes the sequence of SEQ ID NO:80.

In embodiments, the light chain variable domain is the sequence of SEQ ID NO:73. In embodiments, the light chain variable domain is the sequence of SEQ ID NO:74. In embodiments, the light chain variable domain is the sequence of SEQ ID NO:75. In embodiments, the light chain variable domain is the sequence of SEQ ID NO:76. In embodiments, the light chain variable domain is the sequence of SEQ ID NO:77. In embodiments, the light chain variable domain is the sequence of SEQ ID NO:78. In embodiments, the light chain variable domain is the sequence of SEQ ID NO:79. In embodiments, the light chain variable domain is the sequence of SEQ ID NO:80.

In embodiments, the light chain variable domain includes a FR L1 as set forth in SEQ ID NO:129, a FR L2 as set forth in SEQ ID NO:130, a FR H3 as set forth in SEQ ID NO:131 and a FR H4 as set forth in SEQ ID NO:132.

In embodiments, the light chain variable domain includes a FR L1 as set forth in SEQ ID NO:133, a FR L2 as set forth in SEQ ID NO:134, a FR H3 as set forth in SEQ ID NO:135 and a FR H4 as set forth in SEQ ID NO:136.

In embodiments, the light chain variable domain includes a FR L1 as set forth in SEQ ID NO:137, a FR L2 as set forth in SEQ ID NO:138, a FR H3 as set forth in SEQ ID NO:139 and a FR H4 as set forth in SEQ ID NO:140.

In embodiments, the light chain variable domain includes a FR L1 as set forth in SEQ ID NO:141, a FR L2 as set forth in SEQ ID NO:142, a FR H3 as set forth in SEQ ID NO:143 and a FR H4 as set forth in SEQ ID NO:144.

In embodiments, the light chain variable domain includes a FR L1 as set forth in SEQ ID NO:145, a FR L2 as set forth in SEQ ID NO:146, a FR H3 as set forth in SEQ ID NO:147 and a FR H4 as set forth in SEQ ID NO:148.

In embodiments, the light chain variable domain includes a FR L1 as set forth in SEQ ID NO:149, a FR L2 as set forth in SEQ ID NO:150, a FR H3 as set forth in SEQ ID NO:151 and a FR H4 as set forth in SEQ ID NO:152.

In embodiments, the light chain variable domain includes a FR L1 as set forth in SEQ ID NO:153, a FR L2 as set forth in SEQ ID NO:154, a FR H3 as set forth in SEQ ID NO:155 and a FR H4 as set forth in SEQ ID NO:156.

In embodiments, the light chain variable domain includes a FR L1 as set forth in SEQ ID NO:157, a FR L2 as set forth in SEQ ID NO:158, a FR H3 as set forth in SEQ ID NO:159 and a FR H4 as set forth in SEQ ID NO:160.

In one embodiment, the antibody includes a light chain variable domain including a CDR L1 as set forth in SEQ ID NO:37, a CDR L2 as set forth in SEQ ID NO:38 and a CDR L3 as set forth in SEQ ID NO:39; and a FR L1 as set forth in SEQ ID NO: 129, a FR L2 as set forth in SEQ ID NO: 130, a FR L3 as set forth in SEQ ID NO: 131, and a FR L4 as set forth in SEQ ID NO: 132. In one further embodiment, the antibody is antibody 1A12.

In one embodiment, the antibody includes a light chain variable domain including a CDR L1 as set forth in SEQ ID NO:40, a CDR L2 as set forth in SEQ ID NO:41 and a CDR L3 as set forth in SEQ ID NO:42; and a FR L1 as set forth in SEQ ID NO: 133, a FR L2 as set forth in SEQ ID NO: 134, a FR L3 as set forth in SEQ ID NO: 135, and a FR L4 as set forth in SEQ ID NO: 136. In one further embodiment, the antibody is antibody 1A5.

In one embodiment, the antibody includes a light chain variable domain including a CDR L1 as set forth in SEQ ID NO:43, a CDR L2 as set forth in SEQ ID NO:44 and a CDR L3 as set forth in SEQ ID NO:45; and a FR L1 as set forth in SEQ ID NO: 137, a FR L2 as set forth in SEQ ID NO: 138, a FR L3 as set forth in SEQ ID NO: 139, and a FR L4 as set forth in SEQ ID NO: 140. In one further embodiment, the antibody is antibody 1A6.

In one embodiment, the antibody includes a light chain variable domain including a CDR L1 as set forth in SEQ ID NO:46, a CDR L2 as set forth in SEQ ID NO:47 and a CDR L3 as set forth in SEQ ID NO:48; and a FR L1 as set forth in SEQ ID NO: 141, a FR L2 as set forth in SEQ ID NO: 142, a FR L3 as set forth in SEQ ID NO: 143, and a FR L4 as set forth in SEQ ID NO: 144. In one further embodiment, the antibody is antibody 1A1.

In one embodiment, the antibody includes a light chain variable domain including a CDR L1 as set forth in SEQ ID NO:49, a CDR L2 as set forth in SEQ ID NO:50 and a CDR L3 as set forth in SEQ ID NO:51; and a FR L1 as set forth in SEQ ID NO: 145, a FR L2 as set forth in SEQ ID NO: 146, a FR L3 as set forth in SEQ ID NO: 147, and a FR L4 as set forth in SEQ ID NO: 148. In one further embodiment, the antibody is antibody 1A4.

In one embodiment, the antibody includes a light chain variable domain including a CDR L1 as set forth in SEQ ID NO:52, a CDR L2 as set forth in SEQ ID NO:53 and a CDR L3 as set forth in SEQ ID NO:54; and a FR L1 as set forth in SEQ ID NO: 149, a FR L2 as set forth in SEQ ID NO: 150, a FR L3 as set forth in SEQ ID NO: 151, and a FR L4 as set forth in SEQ ID NO: 152. In one further embodiment, the antibody is antibody 1A11.

In one embodiment, the antibody includes a light chain variable domain including a CDR L1 as set forth in SEQ ID NO:55, a CDR L2 as set forth in SEQ ID NO:56 and a CDR L3 as set forth in SEQ ID NO:57; and a FR L1 as set forth in SEQ ID NO: 153, a FR L2 as set forth in SEQ ID NO: 154, a FR L3 as set forth in SEQ ID NO: 155, and a FR L4 as set forth in SEQ ID NO: 156. In one further embodiment, the antibody is antibody 1E12.

In one embodiment, the antibody includes a light chain variable domain including a CDR L1 as set forth in SEQ ID NO:58, a CDR L2 as set forth in SEQ ID NO:59 and a CDR L3 as set forth in SEQ ID NO:60; and a FR L1 as set forth in SEQ ID NO: 157, a FR L2 as set forth in SEQ ID NO: 158, a FR L3 as set forth in SEQ ID NO: 159, and a FR L4 as set forth in SEQ ID NO: 160. In one further embodiment, the antibody is antibody D1F6.

The ability of an antibody to bind a specific epitope (e.g., IL1RAP) can be described by the equilibrium dissociation constant ($K_D$). The equilibrium dissociation constant ($K_D$) as defined herein is the ratio of the dissociation rate (K-off) and the association rate (K-on) of an antibody to IL1RAP. It is described by the following formula: $K_D$=K-off/K-on. In embodiments, the antibody is capable of binding IL1RAP with an equilibrium dissociation constant ($K_D$) of about 21 nM. In embodiments, the antibody is capable of binding IL1RAP with an equilibrium dissociation constant ($K_D$) of 21 nM. In embodiments, the antibody is capable of binding IL1RAP with an equilibrium dissociation constant ($K_D$) of about 80.6 nM. In embodiments, the antibody is capable of binding IL1RAP with an equilibrium dissociation constant ($K_D$) of 80.6 nM.

In embodiments, the antibody is capable of binding IL1RAP with an equilibrium dissociation constant ($K_D$) of about 1-4 M. In embodiments, the antibody is capable of binding IL1RAP with an equilibrium dissociation constant ($K_D$) of about 1.5-4 M. In embodiments, the antibody is capable of binding IL1RAP with an equilibrium dissociation constant ($K_D$) of about 2-4 M. In embodiments, the antibody is capable of binding IL1RAP with an equilibrium dissociation constant ($K_D$) of about 2.5-4 M. In embodiments, the antibody is capable of binding IL1RAP with an equilibrium dissociation constant ($K_D$) of about 3-4 M. In embodiments, the antibody is capable of binding IL1RAP with an equilibrium dissociation constant ($K_D$) of about 3.5-4 M. In embodiments, the antibody is capable of binding IL1RAP with an equilibrium dissociation constant ($K_D$) of 1-4 M. In embodiments, the antibody is capable of binding IL1RAP with an equilibrium dissociation constant ($K_D$) of 1.5-4 M. In embodiments, the antibody is capable of binding IL1RAP with an equilibrium dissociation constant ($K_D$) of 2-4 M. In embodiments, the antibody is capable of binding IL1RAP with an equilibrium dissociation constant ($K_D$) of 2.5-4 M. In embodiments, the antibody is capable of binding IL1RAP with an equilibrium dissociation constant ($K_D$) of 3-4 M. In embodiments, the antibody is capable of binding IL1RAP with an equilibrium dissociation constant ($K_D$) of 3.5-4 M.

In embodiments, the antibody is capable of binding IL1RAP with an equilibrium dissociation constant ($K_D$) of about 1-3.5 M. In embodiments, the antibody is capable of binding IL1RAP with an equilibrium dissociation constant ($K_D$) of about 1-3 M. In embodiments, the antibody is capable of binding IL1RAP with an equilibrium dissociation constant ($K_D$) of about 1-2.5 M. In embodiments, the antibody is capable of binding IL1RAP with an equilibrium dissociation constant ($K_D$) of about 1-2 M. In embodiments, the antibody is capable of binding IL1RAP with an equilibrium dissociation constant ($K_D$) of about 1-1.5 M. In embodiments, the antibody is capable of binding IL1RAP with an equilibrium dissociation constant ($K_D$) of 1-3.5 M. In embodiments, the antibody is capable of binding IL1RAP with an equilibrium dissociation constant ($K_D$) of 1-3 M. In embodiments, the antibody is capable of binding IL1RAP with an equilibrium dissociation constant ($K_D$) of 1-2.5 M. In embodiments, the antibody is capable of binding IL1RAP with an equilibrium dissociation constant ($K_D$) of 1-2 M. In embodiments, the antibody is capable of binding IL1RAP with an equilibrium dissociation constant ($K_D$) of 1-1.5 M. In embodiments, the antibody is capable of binding IL1RAP with an equilibrium dissociation constant ($K_D$) of about 4 M, about 3.5 M, about 3 M, about 2.5 M, about 2 M, about 1.5 M, or about 1 M. In embodiments, the antibody is capable of binding IL1RAP with an equilibrium dissociation constant ($K_D$) of 4 M, 3.5 M, 3 M, 2.5 M, 2 M, 1.5 M, or 1 M.

In embodiments, the antibody is capable of binding IL1RAP with an equilibrium dissociation constant ($K_D$) of about 2.899 M. In embodiments, the antibody is capable of binding IL1RAP with an equilibrium dissociation constant ($K_D$) of 2.899 M. In embodiments, the antibody is capable of binding IL1RAP with an equilibrium dissociation constant ($K_D$) of about 1.402 M. In embodiments, the antibody is capable of binding IL1RAP with an equilibrium dissociation constant ($K_D$) of 1.402 M.

In embodiments, the antibody is capable of binding IL1RAP with an equilibrium dissociation constant ($K_D$) of about 1-4 mM. In embodiments, the antibody is capable of binding IL1RAP with an equilibrium dissociation constant ($K_D$) of about 1.5-4 mM. In embodiments, the antibody is capable of binding IL1RAP with an equilibrium dissociation constant ($K_D$) of about 2-4 mM. In embodiments, the antibody is capable of binding IL1RAP with an equilibrium dissociation constant ($K_D$) of about 2.5-4 mM. In embodiments, the antibody is capable of binding IL1RAP with an equilibrium dissociation constant ($K_D$) of about 3-4 mM. In embodiments, the antibody is capable of binding IL1RAP with an equilibrium dissociation constant ($K_D$) of about 3.5-4 mM. In embodiments, the antibody is capable of binding IL1RAP with an equilibrium dissociation constant ($K_D$) of 1-4 mM. In embodiments, the antibody is capable of binding IL1RAP with an equilibrium dissociation constant ($K_D$) of 1.5-4 mM. In embodiments, the antibody is capable of binding IL1RAP with an equilibrium dissociation constant ($K_D$) of 2-4 mM. In embodiments, the antibody is capable of binding IL1RAP with an equilibrium dissociation constant ($K_D$) of 2.5-4 mM. In embodiments, the antibody is capable of binding IL1RAP with an equilibrium dissociation constant ($K_D$) of 3-4 mM. In embodiments, the antibody is capable of binding IL1RAP with an equilibrium dissociation constant ($K_D$) of 3.5-4 mM.

In embodiments, the antibody is capable of binding IL1RAP with an equilibrium dissociation constant ($K_D$) of about 1-3.5 mM. In embodiments, the antibody is capable of binding IL1RAP with an equilibrium dissociation constant ($K_D$) of about 1-3 mM. In embodiments, the antibody is capable of binding IL1RAP with an equilibrium dissociation constant ($K_D$) of about 1-2.5 mM. In embodiments, the antibody is capable of binding IL1RAP with an equilibrium dissociation constant ($K_D$) of about 1-2 mM. In embodiments, the antibody is capable of binding IL1RAP with an equilibrium dissociation constant ($K_D$) of about 1-1.5 mM. In embodiments, the antibody is capable of binding IL1RAP with an equilibrium dissociation constant ($K_D$) of 1-3.5 mM. In embodiments, the antibody is capable of binding IL1RAP with an equilibrium dissociation constant ($K_D$) of 1-3 mM. In embodiments, the antibody is capable of binding IL1RAP with an equilibrium dissociation constant ($K_D$) of 1-2.5 mM. In embodiments, the antibody is capable of binding IL1RAP with an equilibrium dissociation constant ($K_D$) of 1-2 mM. In embodiments, the antibody is capable of binding IL1RAP with an equilibrium dissociation constant ($K_D$) of 1-1.5 mM. In embodiments, the antibody is capable of binding IL1RAP with an equilibrium dissociation constant ($K_D$) of about 4 mM, about 3.5 mM, about 3 mM, about 2.5 mM, about 2 mM, about 1.5 mM, or about 1 mM. In embodiments, the antibody is capable of binding IL1RAP with an equilibrium dissociation constant ($K_D$) of 4 mM, 3.5 mM, 3 mM, 2.5 mM, 2 mM, 1.5 mM, or 1 mM.

In embodiments, the antibody is capable of binding IL1RAP with an equilibrium dissociation constant ($K_D$) of about 2.71 mM. In embodiments, the antibody is capable of binding IL1RAP with an equilibrium dissociation constant ($K_D$) of 2.71 mM.

In embodiments, the antibody is capable of binding IL1RAP with an equilibrium dissociation constant ($K_D$) of about 20-30 mM. In embodiments, the antibody is capable of binding IL1RAP with an equilibrium dissociation constant ($K_D$) of about 21-30 mM. In embodiments, the antibody is capable of binding IL1RAP with an equilibrium dissociation constant ($K_D$) of about 22-30 mM. In embodiments, the antibody is capable of binding IL1RAP with an equilibrium dissociation constant ($K_D$) of about 23-30 mM. In embodiments, the antibody is capable of binding IL1RAP with an equilibrium dissociation constant ($K_D$) of about 24-30 mM. In embodiments, the antibody is capable of binding IL1RAP with an equilibrium dissociation constant ($K_D$) of about 25-30 mM. In embodiments, the antibody is capable of binding IL1RAP with an equilibrium dissociation constant ($K_D$) of about 26-30 mM. In embodiments, the antibody is capable of binding IL1RAP with an equilibrium dissociation constant ($K_D$) of about 27-30 mM. In embodiments, the antibody is capable of binding IL1RAP with an equilibrium dissociation constant ($K_D$) of about 28-30 mM. In embodiments, the antibody is capable of binding IL1RAP with an equilibrium dissociation constant ($K_D$) of about 29-30 mM.

In embodiments, the antibody is capable of binding IL1RAP with an equilibrium dissociation constant ($K_D$) of 20-30 mM. In embodiments, the antibody is capable of binding IL1RAP with an equilibrium dissociation constant ($K_D$) of 21-30 mM. In embodiments, the antibody is capable of binding IL1RAP with an equilibrium dissociation constant ($K_D$) of 22-30 mM. In embodiments, the antibody is capable of binding IL1RAP with an equilibrium dissociation constant ($K_D$) of 23-30 mM. In embodiments, the antibody is capable of binding IL1RAP with an equilibrium dissociation constant ($K_D$) of 24-30 mM. In embodiments, the antibody is capable of binding IL1RAP with an equilibrium dissociation constant ($K_D$) of 25-30 mM. In embodiments, the antibody is capable of binding IL1RAP with an equilibrium dissociation constant ($K_D$) of 26-30 mM. In embodiments, the antibody is capable of binding IL1RAP with an equilibrium dissociation constant ($K_D$) of 27-30 mM. In embodiments, the antibody is capable of binding IL1RAP with an equilibrium dissociation constant ($K_D$) of 28-30 mM. In embodiments, the antibody is capable of binding IL1RAP with an equilibrium dissociation constant ($K_D$) of 29-30 mM.

In embodiments, the antibody is capable of binding IL1RAP with an equilibrium dissociation constant ($K_D$) of about 20-29 mM. In embodiments, the antibody is capable of binding IL1RAP with an equilibrium dissociation constant ($K_D$) of about 20-28 mM. In embodiments, the antibody is capable of binding IL1RAP with an equilibrium dissociation constant ($K_D$) of about 20-27 mM. In embodiments, the antibody is capable of binding IL1RAP with an equilibrium dissociation constant ($K_D$) of about 20-26 mM. In embodiments, the antibody is capable of binding IL1RAP with an equilibrium dissociation constant ($K_D$) of about 20-25 mM. In embodiments, the antibody is capable of binding IL1RAP with an equilibrium dissociation constant ($K_D$) of about 20-24 mM. In embodiments, the antibody is capable of binding IL1RAP with an equilibrium dissociation constant ($K_D$) of about 20-23 mM. In embodiments, the antibody is capable of binding IL1RAP with an equilibrium dissociation constant ($K_D$) of about 20-22 mM. In embodiments, the antibody is capable of binding IL1RAP with an equilibrium dissociation constant ($K_D$) of about 20-21 mM.

In embodiments, the antibody is capable of binding IL1RAP with an equilibrium dissociation constant ($K_D$) of 20-29 mM. In embodiments, the antibody is capable of binding IL1RAP with an equilibrium dissociation constant ($K_D$) of 20-28 mM. In embodiments, the antibody is capable of binding IL1RAP with an equilibrium dissociation constant ($K_D$) of 20-27 mM. In embodiments, the antibody is capable of binding IL1RAP with an equilibrium dissociation constant ($K_D$) of 20-26 mM. In embodiments, the antibody is capable of binding IL1RAP with an equilibrium dissociation constant ($K_D$) of 20-25 mM. In embodiments, the antibody is capable of binding IL1RAP with an equilibrium dissociation constant ($K_D$) of 20-24 mM. In embodiments, the antibody is capable of binding IL1RAP with an equilibrium dissociation constant ($K_D$) of 20-23 mM. In embodiments, the antibody is capable of binding IL1RAP with an equilibrium dissociation constant ($K_D$) of 20-22 mM. In embodiments, the antibody is capable of binding IL1RAP with an equilibrium dissociation constant ($K_D$) of 20-21 mM.

In embodiments, the antibody is capable of binding IL1RAP with an equilibrium dissociation constant ($K_D$) of about 30 mM, about 29 mM, about 28 mM, about 27 mM, about 26 mM, about 25 mM, about 24 mM, about 23 mM, about 22 mM, about 21 mM, or about 20 mM. In embodiments, the antibody is capable of binding IL1RAP with an equilibrium dissociation constant ($K_D$) of 30 mM, 29 mM, 28 mM, 27 mM, 26 mM, 25 mM, 24 mM, 23 mM, 22 mM, 21 mM, or 20 mM.

In embodiments, the antibody is capable of binding IL1RAP with an equilibrium dissociation constant ($K_D$) of about 26.95 mM. In embodiments, the antibody is capable of binding IL1RAP with an equilibrium dissociation constant ($K_D$) of 26.95 mM.

In embodiments, the antibody is capable of binding IL1RAP with an equilibrium dissociation constant ($K_D$) of about 240-260 µM. In embodiments, the antibody is capable of binding IL1RAP with an equilibrium dissociation constant ($K_D$) of about 242-260 µM. In embodiments, the antibody is capable of binding IL1RAP with an equilibrium dissociation constant ($K_D$) of about 244-260 µM. In embodiments, the antibody is capable of binding IL1RAP with an equilibrium dissociation constant ($K_D$) of about 246-260 µM. In embodiments, the antibody is capable of binding IL1RAP with an equilibrium dissociation constant ($K_D$) of about 248-260 µM. In embodiments, the antibody is capable of binding IL1RAP with an equilibrium dissociation constant ($K_D$) of about 250-260 µM. In embodiments, the antibody is capable of binding IL1RAP with an equilibrium dissociation constant ($K_D$) of about 252-260 µM. In embodiments, the antibody is capable of binding IL1RAP with an equilibrium dissociation constant ($K_D$) of about 254-260 µM. In embodiments, the antibody is capable of binding IL1RAP with an equilibrium dissociation constant ($K_D$) of about 256-260 µM. In embodiments, the antibody is capable of binding IL1RAP with an equilibrium dissociation constant ($K_D$) of about 258-260 µM.

In embodiments, the antibody is capable of binding IL1RAP with an equilibrium dissociation constant ($K_D$) from 240-260 µM. In embodiments, the antibody is capable of binding IL1RAP with an equilibrium dissociation constant ($K_D$) of 242-260 µM. In embodiments, the antibody is capable of binding IL1RAP with an equilibrium dissociation constant ($K_D$) of 244-260 µM. In embodiments, the antibody is capable of binding IL1RAP with an equilibrium dissociation constant ($K_D$) of 246-260 µM. In embodiments, the antibody is capable of binding IL1RAP with an equilibrium dissociation constant ($K_D$) of 248-260 µM. In embodiments, the antibody is capable of binding IL1RAP with an equilibrium dissociation constant ($K_D$) of 250-260 µM. In embodiments, the antibody is capable of binding IL1RAP with an equilibrium dissociation constant ($K_D$) of 252-260 µM. In embodiments, the antibody is capable of binding IL1RAP with an equilibrium dissociation constant ($K_D$) of 254-260 µM. In embodiments, the antibody is capable of binding IL1RAP with an equilibrium dissociation constant ($K_D$) of 256-260 µM. In embodiments, the antibody is capable of binding IL1RAP with an equilibrium dissociation constant ($K_D$) of 258-260 µM.

In embodiments, the antibody is capable of binding IL1RAP with an equilibrium dissociation constant ($K_D$) of about 240-258 µM. In embodiments, the antibody is capable of binding IL1RAP with an equilibrium dissociation constant ($K_D$) of about 240-256 µM. In embodiments, the antibody is capable of binding IL1RAP with an equilibrium dissociation constant ($K_D$) of about 240-254 µM. In embodiments, the antibody is capable of binding IL1RAP with an equilibrium dissociation constant ($K_D$) of about 240-252 µM. In embodiments, the antibody is capable of binding IL1RAP with an equilibrium dissociation constant ($K_D$) of about 240-250 µM. In embodiments, the antibody is capable of binding IL1RAP with an equilibrium dissociation constant ($K_D$) of about 240-248 µM. In embodiments, the antibody is capable of binding IL1RAP with an equilibrium dissociation constant ($K_D$) of about 240-246 µM. In embodiments, the antibody is capable of binding IL1RAP with an equilibrium dissociation constant ($K_D$) of about 240-242 µM.

In embodiments, the antibody is capable of binding IL1RAP with an equilibrium dissociation constant ($K_D$) from 240-258 µM. In embodiments, the antibody is capable of binding IL1RAP with an equilibrium dissociation constant ($K_D$) of 240-256 µM. In embodiments, the antibody is capable of binding IL1RAP with an equilibrium dissociation constant ($K_D$) of 240-254 µM. In embodiments, the antibody is capable of binding IL1RAP with an equilibrium dissociation constant ($K_D$) of 240-252 µM. In embodiments, the antibody is capable of binding IL1RAP with an equilibrium dissociation constant ($K_D$) of 240-250 µM. In embodiments, the antibody is capable of binding IL1RAP with an equilibrium dissociation constant ($K_D$) of 240-248 µM. In embodiments, the antibody is capable of binding IL1RAP with an equilibrium dissociation constant ($K_D$) of 240-246 µM. In embodiments, the antibody is capable of binding IL1RAP with an equilibrium dissociation constant ($K_D$) of 240-242 µM.

In embodiments, the antibody is capable of binding IL1RAP with an equilibrium dissociation constant ($K_D$) of about 260 µM, about 258 µM, about 256 µM, about 254 µM, about 252 µM, about 250 µM, about 248 µM, about 246 µM, about 244 µM, about 242 µM, or about 240 µM. In embodiments, the antibody is capable of binding IL1RAP with an equilibrium dissociation constant ($K_D$) of 260 µM, 258 µM, 256 µM, 254 µM, 252 µM, 250 µM, 248 µM, 246 µM, 244 µM, 242 µM, or 240 µM.

In embodiments, the antibody is capable of binding IL1RAP with an equilibrium dissociation constant ($K_D$) of about 249.8 µM. In embodiments, the antibody is capable of binding IL1RAP with an equilibrium dissociation constant ($K_D$) of 249.8 µM.

In embodiments, the antibody is capable of binding IL1RAP with an equilibrium dissociation constant ($K_D$) of about 30-40 µM. In embodiments, the antibody is capable of binding IL1RAP with an equilibrium dissociation constant ($K_D$) of about 31-40 µM. In embodiments, the antibody is capable of binding IL1RAP with an equilibrium dissociation constant ($K_D$) of about 32-40 µM. In embodiments, the antibody is capable of binding IL1RAP with an equilibrium dissociation constant ($K_D$) of about 33-40 µM. In embodiments, the antibody is capable of binding IL1RAP with an equilibrium dissociation constant ($K_D$) of about 34-40 µM. In embodiments, the antibody is capable of binding IL1RAP with an equilibrium dissociation constant ($K_D$) of about 35-40 µM. In embodiments, the antibody is capable of binding IL1RAP with an equilibrium dissociation constant ($K_D$) of about 36-40 µM. In embodiments, the antibody is capable of binding IL1RAP with an equilibrium dissociation constant ($K_D$) of about 37-40 µM. In embodiments, the antibody is capable of binding IL1RAP with an equilibrium dissociation constant ($K_D$) of about 38-40 µM. In embodiments, the antibody is capable of binding IL1RAP with an equilibrium dissociation constant ($K_D$) of about 39-40 µM.

In embodiments, the antibody is capable of binding IL1RAP with an equilibrium dissociation constant ($K_D$) of 30-40 µM. In embodiments, the antibody is capable of binding IL1RAP with an equilibrium dissociation constant ($K_D$) of 31-40 µM. In embodiments, the antibody is capable of binding IL1RAP with an equilibrium dissociation constant ($K_D$) of 32-40 µM. In embodiments, the antibody is capable of binding IL1RAP with an equilibrium dissociation constant ($K_D$) of 33-40 µM. In embodiments, the antibody is capable of binding IL1RAP with an equilibrium dissociation constant ($K_D$) of 34-40 µM. In embodiments, the antibody is capable of binding IL1RAP with an equilibrium dissociation constant ($K_D$) of 35-40 µM. In embodiments, the antibody is capable of binding IL1RAP with an equilibrium dissociation constant ($K_D$) of 36-40 µM. In embodiments, the antibody is capable of binding IL1RAP with an equilibrium dissociation constant ($K_D$) of 37-40 µM. In embodiments, the antibody is capable of binding IL1RAP with an equilibrium dissociation constant ($K_D$) of 38-40 µM. In embodiments, the antibody is capable of binding IL1RAP with an equilibrium dissociation constant ($K_D$) of 39-40 µM.

In embodiments, the antibody is capable of binding IL1RAP with an equilibrium dissociation constant ($K_D$) of about 30-39 µM. In embodiments, the antibody is capable of binding IL1RAP with an equilibrium dissociation constant ($K_D$) of about 30-38 µM. In embodiments, the antibody is capable of binding IL1RAP with an equilibrium dissociation constant ($K_D$) of about 30-37 µM. In embodiments, the antibody is capable of binding IL1RAP with an equilibrium dissociation constant ($K_D$) of about 30-36 µM. In embodiments, the antibody is capable of binding IL1RAP with an equilibrium dissociation constant ($K_D$) of about 30-35 µM. In embodiments, the antibody is capable of binding IL1RAP with an equilibrium dissociation constant ($K_D$) of about 30-34 µM. In embodiments, the antibody is capable of binding IL1RAP with an equilibrium dissociation constant ($K_D$) of about 30-33 µM. In embodiments, the antibody is capable of binding IL1RAP with an equilibrium dissociation constant ($K_D$) of about 30-32 µM. In embodiments, the antibody is capable of binding IL1RAP with an equilibrium dissociation constant ($K_D$) of about 30-31 µM.

In embodiments, the antibody is capable of binding IL1RAP with an equilibrium dissociation constant ($K_D$) of 30-39 µM. In embodiments, the antibody is capable of binding IL1RAP with an equilibrium dissociation constant ($K_D$) of 30-38 µM. In embodiments, the antibody is capable of binding IL1RAP with an equilibrium dissociation constant ($K_D$) of 30-37 µM. In embodiments, the antibody is capable of binding IL1RAP with an equilibrium dissociation constant ($K_D$) of 30-36 µM. In embodiments, the antibody is capable of binding IL1RAP with an equilibrium dissociation constant ($K_D$) of 30-35 µM. In embodiments, the antibody is capable of binding IL1RAP with an equilibrium dissociation constant ($K_D$) of 30-34 µM. In embodiments, the antibody is capable of binding IL1RAP with an equilibrium dissociation constant ($K_D$) of 30-33 µM. In embodiments, the antibody is capable of binding IL1RAP with an equilibrium dissociation constant ($K_D$) of 30-32 µM. In embodiments, the antibody is capable of binding IL1RAP with an equilibrium dissociation constant ($K_D$) of 30-31 µM.

In embodiments, the antibody is capable of binding IL1RAP with an equilibrium dissociation constant ($K_D$) of about 30 μM, about 31 μM, about 32 μM, about 33 μM, about 34 μM, about 35 μM, about 36 μM, about 37 μM, about 38 μM, about 39 μM, or about 40 μM. In embodiments, the antibody is capable of binding IL1RAP with an equilibrium dissociation constant ($K_D$) of 30 μM, 31 μM, 32 μM, 33 μM, 34 μM, 35 μM, 36 μM, 37 μM, 38 μM, 39 μM, or 40 μM.

In embodiments, the antibody is capable of binding IL1RAP with an equilibrium dissociation constant ($K_D$) of about 35.75 μM. In embodiments, the antibody is capable of binding IL1RAP with an equilibrium dissociation constant ($K_D$) of 35.75 μM.

In embodiments, the antibody is capable of binding IL1RAP with an equilibrium dissociation constant ($K_D$) of about 0.2-8 μM. In embodiments, the antibody is capable of binding IL1RAP with an equilibrium dissociation constant ($K_D$) of about 0.4-8 μM. In embodiments, the antibody is capable of binding IL1RAP with an equilibrium dissociation constant ($K_D$) of about 0.6-8 μM. In embodiments, the antibody is capable of binding IL1RAP with an equilibrium dissociation constant ($K_D$) of about 0.8-8 μM. In embodiments, the antibody is capable of binding IL1RAP with an equilibrium dissociation constant ($K_D$) of about 1-8 μM. In embodiments, the antibody is capable of binding IL1RAP with an equilibrium dissociation constant ($K_D$) of about 1.5-8 μM. In embodiments, the antibody is capable of binding IL1RAP with an equilibrium dissociation constant ($K_D$) of about 2-8 μM. In embodiments, the antibody is capable of binding IL1RAP with an equilibrium dissociation constant ($K_D$) of about 2.5-8 μM. In embodiments, the antibody is capable of binding IL1RAP with an equilibrium dissociation constant ($K_D$) of about 3-8 μM. In embodiments, the antibody is capable of binding IL1RAP with an equilibrium dissociation constant ($K_D$) of about 3.5-8 μM. In embodiments, the antibody is capable of binding IL1RAP with an equilibrium dissociation constant ($K_D$) of about 4-8 μM.

In embodiments, the antibody is capable of binding IL1RAP with an equilibrium dissociation constant ($K_D$) of about 4.5-8 μM. In embodiments, the antibody is capable of binding IL1RAP with an equilibrium dissociation constant ($K_D$) of about 5-8 μM. In embodiments, the antibody is capable of binding IL1RAP with an equilibrium dissociation constant ($K_D$) of about 5.5-8 μM. In embodiments, the antibody is capable of binding IL1RAP with an equilibrium dissociation constant ($K_D$) of about 6-8 μM. In embodiments, the antibody is capable of binding IL1RAP with an equilibrium dissociation constant ($K_D$) of about 6.5-8 μM. In embodiments, the antibody is capable of binding IL1RAP with an equilibrium dissociation constant ($K_D$) of about 7-8 μM. In embodiments, the antibody is capable of binding IL1RAP with an equilibrium dissociation constant ($K_D$) of about 7.5-8 μM.

In embodiments, the antibody is capable of binding IL1RAP with an equilibrium dissociation constant ($K_D$) from 0.2-8 μM. In embodiments, the antibody is capable of binding IL1RAP with an equilibrium dissociation constant ($K_D$) of 0.4-8 μM. In embodiments, the antibody is capable of binding IL1RAP with an equilibrium dissociation constant ($K_D$) of 0.6-8 μM. In embodiments, the antibody is capable of binding IL1RAP with an equilibrium dissociation constant ($K_D$) of 0.8-8 μM. In embodiments, the antibody is capable of binding IL1RAP with an equilibrium dissociation constant ($K_D$) of 1-8 μM. In embodiments, the antibody is capable of binding IL1RAP with an equilibrium dissociation constant ($K_D$) of 1.5-8 μM. In embodiments, the antibody is capable of binding IL1RAP with an equilibrium dissociation constant ($K_D$) of 2-8 μM. In embodiments, the antibody is capable of binding IL1RAP with an equilibrium dissociation constant ($K_D$) of 2.5-8 μM. In embodiments, the antibody is capable of binding IL1RAP with an equilibrium dissociation constant ($K_D$) of 3-8 μM. In embodiments, the antibody is capable of binding IL1RAP with an equilibrium dissociation constant ($K_D$) of 3.5-8 μM. In embodiments, the antibody is capable of binding IL1RAP with an equilibrium dissociation constant ($K_D$) of 4-8 μM. In embodiments, the antibody is capable of binding IL1RAP with an equilibrium dissociation constant ($K_D$) of 4.5-8 μM. In embodiments, the antibody is capable of binding IL1RAP with an equilibrium dissociation constant ($K_D$) of 5-8 μM. In embodiments, the antibody is capable of binding IL1RAP with an equilibrium dissociation constant ($K_D$) of 5.5-8 μM. In embodiments, the antibody is capable of binding IL1RAP with an equilibrium dissociation constant ($K_D$) of 6-8 μM. In embodiments, the antibody is capable of binding IL1RAP with an equilibrium dissociation constant ($K_D$) of 6.5-8 μM. In embodiments, the antibody is capable of binding IL1RAP with an equilibrium dissociation constant ($K_D$) of 7-8 μM. In embodiments, the antibody is capable of binding IL1RAP with an equilibrium dissociation constant ($K_D$) of 7.5-8 μM.

In embodiments, the antibody is capable of binding IL1RAP with an equilibrium dissociation constant ($K_D$) of about 0.2-7.5 μM. In embodiments, the antibody is capable of binding IL1RAP with an equilibrium dissociation constant ($K_D$) of about 0.2-7 μM. In embodiments, the antibody is capable of binding IL1RAP with an equilibrium dissociation constant ($K_D$) of about 0.2-6.5 μM. In embodiments, the antibody is capable of binding IL1RAP with an equilibrium dissociation constant ($K_D$) of about 0.2-6 μM. In embodiments, the antibody is capable of binding IL1RAP with an equilibrium dissociation constant ($K_D$) of about 0.2-5.5 μM. In embodiments, the antibody is capable of binding IL1RAP with an equilibrium dissociation constant ($K_D$) of about 0.2-5 μM. In embodiments, the antibody is capable of binding IL1RAP with an equilibrium dissociation constant ($K_D$) of about 0.2-4.5 μM. In embodiments, the antibody is capable of binding IL1RAP with an equilibrium dissociation constant ($K_D$) of about 0.2-4 μM. In embodiments, the antibody is capable of binding IL1RAP with an equilibrium dissociation constant ($K_D$) of about 0.2-3.5 μM. In embodiments, the antibody is capable of binding IL1RAP with an equilibrium dissociation constant ($K_D$) of about 0.2-3 μM. In embodiments, the antibody is capable of binding IL1RAP with an equilibrium dissociation constant ($K_D$) of about 0.2-2.5 μM. In embodiments, the antibody is capable of binding IL1RAP with an equilibrium dissociation constant ($K_D$) of about 0.2-2 μM. In embodiments, the antibody is capable of binding IL1RAP with an equilibrium dissociation constant ($K_D$) of about 0.2-1.5 μM. In embodiments, the antibody is capable of binding IL1RAP with an equilibrium dissociation constant ($K_D$) of about 0.2-1 μM. In embodiments, the antibody is capable of binding IL1RAP with an equilibrium dissociation constant ($K_D$) of about 0.2-0.8 μM. In embodiments, the antibody is capable of binding IL1RAP with an equilibrium dissociation constant ($K_D$) of about 0.2-0.6 μM. In embodiments, the antibody is capable of binding IL1RAP with an equilibrium dissociation constant ($K_D$) of about 0.2-0.4 μM.

In embodiments, the antibody is capable of binding IL1RAP with an equilibrium dissociation constant ($K_D$) of 0.2-7.5 μM. In embodiments, the antibody is capable of binding IL1RAP with an equilibrium dissociation constant ($K_D$) of 0.2-7 µM. In embodiments, the antibody is capable of binding IL1RAP with an equilibrium dissociation constant ($K_D$) of 0.2-6.5 µM. In embodiments, the antibody is capable of binding IL1RAP with an equilibrium dissociation constant ($K_D$) of 0.2-6 µM. In embodiments, the antibody is capable of binding IL1RAP with an equilibrium dissociation constant ($K_D$) of 0.2-5.5 µM. In embodiments, the antibody is capable of binding IL1RAP with an equilibrium dissociation constant ($K_D$) of 0.2-5 µM. In embodiments, the antibody is capable of binding IL1RAP with an equilibrium dissociation constant ($K_D$) of 0.2-4.5 µM. In embodiments, the antibody is capable of binding IL1RAP with an equilibrium dissociation constant ($K_D$) of 0.2-4 µM. In embodiments, the antibody is capable of binding IL1RAP with an equilibrium dissociation constant ($K_D$) of 0.2-3.5 µM. In embodiments, the antibody is capable of binding IL1RAP with an equilibrium dissociation constant ($K_D$) of 0.2-3 µM. In embodiments, the antibody is capable of binding IL1RAP with an equilibrium dissociation constant ($K_D$) of 0.2-2.5 µM. In embodiments, the antibody is capable of binding IL1RAP with an equilibrium dissociation constant ($K_D$) of 0.2-2 µM. In embodiments, the antibody is capable of binding IL1RAP with an equilibrium dissociation constant ($K_D$) of 0.2-1.5 µM. In embodiments, the antibody is capable of binding IL1RAP with an equilibrium dissociation constant ($K_D$) of 0.2-1 µM. In embodiments, the antibody is capable of binding IL1RAP with an equilibrium dissociation constant ($K_D$) of 0.2-0.8 µM. In embodiments, the antibody is capable of binding IL1RAP with an equilibrium dissociation constant ($K_D$) of 0.2-0.6 µM. In embodiments, the antibody is capable of binding IL1RAP with an equilibrium dissociation constant ($K_D$) of 0.2-0.4 µM.

In embodiments, the antibody is capable of binding IL1RAP with an equilibrium dissociation constant ($K_D$) of about 8 µM, about 7.5 µM, about 7 µM, about 6.5 µM, about 6 µM, about 5.5 µM, about 5 µM, about 4.5 µM, about 4 µM, about 3.5 µM, about 3 µM, about 2.5 µM, about 2 µM, about 1.5 µM, about 1 µM, about 0.8 µM, about 0.6 µM, about 0.4 µM, or about 0.2 µM. In embodiments, the antibody is capable of binding IL1RAP with an equilibrium dissociation constant ($K_D$) of 8 µM, 7.5 µM, 7 µM, 6.5 µM, 6 µM, 5.5 µM, 5 µM, 4.5 µM, 4 µM, 3.5 µM, 3 µM, 2.5 µM, 2 µM, 1.5 µM, 1 µM, 0.8 µM, 0.6 µM, 0.4 µM, or 0.2 µM.

In embodiments, the antibody is capable of binding IL1RAP with an equilibrium dissociation constant ($K_D$) of about 3.07 µM. In embodiments, the antibody is capable of binding IL1RAP with an equilibrium dissociation constant ($K_D$) of 3.07 µM.

In embodiments, the antibody is capable of binding IL1RAP with an equilibrium dissociation constant ($K_D$) of about 2.11 µM. In embodiments, the antibody is capable of binding IL1RAP with an equilibrium dissociation constant ($K_D$) of 2.11 µM.

In embodiments, the antibody is capable of binding IL1RAP with an equilibrium dissociation constant ($K_D$) of about 0.85 µM. In embodiments, the antibody is capable of binding IL1RAP with an equilibrium dissociation constant ($K_D$) of 0.85 µM.

In embodiments, the antibody is capable of binding IL1RAP with an equilibrium dissociation constant ($K_D$) of about 1.4 µM. In embodiments, the antibody is capable of binding IL1RAP with an equilibrium dissociation constant ($K_D$) of 1.4 µM.

In embodiments, the antibody is capable of binding IL1RAP with an equilibrium dissociation constant ($K_D$) of about 6.63 µM. In embodiments, the antibody is capable of binding IL1RAP with an equilibrium dissociation constant ($K_D$) of 6.63 µM.

The term "$EC_{50}$" or "half maximal effective concentration" as used herein refers to the concentration of a molecule (e.g., antibody, chimeric antigen receptor or bispecific antibody) capable of inducing a response which is halfway between the baseline response and the maximum response after a specified exposure time. In embodiments, the $EC_{50}$ is the concentration of a molecule (e.g., antibody, chimeric antigen receptor or bispecific antibody) that produces 50% of the maximal possible effect of that molecule. In embodiments, the antibody has an $EC_{50}$ of about 21 nM. In embodiments, the antibody has an $EC_{50}$ of 21 nM. In embodiments, the antibody has an $EC_{50}$ of about 80.6 nM. In embodiments, the antibody has an $EC_{50}$ of 80.6 nM.

In embodiments, the antibody has an $EC_{50}$ of about 1-4 M. In embodiments, the antibody has an $EC_{50}$ of about 1.5-4 M. In embodiments, the antibody has an $EC_{50}$ of about 2-4 M. In embodiments, the antibody has an $EC_{50}$ of about 2.5-4 M. In embodiments, the antibody has an $EC_{50}$ of about 3-4 M. In embodiments, the antibody has an $EC_{50}$ of about 3.5-4 M. In embodiments, the antibody has an $EC_{50}$ of 1-4 M. In embodiments, the antibody has an $EC_{50}$ of 1.5-4 M. In embodiments, the antibody has an $EC_{50}$ of 2-4 M. In embodiments, the antibody has an $EC_{50}$ of 2.5-4 M. In embodiments, the antibody has an $EC_{50}$ of 3-4 M. In embodiments, the antibody has an $EC_{50}$ of 3.5-4 M.

In embodiments, the antibody has an $EC_{50}$ of about 1-3.5 M. In embodiments, the antibody has an $EC_{50}$ of about 1-3 M. In embodiments, the antibody has an $EC_{50}$ of about 1-2.5 M. In embodiments, the antibody has an $EC_{50}$ of about 1-2 M. In embodiments, the antibody has an $EC_{50}$ of about 1-1.5 M. In embodiments, the antibody has an $EC_{50}$ of 1-3.5 M. In embodiments, the antibody has an $EC_{50}$ of 1-3 M. In embodiments, the antibody has an $EC_{50}$ of 1-2.5 M. In embodiments, the antibody has an $EC_{50}$ of 1-2 M. In embodiments, the antibody has an $EC_{50}$ of 1-1.5 M. In embodiments, the antibody has an $EC_{50}$ of about 4 M, about 3.5 M, about 3 M, about 2.5 M, about 2 M, about 1.5 M, or about 1 M. In embodiments, the antibody has an $EC_{50}$ of 4 M, 3.5 M, 3 M, 2.5 M, 2 M, 1.5 M, or 1 M.

In embodiments, the antibody has an $EC_{50}$ of about 2.899 M. In embodiments, the antibody has an $EC_{50}$ of 2.899 M. In embodiments, the antibody has an $EC_{50}$ of about 1.402 M. In embodiments, the antibody has an $EC_{50}$ of 1.402 M.

In embodiments, the antibody has an $EC_{50}$ of about 1-4 mM. In embodiments, the antibody has an $EC_{50}$ of about 1.5-4 mM. In embodiments, the antibody has an $EC_{50}$ of about 2-4 mM. In embodiments, the antibody has an $EC_{50}$ of about 2.5-4 mM. In embodiments, the antibody has an $EC_{50}$ of about 3-4 mM. In embodiments, the antibody has an $EC_{50}$ of about 3.5-4 mM. In embodiments, the antibody has an $EC_{50}$ of 1-4 mM. In embodiments, the antibody has an $EC_{50}$ of 1.5-4 mM. In embodiments, the antibody has an $EC_{50}$ of 2-4 mM. In embodiments, the antibody has an $EC_{50}$ of 2.5-4 mM. In embodiments, the antibody has an $EC_{50}$ of 3-4 mM. In embodiments, the antibody has an $EC_{50}$ of 3.5-4 mM.

In embodiments, the antibody has an $EC_{50}$ of about 1-3.5 mM. In embodiments, the antibody has an $EC_{50}$ of about 1-3 mM. In embodiments, the antibody has an $EC_{50}$ of about 1-2.5 mM. In embodiments, the antibody has an $EC_{50}$ of about 1-2 mM. In embodiments, the antibody has an $EC_{50}$ of about 1-1.5 mM. In embodiments, the antibody has an $EC_{50}$ of 1-3.5 mM. In embodiments, the antibody has an $EC_{50}$ of 1-3 mM. In embodiments, the antibody has an $EC_{50}$ of 1-2.5 mM. In embodiments, the antibody has an $EC_{50}$ of 1-2 mM.

In embodiments, the antibody has an $EC_{50}$ of 1-1.5 mM. In embodiments, the antibody has an $EC_{50}$ of 4 mM, about 3.5 mM, about 3 mM, about 2.5 mM, about 2 mM, about 1.5 mM, or about 1 mM. In embodiments, the antibody has an $EC_{50}$ of 4 mM, 3.5 mM, 3 mM, 2.5 mM, 2 mM, 1.5 mM, or 1 mM.

In embodiments, the antibody has an $EC_{50}$ of about 2.71 mM. In embodiments, the antibody has an $EC_{50}$ of 2.71 mM.

In embodiments, the antibody has an $EC_{50}$ of about 20-30 mM. In embodiments, the antibody has an $EC_{50}$ of about 21-30 mM. In embodiments, the antibody has an $EC_{50}$ of about 22-30 mM. In embodiments, the antibody has an $EC_{50}$ of about 23-30 mM. In embodiments, the antibody has an $EC_{50}$ of about 24-30 mM. In embodiments, the antibody has an $EC_{50}$ of about 25-30 mM. In embodiments, the antibody has an $EC_{50}$ of about 26-30 mM. In embodiments, the antibody has an $EC_{50}$ of about 27-30 mM. In embodiments, the antibody has an $EC_{50}$ of about 28-30 mM. In embodiments, the antibody has an $EC_{50}$ of about 29-30 mM.

In embodiments, the antibody has an $EC_{50}$ of 20-30 mM. In embodiments, the antibody has an $EC_{50}$ of 21-30 mM. In embodiments, the antibody has an $EC_{50}$ of 22-30 mM. In embodiments, the antibody has an $EC_{50}$ of 23-30 mM. In embodiments, the antibody has an $EC_{50}$ of 24-30 mM. In embodiments, the antibody has an $EC_{50}$ of 25-30 mM. In embodiments, the antibody has an $EC_{50}$ of 26-30 mM. In embodiments, the antibody has an $EC_{50}$ of 27-30 mM. In embodiments, the antibody has an $EC_{50}$ of 28-30 mM. In embodiments, the antibody has an $EC_{50}$ of 29-30 mM.

In embodiments, the antibody has an $EC_{50}$ of about 20-29 mM. In embodiments, the antibody has an $EC_{50}$ of about 20-28 mM. In embodiments, the antibody has an $EC_{50}$ of about 20-27 mM. In embodiments, the antibody has an $EC_{50}$ of about 20-26 mM. In embodiments, the antibody has an $EC_{50}$ of about 20-25 mM. In embodiments, the antibody has an $EC_{50}$ of about 20-24 mM. In embodiments, the antibody has an $EC_{50}$ of about 20-23 mM. In embodiments, the antibody has an $EC_{50}$ of about 20-22 mM. In embodiments, the antibody has an $EC_{50}$ of about 20-21 mM.

In embodiments, the antibody has an $EC_{50}$ of 20-29 mM. In embodiments, the antibody has an $EC_{50}$ of 20-28 mM. In embodiments, the antibody has an $EC_{50}$ of 20-27 mM. In embodiments, the antibody has an $EC_{50}$ of 20-26 mM. In embodiments, the antibody has an $EC_{50}$ of 20-25 mM. In embodiments, the antibody has an $EC_{50}$ of 20-24 mM. In embodiments, the antibody has an $EC_{50}$ of 20-23 mM. In embodiments, the antibody has an $EC_{50}$ of 20-22 mM. In embodiments, the antibody has an $EC_{50}$ of 20-21 mM.

In embodiments, the antibody has an $EC_{50}$ of about 30 mM, about 29 mM, about 28 mM, about 27 mM, about 26 mM, about 25 mM, about 24 mM, about 23 mM, about 22 mM, about 21 mM, or about 20 mM. In embodiments, the antibody has an $EC_{50}$ of 30 mM, 29 mM, 28 mM, 27 mM, 26 mM, 25 mM, 24 mM, 23 mM, 22 mM, 21 mM, or 20 mM.

In embodiments, the antibody has an $EC_{50}$ of about 26.95 mM. In embodiments, the antibody has an $EC_{50}$ of 26.95 mM.

In embodiments, the antibody has an $EC_{50}$ of about 240-260 µM. In embodiments, the antibody has an $EC_{50}$ of about 242-260 µM. In embodiments, the antibody has an $EC_{50}$ of about 244-260 µM. In embodiments, the antibody has an $EC_{50}$ of about 246-260 µM. In embodiments, the antibody has an $EC_{50}$ of about 248-260 µM. In embodiments, the antibody has an $EC_{50}$ of about 250-260 µM. In embodiments, the antibody has an $EC_{50}$ of about 252-260 µM. In embodiments, the antibody has an $EC_{50}$ of about 254-260 µM. In embodiments, the antibody has an $EC_{50}$ of about 256-260 µM. In embodiments, the antibody has an $EC_{50}$ of about 258-260 µM.

In embodiments, the antibody has an $EC_{50}$ from 240-260 µM. In embodiments, the antibody has an $EC_{50}$ of 242-260 µM. In embodiments, the antibody has an $EC_{50}$ of 244-260 µM. In embodiments, the antibody has an $EC_{50}$ of 246-260 µM. In embodiments, the antibody has an $EC_{50}$ of 248-260 µM. In embodiments, the antibody has an $EC_{50}$ of 250-260 µM. In embodiments, the antibody has an $EC_{50}$ of 252-260 µM. In embodiments, the antibody has an $EC_{50}$ of 254-260 µM. In embodiments, the antibody has an $EC_{50}$ of 256-260 µM. In embodiments, the antibody has an $EC_{50}$ of 258-260 µM.

In embodiments, the antibody has an $EC_{50}$ of about 240-258 µM. In embodiments, the antibody has an $EC_{50}$ of about 240-256 µM. In embodiments, the antibody has an $EC_{50}$ of about 240-254 µM. In embodiments, the antibody has an $EC_{50}$ of about 240-252 µM. In embodiments, the antibody has an $EC_{50}$ of about 240-250 µM. In embodiments, the antibody has an $EC_{50}$ of about 240-248 µM. In embodiments, the antibody has an $EC_{50}$ of about 240-246 µM. In embodiments, the antibody has an $EC_{50}$ of about 240-242 µM.

In embodiments, the antibody has an $EC_{50}$ from 240-258 µM. In embodiments, the antibody has an $EC_{50}$ of 240-256 µM. In embodiments, the antibody has an $EC_{50}$ of 240-254 µM. In embodiments, the antibody has an $EC_{50}$ of 240-252 µM. In embodiments, the antibody has an $EC_{50}$ of 240-250 µM. In embodiments, the antibody has an $EC_{50}$ of 240-248 µM. In embodiments, the antibody has an $EC_{50}$ of 240-246 µM. In embodiments, the antibody has an $EC_{50}$ of 240-242 µM.

In embodiments, the antibody has an $EC_{50}$ of about 260 µM, about 258 µM, about 256 µM, about 254 µM, about 252 µM, about 250 µM, about 248 µM, about 246 µM, about 244 µM, about 242 µM, or about 240 µM. In embodiments, the antibody has an $EC_{50}$ of 260 µM, 258 µM, 256 µM, 254 µM, 252 µM, 250 µM, 248 µM, 246 µM, 244 µM, 242 µM, or 240 µM.

In embodiments, the antibody has an $EC_{50}$ of about 249.8 µM. In embodiments, the antibody has an $EC_{50}$ of 249.8 µM.

In embodiments, the antibody has an $EC_{50}$ of about 30-40 µM. In embodiments, the antibody has an $EC_{50}$ of about 31-40 µM. In embodiments, the antibody has an $EC_{50}$ of about 32-40 µM. In embodiments, the antibody has an $EC_{50}$ of about 33-40 µM. In embodiments, the antibody has an $EC_{50}$ of about 34-40 µM. In embodiments, the antibody has an $EC_{50}$ of about 35-40 µM. In embodiments, the antibody has an $EC_{50}$ of about 36-40 µM. In embodiments, the antibody has an $EC_{50}$ of about 37-40 µM. In embodiments, the antibody has an $EC_{50}$ of about 38-40 µM. In embodiments, the antibody has an $EC_{50}$ of about 39-40 µM.

In embodiments, the antibody has an $EC_{50}$ of 30-40 µM. In embodiments, the antibody has an $EC_{50}$ of 31-40 µM. In embodiments, the antibody has an $EC_{50}$ of 32-40 µM. In embodiments, the antibody has an $EC_{50}$ of 33-40 µM. In embodiments, the antibody has an $EC_{50}$ of 34-40 µM. In embodiments, the antibody has an $EC_{50}$ of 35-40 µM. In embodiments, the antibody has an $EC_{50}$ of 36-40 µM. In embodiments, the antibody has an $EC_{50}$ of 37-40 µM. In embodiments, the antibody has an $EC_{50}$ of 38-40 µM. In embodiments, the antibody has an $EC_{50}$ of 39-40 µM.

In embodiments, the antibody has an $EC_{50}$ of about 30-39 µM. In embodiments, the antibody has an $EC_{50}$ of about 30-38 µM. In embodiments, the antibody has an $EC_{50}$ of about 30-37 µM. In embodiments, the antibody has an $EC_{50}$ of about 30-36 µM. In embodiments, the antibody has an EC$_{50}$ of about 30-35 µM. In embodiments, the antibody has an EC$_{50}$ of about 30-34 µM. In embodiments, the antibody has an EC$_{50}$ of about 30-33 µM. In embodiments, the antibody has an EC$_{50}$ of about 30-32 µM. In embodiments, the antibody has an EC$_{50}$ of about 30-31 µM.

In embodiments, the antibody has an EC$_{50}$ of 30-39 µM. In embodiments, the antibody has an EC$_{50}$ of 30-38 µM. In embodiments, the antibody has an EC$_{50}$ of 30-37 µM. In embodiments, the antibody has an EC$_{50}$ of 30-36 µM. In embodiments, the antibody has an EC$_{50}$ of 30-35 µM. In embodiments, the antibody has an EC$_{50}$ of 30-34 µM. In embodiments, the antibody has an EC$_{50}$ of 30-33 µM. In embodiments, the antibody has an EC$_{50}$ of 30-32 µM. In embodiments, the antibody has an EC$_{50}$ of 30-31 µM.

In embodiments, the antibody has an EC$_{50}$ of about 30 µM, about 31 µM, about 32 µM, about 33 µM, about 34 µM, about 35 µM, about 36 µM, about 37 µM, about 38 µM, about 39 µM, or about 40 µM. In embodiments, the antibody has an EC$_{50}$ of 30 µM, 31 µM, 32 µM, 33 µM, 34 µM, 35 µM, 36 µM, 37 µM, 38 µM, 39 µM, or 40 µM.

In embodiments, the antibody has an EC$_{50}$ of about 35.75 µM. In embodiments, the antibody has an EC$_{50}$ of 35.75 µM.

In embodiments, the antibody has an EC$_{50}$ of about 0.2-8 µM. In embodiments, the antibody has an EC$_{50}$ of about 0.4-8 µM. In embodiments, the antibody has an EC$_{50}$ of about 0.6-8 µM. In embodiments, the antibody has an EC$_{50}$ of about 0.8-8 µM. In embodiments, the antibody has an EC$_{50}$ of about 1-8 µM. In embodiments, the antibody has an EC$_{50}$ of about 1.5-8 µM. In embodiments, the antibody has an EC$_{50}$ of about 2-8 µM. In embodiments, the antibody has an EC$_{50}$ of about 2.5-8 µM. In embodiments, the antibody has an EC$_{50}$ of about 3-8 µM. In embodiments, the antibody has an EC$_{50}$ of about 3.5-8 µM. In embodiments, the antibody has an EC$_{50}$ of about 4-8 µM. In embodiments, the antibody has an EC$_{50}$ of about 4.5-8 µM. In embodiments, the antibody has an EC$_{50}$ of about 5-8 µM. In embodiments, the antibody has an EC$_{50}$ of about 5.5-8 µM. In embodiments, the antibody has an EC$_{50}$ of about 6-8 µM. In embodiments, the antibody has an EC$_{50}$ of about 6.5-8 µM. In embodiments, the antibody has an EC$_{50}$ of about 7-8 µM. In embodiments, the antibody has an EC$_{50}$ of about 7.5-8 µM.

In embodiments, the antibody has an EC$_{50}$ from 0.2-8 µM. In embodiments, the antibody has an EC$_{50}$ of 0.4-8 µM. In embodiments, the antibody has an EC$_{50}$ of 0.6-8 µM. In embodiments, the antibody has an EC$_{50}$ of 0.8-8 µM. In embodiments, the antibody has an EC$_{50}$ of 1-8 µM. In embodiments, the antibody has an EC$_{50}$ of 1.5-8 µM. In embodiments, the antibody has an EC$_{50}$ of 2-8 µM. In embodiments, the antibody has an EC$_{50}$ of 2.5-8 µM. In embodiments, the antibody has an EC$_{50}$ of 3-8 µM. In embodiments, the antibody has an EC$_{50}$ of 3.5-8 µM. In embodiments, the antibody has an EC$_{50}$ of 4-8 µM. In embodiments, the antibody has an EC$_{50}$ of 4.5-8 µM. In embodiments, the antibody has an EC$_{50}$ of 5-8 µM. In embodiments, the antibody has an EC$_{50}$ of 5.5-8 µM. In embodiments, the antibody has an EC$_{50}$ of 6-8 µM. In embodiments, the antibody has an EC$_{50}$ of 6.5-8 µM. In embodiments, the antibody has an EC$_{50}$ of 7-8 µM. In embodiments, the antibody has an EC$_{50}$ of 7.5-8 µM.

In embodiments, the antibody has an EC$_{50}$ of about 0.2-7.5 µM. In embodiments, the antibody has an EC$_{50}$ of about 0.2-7 µM. In embodiments, the antibody has an EC$_{50}$ of about 0.2-6.5 µM. In embodiments, the antibody has an EC$_{50}$ of about 0.2-6 µM. In embodiments, the antibody has an EC$_{50}$ of about 0.2-5.5 µM. In embodiments, the antibody has an EC$_{50}$ of about 0.2-5 µM. In embodiments, the antibody has an EC$_{50}$ of about 0.2-4.5 µM. In embodiments, the antibody has an EC$_{50}$ of about 0.2-4 µM. In embodiments, the antibody has an EC$_{50}$ of about 0.2-3.5 µM. In embodiments, the antibody has an EC$_{50}$ of about 0.2-3 µM. In embodiments, the antibody has an EC$_{50}$ of about 0.2-2.5 µM. In embodiments, the antibody has an EC$_{50}$ of about 0.2-2 µM. In embodiments, the antibody has an EC$_{50}$ of about 0.2-1.5 µM. In embodiments, the antibody has an EC$_{50}$ of about 0.2-1 µM. In embodiments, the antibody has an EC$_{50}$ of about 0.2-0.8 µM. In embodiments, the antibody has an EC$_{50}$ of about 0.2-0.6 µM. In embodiments, the antibody has an EC$_{50}$ of about 0.2-0.4 µM.

In embodiments, the antibody has an EC$_{50}$ of 0.2-7.5 µM. In embodiments, the antibody has an EC$_{50}$ of 0.2-7 µM. In embodiments, the antibody has an EC$_{50}$ of 0.2-6.5 µM. In embodiments, the antibody has an EC$_{50}$ of 0.2-6 µM. In embodiments, the antibody has an EC$_{50}$ of 0.2-5.5 µM. In embodiments, the antibody has an EC$_{50}$ of 0.2-5 µM. In embodiments, the antibody has an EC$_{50}$ of 0.2-4.5 µM. In embodiments, the antibody has an EC$_{50}$ of 0.2-4 µM. In embodiments, the antibody has an EC$_{50}$ of 0.2-3.5 µM. In embodiments, the antibody has an EC$_{50}$ of 0.2-3 µM. In embodiments, the antibody has an EC$_{50}$ of 0.2-2.5 µM. In embodiments, the antibody has an EC$_{50}$ of 0.2-2 µM. In embodiments, the antibody has an EC$_{50}$ of 0.2-1.5 µM. In embodiments, the antibody has an EC$_{50}$ of 0.2-1 µM. In embodiments, the antibody has an EC$_{50}$ of 0.2-0.8 µM. In embodiments, the antibody has an EC$_{50}$ of 0.2-0.6 µM. In embodiments, the antibody has an EC$_{50}$ of 0.2-0.4 µM.

In embodiments, the antibody has an EC$_{50}$ of about 8 µM, about 7.5 µM, about 7 µM, about 6.5 µM, about 6 µM, about 5.5 µM, about 5 µM, about 4.5 µM, about 4 µM, about 3.5 µM, about 3 µM, about 2.5 µM, about 2 µM, about 1.5 µM, about 1 µM, about 0.8 µM, about 0.6 µM, about 0.4 µM, or about 0.2 µM. In embodiments, the antibody has an EC$_{50}$ of 8 µM, 7.5 µM, 7 µM, 6.5 µM, 6 µM, 5.5 µM, 5 µM, 4.5 µM, 4 µM, 3.5 µM, 3 µM, 2.5 µM, 2 µM, 1.5 µM, 1 µM, 0.8 µM, 0.6 µM, 0.4 µM, or 0.2 µM.

In embodiments, the antibody has an EC$_{50}$ of about 3.07 µM. In embodiments, the antibody has an EC$_{50}$ of 3.07 µM.

In embodiments, the antibody has an EC$_{50}$ of about 2.11 µM. In embodiments, the antibody has an EC$_{50}$ of 2.11 µM.

In embodiments, the antibody has an EC$_{50}$ of about 0.85 µM. In embodiments, the antibody has an EC$_{50}$ of 0.85 µM.

In embodiments, the antibody has an EC$_{50}$ of about 1.4 µM. In embodiments, the antibody has an EC$_{50}$ of 1.4 µM.

In embodiments, the antibody has an EC$_{50}$ of about 6.63 µM. In embodiments, the antibody has an EC$_{50}$ of 6.63 µM.

In embodiments, the antibody has an EC$_{50}$ of one of Table 1.

Table 1 shows EC$_{50}$ values of exemplary anti-IL1RAP antibodies provided herein.

| ID | EC$_{50}$ (mg/ml) |
| --- | --- |
| 1A1 | ~289884 |
| 1A4 | 3.575 |
| 1A5 | ~140188 |
| 1A6 | 24.98 |
| 1A11 | ~271.3 |
| 1A12 | ~2695 |
| 1B8 | 0.3072 |
| 1E12 | 0.2111 |

| ID | EC$_{50}$ (mg/ml) |
|---|---|
| 2E12 | 0.0854 |
| D1A4 | 0.1404 |
| D1F6 | 0.6298 |
| 1D5 | 0.005291 |

In embodiments, the antibody is bound to an IL1RAP. In embodiments, the IL1RAP is a human IL1RAP. In embodiments, the IL1RAP forms part of a cell. In embodiments, the IL1RAP is expressed on the surface of the cell. In embodiments, the cell is a cancer cell. In embodiments, the cancer cell is a leukemia stem cell (LSC). In embodiments, the cancer cell is an acute myeloid leukemia (AML) cell. In embodiments, the cancer cell is a chronic myeloid leukemia (CML) cell. In embodiments, the cancer cell is a lung cancer cell. In embodiments, the cancer cell is a non-small cell lung cancer (NSCLC) cell. In embodiments, the cancer cell is a pancreatic cancer cell. In embodiments, the cancer cell is a melanoma cell. In embodiments, the cancer cell is a breast cancer cell. In embodiments, the cancer cell is a colon cancer cell.

Recombinant Protein Compositions

As described above, the light chain variable (VL) domain and the heavy chain variable (VH) domain provided herein including embodiments thereof, may each independently form part of an antibody, an antibody variant, a fragment of an antibody, a fragment of an antibody variant, or a recombinant protein (e.g., a chimeric antigen receptor, bispecific antibody). Provided herein are, inter alia, recombinant proteins (e.g., a chimeric antigen receptor, a bispecific antibody), which include the light chain variable (VL) domain and/or the heavy chain variable (VH) domain as provided herein and are therefore capable of binding IL1RAP and recruiting effector cells to IL1RAP-expressing cells (e.g., LSCs) thereby eliminating the IL1RAP-expressing cells. In embodiments, the recombinant protein is a chimeric antigen receptor (CAR). In embodiments, the recombinant protein is a bispecific antibody.

Chimeric Antigen Receptor Proteins

Provided herein are, inter alia, recombinant proteins, wherein the recombinant protein is a chimeric antigen receptor. The antibody region of the recombinant protein may include any of the light chain and heavy chain variable domains provided herein including embodiments thereof. The light chain variable (VL) domain and/or the heavy chain variable (VH) domain as provided herein may form part of a chimeric antigen receptor. Thus, in an aspect is provided a recombinant protein including: (i) an antibody region including: (a) a heavy chain variable domain including a CDR H1 as set forth in SEQ ID NO:1, a CDR H2 as set forth in SEQ ID NO:2 and a CDR H3 as set forth in SEQ ID NO:3; and (b) a light chain variable domain including a CDR L1 as set forth in SEQ ID NO:4, a CDR L2 as set forth in SEQ ID NO:5, and a CDR L3 as set forth in SEQ ID NO:6; and (ii) a transmembrane domain.

In another aspect is provided a recombinant protein including: (i) an antibody region including: (a) a heavy chain variable domain including a CDR H1 as set forth in SEQ ID NO:7, a CDR H2 as set forth in SEQ ID NO:8 and a CDR H3 as set forth in SEQ ID NO:9; and (b) a light chain variable domain including a CDR L1 as set forth in SEQ ID NO:10, a CDR L2 as set forth in SEQ ID NO:11, and a CDR L3 as set forth in SEQ ID NO:12; and (ii) a transmembrane domain.

In another aspect is provided a recombinant protein including: (i) an antibody region including: (a) a heavy chain variable domain including a CDR H1 as set forth in SEQ ID NO:19, a CDR H2 as set forth in SEQ ID NO:20 and a CDR H3 as set forth in SEQ ID NO:21; and (b) a light chain variable domain including a CDR L1 as set forth in SEQ ID NO:22, a CDR L2 as set forth in SEQ ID NO:23, and a CDR L3 as set forth in SEQ ID NO:24; and (ii) a transmembrane domain.

In another aspect is provided a recombinant protein including: (i) an antibody region including: (a) a heavy chain variable domain including a CDR H1 as set forth in SEQ ID NO:25, a CDR H2 as set forth in SEQ ID NO:26 and a CDR H3 as set forth in SEQ ID NO:27; and (b) a light chain variable domain including a CDR L1 as set forth in SEQ ID NO:28, a CDR L2 as set forth in SEQ ID NO:29, and a CDR L3 as set forth in SEQ ID NO:30; and (ii) a transmembrane domain.

In another aspect is provided a recombinant protein including: (i) an antibody region including: (a) a heavy chain variable domain including a CDR H1 as set forth in SEQ ID NO:31, a CDR H2 as set forth in SEQ ID NO:32 and a CDR H3 as set forth in SEQ ID NO:33; and (b) a light chain variable domain including a CDR L1 as set forth in SEQ ID NO:34, a CDR L2 as set forth in SEQ ID NO:35, and a CDR L3 as set forth in SEQ ID NO:36; and (ii) a transmembrane domain.

The recombinant proteins provided herein may be chimeric antigen receptors including an antibody region wherein the antibody region is a single domain antibody. Thus, in an aspect is provided a recombinant protein including: (i) an antibody region including: (a) a light chain variable domain including a CDR L1 as set forth in SEQ ID NO:37, a CDR L2 as set forth in SEQ ID NO:38 and a CDR L3 as set forth in SEQ ID NO:39; and (ii) a transmembrane domain.

In another aspect is provided a recombinant protein including: (i) an antibody region including: (a) a light chain variable domain including a CDR L1 as set forth in SEQ ID NO:40, a CDR L2 as set forth in SEQ ID NO:41 and a CDR L3 as set forth in SEQ ID NO:42; and (ii) a transmembrane domain.

In another aspect is provided a recombinant protein including: (i) an antibody region including: (a) a light chain variable domain including a CDR L1 as set forth in SEQ ID NO:43, a CDR L2 as set forth in SEQ ID NO:44 and a CDR L3 as set forth in SEQ ID NO:45; and (ii) a transmembrane domain.

In another aspect is provided a recombinant protein including: (i) an antibody region including: (a) a light chain variable domain including a CDR L1 as set forth in SEQ ID NO:46, a CDR L2 as set forth in SEQ ID NO:47 and a CDR L3 as set forth in SEQ ID NO:48; and (ii) a transmembrane domain.

In another aspect is provided a recombinant protein including: (i) an antibody region including: (a) a light chain variable domain including a CDR L1 as set forth in SEQ ID NO:49, a CDR L2 as set forth in SEQ ID NO:50 and a CDR L3 as set forth in SEQ ID NO:51; and (ii) a transmembrane domain.

In another aspect is provided a recombinant protein including: (i) an antibody region including: (a) a light chain variable domain including a CDR L1 as set forth in SEQ ID NO:52, a CDR L2 as set forth in SEQ ID NO:53 and a CDR L3 as set forth in SEQ ID NO:54; and (ii) a transmembrane domain.

In another aspect is provided a recombinant protein including: (i) an antibody region including: (a) a light chain variable domain including a CDR L1 as set forth in SEQ ID NO:55, a CDR L2 as set forth in SEQ ID NO:56 and a CDR L3 as set forth in SEQ ID NO:57; and (ii) a transmembrane domain.

In another aspect is provided a recombinant protein including: (i) an antibody region including: (a) a light chain variable domain including a CDR L1 as set forth in SEQ ID NO:58, a CDR L2 as set forth in SEQ ID NO:59 and a CDR L3 as set forth in SEQ ID NO:60; and (ii) a transmembrane domain.

An "antibody region" as provided herein refers to a monovalent or multivalent protein moiety that forms part of the recombinant protein (e.g., CAR) provided herein including embodiments thereof. A person of ordinary skill in the art will therefore immediately recognize that the antibody region is a protein moiety capable of binding an antigen (epitope). Thus, the antibody region provided herein may include a domain of an antibody (e.g., a light chain variable (VL) domain, a heavy chain variable (VH) domain) or a fragment of an antibody (e.g., Fab). In embodiments, the antibody region is a protein conjugate. A "protein conjugate" as provided herein refers to a construct consisting of more than one polypeptide, wherein the polypeptides are bound together covalently or non-covalently. In embodiments, the protein conjugate includes a Fab moiety (a monovalent Fab) covalently attached to an scFv moiety (a monovalent scFv). In embodiments, the protein conjugate includes a plurality (at least two) Fab moieties. In embodiments, the polypeptides of a protein conjugate are encoded by one nucleic acid molecule. In embodiments, the polypeptides of a protein conjugate are encoded by different nucleic acid molecules. In embodiments, the polypeptides are connected through a linker. In embodiments, the polypeptides are connected through a chemical linker. In embodiments, the antibody region is an scFv. The antibody region may include a light chain variable (VL) domain and/or a heavy chain variable (VH) domain. Thus, in embodiments, the antibody region includes a single domain antibody. In embodiments, the antibody region includes a light chain variable (VL) domain. In embodiments, the antibody region includes a heavy chain variable (VH) domain. In embodiments, the antibody region is a single domain antibody. In embodiments, the single domain antibody includes a heavy chain variable (VH) domain. In embodiments, the single domain antibody includes a light chain variable (VL) domain. In embodiments, the single domain antibody is a heavy chain variable (VH) domain. In embodiments, the single domain antibody is a light chain variable (VL) domain.

In an aspect is provided a recombinant protein including: (i) an antibody region including: (a) a light chain variable domain including a CDR L1 as set forth in SEQ ID NO:37, a CDR L2 as set forth in SEQ ID NO:38 and a CDR L3 as set forth in SEQ ID NO:39; and (ii) a transmembrane domain.

In another aspect is provided a recombinant protein including: (i) an antibody region including: (a) a light chain variable domain including a CDR L1 as set forth in SEQ ID NO:40, a CDR L2 as set forth in SEQ ID NO:41 and a CDR L3 as set forth in SEQ ID NO:42; and (ii) a transmembrane domain.

In another aspect is provided a recombinant protein including: (i) an antibody region including: (a) a light chain variable domain including a CDR L1 as set forth in SEQ ID NO:43, a CDR L2 as set forth in SEQ ID NO:44 and a CDR L3 as set forth in SEQ ID NO:45; and (ii) a transmembrane domain.

In another aspect is provided a recombinant protein including: (i) an antibody region including: (a) a light chain variable domain including a CDR L1 as set forth in SEQ ID NO:46, a CDR L2 as set forth in SEQ ID NO:47 and a CDR L3 as set forth in SEQ ID NO:48; and (ii) a transmembrane domain.

In another aspect is provided a recombinant protein including: (i) an antibody region including: (a) a light chain variable domain including a CDR L1 as set forth in SEQ ID NO:49, a CDR L2 as set forth in SEQ ID NO:50 and a CDR L3 as set forth in SEQ ID NO:51; and (ii) a transmembrane domain.

In another aspect is provided a recombinant protein including: (i) an antibody region including: (a) a light chain variable domain including a CDR L1 as set forth in SEQ ID NO:52, a CDR L2 as set forth in SEQ ID NO:53 and a CDR L3 as set forth in SEQ ID NO:54; and (ii) a transmembrane domain.

In another aspect is provided a recombinant protein including: (i) an antibody region including: (a) a light chain variable domain including a CDR L1 as set forth in SEQ ID NO:55, a CDR L2 as set forth in SEQ ID NO:56 and a CDR L3 as set forth in SEQ ID NO:57; and (ii) a transmembrane domain.

In another aspect is provided a recombinant protein including: (i) an antibody region including: (a) a light chain variable domain including a CDR L1 as set forth in SEQ ID NO:58, a CDR L2 as set forth in SEQ ID NO:59 and a CDR L3 as set forth in SEQ ID NO:60; and (ii) a transmembrane domain.

A "transmembrane domain" as provided herein refers to a polypeptide forming part of a biological membrane. The transmembrane domain provided herein is capable of spanning a biological membrane (e.g., a cellular membrane) from one side of the membrane through to the other side of the membrane. In embodiments, the transmembrane domain spans from the intracellular side to the extracellular side of a cellular membrane. Transmembrane domains may include non-polar, hydrophobic residues, which anchor the proteins provided herein including embodiments thereof in a biological membrane (e.g., cellular membrane of a T cell). Any transmembrane domain capable of anchoring the proteins provided herein including embodiments thereof are contemplated. Non-limiting examples of transmembrane domains include the transmembrane domains of CD28, CD8, CD4 or CD3-zeta. In embodiments, the transmembrane domain is a CD4 transmembrane domain.

In embodiments, the transmembrane domain is a CD28 transmembrane domain. The term "CD28 transmembrane domain" as provided herein includes any of the recombinant or naturally-occurring forms of the transmembrane domain of CD28, or variants or homologs thereof that maintain CD28 transmembrane domain activity (e.g. within at least 50%, 80%, 90%, 95%, 96%, 97%, 98%, 99% or 100% activity compared to the CD28 transmembrane domain). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD28 transmembrane domain polypeptide. In embodiments, CD28 is the protein as identified by the NCBI sequence reference GI:340545506, homolog or functional fragment thereof.

In embodiments, the transmembrane domain is a CD8 transmembrane domain. The term "CD8 transmembrane domain" as provided herein includes any of the recombinant or naturally-occurring forms of the transmembrane domain of CD8, or variants or homologs thereof that maintain CD8 transmembrane domain activity (e.g. within at least 50%, 80%, 90%, 95%, 96%, 97%, 98%, 99% or 100% activity compared to the CD8 transmembrane domain). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD8 transmembrane domain polypeptide. In embodiments, CD8 is the protein as identified by the NCBI sequence reference GI:225007534, homolog or functional fragment thereof.

In embodiments, the transmembrane domain is a CD4 transmembrane domain. The term "CD4 transmembrane domain" as provided herein includes any of the recombinant or naturally-occurring forms of the transmembrane domain of CD4, or variants or homologs thereof that maintain CD4 transmembrane domain activity (e.g. within at least 50%, 80%, 90%, 95%, 96%, 97%, 98%, 99% or 100% activity compared to the CD4 transmembrane domain). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD4 transmembrane domain polypeptide. In embodiments, CD4 is the protein as identified by the NCBI sequence reference GI:303522473, homolog or functional fragment thereof.

In embodiments, the transmembrane domain is a CD3-zeta (also known as CD247) transmembrane domain. The term "CD3-zeta transmembrane domain" as provided herein includes any of the recombinant or naturally-occurring forms of the transmembrane domain of CD3-zeta, or variants or homologs thereof that maintain CD3-zeta transmembrane domain activity (e.g. within at least 50%, 80%, 90%, 95%, 96%, 97%, 98%, 99% or 100% activity compared to the CD3-zeta transmembrane domain). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD3-zeta transmembrane domain polypeptide. In embodiments, CD3-zeta is the protein as identified by the NCBI sequence reference GI:166362721, homolog or functional fragment thereof.

The recombinant proteins (e.g., chimeric antigen receptors) provided herein may include any of the IL1RAP antibodies or fragments thereof described herein. Thus, the recombinant proteins (e.g., chimeric antigen receptors) may include any of the CDRs, FRs, heavy chain variable domains, or light chain variable domains provided herein. For example, the heavy chain variable domain may include the sequence of SEQ ID NO:61, SEQ ID NO:63, SEQ ID NO:65, SEQ ID NO:67, SEQ ID NO:69, or SEQ ID NO:71. In embodiments, the heavy chain variable domain is the sequence of SEQ ID NO:61, SEQ ID NO:63, SEQ ID NO:65, SEQ ID NO:67, SEQ ID NO:69, or SEQ ID NO:71. For example, the light chain variable domain may include the sequence of SEQ ID NO:62, SEQ ID NO:64, SEQ ID NO:66, SEQ ID NO:68, SEQ ID NO:70, SEQ ID NO:72, SEQ ID NO:73, SEQ ID NO:74, SEQ ID NO:75, SEQ ID NO:76, SEQ ID NO:77, SEQ ID NO:78, SEQ ID NO:79, or SEQ ID NO:80. In embodiments, light chain variable domain is the sequence of SEQ ID NO: 62, SEQ ID NO:64, SEQ ID NO:66, SEQ ID NO:68, SEQ ID NO:70, SEQ ID NO:72, SEQ ID NO:73, SEQ ID NO:74, SEQ ID NO:75, SEQ ID NO:76, SEQ ID NO:77, SEQ ID NO:78, SEQ ID NO:79, or SEQ ID NO:80.

Thus, the heavy chain variable domain may include, for example, a FR H1 as set forth in SEQ ID NO:81, a FR H2 as set forth in SEQ ID NO:82, a FR H3 as set forth in SEQ ID NO:83, and a FR H4 as set forth in SEQ ID NO:84. Further, the light chain variable domain may include, for example, a FR L1 as set forth in SEQ ID NO:85, a FR L2 as set forth in SEQ ID NO:86, a FR L3 as set forth in SEQ ID NO:87, and a FR L4 as set forth in SEQ ID NO:88.

The light chain variable domain may include, for example, a FR L1 as set forth in SEQ ID NO:129, a FR L2 as set forth in SEQ ID NO:130, a FR L3 as set forth in SEQ ID NO:131, and a FR L4 as set forth in SEQ ID NO:132.

The recombinant proteins provided herein include any of the antibodies provided herein. Thus, the recombinant proteins may bind IL1RAP with a dissociation constant ($K_D$) of 2.9 M, 35.75 µM, 1.40 M, 249.8 µM, 2.71 mM, 26.95 mM, 3.07 µM, 2.11 µM, 0.85 µM, 1.40 µM or 6.63 µM.

In embodiments, the recombinant protein is bound to an IL1RAP. In embodiments, the IL1RAP is a human IL1RAP. In embodiments, the IL1RAP forms part of a cell. In embodiments, the IL1RAP is expressed on the surface of the cell. In embodiments, the cell is a cancer cell. In embodiments, the cancer cell is a leukemia stem cell (LSC). In embodiments, the cancer cell is an acute myeloid leukemia (AML) cell. In embodiments, the cancer cell is a chronic myeloid leukemia (CML) cell. In embodiments, the cancer cell is a lung cancer cell. In embodiments, the cancer cell is a non-small cell lung cancer (NSCLC) cell. In embodiments, the cancer cell is a pancreatic cancer cell. In embodiments, the cancer cell is a melanoma cell. In embodiments, the cancer cell is a breast cancer cell. In embodiments, the cancer cell is a colon cancer cell.

In embodiments, the antibody region includes an Fc domain. In embodiments, the Fc domain is an IgG4 Fc domain. In embodiments, the antibody region includes an Fc hinge domain. In embodiments, the antibody region includes an IgG4 Fc hinge domain. In embodiments, the antibody region includes a spacer region. In embodiments, the spacer region is between the transmembrane domain and the antibody region. A "spacer region" as provided herein is a polypeptide connecting the antibody region with the transmembrane domain. In embodiments, the spacer region connects the heavy chain constant region with the transmembrane domain. In embodiments, the spacer region includes an Fc region. In embodiments, the spacer region is an Fc region. Examples of spacer regions contemplated for the recombinant protein compositions provided herein include without limitation, immunoglobulin molecules or fragments thereof (e.g., IgG1, IgG2, IgG3, IgG4) and immunoglobulin molecules or fragments thereof (e.g., IgG1, IgG2, IgG3, IgG4) including mutations affecting Fc receptor binding. In embodiments, the spacer region is a hinge region. In embodiments, the spacer region is an IgG4 hinge region. In embodiments, the spacer region is a modified IgG4 hinge region.

In embodiments, the recombinant protein as provided herein, including embodiments thereof, further includes an intracellular co-stimulatory signaling domain. An "intracellular co-stimulatory signaling domain" as provided herein includes amino acid sequences capable of providing co-stimulatory signaling in response to binding of an antigen to the antibody region provided herein including embodiments thereof. In embodiments, the signaling of the co-stimulatory signaling domain results in production of cytokines and proliferation of the T cell expressing the same. In embodiments, the intracellular co-stimulatory signaling domain is a CD28 intracellular co-stimulatory signaling domain, a 4-1BB intracellular co-stimulatory signaling domain, a ICOS intracellular co-stimulatory signaling domain, or an OX-40 intracellular co-stimulatory signaling domain. In embodiments, the intracellular co-stimulatory signaling domain is a CD28 intracellular co-stimulatory signaling domain. In embodiments, the intracellular co-stimulatory signaling domain is a 4-1BB intracellular co-stimulatory signaling domain. In embodiments, the intracellular co-stimulatory signaling domain is a ICOS intracellular co-stimulatory signaling domain. In embodiments, the intracellular co-stimulatory signaling domain is an OX-40 intracellular co-stimulatory signaling domain.

In embodiments, the recombinant protein as provided herein including embodiments thereof, further includes an intracellular T-cell signaling domain. An "intracellular T-cell signaling domain" as provided herein includes amino acid sequences capable of providing primary signaling in response to binding of an antigen to the antibody region provided herein including embodiments thereof. In embodiments, the signaling of the intracellular T-cell signaling domain results in activation of the T cell expressing the same. In embodiments, the signaling of the intracellular T-cell signaling domain results in proliferation (cell division) of the T cell expressing the same. In embodiments, the signaling of the intracellular T-cell signaling domain results expression by said T cell of proteins known in the art to characteristic of activated T cell (e.g., CTLA-4, PD-1, CD28, CD69). In embodiments, the intracellular T-cell signaling domain includes the signaling domain of the zeta chain of the human CD3 complex. In embodiments, the intracellular T-cell signaling domain is a CD3 δ intracellular T-cell signaling domain.

The term "CTLA-4" as referred to herein includes any of the recombinant or naturally-occurring forms of the cytotoxic T-lymphocyte-associated protein 4 protein, also known as CD152 (cluster of differentiation 152), or variants or homologs thereof that maintain CTLA-4 activity (e.g. within at least 50%, 80%, 90%, 95%, 96%, 97%, 98%, 99% or 100% activity compared to CTLA-4). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CTLA-4 protein. In embodiments, the CTLA-4 protein is substantially identical to the protein identified by the UniProt reference number P16410 or a variant or homolog having substantial identity thereto.

The term "PD-1" as referred to herein includes any of the recombinant or naturally-occurring forms of the Programmed cell death protein 1 protein, also known as CD279 (cluster of differentiation 279), or variants or homologs thereof that maintain PD-1 activity (e.g. within at least 50%, 80%, 90%, 95%, 96%, 97%, 98%, 99% or 100% activity compared to PD-1). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring PD-1 protein. In embodiments, the PD-1 protein is substantially identical to the protein identified by the UniProt reference number Q15116 or a variant or homolog having substantial identity thereto.

The term "CD28" as referred to herein includes any of the recombinant or naturally-occurring forms of the Cluster of Differentiation 28 protein, or variants or homologs thereof that maintain CD28 activity (e.g. within at least 50%, 80%, 90%, 95%, 96%, 97%, 98%, 99% or 100% activity compared to CD28). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD28 protein. In embodiments, the CD28 protein is substantially identical to the protein identified by the UniProt reference number P10747 or a variant or homolog having substantial identity thereto.

The term "CD69" as referred to herein includes any of the recombinant or naturally-occurring forms of the Cluster of Differentiation 69 protein, or variants or homologs thereof that maintain CD69 activity (e.g. within at least 50%, 80%, 90%, 95%, 96%, 97%, 98%, 99% or 100% activity compared to CD69). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD69 protein. In embodiments, the CD69 protein is substantially identical to the protein identified by the UniProt reference number Q07108 or a variant or homolog having substantial identity thereto.

The term "4-1BB" as referred to herein includes any of the recombinant or naturally-occurring forms of the 4-1BB protein, also known as tumor necrosis factor receptor superfamily member 9 (TNFRSF9), Cluster of Differentiation 137 (CD137) and induced by lymphocyte activation (ILA), or variants or homologs thereof that maintain 4-1BB activity (e.g. within at least 50%, 80%, 90%, 95%, 96%, 97%, 98%, 99% or 100% activity compared to 4-1BB). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring EGFR protein. In embodiments, the 4-1BB protein is substantially identical to the protein identified by the UniProt reference number Q07011 or a variant or homolog having substantial identity thereto.

In embodiments, the recombinant protein as provided herein including embodiments thereof, further includes a self-cleaving peptidyl sequence. In embodiments, the self-cleaving peptidyl linker sequence is a T2A sequence or a 2A sequence. In embodiments, the self-cleaving peptidyl linker sequence is a T2A sequence. In embodiments, the self-cleaving peptidyl linker sequence is a 2A sequence.

In embodiments, the recombinant protein as provided herein including embodiments thereof, further includes a detectable domain. A "detectable domain" as provided herein is peptide moiety detectable by spectroscopic, photochemical, biochemical, immunochemical, chemical, or other physical means. For example, a detectable domain as provided herein may be a protein or other entity which can be made detectable, e.g., by incorporating a radiolabel or being reactive to an antibody specifically. Any appropriate method known in the art for conjugating an antibody to the label may be employed, e.g., using methods described in Hermanson, Bioconjugate Techniques 1996, Academic Press, Inc., San Diego. In embodiments, the detectable domain is a truncated EGFR (EGFRt) domain. The term "EGFRt" refers to a truncated epidermal growth factor receptor protein lacking intracellular signaling capabilities. As used herein, EGFRt is an inert cell surface molecule which functions as a detectable domain allowing identification of transduced T cells. In embodiments, the recombinant protein forms part of a cell. In embodiments, the recombinant protein forms part of a T cell.

The term "EGFR" as referred to herein includes any of the recombinant or naturally-occurring forms of the epidermal growth factor receptor protein, also known as ErbB-1 and HER1, or variants or homologs thereof that maintain EGFR activity (e.g. within at least 50%, 80%, 90%, 95%, 96%, 97%, 98%, 99% or 100% activity compared to EGFR). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring EGFR protein. In embodiments, the EGFR protein is substantially identical to the protein identified by the UniProt reference number P00533 or a variant or homolog having substantial identity thereto.

Bispecific Antibodies

The recombinant proteins provided herein may, inter alia, be chimeric antigen receptors. Thus, the second antibody region may include any of the light chain and/or heavy chain variable domains provided herein including embodiments thereof. The light chain variable (VL) domain and/or the heavy chain variable (VH) domain as provided herein may form part of a bispecific antibody. Thus, in another aspect is provided a recombinant protein including: (i) a first antibody region capable of binding an effector cell ligand; and (ii) a second antibody region, including: (a) a heavy chain variable domain including a CDR H1 as set forth in SEQ ID NO:1, a CDR H2 as set forth in SEQ ID NO:2, and a CDR H3 as set forth in SEQ ID NO:3; and (b) a light chain variable domain including a CDR L1 as set forth in SEQ ID NO:4, a CDR L2 as set forth in SEQ ID NO:5 and a CDR L3 as set forth in SEQ ID NO:6.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:7, a CDR H2 as set forth in SEQ ID NO:8, and a CDR H3 as set forth in SEQ ID NO:9; and (b) a light chain variable domain including a CDR L1 as set forth in SEQ ID NO:10, a CDR L2 as set forth in SEQ ID NO:11 and a CDR L3 as set forth in SEQ ID NO:12.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:19, a CDR H2 as set forth in SEQ ID NO:20, and a CDR H3 as set forth in SEQ ID NO:21; and (b) a light chain variable domain including a CDR L1 as set forth in SEQ ID NO:22, a CDR L2 as set forth in SEQ ID NO:23 and a CDR L3 as set forth in SEQ ID NO:24.

In another aspect is provided a recombinant protein including: (i) a first antibody region capable of binding an effector cell ligand; and (ii) a second antibody region, including: (a) a heavy chain variable domain including a CDR H1 as set forth in SEQ ID NO:25, a CDR H2 as set forth in SEQ ID NO:26, and a CDR H3 as set forth in SEQ ID NO:27; and (b) a light chain variable domain including a CDR L1 as set forth in SEQ ID NO:28, a CDR L2 as set forth in SEQ ID NO:29 and a CDR L3 as set forth in SEQ ID NO:30.

In another aspect is provided a recombinant protein including: (i) a first antibody region capable of binding an effector cell ligand; and (ii) a second antibody region, including: (a) a heavy chain variable domain a CDR H1 as set forth in SEQ ID NO:31, a CDR H2 as set forth in SEQ ID NO:32, and a CDR H3 as set forth in SEQ ID NO:33; and (b) a light chain variable domain including a CDR L1 as set forth in SEQ ID NO:34, a CDR L2 as set forth in SEQ ID NO:35 and a CDR L3 as set forth in SEQ ID NO:36.

The term "effector cell ligand" as provided herein refers to a cell surface molecule expressed on an effector cell of the immune system (e.g., a cytotoxic T cell, a helper T cell, a B cell, a natural killer cell). Upon binding of the first antibody region to the effector cell ligand expressed on the effector cell, the effector cell is activated and able to exert its function (e.g., selective killing or eradication of malignant, infected or otherwise unhealthy cells). In embodiments, the effector cell ligand is a CD3 protein. In embodiments, the effector cell ligand is a CD16 protein. In embodiments, the effector cell ligand is a CD32 protein. In embodiments, the effector cell ligand is a NKp46 protein. The first antibody region as provided herein may be an antibody, an antibody variant, a fragment of an antibody or a fragment of an antibody variant.

A "CD3 protein" as referred to herein includes any of the recombinant or naturally-occurring forms of the Cluster of Differentiation 3 (CD3) proteins or variants or homologs thereof that comprise the CD3 complex that mediates signal transduction and maintains CD3 complex activity (e.g. within at least 50%, 80%, 90%, 95%, 96%, 97%, 98%, 99% or 100% activity compared to the CD3 complex). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD3 proteins in the CD3 complex.

A "CD16 protein" as referred to herein includes any of the recombinant or naturally-occurring forms of the Cluster of Differentiation 16 (CD16) protein, also known as low affinity immunoglobulin gamma Fc region receptor III-A, or variants or homologs thereof that maintain CD16 activity (e.g. within at least 50%, 80%, 90%, 95%, 96%, 97%, 98%, 99% or 100% activity compared to CD16). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD16 protein. In embodiments, the CD16 protein is substantially identical to the protein identified by the UniProt reference number P08637 or a variant or homolog having substantial identity thereto.

A "CD32 protein" as referred to herein includes any of the recombinant or naturally-occurring forms of the Cluster of Differentiation 32 (CD32) protein, also known as low affinity immunoglobulin gamma Fc region receptor II-A, or variants or homologs thereof that maintain CD32 activity (e.g. within at least 50%, 80%, 90%, 95%, 96%, 97%, 98%, 99% or 100% activity compared to CD32). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring CD32 protein. In embodiments, the CD32 protein is substantially identical to the protein identified by the UniProt reference number P12318 or a variant or homolog having substantial identity thereto.

A "NKp46 protein" as referred to herein includes any of the recombinant or naturally-occurring forms of the NKp46 protein, also known as natural cytotoxicity triggering receptor 1, or variants or homologs thereof that maintain NKp46 activity (e.g. within at least 50%, 80%, 90%, 95%, 96%, 97%, 98%, 99%, or 100% activity compared to NKp46). In some aspects, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring NKp46 protein. In embodiments, the NKp46 protein is substantially identical to the protein identified by the UniProt reference number O76036 or a variant or homolog having substantial identity thereto.

The recombinant proteins (e.g., bispecific antibody) provided herein may include any of the IL1RAP antibodies or fragments thereof described herein. Thus, the recombinant protein (e.g., bispecific antibody) may include any of the CDRs, FRs, heavy chain variable domains, or light chain variable domains provided herein. For example, the heavy chain variable domain may include the sequence of SEQ ID NO:61, SEQ ID NO:63, SEQ ID NO:65, SEQ ID NO:67, SEQ ID NO:69, or SEQ ID NO:71. In embodiments, the heavy chain variable domain is the sequence of SEQ ID NO:61, SEQ ID NO:63, SEQ ID NO:65, SEQ ID NO:67, SEQ ID NO:69, or SEQ ID NO:71. For example, the light chain variable domain may include the sequence of SEQ ID NO:62, SEQ ID NO:64, SEQ ID NO:66, SEQ ID NO:68, SEQ ID NO:70, SEQ ID NO:72, SEQ ID NO:73, SEQ ID NO:74, SEQ ID NO:75, SEQ ID NO:76, SEQ ID NO:77, SEQ ID NO:78, SEQ ID NO:79, or SEQ ID NO:80. In embodiments, light chain variable domain is the sequence of SEQ ID NO: 62, SEQ ID NO:64, SEQ ID NO:66, SEQ ID NO:68, SEQ ID NO:70, SEQ ID NO:72, SEQ ID NO:73, SEQ ID NO:74, SEQ ID NO:75, SEQ ID NO:76, SEQ ID NO:77, SEQ ID NO:78, SEQ ID NO:79, or SEQ ID NO:80.

The heavy chain variable domain of the recombinant protein (e.g., bispecific antibody) provided herein may include any of the CDRs or FRs provided herein. Thus, the heavy chain variable domain may include, for example, a FR H1 as set forth in SEQ ID NO:81, a FR H2 as set forth in SEQ ID NO:82, a FR H3 as set forth in SEQ ID NO:83, and a FR H4 as set forth in SEQ ID NO:84. The light chain variable domain of the recombinant protein (e.g., bispecific antibody) provided herein may include any of the CDRs or FRs provided herein. For example, the light chain variable domain may include, for example, a FR L1 as set forth in SEQ ID NO:85, a FR L2 as set forth in SEQ ID NO:86, a FR L3 as set forth in SEQ ID NO:87, and a FR L4 as set forth in SEQ ID NO:88. The light chain variable domain may include, for example, a FR L1 as set forth in SEQ ID NO:129, a FR L2 as set forth in SEQ ID NO:130, a FR L3 as set forth in SEQ ID NO:131, and a FR L4 as set forth in SEQ ID NO:132.

In embodiments, the heavy chain variable domain is the sequence of SEQ ID NO:61. In embodiments, the light chain variable domain is the sequence of SEQ ID NO:62. In embodiments, the heavy chain variable domain is the sequence of SEQ ID NO:63. In embodiments, the light chain variable domain is the sequence of SEQ ID NO:64. In embodiments, the heavy chain variable domain is the sequence of SEQ ID NO:67. In embodiments, the light chain variable domain is the sequence of SEQ ID NO:68. In embodiments, the heavy chain variable domain is the sequence of SEQ ID NO:69. In embodiments, the light chain variable domain is the sequence of SEQ ID NO:70. In embodiments, the heavy chain variable domain is the sequence of SEQ ID NO:71. In embodiments, the light chain variable domain is the sequence of SEQ ID NO:72.

In embodiments, the heavy chain variable domain includes a FR H1 as set forth in SEQ ID NO:81, a FR H2 as set forth in SEQ ID NO:82, FR H3 as set forth in SEQ ID NO:83 and a FR H4 as set forth in SEQ ID NO:84. In embodiments, the light chain variable domain includes a FR L1 as set forth in SEQ ID NO:85, a FR L2 as set forth in SEQ ID NO:86, FR L3 as set forth in SEQ ID NO:87 and a FR L4 as set forth in SEQ ID NO:88.

In embodiments, the recombinant protein (bispecific antibody) includes a tryptophan at a position corresponding to Kabat position 366. In embodiments, the recombinant protein (bispecific antibody) includes a serine at a position corresponding to Kabat position 366. In embodiments, the recombinant protein (bispecific antibody) includes an alanine at a position corresponding to Kabat position 368. In embodiments, the recombinant protein (bispecific antibody) includes a valine at a position corresponding to Kabat position 407. In embodiments, the recombinant protein (bispecific antibody) includes an alanine at a position corresponding to Kabat position 234. In embodiments, the recombinant protein (bispecific antibody) includes an alanine at a position corresponding to Kabat position 235.

In embodiments, the first antibody region is a first Fab' fragment or the second antibody region is a second Fab' fragment. In embodiments, the first antibody region is a single chain variable fragment (scFv) or the second antibody region is a second single chain variable fragment (scFv).

The recombinant proteins provided herein may be bispecific antibodies including a second antibody region wherein the second antibody region is a single domain antibody. The second antibody region may include a light chain variable (VL) domain or a heavy chain variable (VH) domain. In embodiments, the second antibody region includes a single domain antibody. In embodiments, the second antibody region includes a light chain variable (VL) domain. In embodiments, the second antibody region includes a heavy chain variable (VH) domain. In embodiments, the second antibody region is a single domain antibody. In embodiments, the single domain antibody includes a heavy chain variable (VH) domain. In embodiments, the single domain antibody includes a light chain variable (VL) domain. In embodiments, the single domain antibody is a heavy chain variable (VH) domain. In embodiments, the single domain antibody is a light chain variable (VL) domain.

Thus, in another aspect is provided a recombinant protein including: (i) a first antibody region capable of binding an effector cell ligand; and (ii) a second antibody region including: (a) a light chain variable domain including a CDR L1 as set forth in SEQ ID NO:37, a CDR L2 as set forth in SEQ ID NO:38 and a CDR L3 as set forth in SEQ ID NO:39.

In another aspect is provided a recombinant protein including: (i) a first antibody region capable of binding an effector cell ligand; and (ii) a second antibody region, including: (a) a light chain variable domain including a CDR L1 as set forth in SEQ ID NO:40, a CDR L2 as set forth in SEQ ID NO:41 and a CDR L3 as set forth in SEQ ID NO:42.

In another aspect is provided a recombinant protein including: (i) a first antibody region capable of binding an effector cell ligand; and (ii) a second antibody region, including: (a) a light chain variable domain including a CDR L1 as set forth in SEQ ID NO:43, a CDR L2 as set forth in SEQ ID NO:44 and a CDR L3 as set forth in SEQ ID NO:45.

In another aspect is provided a recombinant protein including: (i) a first antibody region capable of binding an effector cell ligand; and (ii) a second antibody region, including: (a) a light chain variable domain including a CDR L1 as set forth in SEQ ID NO:46, a CDR L2 as set forth in SEQ ID NO:47 and a CDR L3 as set forth in SEQ ID NO:48.

In another aspect is provided a recombinant protein including: (i) a first antibody region capable of binding an effector cell ligand; and (ii) a second antibody region, including: (a) a light chain variable domain including a CDR L1 as set forth in SEQ ID NO:49, a CDR L2 as set forth in SEQ ID NO:50 and a CDR L3 as set forth in SEQ ID NO:51.

In another aspect is provided a recombinant protein including: (i) a first antibody region capable of binding an effector cell ligand; and (ii) a second antibody region, including: (a) a light chain variable domain including a CDR L1 as set forth in SEQ ID NO:52, a CDR L2 as set forth in SEQ ID NO:53 and a CDR L3 as set forth in SEQ ID NO:54.

In another aspect is provided a recombinant protein including: (i) a first antibody region capable of binding an effector cell ligand; and (ii) a second antibody region, including: (a) a light chain variable domain including a CDR L1 as set forth in SEQ ID NO:55, a CDR L2 as set forth in SEQ ID NO:56 and a CDR L3 as set forth in SEQ ID NO:57.

In another aspect is provided a recombinant protein including: (i) a first antibody region capable of binding an effector cell ligand; and (ii) a second antibody region, including: (a) a light chain variable domain including a CDR L1 as set forth in SEQ ID NO:58, a CDR L2 as set forth in SEQ ID NO:59 and a CDR L3 as set forth in SEQ ID NO:60.

In embodiments, the second antibody region is bound to an IL1RAP. In embodiments, the IL1RAP is a human IL1RAP. In embodiments, the IL1RAP forms part of a cell. In embodiments, the IL1RAP is expressed on the surface of the cell.

In embodiments, the cell is a cancer cell. In embodiments, the cancer cell is a leukemia stem cell (LSC). In embodiments, the cancer cell is an acute myeloid leukemia (AML) cell.

Nucleic Acid Compositions

The compositions provided herein include nucleic acid molecules encoding the anti-IL1RAP antibodies and recombinant proteins provided herein including embodiments thereof. Thus, in an aspect, an isolated nucleic acid encoding an antibody as provided herein including embodiments thereof is provided.

In another aspect, an isolated nucleic acid encoding a recombinant protein as provided herein, including embodiments thereof, is provided.

Pharmaceutics Compositions

The compositions provided herein include pharmaceutical compositions including the anti IL1RAP antibodies and recombinant proteins provided herein including embodiments thereof. Thus, in an aspect is provided a pharmaceutical composition including a therapeutically effective amount of an antibody as provided herein including embodiments thereof and a pharmaceutically acceptable excipient.

In another aspect is provided a pharmaceutical composition including a therapeutically effective amount of a recombinant protein as provided herein, including embodiments thereof, and a pharmaceutically acceptable excipient.

Methods of Treatment

The compositions (e.g., the anti IL1RAP antibodies and recombinant proteins) provided herein, including embodiments thereof, are contemplated as providing effective treatments for diseases such as cancer (e.g., leukemia [e.g., AMU]). Thus, in an aspect is provided a method of treating cancer in a subject in need thereof, the method including administering to a subject a therapeutically effective amount of an antibody as provided herein including embodiments thereof, thereby treating cancer in the subject.

In another aspect is provided a method of treating cancer in a subject in need thereof, the method including administering to a subject a therapeutically effective amount of a recombinant protein as described herein, including embodiments thereof, thereby treating cancer in the subject. In embodiments, the cancer is leukemia. In embodiments, the cancer is acute myeloid leukemia. In embodiments, the cancer is chronic myeloid leukemia (CML). In embodiments, the cancer is lung cancer. In embodiments, the cancer is non-small cell lung cancer (NSCLC). In embodiments, the cancer is pancreatic cancer. In embodiments, the cancer is melanoma. In embodiments, the cancer is breast cancer. In embodiments, the cancer is colon cancer. In embodiments, the method further includes administering to the subject a second therapeutic agent.

In embodiments, the antibody is administered at an amount from about 0.01 nM to about 10 nM. In embodiments, the antibody is administered at an amount from about 0.05 nM to about 10 nM. In embodiments, the antibody is administered at an amount from about 0.1 nM to about 10 nM. In embodiments, the antibody is administered at an amount from about 0.5 nM to about 10 nM. In embodiments, the antibody is administered at an amount from about 1 nM to about 10 nM. In embodiments, the antibody is administered at an amount from about 2 nM to about 10 nM. In embodiments, the antibody is administered at an amount from about 4 nM to about 10 nM. In embodiments, the antibody is administered at an amount from about 6 nM to about 10 nM. In embodiments, the antibody is administered at an amount from about 4 nM to about 10 nM. In embodiments, the antibody is administered at an amount from about 8 nM to about 10 nM. In embodiments, the antibody is administered at an amount of about 0.01 nM, 0.05 nM, 0.1 nM, 0.5 nM, 1 nM, 2 nM, 2 nM, 4 nM, 5 nM, 6 nM, 7 nM, 8 nM, 9 nM or 10 nM.

In embodiments, the antibody is administered at an amount from 0.01 nM to 10 nM. In embodiments, the antibody is administered at an amount from 0.05 nM to 10 nM. In embodiments, the antibody is administered at an amount from 0.1 nM to 10 nM. In embodiments, the antibody is administered at an amount from 0.5 nM to 10 nM. In embodiments, the antibody is administered at an amount from 1 nM to 10 nM. In embodiments, the antibody is administered at an amount from 2 nM to 10 nM. In embodiments, the antibody is administered at an amount from 4 nM to 10 nM. In embodiments, the antibody is administered at an amount from 6 nM to 10 nM. In embodiments, the antibody is administered at an amount from 4 nM to 10 nM. In embodiments, the antibody is administered at an amount from 8 nM to 10 nM. In embodiments, the antibody is administered at an amount of 0.01 nM, 0.05 nM, 0.1 nM, 0.5 nM, 1 nM, 2 nM, 2 nM, 4 nM, 5 nM, 6 nM, 7 nM, 8 nM, 9 nM or 10 nM.

In embodiments, the antibody is administered at an amount from about 0.01 nM to about 8 nM. In embodiments, the antibody is administered at an amount from about 0.05 nM to about 8 nM. In embodiments, the antibody is administered at an amount from about 0.1 nM to about 8 nM. In embodiments, the antibody is administered at an amount from about 0.5 nM to about 8 nM. In embodiments, the antibody is administered at an amount from about 1 nM to about 8 nM. In embodiments, the antibody is administered at an amount from about 2 nM to about 8 nM. In embodiments, the antibody is administered at an amount from about 4 nM to about 8 nM. In embodiments, the antibody is administered at an amount from about 6 nM to about 8 nM. In embodiments, the antibody is administered at an amount from about 4 nM to about 8 nM.

In embodiments, the antibody is administered at an amount from 0.01 nM to 8 nM. In embodiments, the antibody is administered at an amount from 0.05 nM to 8 nM. In embodiments, the antibody is administered at an amount from 0.1 nM to 8 nM. In embodiments, the antibody is administered at an amount from 0.5 nM to 8 nM. In embodiments, the antibody is administered at an amount from 1 nM to 8 nM. In embodiments, the antibody is administered at an amount from 2 nM to 8 nM. In embodiments, the antibody is administered at an amount from 4 nM to 8 nM. In embodiments, the antibody is administered at an amount from 6 nM to 8 nM. In embodiments, the antibody is administered at an amount from 4 nM to 8 nM.

In embodiments, the antibody is administered at an amount from about 0.01 nM to about 6 nM. In embodiments, the antibody is administered at an amount from about 0.05 nM to about 6 nM. In embodiments, the antibody is administered at an amount from about 0.1 nM to about 6 nM. In embodiments, the antibody is administered at an amount from about 0.5 nM to about 8 nM. In embodiments, the antibody is administered at an amount from about 1 nM to about 6 nM. In embodiments, the antibody is administered at an amount from about 2 nM to about 6 nM. In embodiments, the antibody is administered at an amount from about 4 nM to about 6 nM.

In embodiments, the antibody is administered at an amount from 0.01 nM to 6 nM. In embodiments, the antibody is administered at an amount from 0.05 nM to 6 nM. In embodiments, the antibody is administered at an amount from 0.1 nM to 6 nM. In embodiments, the antibody is administered at an amount from 0.5 nM to 6 nM. In embodiments, the antibody is administered at an amount from 1 nM to 6 nM. In embodiments, the antibody is administered at an amount from 2 nM to 6 nM. In embodiments, the antibody is administered at an amount from 4 nM to 6 nM.

In embodiments, the antibody is administered at an amount from about 0.01 nM to about 4 nM. In embodiments, the antibody is administered at an amount from about 0.05 nM to about 4 nM. In embodiments, the antibody is administered at an amount from about 0.1 nM to about 4 nM. In embodiments, the antibody is administered at an amount from about 0.5 nM to about 4 nM. In embodiments, the antibody is administered at an amount from about 1 nM to about 4 nM. In embodiments, the antibody is administered at an amount from about 2 nM to about 4 nM.

In embodiments, the antibody is administered at an amount from 0.01 nM to 4 nM. In embodiments, the antibody is administered at an amount from 0.05 nM to 4 nM. In embodiments, the antibody is administered at an amount from 0.1 nM to 4 nM. In embodiments, the antibody is administered at an amount from 0.5 nM to 4 nM. In embodiments, the antibody is administered at an amount from 1 nM to 4 nM. In embodiments, the antibody is administered at an amount from 2 nM to 4 nM.

In embodiments, the antibody is administered at an amount from about 0.01 nM to about 2 nM. In embodiments, the antibody is administered at an amount from about 0.05 nM to about 2 nM. In embodiments, the antibody is administered at an amount from about 0.1 nM to about 2 nM. In embodiments, the antibody is administered at an amount from about 0.5 nM to about 2 nM. In embodiments, the antibody is administered at an amount from about 1 nM to about 2 nM.

In embodiments, the antibody is administered at an amount from 0.01 nM to 2 nM. In embodiments, the antibody is administered at an amount from 0.05 nM to 2 nM. In embodiments, the antibody is administered at an amount from 0.1 nM to 2 nM. In embodiments, the antibody is administered at an amount from 0.5 nM to 2 nM. In embodiments, the antibody is administered at an amount from 1 nM to 2 nM.

In embodiments, the antibody is administered at an amount from about 0.01 nM to about 1 nM. In embodiments, the antibody is administered at an amount from about 0.05 nM to about 1 nM. In embodiments, the antibody is administered at an amount from about 0.1 nM to about 1 nM. In embodiments, the antibody is administered at an amount from about 0.5 nM to about 1 nM.

In embodiments, the antibody is administered at an amount from 0.01 nM to 1 nM. In embodiments, the antibody is administered at an amount from 0.05 nM to 1 nM. In embodiments, the antibody is administered at an amount from 0.1 nM to 1 nM. In embodiments, the antibody is administered at an amount from 0.5 nM to 1 nM.

In embodiments, the antibody is administered at an amount of about 3.15 nM. In embodiments, the antibody is administered at an amount of 3.15 nM. In embodiments, the antibody is administered at an amount of about 1.05 nM. In embodiments, the antibody is administered at an amount of 1.05 nM.

It is understood that the recombinant protein (i.e., the bispecific antibody or the chimeric antigen receptor) provided herein including embodiments thereof may be administered at any of the concentrations described herein for the administration of the antibody (e.g., 0.01 nM-10 nM).

In embodiments, the antibody is administered at an amount from about 10 µg to about 500 µg. In embodiments, the antibody is administered at an amount from about 20 µg to about 500 µg. In embodiments, the antibody is administered at an amount from about 30 µg to about 500 µg. In embodiments, the antibody is administered at an amount from about 40 µg to about 500 µg. In embodiments, the antibody is administered at an amount from about 50 µg to about 500 µg. In embodiments, the antibody is administered at an amount from about 60 µg to about 500 µg. In embodiments, the antibody is administered at an amount from about 70 µg to about 500 µg. In embodiments, the antibody is administered at an amount from about 80 µg to about 500 µg. In embodiments, the antibody is administered at an amount from about 90 µg to about 500 µg. In embodiments, the antibody is administered at an amount from about 100 µg to about 500 µg.

In embodiments, the antibody is administered at an amount from about 110 µg to about 500 µg. In embodiments, the antibody is administered at an amount from about 120 µg to about 500 µg. In embodiments, the antibody is administered at an amount from about 130 µg to about 500 µg. In embodiments, the antibody is administered at an amount from about 140 µg to about 500 µg. In embodiments, the antibody is administered at an amount from about 150 µg to about 500 µg. In embodiments, the antibody is administered at an amount from about 160 µg to about 500 µg. In embodiments, the antibody is administered at an amount from about 170 µg to about 500 µg. In embodiments, the antibody is administered at an amount from about 180 µg to about 500 µg. In embodiments, the antibody is administered at an amount from about 190 µg to about 500 µg. In embodiments, the antibody is administered at an amount from about 200 µg to about 500 µg.

In embodiments, the antibody is administered at an amount from about 210 µg to about 500 µg. In embodiments, the antibody is administered at an amount from about 220 µg to about 500 µg. In embodiments, the antibody is administered at an amount from about 230 µg to about 500 µg. In embodiments, the antibody is administered at an amount from about 240 µg to about 500 µg. In embodiments, the antibody is administered at an amount from about 250 µg to about 500 µg. In embodiments, the antibody is administered at an amount from about 260 µg to about 500 µg. In embodiments, the antibody is administered at an amount from about 270 µg to about 500 µg. In embodiments, the antibody is administered at an amount from about 280 µg to about 500 µg. In embodiments, the antibody is administered at an amount from about 290 µg to about 500 µg. In embodiments, the antibody is administered at an amount from about 300 µg to about 500 µg.

In embodiments, the antibody is administered at an amount from about 310 µg to about 500 µg. In embodiments, the antibody is administered at an amount from about 320 µg to about 500 µg. In embodiments, the antibody is administered at an amount from about 330 µg to about 500 µg. In embodiments, the antibody is administered at an amount from about 340 µg to about 500 µg. In embodiments, the antibody is administered at an amount from about 350 µg to about 500 µg. In embodiments, the antibody is administered at an amount from about 360 µg to about 500 µg. In embodiments, the antibody is administered at an amount from about 370 µg to about 500 µg. In embodiments, the antibody is administered at an amount from about 380 µg to about 500 µg. In embodiments, the antibody is administered at an amount from about 390 µg to about 500 µg. In embodiments, the antibody is administered at an amount from about 400 µg to about 500 µg.

In embodiments, the antibody is administered at an amount from about 410 µg to about 500 µg. In embodiments, the antibody is administered at an amount from about 420 µg to about 500 µg. In embodiments, the antibody is administered at an amount from about 430 µg to about 500 µg. In embodiments, the antibody is administered at an amount from about 440 µg to about 500 µg. In embodiments, the antibody is administered at an amount from about 450 µg to about 500 µg. In embodiments, the antibody is administered at an amount from about 460 µg to about 500 µg. In embodiments, the antibody is administered at an amount from about 470 µg to about 500 µg. In embodiments, the antibody is administered at an amount from about 480 µg to about 500 µg. In embodiments, the antibody is administered at an amount from about 490 µg to about 500 µg.

In embodiments, the antibody is administered at an amount from about 10 µg to about 400 µg. In embodiments, the antibody is administered at an amount from about 20 µg to about 400 µg. In embodiments, the antibody is administered at an amount from about 30 µg to about 400 µg. In embodiments, the antibody is administered at an amount from about 40 µg to about 400 µg. In embodiments, the antibody is administered at an amount from about 50 µg to about 400 µg. In embodiments, the antibody is administered at an amount from about 60 µg to about 400 µg. In embodiments, the antibody is administered at an amount from about 70 µg to about 400 µg. In embodiments, the antibody is administered at an amount from about 80 µg to about 400 µg. In embodiments, the antibody is administered at an amount from about 90 µg to about 400 µg. In embodiments, the antibody is administered at an amount from about 100 µg to about 400 µg.

In embodiments, the antibody is administered at an amount from about 10 µg to about 300 µg. In embodiments, the antibody is administered at an amount from about 20 µg to about 300 µg. In embodiments, the antibody is administered at an amount from about 30 µg to about 300 µg. In embodiments, the antibody is administered at an amount from about 40 µg to about 300 µg. In embodiments, the antibody is administered at an amount from about 50 µg to about 300 µg. In embodiments, the antibody is administered at an amount from about 60 µg to about 300 µg. In embodiments, the antibody is administered at an amount from about 70 µg to about 300 µg. In embodiments, the antibody is administered at an amount from about 80 µg to about 300 µg. In embodiments, the antibody is administered at an amount from about 90 µg to about 300 µg. In embodiments, the antibody is administered at an amount from about 100 µg to about 300 µg.

In embodiments, the antibody is administered at an amount from about 10 µg to about 200 µg. In embodiments, the antibody is administered at an amount from about 20 µg to about 200 µg. In embodiments, the antibody is administered at an amount from about 30 µg to about 200 µg. In embodiments, the antibody is administered at an amount from about 40 µg to about 200 µg. In embodiments, the antibody is administered at an amount from about 50 µg to about 200 µg. In embodiments, the antibody is administered at an amount from about 60 µg to about 200 µg. In embodiments, the antibody is administered at an amount from about 70 µg to about 200 µg. In embodiments, the antibody is administered at an amount from about 80 µg to about 200 µg. In embodiments, the antibody is administered at an amount from about 90 µg to about 200 µg. In embodiments, the antibody is administered at an amount from about 100 µg to about 200 µg.

In embodiments, the antibody is administered at an amount from about 10 µg to about 100 µg. In embodiments, the antibody is administered at an amount from about 20 µg to about 100 µg. In embodiments, the antibody is administered at an amount from about 30 µg to about 100 µg. In embodiments, the antibody is administered at an amount from about 40 µg to about 100 µg. In embodiments, the antibody is administered at an amount from about 50 µg to about 100 µg. In embodiments, the antibody is administered at an amount from about 60 µg to about 100 µg. In embodiments, the antibody is administered at an amount from about 70 µg to about 100 µg. In embodiments, the antibody is administered at an amount from about 80 µg to about 100 µg. In embodiments, the antibody is administered at an amount from about 90 µg to about 100 µg.

In embodiments, the antibody is administered at an amount of about 10 µg, 20 µg, 30 µg, 40 µg, 50 µg, 60 µg, 70 µg, 80 µg, 90 µg, 100 µg, 110 µg, 120 µg, 130 µg, 140 µg, 150 µg, 160 µg, 170 µg, 180 µg, 190 µg, 200 µg, 210 µg, 220 µg, 230 µg, 240 µg, 250 µg, 260 µg, 270 µg, 280 µg, 290 µg, 300 µg, 310 µg, 320 µg, 330 µg, 340 µg, 350 µg, 360 µg, 370 µg, 380 µg, 390 µg, 400 µg, 410 µg, 420 µg, 430 µg, 440 µg, 450 µg, 460 µg, 470 µg, 480 µg, 490 µg, or 500 µg.

In embodiments, the antibody is administered at an amount of 10 µg, 20 µg, 30 µg, 40 µg, 50 µg, 60 µg, 70 µg, 80 µg, 90 µg, 100 µg, 110 µg, 120 µg, 130 µg, 140 µg, 150 µg, 160 µg, 170 µg, 180 µg, 190 µg, 200 µg, 210 µg, 220 µg, 230 µg, 240 µg, 250 µg, 260 µg, 270 µg, 280 µg, 290 µg, 300 µg, 310 µg, 320 µg, 330 µg, 340 µg, 350 µg, 360 µg, 370 µg, 380 µg, 390 µg, 400 µg, 410 µg, 420 µg, 430 µg, 440 µg, 450 µg, 460 µg, 470 µg, 480 µg, 490 µg, or 500 µg.

It is understood that the recombinant protein (i.e., the bispecific antibody or the chimeric antigen receptor) provided herein including embodiments thereof may be administered at any of the concentrations described herein for the administration of the antibody (e.g., 10 μg-500 μg).

In embodiments, the recombinant protein or antibody is administered at an amount of about 200 g. In embodiments, the recombinant protein or antibody is administered at an amount of 200 μg.

Methods of Inhibiting Cell Proliferation

The compositions provided herein, including embodiments thereof, are further contemplated for inhibiting cell proliferation. Thus, in an aspect is provided a method of inhibiting proliferation of a cell, the method including: (i) contacting a cell with an anti-IL1RAP antibody as provided herein including embodiments thereof, or a recombinant protein as provided herein including embodiments thereof, thereby forming a contacted cell; and (ii) allowing the anti-IL1RAP antibody, the recombinant protein as provided herein including embodiments thereof to bind an IL1RAP on the contacted cell, thereby inhibiting proliferation of the cell. In embodiments, the cell is a cancer cell. In embodiments, the cell is a leukemia stem cell (LSC). In embodiments, the cancer cell is an acute myeloid leukemia (AML) cell. In embodiments, the cancer cell is a chronic myeloid leukemia (CML) cell. In embodiments, the cancer cell is a lung cancer cell. In embodiments, the cancer cell is a non-small cell lung cancer (NSCLC) cell. In embodiments, the cancer cell is a pancreatic cancer cell. In embodiments, the cancer cell is a melanoma cell. In embodiments, the cancer cell is a breast cancer cell. In embodiments, the cancer cell is a colon cancer cell.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

EXAMPLES

Example 1

Applicants showed that interleukin-1 receptor accessory protein (IL1RAP) is exclusively expressed on human AML blasts, including leukemia stem cell (LSC)-enriched subpopulations, but not on normal hematopoietic cells including hematopoietic stem cells (HSCs), thereby providing a better target for AML than current immunotherapeutic targets used in clinical trials (i.e. CD33 and CD123), which are also expressed on normal HSCs. Therefore, Applicants designed an anti-IL1RAP/CD3 T cell-dependent bispecific antibody to target leukemic cells and LSCs while sparing normal HSCs. In vitro functional analyses demonstrated the IL1RAP/CD3 bispecific antibody in combination with T cells not only depleted AML cell lines, but also effectively eliminated leukemic cells including LSCs from different subtypes of AML patient samples. In vivo treatment with IL1RAP/CD3 bispecific antibody plus T cells significantly reduced leukemic burden and prolonged survival in NSG-SGM3 mice transplanted with AML MV4-11 cells, and also generated prolonged survival in primary and secondary recipient NSG-SGM3 mice transplanted with human AML blasts, as compared with treatment with IgG or T cells only. Altogether, these results determined IL1RAP/CD3 bispecific antibody plus T cells as a novel and effective immunotherapeutic approach in the treatment of AML.

Example 2: Generation and Selection of the Antibody

A human phage display library was constructed using purified peripheral blood mononuclear cells (PBMCs) from ten healthy donors, as described previously. Twelve unique clones were identified as IL1RAP-binding clones. The gene sequences of single-chain fragment variables (scFv) of these clones were ligated individually into a scFv-FC expression vector (TEGX-SCblue, Antibody Design). Antibodies were expressed in transient expi293 cells, and purified by protein A affinity chromatography. The IL1RAP EC50 (Table 2) of these antibodies was determined by ELISA and antibody-dependent T cell-mediated cytotoxicity (ADCC). The antibody with the highest binding affinity (i.e., lowest $EC_{50}$) was selected for constructing bispecific antibody.

Table 2. Half maximal effective concentration ($EC_{50}$) studies of exemplary IL1RAP antibodies and fragments thereof provided herein.

| IL1RAP Antibody Clone ID | $EC_{50}$ |
|---|---|
| 1A1 | 2.89884 M |
| 1A4 | 35.75 uM |
| 1A5 | 1.40188 M |
| 1A6 | 249.8 uM |
| 1A11 | 2.71 mM |
| 1A12 | 26.95 mM |
| 1B8 | 3.072 uM |
| 1E12 | 2.111 uM |
| 2E12 | 0.854 uM |
| D1A4 | 1.404 uM |
| D1F6 | 6.6298 uM |
| 1D5 | 52.91 pM |

Example 3: T Cell Dependent Cellular Cytotoxicity (TDCC) Long Term Kill Assay

To determine T cell mediated killing of AML cell lines and AML primary cells, different concentrations of anti-IL1RAP antibodies combined with purified T cells from healthy donors or AML patient samples were incubated with $1\times10^4$ target cells per well at various effector-to-target (E:T) ratios. 48 hours after incubation, the cells were stained with antibodies, $CD34^+CD45^{dim}$ or $CD33^+CD45^{dim}CD14^-$ cells were designated as leukemia cells, $CD45^+CD4^+$ or $CD45^+CD8^+$ as T cells, and $CD25^+$ or $CD69^+$ as activated T cells. Numbers of leukemia cells and T cells were counted and cytotoxicity was calculated as: cytotoxicity (%)=100×(1−treated target cells/control target cells).

Table 3. TDCC studies using recombinant proteins (IgG antibodies) provided herein.

| ID | cell lysis %-1 | cell lysis %-2 | cell lysis %-3 | cell lysis %-average |
|---|---|---|---|---|
| H14 | 37.92 | 45.03 | 45.97 | 42.97 |
| 1A1 | 24.52 | 16.4 | 20.49 | 20.47 |
| 1A4 | 24.63 | 22.95 | 22.75 | 23.44 |
| 1A5 | 24 | 26.14 | 25.89 | 25.34 |
| 1A6 | 28.61 | 22.12 | 26.82 | 25.85 |
| 1A11 | 25.08 | 21.44 | 25.58 | 24.03 |
| 1A12 | 16.49 | 12.47 | 13.8 | 14.25 |
| 1B8 | 34.57 | 30.17 | 34.42 | 33.05 |
| 1E12 | 39.63 | 36.3 | 39.72 | 38.55 |

-continued

| ID | cell lysis %-1 | cell lysis %-2 | cell lysis %-3 | cell lysis %-average |
|---|---|---|---|---|
| 2E12 | 27.2 | 28.7 | 23.71 | 26.54 |
| D1A4 | 29.78 | 26.37 | 24.54 | 26.90 |
| D1F6 | 23.23 | 27.02 | 31.72 | 27.32 |
| 1D5 | 48.9 | 42.56 | 48.27 | 46.58 |
| Control | 16.7 | 14.04 | 17.57 | 16.10 |
| 1C7 | N/A | N/A | N/A | N/A |

| ID | cell lysis %-1 | cell lysis %-2 | cell lysis %-3 | cell lysis %-average |
|---|---|---|---|---|
| 1A7 | N/A | N/A | N/A | N/A |

Example 4: CDR Sequences of the Heavy Chain Variable Domains and Light Chain Variable Domains for Anti-IL1Rap Antibody Clones Table 4. CDR sequences of the heavy chain variable domains and light chain variable domains of anti-IL1RAP antibodies provided herein.

| SEQ ID NO. | Sequence | CDR | IL1RAP Antibody Clone ID |
|---|---|---|---|
| 1 | GFPFNMYG | CDR H1 | D1A4 |
| 2 | ISAYNGRT | CDR H2 | D1A4 |
| 3 | ARSGKQQLGSAQPLDS | CDR H3 | D1A4 |
| 4 | SSNIGSNT | CDR L1 | D1A4 |
| 5 | SNN | CDR L2 | D1A4 |
| 6 | AAWDDSLNGL | CDR L3 | D1A4 |
| 7 | GYRFTDYW | CDR H1 | 1C7 |
| 8 | IYLGDSET | CDR H2 | 1C7 |
| 9 | ARGFAYGDWYFDL | CDR H3 | 1C7 |
| 10 | QGIAGW | CDR L1 | 1C7 |
| 11 | AAS | CDR L2 | 1C7 |
| 12 | QQSSSTPHT | CDR L3 | 1C7 |
| 13 | GYSFSSHW | CDR H1 | ID5 |
| 14 | IYPGDSDT | CDR H2 | ID5 |
| 15 | ARGELPGEAYYFD | CDR H3 | ID5 |
| 16 | QSLLHSNGYKY | CDR L1 | ID5 |
| 17 | LGS | CDR L2 | ID5 |
| 18 | MQALQTPLT | CDR L3 | ID5 |
| 19 | GFTFSRYW | CDR H1 | 2E12 |
| 20 | IHTDGSSI | CDR H2 | 2E12 |
| 21 | ARDIGGGYSYGSVDY | CDR H3 | 2E12 |
| 22 | NIGSKS | CDR L1 | 2E12 |
| 23 | GGG | CDR L2 | 2E12 |
| 24 | QVWDGSTDHYI | CDR L3 | 2E12 |
| 25 | DYTFTSYG | CDR H1 | 1A7 |
| 26 | ISAYNGNT | CDR H2 | 1A7 |
| 27 | ARVHPRHIIGAGYFDY | CDR H3 | 1A7 |
| 28 | SSDVGVYDY | CDR L1 | 1A7 |
| 29 | DVS | CDR L2 | 1A7 |
| 30 | CAYTFVFGT | CDR L3 | 1A7 |
| 31 | GYTFTSYY | CDR H1 | 1B8 |
| 32 | INPSGGST | CDR H2 | 1B8 |
| 33 | AIFAPPDYGDYVDAFDI | CDR H3 | 1B8 |
| 34 | QSLLHSNGYNY | CDR L1 | 1B8 |
| 35 | LGS | CDR L2 | 1B8 |
| 36 | MQALQTPRGTKVE | CDR L3 | 1B8 |
| 37 | SGDIGFYNY | CDR L1 | 1A12 |
| 38 | EVN | CDR L2 | 1A12 |
| 39 | VSYGISDTVL | CDR L3 | 1A12 |
| 40 | SGDIGFYNY | CDR L1 | 1A5 |
| 41 | EVN | CDR L2 | 1A5 |
| 42 | VSYGISDTVL | CDR L3 | 1A5 |
| 43 | ISNIGSNA | CDR L1 | 1A6 |
| 44 | SDN | CDR L2 | 1A6 |
| 45 | AAWDDSLNGNV | CDR L3 | 1A6 |
| 46 | SSNIGINA | CDR L1 | 1A1 |
| 47 | SND | CDR L2 | 1A1 |
| 48 | AAWDDSLNANV | CDR L3 | 1A1 |
| 49 | SSNIGSNP | CDR L1 | 1A4 |
| 50 | NTG | CDR L2 | 1A4 |
| 51 | AAWDDRLNGNV | CDR L3 | 1A4 |
| 52 | QSVNNF | CDR L1 | 1A11 |
| 53 | AVS | CDR L2 | 1A11 |
| 54 | QQSSSAPNT | CDR L3 | 1A11 |
| 55 | SGSVGEYY | CDR L1 | 1E12 |
| 56 | EDY | CDR L2 | 1E12 |
| 57 | QSYDGSNFV | CDR L3 | 1E12 |
| 58 | GSNIGINP | CDR L1 | D1F6 |
| 59 | SDD | CDR L2 | D1F6 |
| 60 | AAWDDSLNGPGNV | CDR L3 | D1F6 |

Example 5: Sequences of the Heavy Chain Variable Domains and Light Chain Variable Domains for Anti-IL1Rap Antibody Clones Table 5. Sequences of heavy variable chain domains and light chain variable domains of IL1RAP antibodies provided herein.

| SEQ ID NO. | Sequence | Fragment | Clone |
|---|---|---|---|
| 61 | PGPLVQSGAEVKKPGASVKVSCTTSGFPFNMYGFNWVRQAPGQGLEWMGWISAYNGRTNYAQKFQGRVTMTTDTSTSTSYVELESLTSDDTAVYYCARSGKQQLGSAQPLDSWGQGTLIIVSS | VH | D1A4 |
| 62 | NFMLTQPPSASGTPGQRVTISCSGSSSNIGSNTVNWYQQLPGTAPKLLIYSNNQRPSGVPDRFSGSKSGTSASLAISGLQSEDEADYYCAAWDDSLNGLFGGGTKLTVL | VL | D1A4 |
| 63 | QVQLVQSGAEVKKPGESLKISCKASGYRFTDYWIGWVRQMPGKGLEWMGIIYLGDSETIYSPSFQGQVTISADKSISTAFLQLTSLKASDSAIYSCARGFAYGDWYFDLWGRGTLVIVS | VH | 1C7 |
| 64 | NIQMTQSPSSVSASVGDRVTITCRASQGIAGWLAWYQQKPGKRPNLLIYAASTLQSGVPSRFSGSGSGTDFTLTISSLQPEDFATYYCQQSSSTPHTFGQGTKLEIK | VL | 1C7 |
| 65 | QVQLVQSGAEVKKPGESLKISCKGSGYSFSSHWIGWVRQMPGKGLEWMGIIYPGDSDTRYSPSFQGQVTISADKSISTAYLQWSSLKASDTAMYYCARGELPGEAYYFDNWGQGTLVTVSS | VH | 1D5 |
| 66 | EIVMTQSPLSLPVTPGEPASISCRSSQSLLHSNGYKYLDWYLQKPGQSPQLLIYLGSNRASGVPDRFSGSGSGTDFTLKISRVEAEDVGVYYCMQALQTPLTFGGGTKVEIK | VL | 1D5 |
| 67 | PGAAAGVGGGLVQPGGSLRLSCEASGFTFSRYWMHWVRQAPGKGLVWVSRIHTDGSSISYADSVKGRFTISRDNAKNTLYLQMNSLRAEDTAVYYCARDIGGGYSYGSVDYWGQGTLVTVSS | VH | 2E12 |
| 68 | QPVLTQSPSVSVAPGKTTRITCGGDNIGSKSVHWFQQKPGQAPVLVVFGGGDRPSGIPERFSGSNSGNTATLIISGVEGGDEADYYCQVWDGSTDHYIFGAGTMVTVL | VL | 2E12 |
| 69 | QVKLVESGPEVKKPGASVKVSCKASDYTFTSYGISWVRLAPGQGLEWMGWISAYNGNTNYPQKLQGRVTVTTDTSTSTAYMELRSLTSDDTAVYYCARVHPRHIIGAGYFDYWGQGTMVTVSS | VH | 1A7 |
| 70 | LPVLTQPRSVAGSPGQSVTISCTGSSSDVGVYDYVSWYQQHPGKVPRLMIYDVSKRPPGVPDRFSGSRSGNTASLTISGLQTEDEADYYCAYTFVFGTGTNVSVL | VL | 1A7 |
| 71 | PSFVVQSGAEVKKPGASVKVSCKASGYTFTSYYMHWVRQAPGQGLEWMGIINPSGGSTSYAQKFQGRVPMTRDTSTSTVYLELNSLRSEDTAVYYCAIFAPPDYGDYVDAFDIWGQGTLIIVSS | VH | 1B8 |
| 72 | DVVMTQSPLSLPVTPGEPASISCRSSQSLLHSNGYNYLDWYLQKPGQSPQLLIYLGSNRASGVPDRFSGSGSGTDFTLKISRVEAEDVGVYYCMQALQTPRGTKVEIK | VL | 1B8 |
| 73 | QSALNQPPSASGSPGQAVTISCTGSSGDIGFYNYVSWYQQHPGKAPKLLIFEVNQRPSGVPDRFSGSRSGSTASLTVSGLQADDEADYYCVSYGISDTVLFGGGTRLTVL | VL | 1A12 |
| 74 | QSALTQPPSASGSPGQAVTISCTGSSGDIGFYNYVSWYQQHPGKAPKLLIFEVNQRPSGVPDRFSGSKSGTTASLTVSGLQADDEAHYYCVSYGISDTVLFGGGTKLTVL | VL | 1A5 |
| 75 | QSVLTQPPSASGTPGQRVTFSCSGSISNIGSNAVNWYQQLPGTAPSLLIYSDNQRPSGVPDRFSGSKSGTSASLAISGLQSEDEADYYCAAWDDSLNGNVFGTGTKVTVL | VL | 1A6 |
| 76 | QSVLTQPPSVSGAPGQRVTISCGSSSSNIGINAVNWYQQVPGTAPKLLMYSNDQRPSGVPARFSGSKSGTSASLAISGLQSEDEADYYCAAWDDSLNANVFGTGTKVTVL | VL | 1A1 |
| 77 | QSVLTQSPSASGTPGQRVTISCSGSSSNIGSNPVNWYQQLPGTVPTLLIFNTGQRPSGVPDRFSGSRSGTSASLAISGLQSEDEADYYCAAWDDRLNGNVFGTGTKVTVL | VL | 1A4 |

| SEQ ID NO. | Sequence | Fragment | Clone |
|---|---|---|---|
| 78 | DIVMTQSPSSLSASVGDRVTITCRASQSVNNFLNWYQHRPGKAPKLLIYAVSSLQSGVPSRFSGSGFGTDFTLTISSLQPEDFATYCQQSSSAPNTFGQGTKLEIK | VL | 1A11 |
| 79 | NFMLTQPHSVSESPGKTVTISCTRSSGSVGEYYVQWYQHRPGSIPTFVIYEDYKRPSGVPVRFSGSVDSASNSATLIISGLIPEDEADYYCQSYDGSNFVFGTGTRVTVL | VL | 1E12 |
| 80 | QAVLTQPPSASGTPGQRVTISCSGSGSNIGINPVNWYQQLPGTAPKLLIYSDDQRPSGVPDRFSGSKSGTSASLAISGLQSEDEADYYCAAWDDSLNGPGNVFGTGTKVTVL | VL | D1F6 |

Example 6: Framework Sequences of Heavy Chain Variable Domains and Light Variable Domains for Anti-IL1Rap Antibody Clones Table 6. The framework sequences of heavy chain variable domains and light chain variable domains of IL1RAP antibodies provided herein

| SEQ ID NO. | Sequence | FR | Clone |
|---|---|---|---|
| 81 | PGPLVQSGAEVKKPGASVKVSCTTS | FR H1 | D1A4 |
| 82 | FNWVRQAPGQGLEWMGW | FR H2 | D1A4 |
| 83 | NYAQKFQGRVTMTTDTSTSTSYVELESLTSDDTAVYYC | FR H3 | D1A4 |
| 84 | WGQGTLIIVSS | FR H4 | D1A4 |
| 85 | NFMLTQPPSASGTPGQRVTISCSGS | FR L1 | D1A4 |
| 86 | VNWYQQLPGTAPKLLIY | FR L2 | D1A4 |
| 87 | QRPSGVPDRFSGSKSGTSASLAISGLQSEDEADYYC | FR L3 | D1A4 |
| 88 | FGGGTKLTVL | FR L4 | D1A4 |
| 89 | QVQLVQSGAEVKKPGESLKISCKAS | FR H1 | 1C7 |
| 90 | IGWVRQMPGKGLEWMGI | FR H2 | 1C7 |
| 91 | IYSPSFQGQVTISADKSISTAFLQLTSLKASDSAIYSC | FR H3 | 1C7 |
| 92 | WGRGTLVIVS | FR H4 | 1C7 |
| 93 | NIQMTQSPSSVSASVGDRVTITCRAS | FR L1 | 1C7 |
| 94 | LAWYQQKPGKRPNLLIY | FR L2 | 1C7 |
| 95 | TLQSGVPSRFSGSGSGTDFTLTISSLQPEDFATYYC | FR L3 | 1C7 |
| 96 | FGQGTKLEIK | FR L4 | 1C7 |
| 97 | QVQLVQSGAEVKKPGESLKISCKGS | FR H1 | 1D5 |
| 98 | IGWVRQMPGKGLEWMGI | FR H2 | 1D5 |
| 99 | RYSPSFQGQVTISADKSISTAYLQWSSLKASDTAMYYC | FR H3 | 1D5 |
| 100 | NWGQGTLVTVSS | FR H4 | 1D5 |
| 101 | EIVMTQSPLSLPVTPGEPASISCRSS | FR L1 | 1D5 |
| 102 | LDWYLQKPGQSPQLLIY | FR L2 | 1D5 |
| 103 | NRASGVPDRFSGSGSGTDFTLKISRVEAEDVGVYYC | FR L3 | 1D5 |
| 104 | FGGGTKVEIK | FR L4 | 1D5 |
| 105 | PGAAAGVGGGLVQPGGSLRLSCEAS | FR H1 | 2E12 |
| 106 | MHWVRQAPGKGLVWVSR | FR H2 | 2E12 |
| 107 | SYADSVKGRFTISRDNAKNTLYLQMNSLRAEDTAVYYC | FR H3 | 2E12 |
| 108 | WGQGTLVTVSS | FR H4 | 2E12 |
| 109 | QPVLTQSPSVSVAPGKTTRITCGGD | FR L1 | 2E12 |
| 110 | VHWFQQKPGQAPVLVVF | FR L2 | 2E12 |
| 111 | DRPSGIPERFSGSNSGNTATLIISGVEGGDEADYYC | FR L3 | 2E12 |
| 112 | FGAGTMVTVL | FR L4 | 2E12 |
| 113 | QVKLVESGPEVKKPGASVKVSCKAS | FR H1 | 1A7 |
| 114 | ISWVRLAPGQGLEWMGW | FR H2 | 1A7 |
| 115 | NYPQKLQGRVTVTTDTSTSTAYMELRSLTSDDTAVYYC | FR H3 | 1A7 |
| 116 | WGQGTMVTVSS | FR H4 | 1A7 |
| 117 | LPVLTQPRSVAGSPGQSVTISCTGS | FR L1 | 1A7 |
| 118 | VSWYQQHPGKVPRLMIY | FR L2 | 1A7 |
| 119 | KRPPGVPDRFSGSRSGNTASLTISGLQTEDEADYY | FR L3 | 1A7 |
| 120 | GTNVSVL | FR L4 | 1A7 |
| 121 | PSFVVQSGAEVKKPGASVKVSCKAS | FR H1 | 1B8 |
| 122 | MHWVRQAPGQGLEWMGI | FR H2 | 1B8 |
| 123 | SYAQKFQGRVPMTRDTSTSTVYLELNSLRSEDTAVYYC | FR H3 | 1B8 |
| 124 | WGQGTLIIVSS | FR H4 | 1B8 |
| 125 | DVVMTQSPLSLPVTPGEPASISCRSS | FR L1 | 1B8 |
| 126 | LDWYLQKPGQSPQLLIY | FR L2 | 1B8 |
| 127 | NRASGVPDRFSGSGSGTDFTLKISRVEAEDVGVYYC | FR L3 | 1B8 |

| SEQ ID NO. | Sequence | FR | Clone |
|---|---|---|---|
| 128 | IK | FR L4 | 1B8 |
| 129 | QSALNQPPSASGSPGQAVTISCTGS | FR L1 | 1A12 |
| 130 | VSWYQQHPGKAPKLLIF | FR L2 | 1A12 |
| 131 | QRPSGVPDRFSGSRSGSTASLTVSGLQADDEADYYC | FR L3 | 1A12 |
| 132 | FGGGTRLTVL | FR L4 | 1A12 |
| 133 | QSALTQPPSASGSPGQAVTISCTGS | FR L1 | 1A5 |
| 134 | VSWYQQHPGKAPKLLIF | FR L2 | 1A5 |
| 135 | QRPSGVPDRFSGSKSGTTASLTVSGLQADDEAHYYC | FR L3 | 1A5 |
| 136 | FGGGTKLTVL | FR L4 | 1A5 |
| 137 | QSVLTQPPSASGTPGQRVTFSCSGS | FR L1 | 1A6 |
| 138 | VNWYQQLPGTAPSLLIY | FR L2 | 1A6 |
| 139 | QRPSGVPDRFSGSKSGTSASLAISGLQSEDEADYYC | FR L3 | 1A6 |
| 140 | FGTGTKVTVL | FR L4 | 1A6 |
| 141 | QSVLTQPPSVSGAPGQRVTISCSGS | FR L1 | 1A1 |
| 142 | VNWYQQVPGTAPKLLMY | FR L2 | 1A1 |
| 143 | QRPSGVPARFSGSKSGTSASLAISGLQSEDEADYYC | FR L3 | 1A1 |
| 144 | FGTGTKVTVL | FR L4 | 1A1 |
| 145 | QSVLTQSPSASGTPGQRVTISCSGS | FR L1 | 1A4 |
| 146 | VNWYQQLPGTVPTLLIF | FR L2 | 1A4 |
| 147 | QRPSGVPDRFSGSRSGTSASLAISGLQSEDEADYYC | FR L3 | 1A4 |
| 148 | FGTGTKVTVL | FR L4 | 1A4 |
| 149 | DIVMTQSPSSLSASVGDRVTITCRAS | FR L1 | 1A11 |
| 150 | LNWYQHRPGKAPKLLIY | FR L2 | 1A11 |
| 151 | SLQSGVPSRFSGSGFGTDFTLTISSLQPEDFATYYC | FR L3 | 1A11 |
| 152 | FGQGTKLEIK | FR L4 | 1A11 |
| 153 | NFMLTQPHSVSESPGKTVTISCTRS | FR L1 | 1E12 |
| 154 | VQWYQHRPGSIPTFVIY | FR L2 | 1E12 |
| 155 | KRPSGVPVRFSGSVDSASNSATLIISGLIPEDEADYYC | FR L3 | 1E12 |
| 156 | FGTGTRVTVL | FR L4 | 1E12 |
| 157 | QAVLTQPPSASGTPGQRVTISCSGS | FR L1 | D1F6 |
| 158 | VNWYQQLPGTAPKLLIY | FR L2 | D1F6 |
| 159 | QRPSGVPDRFSGSKSGTSASLAISGLQSEDEADYYC | FR L3 | D1F6 |
| 160 | FGTGTKVTVL | FR L4 | D1F6 |

Example 7: Nucleic Acid Sequences Encoding Heavy Chain Variable Domains and Light Chain Variable Domains for Anti-IL1Rap Antibody Clones Table 7. Nucleic acid sequences encoding heavy chain variable domains and light chain variable domains of IL1RAP antibodies provided herein.

| IL1RAP Antibody Clone ID | Fragment | SEQ ID NO. | Sequence |
|---|---|---|---|
| D1A4 | VH | 161 | CCAGGTCCGCTGGTGCAGTCTGGAGCTGAGGTGAAGAAGCCTGGGGCCTCAGTGAAGGTCTCCTGCACAACCTCTGGATTCCCCTTTAACATGTATGGTTTCAACTGGGTGCGACAGGCCCCTGGACAAGGTCTTGAGTGGATGGGATGGATCAGCGCTTACAATGGTCGCACAAATTATGCACAGAAGTTCCAGGGCAGAGTCACCATGACCACAGACACATCCACGAGCACATCTTATGTGGAACTGGAGAGCCTCACATCTGACGACACGGCCGTTTATTACTGTGCGAGGAGCGGAAAGCAGCAGCTGGGTTCCGCGCAACCTCTTGACTCGTGGGGCCAGGGAACCCTGATCATCGTCTCTTCAG |
| D1A4 | VL | 162 | AATTTTATGCTGACTCAGCCACCCTCAGCGTCTGGGACCCCCGGGCAGAGGGTCACCATCTCTTGTTCTGGAAGCAGCTCCAACATCGGAAGTAATACTGTAAACTGGTACCAGCAGCTCCCAGGAACGGCCCCCAAACTCCTCATCTATAGTAATAATCAGCGGCCCTCAGGGGTCCCTGACCGATTCTCTGGCTCCAAGTCTGGCACCTCAGCCTCCCTGGCCATCAGTGGGCTCCAGTCTGAGGATGAGGCTGATTATTACTGTGCAGCATGGGATGACAGCCTGAATGGCCTATTCGGCGGAGGGACCAAGCTGACCGTCCTA |

-continued

| IL1RAP Antibody Clone ID | Fragment | SEQ ID NO. | Sequence |
|---|---|---|---|
| 1C7 | VH | 163 | CAGGTGCAGCTGGTGCAGTCTGGAGCAGAGGT GAAAAAGCCCGGGGAGTCTCTGAAGATCTCCT GTAAGGCTTCTGGATATCGCTTTACCGACTAT TGGATCGGCTGGGTGCGCCAGATGCCCGGGAA AGGCCTGGAGTGGATGGGGATCATCTATCTTG GTGACTCTGAAACCATATACAGTCCGTCCTTC CAAGGCCAGGTCACCATCTCAGCCGACAAGTC CATCAGCACCGCCTTCCTGCAGTTGACCAGCC TGAAGGCCTCGGACAGCGCCATTTATTCCTGT GCGAGAGGATTCGCTTATGGGACTGGTACTT CGATCTCTGGGGCCGTGGCACCCTGGTCATCG TCTC |
| 1C7 | VL | 164 | AACATCCAGATGACCCAGTCTCCATCTTCTGT GTCTGCATCTGTAGGAGACAGAGTCACCATCA CTTGTCGGGCGAGTCAGGGTATTGCCGGCTGG TTAGCCTGGTATCAGCAGAAACCTGGGAAACG CCCTAACCTCCTGATCTATGCTGCATCCACTT TGCAAAGTGGGGTCCCATCAAGGTTCAGTGGC AGTGGATCTGGGACAGATTTCACTCTCACCAT CAGCAGTCTGCAACCTGAAGATTTTGCAACTT ACTACTGTCAACAGAGTTCCAGTACCCCTCAC ACTTTTGGCCAGGGGACCAAGCTGGAGATCAA AC |
| 1D5 | VH | 165 | ATACAGCTTTAGCAGCCACTGGATCGGCTGGG TGCGCCAGATGCCCGGGAAAGGCCTGGAGTGG ATGGGGATCATCTATCCTGGTGACTCTGATAC CAGATACAGTCCGTCCTTCCAAGGCCAGGTCA CCATCTCAGCCGACAAGTCCATCAGCACCGCC TACCTGCAGTGGAGTAGCCTGAAGGCCTCGGA CACCGCCATGTATTATTGTGCGAGAGGGGAGT TACCGGGAGAGGCGTACTACTTTGACAACTGG GGCCAGGGAACCCTGGTCACCGTCTCCTCAG |
| 1D5 | VL | 166 | GAAATTGTAATGACACAGTCTCCACTCTCCCT GCCCGTCACCCCTGGAGAGCCGGCCTCCATCT CCTGCAGGTCTAGTCAGAGCCTCCTGCATAGT AATGGATACAAGTATTTGGATTGGTATCTGCA GAAGCCAGGGCAGTCTCCACAGCTCCTGATCT ACTTGGGCTCTAATCGGGCCTCCGGGGTCCCT GACAGGTTCAGTGGCAGTGGATCAGGCACAGA TTTTACACTGAAAATCAGCAGAGTGGAGGCTG AGGATGTTGGGGTTTATTACTGCATGCAAGCT CTACAAACTCCTCTCACTTTCGGCGGAGGGAC CAAGGTGGAGATCAAA |
| 2E12 | VH | 167 | CCAGGTGCAGCTGCAGGAGTCGGGGGAGGCTT AGTTCAGCCTGGGGGGTCCCTGAGACTCTCCT GTGAAGCCTCTGGATTCACCTTCAGTAGGTAC TGGATGCACTGGGTCCGCCAAGCTCCAGGGAA GGGGCTGGTGTGGGTCTCACGTATTCATACTG ATGGGAGTAGCATAAGTTATGCGGACTCCGTG AAGGGCCGATTCACCATCTCCAGAGACAACGC CAAGAACACGCTGTATCTGCAAATGAACAGTC TGAGAGCCGAGGACACGGCTGTGTATTACTGT GCAAGAGATATAGGGGTGGATACAGCTATGG TTCGGTTGACTACTGGGGCCAGGGAACCCTGG TCACCGTCTCCTCAG |
| 2E12 | VL | 168 | CAGCCTGTGCTGACTCAATCACCCTCTGTGTC AGTGGCCCCAGGAAAGACGACCAGGATTACCT GTGGGGGAGACAACATTGGAAGTAAAAGTGTG CACTGGTTCCAGCAGAAGCCAGGCCAGGCCCC TGTCCTGGTCGTCTTTGGTGGTGGCGACCGGC CCTCAGGGATCCCTGAGCGATTCTCTGGCTCC AACTCTGGGAATACGGCCACCCTAATCATCAG TGGGGTCGAAGGCGGGATGAGGCCGACTATT ACTGTCAGGTTTGGGATGGTAGTACTGATCAT TATATCTTCGGAGCTGGGACCATGGTCACCGT CCTA |
| 1A7 | VH | 169 | CAGGTGAAGCTGGTGGAGTCTGGACCTGAGGT GAAGAAGCCTGGGGCCTCAGTGAAGGTCTCCT GCAAGGCTTCTGATTACACCTTTACCAGTTAT |

-continued

| IL1RAP Antibody Clone ID | Fragment | SEQ ID NO. | Sequence |
|---|---|---|---|
| | | | GGTATCAGCTGGGTGCGGCTGGCCCCTGGACA AGGGCTTGAGTGGATGGGATGGATCAGCGCTT ACAATGGTAACACAAACTATCCACAGAAGCTC CAGGGCAGAGTCACCGTGACCACAGACACATC CACGAGCACAGCCTACATGGAGCTGAGGAGCC TGACATCTGACGACACGGCCGTGTATTACTGT GCGAGAGTCCATCCCCGCCACATAATCGGGGC GGGGTACTTTGACTACTGGGGCCAGGGGACAA TGGTCACCGTCTCCTCAG |
| 1A7 | VL | 170 | CTGCCTGTGCTGACTCAGCCTCGCTCAGTGGC CGGGTCTCCTGGACAGTCAGTCACCATCTCCT GCACTGGGTCCAGCAGTGATGTTGGTGTTTAT GACTATGTCTCCTGGTACCAACAACACCCCGG CAAAGTCCCCCGACTCATGATTTATGATGTCA GTAAGCGGCCCCAGGGGTCCCGGATCGCTTC TCTGGCTCCAGGTCTGGAAACACGGCCTCCCT GACCATCTCTGGCCTCCAGACTGAGGATGAGG CTGATTATTaCtgCGCCTACACCTTTGTCTTC GGAACTGGGACCAATGTCTCCGTCCTA |
| 1B8 | VH | 171 | CCCAGTTTCGTGGTGCAGTCTGGGGCTGAGGT GAAGAAGCCTGGGGCCTCAGTGAAGGTTTCCT GCAAGGCATCTGGATACACCTTCACCAGCTAC TATATGCACTGGGTGCGACAGGCCCCTGGACA AGGGCTTGAGTGGATGGGAATAATCAACCCTA GTGGTGGTAGCACAAGCTACGCACAGAAGTTC CAGGGCAGAGTCCCCATGACCAGGGACACGTC CACGAGCACAGTCTACCTGGAGCTGAACAGCC TGAGATCTGAGGACACGGCCGTGTATTACTGT GCTATTTTTGCCCCACCGGACTACGGTGACTA CGTTGATGCTTTTGATATCTGGGGCCAAGGGA CATTGATCATCGTCTCTTCA |
| 1B8 | VL | 172 | GATGTTGTGATGACACAGTCTCCACTCTCCCT GCCCGTCACCCCTGGAGAGCCGGCCTCCATCT CCTGCAGGTCTAGTCAGAGCCTCCTGCATAGT AATGGATACAACTATTTGGATTGGTACCTGCA GAAGCCAGGGCAGTCTCCACAGCTCCTGATCT ATTTGGGTTCTAATCGGGCCTCCGGGGTCCCT GACAGGTTCAGTGGCAGTGGATCAGGCACAGA TTTTACACTGAAAATCAGCAGAGTGGAGGCTG AGGATGTTGGGGTTTATTACTGCATGCAAGCT CTACAAACTCCTCGAGGGACCAAGGTGGAGAT CAAA |
| 1A12 | VL | 173 | CAGTCTGCCCTGAATCAGCCTCCCTCCGCGTC CGGGTCTCCTGGACAGGCAGTCACCATCTCCT GCACTGGCTCCAGCGGCGACATTGGGTTTTAT AATTATGTCTCGTGGTACCAGCAGCACCCAGG CAAGGCCCCCAAACTCCTGATCTTTGAGGTCA ATCAGCGACCCTCAGGGGTCCCTGATCGCTTC TCAGGGTCCAGGTCTGGCAGCACGGCCTCCCT GACCGTCTCGGGGCTCCAGGCTGACGATGAGG CTGACTATTACTGCGTCTCATATGGAATTTCC GACACTGTTCTTTTCGGCGGAGGCACCAGGTT GACCGTCCTAG |
| 1A5 | VL | 174 | CAGTCTGCCCTGACTCAGCCTCCCTCCGCGTC CGGGTCTCCTGGACAGGCAGTCACCATCTCCT GCACTGGCTCCAGCGGCGACATTGGGTTTTAT AATTATGTCTCCTGGTACCAGCAACACCCAGG CAAAGCCCCCAAACTCCTCATCTTTGAGGTCA ATCAGCGACCCTCAGGGGTCCCTGATCGCTTC TCTGGCTCCAAGTCTGGCACCACGGCCTCCCT CACCGTCTCGGGACTCCAGGCTGACGATGAGG CTCACTATTACTGCGTCTCATATGGAATCTCC GACACTGTTCTTTTCGGCGGAGGCACCAAGTT GACCGTCCTAG |
| 1A6 | VL | 175 | CAGTCTGTGCTGACTCAGCCACCCTCAGCGTC TGGGACCCCCGGGCAGAGGGTCACCTTCTCTT GTTCTGGAAGCATCTCCAACATCGGGAGTAAT GCTGTAAACTGGTACCAGCAGCTCCCAGGAAC GGCCCCCAGTCTCCTCATCTATAGTGATAATC |

-continued

| IL1RAP Antibody Clone ID | Fragment | SEQ ID NO. | Sequence |
|---|---|---|---|
| | | | AGCGGCCCTCAGGGGTCCCTGACCGATTCTCT<br>GGCTCCAAGTCTGGCACCTCAGCCTCCCTGGC<br>CATCAGTGGGCTCCAGTCTGAGGATGAGGCTG<br>ATTATTACTGTGCAGCATGGGATGACAGCCTG<br>AATGGTAATGTCTTCGGAACTGGGACCAAGGT<br>CACCGTCCTAG |
| 1A1 | VL | 176 | CAGTCTGTGCTGACGCAGCCGCCCTCAGTGTC<br>TGGGGCCCCAGGGCAGAGGGTCACCATCTCTT<br>GTTCTGGAAGCAGCTCCAACATCGGAATTAAT<br>GCTGTAAACTGGTACCAGCAGGTCCCAGGAAC<br>GGCCCCCAAACTCCTCATGTATAGTAATGATC<br>AGCGGCCCTCAGGGGTCCCTGCCCGATTTTCT<br>GGCTCCAAGTCCGGCACCTCAGCCTCCCTGGC<br>CATCAGTGGGCTCCAGTCTGAGGATGAGGCTG<br>ATTATTACTGTGCAGCATGGGATGACAGCCTG<br>AATGCCAATGTCTTCGGAACCGGGACCAAGGT<br>CACCGTCCTAG |
| 1A4 | VL | 177 | CAGTCTGTGCTGACTCAGTCACCCTCAGCGTC<br>TGGGACCCCCGGGCAGAGGGTCACCATCTCTT<br>GCTCAGGAAGCAGCTCCAACATCGGAAGTAAT<br>CCTGTAAACTGGTACCAACAGCTCCCAGGAAC<br>GGTCCCCACACTCCTCATCTTTAATACTGGTC<br>AGCGGCCCTCAGGGGTCCCTGACCGATTCTCT<br>GGCTCCAGGTCTGGCACCTCAGCCTCCCTGGC<br>CATCAGTGGGCTCCAGTCTGAGGATGAGGCTG<br>ACTATTACTGTGCAGCATGGGATGACCGCCTG<br>AATGGTAATGTCTTCGGAACTGGGACCAAGGT<br>CACCGTCCTAG |
| D1A11 | VL | 178 | GACATCGTGATGACCCAGTCTCCATCCTCCCT<br>GTCTGCATCTGTAGGAGACAGAGTGACCATCA<br>CTTGCCGGGCAAGCAGAGCGTTAACAATTTT<br>TTAAATTGGTATCAACACAGACCAGGGAAAGC<br>CCCTAAGCTCCTGATCTATGCTGTATCCAGTT<br>TGCAAAGTGGGGTCCCATCAAGGTTCAGTGGC<br>AGTGGATTTGGGACAGATTTCACTCTCACCAT<br>CAGCAGTCTGCAACCTGAAGATTTTGCAACTT<br>ATTATTGTCAACAGAGTTCCAGTGCCCCTAAC<br>ACTTTTGGCCAGGGGACCAAGCTGGAGATCAA<br>A |
| 1E12 | VL | 179 | AATTTTATGCTGACTCAGCCACACTCTGTGTC<br>GGAGTCTCCGGGGAAGACGGTGACCATCTCCT<br>GCACCCGCAGCAGTGGCAGCGTTGGCGAATAT<br>TATGTGCAGTGGTACCAACACCGCCCGGGCAG<br>TATTCCCACCTTTGTCATCTATGAGGACTACA<br>AAAGACCCTCTGGGGTCCCTGTTCGGTTTTCT<br>GGCTCTGTCGACAGCGCCTCCAACTCCGCCAC<br>CCTCATCATCTCTGGGCTGATACCTGAGGACG<br>AGGCTGACTACTACTGTCAGTCTTATGATGGC<br>TCCAACTTTGTCTTCGGAACTGGGACCAGGGT<br>CACCGTCCTA |
| D1F6 | VL | 180 | CAGGCTGTGCTGACTCAGCCACCCTCAGCGTC<br>TGGGACCCCCGGGCAGAGGGTCACCATCTCTT<br>GTTCTGGAAGCGGCTCCAACATCGGAATTAAT<br>CCTGTAAACTGGTACCAGCAGCTCCCAGGAAC<br>GGCCCCCAAACTCCTCATCTATAGTGATGATC<br>AGCGGCCCTCAGGGGTCCCTGACCGATTCTCT<br>GGCTCCAAGTCTGGCACCTCAGCCTCCCTGGC<br>CATTAGTGGGCTCCAGTCTGAGGATGAGGCTG<br>ATTATTACTGTGCAGCATGGGATGACAGCCTG<br>AATGGTCCGGGGAATGTCTTCGGAACTGGGAC<br>CAAGGTCACCGTCCTA |

EMBODIMENTS

Embodiment 1. An anti-interleukin-1 receptor accessory protein (IL1RAP) antibody comprising a heavy chain variable domain and a light chain variable domain,
  wherein said heavy chain variable domain comprises:
    a CDR H1 as set forth in SEQ ID NO:1, a CDR H2 as set forth in SEQ ID NO:2 and a CDR H3 as set forth in SEQ ID NO:3; and
  wherein said light chain variable domain comprises:
CDR L1 as set forth in SEQ ID NO:4, a CDR L2 as set forth in SEQ ID NO:5, and a CDR L3 as set forth in SEQ ID NO:6.

Embodiment 2. The antibody of embodiment 1, wherein said heavy chain variable domain comprises the sequence of SEQ ID NO:61.

Embodiment 3. The antibody of embodiment 1 or 2, wherein said light chain variable domain comprises the sequence of SEQ ID NO:62.

Embodiment 4. The antibody of any one of embodiments 1-3, wherein said heavy chain variable domain comprises a FR H1 as set forth in SEQ ID NO:81, a FR H2 as set forth in SEQ ID NO:82, a FR H3 as set forth in SEQ ID NO:83 and a FR H4 as set forth in SEQ ID NO:84.

Embodiment 5. The antibody of any one of embodiments 1 to 4, wherein said light chain variable domain comprises a FR L1 as set forth in SEQ ID NO:85, a FR L2 as set forth in SEQ ID NO:86, a FR L3 as set forth in SEQ ID NO:87 and a FR L4 as set forth in SEQ ID NO:88.

Embodiment 6. An isolated nucleic acid encoding an antibody of any one of embodiments 1 to 5.

Embodiment 7. A pharmaceutical composition comprising a therapeutically effective amount of an antibody of any one of embodiments 1 to 5 and a pharmaceutically acceptable excipient.

Embodiment 8. A method of treating cancer in a subject in need thereof, said method comprising administering to a subject a therapeutically effective amount of an antibody of any one of embodiments 1 to 5, thereby treating cancer in said subject.

Embodiment 9. A recombinant protein comprising:
  (i) an antibody region comprising:
    (a) a heavy chain variable domain comprising a CDR H1 as set forth in SEQ ID NO:1, a CDR H2 as set forth in SEQ ID NO:2 and a CDR H3 as set forth in SEQ ID NO:3; and
    (b) a light chain variable domain comprising a CDR L1 as set forth in SEQ ID NO:4, a CDR L2 as set forth in SEQ ID NO:5, and a CDR L3 as set forth in SEQ ID NO:6; and
  (ii) a transmembrane domain.

Embodiment 10. The recombinant protein of embodiment 9, wherein said heavy chain variable domain comprises the sequence of SEQ ID NO: 61.

Embodiment 11. The recombinant protein of embodiment 9 or 10, wherein said light chain variable domain comprises the sequence of SEQ ID NO:62.

Embodiment 12. The recombinant protein of any one of embodiments 9 to 11, wherein said heavy chain variable domain comprises a FR H1 as set forth in SEQ ID NO:81, a FR H2 as set forth in SEQ ID NO:82, a FR H3 as set forth in SEQ ID NO:83 and a FR H4 as set forth in SEQ ID NO:84.

Embodiment 13. The recombinant protein of any one of embodiments 9 to 12, wherein said light chain variable domain comprises a FR L1 as set forth in SEQ ID NO:85, a FR L2 as set forth in SEQ ID NO:86, a FR L3 as set forth in SEQ ID NO:87 and a FR L4 as set forth in SEQ ID NO:88.

Embodiment 14. The recombinant protein of any one of embodiments 9 to 13, further comprising an intracellular co-stimulatory signaling domain.

Embodiment 15. The recombinant protein of any one of embodiments 9 to 14, further comprising an intracellular T-cell signaling domain.

Embodiment 16. The recombinant protein of any one of embodiments 9 to 15, further comprising a self-cleaving peptidyl sequence.

Embodiment 17. An isolated nucleic acid encoding a recombinant protein of any one of embodiments 9 to 16.

Embodiment 18. A pharmaceutical composition comprising a therapeutically effective amount of a recombinant protein of any one of embodiments 9 to 16 and a pharmaceutically acceptable excipient.

Embodiment 19. A method of treating cancer in a subject in need thereof, said method comprising administering to a subject a therapeutically effective amount of a recombinant protein of any one of embodiments 9 to 16, thereby treating cancer in said subject.

Embodiment 20. A recombinant protein comprising:
  (i) a first antibody region capable of binding an effector cell ligand; and
  (ii) a second antibody region, comprising:
    (a) a heavy chain variable domain comprising a CDR H1 as set forth in SEQ ID NO:1, a CDR H2 as set forth in SEQ ID NO:2 and a CDR H3 as set forth in SEQ ID NO:3; and
    (b) a light chain variable domain comprising a CDR L1 as set forth in SEQ ID NO:4, a CDR L2 as set forth in SEQ ID NO:5, and a CDR L3 as set forth in SEQ ID NO:6.

Embodiment 21. The recombinant protein of embodiment 20, wherein said heavy chain variable domain comprises the sequence of SEQ ID NO:61.

Embodiment 22. The recombinant protein of embodiment 20 or 21, wherein said light chain variable domain comprises the sequence of SEQ ID NO:62.

Embodiment 23. The recombinant protein of any one of embodiments 20 to 22, wherein said heavy chain variable domain comprises a FR H1 as set forth in SEQ ID NO:81, a FR H2 as set forth in SEQ ID NO:82, a FR H3 as set forth in SEQ ID NO:83 and a FR H4 as set forth in SEQ ID NO:84.

Embodiment 24. The recombinant protein of any one of embodiments 20 to 23, wherein said light chain variable domain comprises a FR L1 as set forth in SEQ ID NO:85, a FR L2 as set forth in SEQ ID NO:86, a FR L3 as set forth in SEQ ID NO:87 and a FR L4 as set forth in SEQ ID NO:88.

Embodiment 25. The recombinant protein of any one of embodiments 20 to 24, wherein said effector cell ligand is a CD3 protein.

Embodiment 26. A pharmaceutical composition comprising a therapeutically effective amount of a recombinant protein of any one of embodiments 20 to 25 and a pharmaceutically acceptable excipient.

Embodiment 27. A method of treating cancer in a subject in need thereof, said method comprising administering to a subject a therapeutically effective amount of a recombinant protein of any one of embodiments 20 to 25, thereby treating cancer in said subject.

Embodiment 28. An anti-interleukin-1 receptor accessory protein (IL1RAP) antibody comprising a heavy chain variable domain and a light chain variable domain,
wherein said heavy chain variable domain comprises:
a CDR H1 as set forth in SEQ ID NO:7, a CDR H2 as set forth in SEQ ID NO:8 and a CDR H3 as set forth in SEQ ID NO:9; and
wherein said light chain variable domain comprises:
a CDR L1 as set forth in SEQ ID NO:10, a CDR L2 as set forth in SEQ ID NO:11, and a CDR L3 as set forth in SEQ ID NO:12.

Embodiment 29. The antibody of embodiment 28, wherein said heavy chain variable domain comprises the sequence of SEQ ID NO:63.

Embodiment 30. The antibody of embodiment 28 or 29, wherein said light chain variable domain comprises the sequence of SEQ ID NO:64.

Embodiment 31. The antibody of any one of embodiments 28 to 30, wherein said heavy chain variable domain comprises a FR H1 as set forth in SEQ ID NO:89, a FR H2 as set forth in SEQ ID NO:90, a FR H3 as set forth in SEQ ID NO:91 and a FR H4 as set forth in SEQ ID NO:92.

Embodiment 32. The antibody of any one of embodiments 28 to 31, wherein said light chain variable domain comprises a FR L1 as set forth in SEQ ID NO:93, a FR L2 as set forth in SEQ ID NO:94, a FR L3 as set forth in SEQ ID NO:95 and a FR L4 as set forth in SEQ ID NO:96.

Embodiment 33. An isolated nucleic acid encoding an antibody of any one of embodiments 28 to 32.

Embodiment 34. A pharmaceutical composition comprising a therapeutically effective amount of an antibody of any one of embodiments 28 to 32 and a pharmaceutically acceptable excipient.

Embodiment 35. A method of treating cancer in a subject in need thereof, said method comprising administering to a subject a therapeutically effective amount of an antibody of any one of emobodiments 28-32, thereby treating cancer in said subject.

Embodiment 36. A recombinant protein comprising:
(i) an antibody region comprising:
(a) a heavy chain variable domain comprising a CDR H1 as set forth in SEQ ID NO:7, a CDR H2 as set forth in SEQ ID NO:8 and a CDR H3 as set forth in SEQ ID NO:9; and
(b) a light chain variable domain comprising a CDR L1 as set forth in SEQ ID NO:10, a CDR L2 as set forth in SEQ ID NO:11, and a CDR L3 as set forth in SEQ ID NO:12; and
(ii) a transmembrane domain.

Embodiment 37. The recombinant protein of embodiment 36, wherein said heavy chain variable domain comprises the sequence of SEQ ID NO: 63.

Embodiment 38. The recombinant protein of embodiment 36 or 37, wherein said light chain variable domain comprises the sequence of SEQ ID NO:64.

Embodiment 39. The recombinant protein of any one of embodiments 36 to 38, wherein said heavy chain variable domain comprises a FR H1 as set forth in SEQ ID NO:89, a FR H2 as set forth in SEQ ID NO:90, a FR H3 as set forth in SEQ ID NO:91 and a FR H4 as set forth in SEQ ID NO:92.

Embodiment 40. The recombinant protein of any one of embodiments 36 to 39, wherein said light chain variable domain comprises a FR L1 as set forth in SEQ ID NO:93, a FR L2 as set forth in SEQ ID NO:94, a FR L3 as set forth in SEQ ID NO:95 and a FR L4 as set forth in SEQ ID NO:96.

Embodiment 41. The recombinant protein of any one of embodiments 36 to 40, further comprising an intracellular co-stimulatory signaling domain.

Embodiment 42. The recombinant protein of any one of embodiments 36 to 41, further comprising an intracellular T-cell signaling domain.

Embodiment 43. The recombinant protein of any one of embodiments 36 to 42, further comprising a self-cleaving peptidyl sequence.

Embodiment 44. An isolated nucleic acid encoding a recombinant protein of any one of embodiments 36 to 43.

Embodiment 45. A pharmaceutical composition comprising a therapeutically effective amount of a recombinant protein of any one of embodiments 36 to 43 and a pharmaceutically acceptable excipient.

Embodiment 46. A method of treating cancer in a subject in need thereof, said method comprising administering to a subject a therapeutically effective amount of a recombinant protein of any one of embodiments 36 to 43, thereby treating cancer in said subject.

Embodiment 47. A recombinant protein comprising:
(i) a first antibody region capable of binding an effector cell ligand; and
(ii) a second antibody region, comprising:
(a) a heavy chain variable domain comprising a CDR H1 as set forth in SEQ ID NO:7, a CDR H2 as set forth in SEQ ID NO:8 and a CDR H3 as set forth in SEQ ID NO:9; and
(b) a light chain variable domain comprising a CDR L1 as set forth in SEQ ID NO:10, a CDR L2 as set forth in SEQ ID NO:11, and a CDR L3 as set forth in SEQ ID NO:12.

Embodiment 48. The recombinant protein of embodiment 47, wherein said heavy chain variable domain comprises the sequence of SEQ ID NO:63.

Embodiment 49. The recombinant protein of embodiment 47 or 48, wherein said light chain variable domain comprises the sequence of SEQ ID NO:64.

Embodiment 50. The recombinant protein of any one of embodiments 47 to 49, wherein said heavy chain variable domain comprises a FR H1 as set forth in SEQ ID NO:89, a FR H2 as set forth in SEQ ID NO:90, a FR H3 as set forth in SEQ ID NO:91 and a FR H4 as set forth in SEQ ID NO:92.

Embodiment 51. The recombinant protein of any one of embodiments 47 to 50, wherein said light chain variable domain comprises a FR L1 as set forth in SEQ ID NO:93, a FR L2 as set forth in SEQ ID NO:94, a FR L3 as set forth in SEQ ID NO:95 and a FR L4 as set forth in SEQ ID NO:96.

Embodiment 52. The recombinant protein of any one of embodiments 47 to 51, wherein said effector cell ligand is a CD3 protein.

Embodiment 53. A pharmaceutical composition comprising a therapeutically effective amount of a recombinant protein of any one of embodiments 47 to 52 and a pharmaceutically acceptable excipient.

Embodiment 54. A method of treating cancer in a subject in need thereof, said method comprising administering to a subject a therapeutically effective amount of a recombinant protein of any one of embodiments 47 to 52, thereby treating cancer in said subject.

Embodiment 55. An anti-interleukin-1 receptor accessory protein (IL1RAP) antibody comprising a heavy chain variable domain and a light chain variable domain, wherein said heavy chain variable domain comprises:
  a CDR H1 as set forth in SEQ ID NO:19, a CDR H2 as set forth in SEQ ID NO:20 and a CDR H3 as set forth in SEQ ID NO:21; and
wherein said light chain variable domain comprises:
a CDR L1 as set forth in SEQ ID NO:22, a CDR L2 as set forth in SEQ ID NO:23, and a CDR L3 as set forth in SEQ ID NO:24.

Embodiment 56. The antibody of embodiment 55, wherein said heavy chain variable domain comprises the sequence of SEQ ID NO:67.

Embodiment 57. The antibody of embodiment 55 or 56, wherein said light chain variable domain comprises the sequence of SEQ ID NO:68.

Embodiment 58. The antibody of any one of embodiments 55 to 57, wherein said heavy chain variable domain comprises a FR H1 as set forth in SEQ ID NO:105, a FR H2 as set forth in SEQ ID NO:106, a FR H3 as set forth in SEQ ID NO:107 and a FR H4 as set forth in SEQ ID NO:108.

Embodiment 59. The antibody of any one of embodiments 55 to 58, wherein said light chain variable domain comprises a FR L1 as set forth in SEQ ID NO:109, a FR L2 as set forth in SEQ ID NO:110, a FR L3 as set forth in SEQ ID NO:111 and a FR L4 as set forth in SEQ ID NO:112.

Embodiment 60. An isolated nucleic acid encoding an antibody of any one of embodiments 55 to 59.

Embodiment 61. A pharmaceutical composition comprising a therapeutically effective amount of an antibody of any one of embodiments 55 to 59 and a pharmaceutically acceptable excipient.

Embodiment 62. A method of treating cancer in a subject in need thereof, said method comprising administering to a subject a therapeutically effective amount of an antibody of any one of embodiments 55 to 59, thereby treating cancer in said subject.

Embodiment 63. A recombinant protein comprising:
  (i) an antibody region comprising:
    (a) a heavy chain variable domain comprising a CDR H1 as set forth in SEQ ID NO:19, a CDR H2 as set forth in SEQ ID NO:20 and a CDR H3 as set forth in SEQ ID NO:21; and
    (b) a light chain variable domain comprising a CDR L1 as set forth in SEQ ID NO:22, a CDR L2 as set forth in SEQ ID NO:23, and a CDR L3 as set forth in SEQ ID NO:24; and
  (ii) a transmembrane domain.

Embodiment 64. The recombinant protein of embodiment 63, wherein said heavy chain variable domain comprises the sequence of SEQ ID NO: 67.

Embodiment 65. The recombinant protein of embodiment 63 or 64, wherein said light chain variable domain comprises the sequence of SEQ ID NO:68.

Embodiment 66. The recombinant protein of any one of embodiments 63 to 65, wherein said heavy chain variable domain comprises a FR H1 as set forth in SEQ ID NO:105, a FR H2 as set forth in SEQ ID NO:106, a FR H3 as set forth in SEQ ID NO:107 and a FR H4 as set forth in SEQ ID NO:108.

Embodiment 67. The recombinant protein of any one of embodiments 63 to 66, wherein said light chain variable domain comprises a FR L1 as set forth in SEQ ID NO:109, a FR L2 as set forth in SEQ ID NO:110, a FR L3 as set forth in SEQ ID NO:111 and a FR L4 as set forth in SEQ ID NO:112.

Embodiment 68. The recombinant protein of any one of embodiments 63 to 67, further comprising an intracellular co-stimulatory signaling domain.

Embodiment 69. The recombinant protein of any one of embodiments 63 to 68, further comprising an intracellular T-cell signaling domain.

Embodiment 70. The recombinant protein of any one of embodiments 63 to 69, further comprising a self-cleaving peptidyl sequence.

Embodiment 71. An isolated nucleic acid encoding a recombinant protein of any one of embodiments 63 to 70.

Embodiment 72. A pharmaceutical composition comprising a therapeutically effective amount of a recombinant protein of any one of embodiments 63 to 70 and a pharmaceutically acceptable excipient.

Embodiment 73. A method of treating cancer in a subject in need thereof, said method comprising administering to a subject a therapeutically effective amount of a recombinant protein of any one of embodiments 63 to 70, thereby treating cancer in said subject.

Embodiment 74. A recombinant protein comprising:
  (i) a first antibody region capable of binding an effector cell ligand; and
  (ii) a second antibody region, comprising:
    (a) a heavy chain variable domain comprising a CDR H1 as set forth in SEQ ID NO:19, a CDR H2 as set forth in SEQ ID NO:20 and a CDR H3 as set forth in SEQ ID NO:21; and
    (b) a light chain variable domain comprising a CDR L1 as set forth in SEQ ID NO:22, a CDR L2 as set forth in SEQ ID NO:23, and a CDR L3 as set forth in SEQ ID NO:24.

Embodiment 75. The recombinant protein of embodiment 74, wherein said heavy chain variable domain comprises the sequence of SEQ ID NO:67.

Embodiment 76. The recombinant protein of embodiment 74 or 75, wherein said light chain variable domain comprises the sequence of SEQ ID NO:68.

Embodiment 77. The recombinant protein of any one of embodiments 74 to 76, wherein said heavy chain variable domain comprises a FR H1 as set forth in SEQ ID NO:105, a FR H2 as set forth in SEQ ID NO:106, a FR H3 as set forth in SEQ ID NO:107 and a FR H4 as set forth in SEQ ID NO:108.

Embodiment 78. The recombinant protein of any one of embodiments 74 to 77, wherein said light chain variable domain comprises a FR L1 as set forth in SEQ ID NO:109, a FR L2 as set forth in SEQ ID NO:110, a FR L3 as set forth in SEQ ID NO:111 and a FR L4 as set forth in SEQ ID NO:112.

Embodiment 79. The recombinant protein of any one of embodiments 74 to 78, wherein said effector cell ligand is a CD3 protein.

Embodiment 80. A pharmaceutical composition comprising a therapeutically effective amount of a recombinant protein of any one of embodiments 74 to 79 and a pharmaceutically acceptable excipient.

Embodiment 81. A method of treating cancer in a subject in need thereof, said method comprising administering to a subject a therapeutically effective amount of a recombinant protein of any one of embodiments 74 to 79, thereby treating cancer in said subject.

Embodiment 82. An anti-interleukin-1 receptor accessory protein (IL1RAP) antibody comprising a heavy chain variable domain and a light chain variable domain,
wherein said heavy chain variable domain comprises:
  a CDR H1 as set forth in SEQ ID NO:25, a CDR H2 as set forth in SEQ ID NO:26 and a CDR H3 as set forth in SEQ ID NO:27; and wherein said light chain variable domain comprises:
a CDR L1 as set forth in SEQ ID NO:28, a CDR L2 as set forth in SEQ ID NO:29, and a CDR L3 as set forth in SEQ ID NO:30.

Embodiment 83. The antibody of embodiment 82, wherein said heavy chain variable domain comprises the sequence of SEQ ID NO:69.

Embodiment 84. The antibody of embodiment 82 or 83, wherein said light chain variable domain comprises the sequence of SEQ ID NO:70.

Embodiment 85. The antibody of any one of embodiments 82 to 84, wherein said heavy chain variable domain comprises a FR H1 as set forth in SEQ ID NO:113, a FR H2 as set forth in SEQ ID NO:114, a FR H3 as set forth in SEQ ID NO:115 and a FR H4 as set forth in SEQ ID NO:116.

Embodiment 86. The antibody of any one of embodiments 82 to 85, wherein said light chain variable domain comprises a FR L1 as set forth in SEQ ID NO:117, a FR L2 as set forth in SEQ ID NO:118, a FR L3 as set forth in SEQ ID NO:119 and a FR L4 as set forth in SEQ ID NO:120.

Embodiment 87. An isolated nucleic acid encoding an antibody of any one of embodiments 82 to 86.

Embodiment 88. A pharmaceutical composition comprising a therapeutically effective amount of an antibody of any one of embodiments 82 to 86 and a pharmaceutically acceptable excipient.

Embodiment 89. A method of treating cancer in a subject in need thereof, said method comprising administering to a subject a therapeutically effective amount of an antibody of any one of embodiments 82 to 86, thereby treating cancer in said subject.

Embodiment 90. A recombinant protein comprising:
(i) an antibody region comprising:
  (a) a heavy chain variable domain comprising a CDR H1 as set forth in SEQ ID NO:25, a CDR H2 as set forth in SEQ ID NO:26 and a CDR H3 as set forth in SEQ ID NO:27; and
  (b) a light chain variable domain comprising a CDR L1 as set forth in SEQ ID NO:28, a CDR L2 as set forth in SEQ ID NO:29, and a CDR L3 as set forth in SEQ ID NO:30; and
(ii) a transmembrane domain.

Embodiment 91. The recombinant protein of embodiment 90, wherein said heavy chain variable domain comprises the sequence of SEQ ID NO: 69.

Embodiment 92. The recombinant protein of embodiment 90 or 91, wherein said light chain variable domain comprises the sequence of SEQ ID NO:70.

Embodiment 93. The recombinant protein of any one of embodiments 90 to 92, wherein said heavy chain variable domain comprises a FR H1 as set forth in SEQ ID NO:113, a FR H2 as set forth in SEQ ID NO:114, a FR H3 as set forth in SEQ ID NO:115 and a FR H4 as set forth in SEQ ID NO:116.

Embodiment 94. The recombinant protein of any one of embodiments 90 to 93, wherein said light chain variable domain comprises a FR L1 as set forth in SEQ ID NO:117, a FR L2 as set forth in SEQ ID NO:118, a FR L3 as set forth in SEQ ID NO:119 and a FR L4 as set forth in SEQ ID NO:120.

Embodiment 95. The recombinant protein of any one of embodiments 90 to 94, further comprising an intracellular co-stimulatory signaling domain.

Embodiment 96. The recombinant protein of any one of embodiments 90 to 95, further comprising an intracellular T-cell signaling domain.

Embodiment 97. The recombinant protein of any one of embodiments 90 to 96, further comprising a self-cleaving peptidyl sequence.

Embodiment 98. An isolated nucleic acid encoding a recombinant protein of any one of embodiments 90 to 97.

Embodiment 99. A pharmaceutical composition comprising a therapeutically effective amount of a recombinant protein of any one of embodiments 90 to 97 and a pharmaceutically acceptable excipient.

Embodiment 100. A method of treating cancer in a subject in need thereof, said method comprising administering to a subject a therapeutically effective amount of a recombinant protein of any one of embodiments 90 to 97, thereby treating cancer in said subject.

Embodiment 101. A recombinant protein comprising:
(i) a first antibody region capable of binding an effector cell ligand; and
(ii) a second antibody region, comprising:
  (a) a heavy chain variable domain comprising a CDR H1 as set forth in SEQ ID NO:25, a CDR H2 as set forth in SEQ ID NO:26 and a CDR H3 as set forth in SEQ ID NO:27; and
  (b) a light chain variable domain comprising a CDR L1 as set forth in SEQ ID NO:28, a CDR L2 as set forth in SEQ ID NO:29, and a CDR L3 as set forth in SEQ ID NO:30.

Embodiment 102. The recombinant protein of embodiment 101, wherein said heavy chain variable domain comprises the sequence of SEQ ID NO:69.

Embodiment 103. The recombinant protein of embodiment 101 or 102, wherein said light chain variable domain comprises the sequence of SEQ ID NO:70.

Embodiment 104. The recombinant protein of any one of embodiments 101 to 103, wherein said heavy chain variable domain comprises a FR H1 as set forth in SEQ ID NO:113, a FR H2 as set forth in SEQ ID NO:114, a FR H3 as set forth in SEQ ID NO:115 and a FR H4 as set forth in SEQ ID NO:116.

Embodiment 105. The recombinant protein of any one of embodiments 101 to 204, wherein said light chain variable domain comprises a FR L1 as set forth in SEQ ID NO:117, a FR L2 as set forth in SEQ ID NO:118, a FR L3 as set forth in SEQ ID NO:119 and a FR L4 as set forth in SEQ ID NO:120.

Embodiment 106. The recombinant protein of any one of embodiments 101 to 105, wherein said effector cell ligand is a CD3 protein.

Embodiment 107. A pharmaceutical composition comprising a therapeutically effective amount of a recombinant protein of any one of embodiments 101 to 106 and a pharmaceutically acceptable excipient.

Embodiment 108. A method of treating cancer in a subject in need thereof, said method comprising administering to a subject a therapeutically effective amount of a recombinant protein of any one of embodiments 101 to 106, thereby treating cancer in said subject.

Embodiment 109. An anti-interleukin-1 receptor accessory protein (IL1RAP) antibody comprising a heavy chain variable domain and a light chain variable domain,
wherein said heavy chain variable domain comprises:
  a CDR H1 as set forth in SEQ ID NO:31, a CDR H2 as set forth in SEQ ID NO:32 and a CDR H3 as set forth in SEQ ID NO:33; and
wherein said light chain variable domain comprises:
a CDR L1 as set forth in SEQ ID NO:34, a CDR L2 as set forth in SEQ ID NO:35, and a CDR L3 as set forth in SEQ ID NO:36.

Embodiment 110. The antibody of embodiment 109, wherein said heavy chain variable domain comprises the sequence of SEQ ID NO:71.

Embodiment 111. The antibody of embodiment 109 or 110, wherein said light chain variable domain comprises the sequence of SEQ ID NO:72.

Embodiment 112. The antibody of any one of embodiments 109 to 111, wherein said heavy chain variable domain comprises a FR H1 as set forth in SEQ ID NO:121, a FR H2 as set forth in SEQ ID NO:122, a FR H3 as set forth in SEQ ID NO:123 and a FR H4 as set forth in SEQ ID NO:124.

Embodiment 113. The antibody of any one of embodiments 109 to 111, wherein said light chain variable domain comprises a FR L1 as set forth in SEQ ID NO:125, a FR L2 as set forth in SEQ ID NO:126, a FR L3 as set forth in SEQ ID NO:127 and a FR L4 as set forth in SEQ ID NO:128.

Embodiment 114. An isolated nucleic acid encoding an antibody of any one of embodiments 109 to 113.

Embodiment 115. A pharmaceutical composition comprising a therapeutically effective amount of an antibody of any one of embodiments 109 to 113 and a pharmaceutically acceptable excipient.

Embodiment 116. A method of treating cancer in a subject in need thereof, said method comprising administering to a subject a therapeutically effective amount of an antibody of any one of embodiments 109 to 113, thereby treating cancer in said subject.

Embodiment 117. A recombinant protein comprising:
(i) an antibody region comprising:
(a) a heavy chain variable domain comprising a CDR H1 as set forth in SEQ ID NO:31, a CDR H2 as set forth in SEQ ID NO:32 and a CDR H3 as set forth in SEQ ID NO:33; and
(b) a light chain variable domain comprising a CDR L1 as set forth in SEQ ID NO:34, a CDR L2 as set forth in SEQ ID NO:35, and a CDR L3 as set forth in SEQ ID NO:36; and
(ii) a transmembrane domain.

Embodiment 118. The recombinant protein of embodiment 117, wherein said heavy chain variable domain comprises the sequence of SEQ ID NO: 71.

Embodiment 119. The recombinant protein of embodiment 117 or 118, wherein said light chain variable domain comprises the sequence of SEQ ID NO:72.

Embodiment 120. The recombinant protein of any one of embodiments 117 to 119, wherein said heavy chain variable domain comprises a FR H1 as set forth in SEQ ID NO:121, a FR H2 as set forth in SEQ ID NO:122, a FR H3 as set forth in SEQ ID NO:123 and a FR H4 as set forth in SEQ ID NO:124.

Embodiment 121. The recombinant protein of any one of embodiments 117 to 120, wherein said light chain variable domain comprises a FR L1 as set forth in SEQ ID NO:125, a FR L2 as set forth in SEQ ID NO:126, a FR L3 as set forth in SEQ ID NO:127 and a FR L4 as set forth in SEQ ID NO:128.

Embodiment 122. The recombinant protein of any one of embodiments 117 to 121, further comprising an intracellular co-stimulatory signaling domain.

Embodiment 123. The recombinant protein of any one of embodiments 117 to 122 further comprising an intracellular T-cell signaling domain.

Embodiment 124. The recombinant protein of any one of embodiments 117 to 123, further comprising a self-cleaving peptidyl sequence.

Embodiment 125. An isolated nucleic acid encoding a recombinant protein of any one of embodiments 117 to 124.

Embodiment 126. A pharmaceutical composition comprising a therapeutically effective amount of a recombinant protein of any one of embodiments 117 to 124 and a pharmaceutically acceptable excipient.

Embodiment 127. A method of treating cancer in a subject in need thereof, said method comprising administering to a subject a therapeutically effective amount of a recombinant protein of any one of embodiments 117 to 124, thereby treating cancer in said subject.

Embodiment 128. A recombinant protein comprising:
(i) a first antibody region capable of binding an effector cell ligand; and
(ii) a second antibody region, comprising:
(a) a heavy chain variable domain comprising a CDR H1 as set forth in SEQ ID NO:31, a CDR H2 as set forth in SEQ ID NO:32 and a CDR H3 as set forth in SEQ ID NO:33; and
(b) a light chain variable domain comprising a CDR L1 as set forth in SEQ ID NO:34, a CDR L2 as set forth in SEQ ID NO:35, and a CDR L3 as set forth in SEQ ID NO:36.

Embodiment 129. The recombinant protein of embodiment 128, wherein said heavy chain variable domain comprises the sequence of SEQ ID NO:71.

Embodiment 130. The recombinant protein of embodiment 128 or 129, wherein said light chain variable domain comprises the sequence of SEQ ID NO:72.

Embodiment 131. The recombinant protein of any one of embodiments 128 to 130, wherein said heavy chain variable domain comprises a FR H1 as set forth in SEQ ID NO:121, a FR H2 as set forth in SEQ ID NO:122, a FR H3 as set forth in SEQ ID NO:123 and a FR H4 as set forth in SEQ ID NO:124.

Embodiment 132. The recombinant protein of any one of embodiments 128 to 131, wherein said light chain variable domain comprises a FR L1 as set forth in SEQ ID NO:125, a FR L2 as set forth in SEQ ID NO:126, a FR L3 as set forth in SEQ ID NO:127 and a FR L4 as set forth in SEQ ID NO:128.

Embodiment 133. The recombinant protein of any one of embodiments 128 to 132, wherein said effector cell ligand is a CD3 protein.

Embodiment 134. A pharmaceutical composition comprising a therapeutically effective amount of a recombinant protein of any one of embodiments 128 to 133 and a pharmaceutically acceptable excipient.

Embodiment 135. A method of treating cancer in a subject in need thereof, said method comprising administering to a subject a therapeutically effective amount of a recombinant protein of any one of embodiments 128 to 133, thereby treating cancer in said subject.

Embodiment 136. An anti-interleukin-1 receptor accessory protein (IL1RAP) antibody comprising a light chain variable domain,
wherein said light chain variable domain comprises:
a CDR L1 as set forth in SEQ ID NO:37, a CDR L2 as set forth in SEQ ID NO:38 and a CDR L3 as set forth in SEQ ID NO:39

Embodiment 137. The antibody of embodiment 136, wherein said light chain variable domain comprises the sequence of SEQ ID NO: 73.

Embodiment 138. The antibody of embodiment 136 or 137, wherein said light chain variable domain comprises a FR L1 as set forth in SEQ ID NO:129, a FR L2 as set forth in SEQ ID NO:130, a FR L3 as set forth in SEQ ID NO:131 and a FR L4 as set forth in SEQ ID NO:132.

Embodiment 139. An isolated nucleic acid encoding an antibody of any one of embodiments 136 to 138.

Embodiment 140. A pharmaceutical composition comprising a therapeutically effective amount of an antibody of any one of embodiments 136 to 138 and a pharmaceutically acceptable excipient.

Embodiment 141. A method of treating cancer in a subject in need thereof, said method comprising administering to a subject a therapeutically effective amount of an antibody of any one of embodiments 136 to 138, thereby treating cancer in said subject.

Embodiment 142. A recombinant protein comprising:
(i) an antibody region comprising:
a light chain variable domain comprising a CDR L1 as set forth in SEQ ID NO:37, a CDR L2 as set forth in SEQ ID NO:38 and a CDR L3 as set forth in SEQ ID NO:39; and
(ii) a transmembrane domain.

Embodiment 143. The recombinant protein of embodiment 142, wherein said light chain variable domain comprises the sequence of SEQ ID NO: 73.

Embodiment 144. The recombinant protein of embodiment 142 or 143, wherein said light chain variable domain comprises a FR L1 as set forth in SEQ ID NO:129, a FR L2 as set forth in SEQ ID NO:130, a FR L3 as set forth in SEQ ID NO:131 and a FR L4 as set forth in SEQ ID NO:132.

Embodiment 145. The recombinant protein of any one of embodiments 142 to 144, further comprising an intracellular co-stimulatory signaling domain.

Embodiment 146. The recombinant protein of any one of embodiments 142 to 145, further comprising an intracellular T-cell signaling domain.

Embodiment 147. The recombinant protein of any one of embodiments 142 to 146, further comprising a self-cleaving peptidyl sequence.

Embodiment 148. An isolated nucleic acid encoding a recombinant protein of any one of embodiments 142 to 147.

Embodiment 149. A pharmaceutical composition comprising a therapeutically effective amount of a recombinant protein of any one of embodiments 142 to 147 and a pharmaceutically acceptable excipient.

Embodiment 150. A method of treating cancer in a subject in need thereof, said method comprising administering to a subject a therapeutically effective amount of a recombinant protein of any one of embodiments 142 to 147, thereby treating cancer in said subject.

Embodiment 151. A recombinant protein comprising:
(i) a first antibody region capable of binding an effector cell ligand; and
(ii) a second antibody region, comprising:
a light chain variable domain comprising a CDR L1 as set forth in SEQ ID NO:37, a CDR L2 as set forth in SEQ ID NO:38 and a CDR L3 as set forth in SEQ ID NO:39.

Embodiment 152. The recombinant protein of embodiment 151, wherein said light chain variable domain comprises the sequence of SEQ ID NO:73.

Embodiment 153. The recombinant protein of embodiment 151 or 152, wherein said light chain variable domain comprises a FR L1 as set forth in SEQ ID NO:129, a FR L2 as set forth in SEQ ID NO:130, a FR L3 as set forth in SEQ ID NO:131 and a FR L4 as set forth in SEQ ID NO:132.

Embodiment 154. The recombinant protein of any one of embodiments 151 to 153, wherein said effector cell ligand is a CD3 protein.

Embodiment 155. A pharmaceutical composition comprising a therapeutically effective amount of a recombinant protein of any one of embodiments 151 to 154 and a pharmaceutically acceptable excipient.

Embodiment 156. A method of treating cancer in a subject in need thereof, said method comprising administering to a subject a therapeutically effective amount of a recombinant protein of any one of embodiments 151 to 154, thereby treating cancer in said subject.

Embodiment 157. An anti-interleukin-1 receptor accessory protein (IL1RAP) antibody comprising a light chain variable domain,
wherein said light chain variable domain comprises:
a CDR L1 as set forth in SEQ ID NO:40, a CDR L2 as set forth in SEQ ID NO:41, and a CDR L3 as set forth in SEQ ID NO:42.

Embodiment 158. The antibody of embodiment 157, wherein said light chain variable domain comprises the sequence of SEQ ID NO:74.

Embodiment 159. The antibody of embodiment 157 or 158, wherein said light chain variable domain comprises a FR L1 as set forth in SEQ ID NO:133, a FR L2 as set forth in SEQ ID NO:134, a FR L3 as set forth in SEQ ID NO:135 and a FR L4 as set forth in SEQ ID NO:136.

Embodiment 160. An isolated nucleic acid encoding an antibody of any one of embodiments 157 to 159.

Embodiment 161. A pharmaceutical composition comprising a therapeutically effective amount of an antibody of any one of embodiments 157 to 159 and a pharmaceutically acceptable excipient.

Embodiment 162. A method of treating cancer in a subject in need thereof, said method comprising administering to a subject a therapeutically effective amount of an antibody of any one of embodiments 157 to 159, thereby treating cancer in said subject.

Embodiment 163. A recombinant protein comprising:
(i) an antibody region comprising:
a light chain variable domain comprising a CDR L1 as set forth in SEQ ID NO:40, a CDR L2 as set forth in SEQ ID NO:41, and a CDR L3 as set forth in SEQ ID NO:42; and
(ii) a transmembrane domain.

Embodiment 164. The recombinant protein of embodiment 163, wherein said light chain variable domain comprises the sequence of SEQ ID NO:74.

Embodiment 165. The recombinant protein of embodiment 163 or 164, wherein said light chain variable domain comprises a FR L1 as set forth in SEQ ID NO:133, a FR L2 as set forth in SEQ ID NO:134, a FR L3 as set forth in SEQ ID NO:135 and a FR L4 as set forth in SEQ ID NO:136.

Embodiment 166. The recombinant protein of any one of embodiments 163 to 165, further comprising an intracellular co-stimulatory signaling domain.

Embodiment 167. The recombinant protein of any one of embodiments 163 to 166, further comprising an intracellular T-cell signaling domain.

Embodiment 168. The recombinant protein of any one of embodiments 163 to 167, further comprising a self-cleaving peptidyl sequence.

Embodiment 169. An isolated nucleic acid encoding a recombinant protein of any one of embodiments 163 to 168.

Embodiment 170. A pharmaceutical composition comprising a therapeutically effective amount of a recombinant protein of any one of embodiments 163 to 168 and a pharmaceutically acceptable excipient.

Embodiment 171. A method of treating cancer in a subject in need thereof, said method comprising administering to a subject a therapeutically effective amount of a recombinant protein of any one of embodiments 163 to 168, thereby treating cancer in said subject.

Embodiment 172. A recombinant protein comprising:
(i) a first antibody region capable of binding an effector cell ligand; and
(ii) a second antibody region, comprising:
a light chain variable domain comprising a CDR L1 as set forth in SEQ ID NO:40, a CDR L2 as set forth in SEQ ID NO:41, and a CDR L3 as set forth in SEQ ID NO:42.

Embodiment 173. The recombinant protein of embodiment 172, wherein said light chain variable domain comprises the sequence of SEQ ID NO:74.

Embodiment 174. The recombinant protein of embodiment 172 or 173, wherein said light chain variable domain comprises a FR L1 as set forth in SEQ ID NO:133, a FR L2 as set forth in SEQ ID NO:134, a FR L3 as set forth in SEQ ID NO:135 and a FR L4 as set forth in SEQ ID NO:136.

Embodiment 175. The recombinant protein of any one of embodiments 172 to 174, wherein said effector cell ligand is a CD3 protein.

Embodiment 176. A pharmaceutical composition comprising a therapeutically effective amount of a recombinant protein of any one of embodiments 172 to 175 and a pharmaceutically acceptable excipient.

Embodiment 177. A method of treating cancer in a subject in need thereof, said method comprising administering to a subject a therapeutically effective amount of a recombinant protein of any one of embodiments 172 to 175, thereby treating cancer in said subject.

Embodiment 178. An anti-interleukin-1 receptor accessory protein (IL1RAP) antibody comprising a light chain variable domain,
wherein said light chain variable domain comprises:
a CDR L1 as set forth in SEQ ID NO:43, a CDR L2 as set forth in SEQ ID NO:44, and a CDR L3 as set forth in SEQ ID NO:45

Embodiment 179. The antibody of embodiment 178, wherein said light chain variable domain comprises the sequence of SEQ ID NO:75.

Embodiment 180. The antibody of embodiment 178 or 179, wherein said light chain variable domain comprises a FR L1 as set forth in SEQ ID NO:137, a FR L2 as set forth in SEQ ID NO:138, a FR L3 as set forth in SEQ ID NO:139 and a FR L4 as set forth in SEQ ID NO:140.

Embodiment 181. An isolated nucleic acid encoding an antibody of any one of embodiments 178 to 180.

Embodiment 182. A pharmaceutical composition comprising a therapeutically effective amount of an antibody of any one of embodiments 178 to 180 and a pharmaceutically acceptable excipient.

Embodiment 183. A method of treating cancer in a subject in need thereof, said method comprising administering to a subject a therapeutically effective amount of an antibody of any one of embodiments 178 to 180, thereby treating cancer in said subject.

Embodiment 184. A recombinant protein comprising:
(i) an antibody region comprising:
(a) a light chain variable domain comprising a CDR L1 as set forth in SEQ ID NO:43, a CDR L2 as set forth in SEQ ID NO:44, and a CDR L3 as set forth in SEQ ID NO:45; and
(ii) a transmembrane domain.

Embodiment 185. The recombinant protein of embodiment 184, wherein said light chain variable domain comprises the sequence of SEQ ID NO:75.

Embodiment 186. The recombinant protein of embodiment 184 or 185, wherein said light chain variable domain comprises a FR L1 as set forth in SEQ ID NO:137, a FR L2 as set forth in SEQ ID NO:138, a FR L3 as set forth in SEQ ID NO:139 and a FR L4 as set forth in SEQ ID NO:140.

Embodiment 187. The recombinant protein of any one of embodiments 184 to 186, further comprising an intracellular co-stimulatory signaling domain.

Embodiment 188. The recombinant protein of any one of embodiments 184 to 187, further comprising an intracellular T-cell signaling domain.

Embodiment 189. The recombinant protein of any one of embodiments 184 to 188, further comprising a self-cleaving peptidyl sequence.

Embodiment 190. An isolated nucleic acid encoding a recombinant protein of any one of embodiments 184 to 189.

Embodiment 191. A pharmaceutical composition comprising a therapeutically effective amount of a recombinant protein of any one of embodiments 184 to 189 and a pharmaceutically acceptable excipient.

Embodiment 192. A method of treating cancer in a subject in need thereof, said method comprising administering to a subject a therapeutically effective amount of a recombinant protein of any one of embodiments 184 to 189, thereby treating cancer in said subject.

Embodiment 193. A recombinant protein comprising:
(i) a first antibody region capable of binding an effector cell ligand; and
(ii) a second antibody region, comprising:
a light chain variable domain comprising a CDR L1 as set forth in SEQ ID NO:43, a CDR L2 as set forth in SEQ ID NO:44, and a CDR L3 as set forth in SEQ ID NO:45.

Embodiment 194. The recombinant protein of embodiment 193, wherein said light chain variable domain comprises the sequence of SEQ ID NO:75.

Embodiment 195. The recombinant protein of embodiment 193 or 194, wherein said light chain variable domain comprises a FR L1 as set forth in SEQ ID NO:137, a FR L2 as set forth in SEQ ID NO:138, a FR L3 as set forth in SEQ ID NO:139 and a FR L4 as set forth in SEQ ID NO:140.

Embodiment 196. The recombinant protein of any one of embodiments 193 to 195, wherein said effector cell ligand is a CD3 protein.

Embodiment 197. A pharmaceutical composition comprising a therapeutically effective amount of a recombinant protein of any one of embodiments 193 to 196 and a pharmaceutically acceptable excipient.

Embodiment 198. A method of treating cancer in a subject in need thereof, said method comprising administering to a subject a therapeutically effective amount of a recombinant protein of any one of embodiments 193 to 196, thereby treating cancer in said subject.

Embodiment 199. An anti-interleukin-1 receptor accessory protein (IL1RAP) antibody comprising a light chain variable domain,
wherein said light chain variable domain comprises:
a CDR L1 as set forth in SEQ ID NO:46, a CDR L2 as set forth in SEQ ID NO:47, and a CDR L3 as set forth in SEQ ID NO:48.

Embodiment 200. The antibody of embodiment 199, wherein said light chain variable domain comprises the sequence of SEQ ID NO:76.

Embodiment 201. The antibody of embodiment 199 or 200, wherein said light chain variable domain comprises a FR L1 as set forth in SEQ ID NO:141, a FR L2 as set forth in SEQ ID NO:142, a FR L3 as set forth in SEQ ID NO:143 and a FR L4 as set forth in SEQ ID NO:144.

Embodiment 202. An isolated nucleic acid encoding an antibody of any one of embodiments 199-201.

Embodiment 203. A pharmaceutical composition comprising a therapeutically effective amount of an antibody of any one of embodiments 199 to 201 and a pharmaceutically acceptable excipient.

Embodiment 204. A method of treating cancer in a subject in need thereof, said method comprising administering to a subject a therapeutically effective amount of an antibody of any one of embodiments 199 to 201, thereby treating cancer in said subject.

Embodiment 205. A recombinant protein comprising:
(i) an antibody region comprising:
a light chain variable domain comprising a CDR L1 as set forth in SEQ ID NO:46, a CDR L2 as set forth in SEQ ID NO:47, and a CDR L3 as set forth in SEQ ID NO:48; and
(ii) a transmembrane domain.

Embodiment 206. The recombinant protein of embodiment 205, wherein said light chain variable domain comprises the sequence of SEQ ID NO:76.

Embodiment 207. The recombinant protein of embodiment 205 or 206, wherein said light chain variable domain comprises a FR L1 as set forth in SEQ ID NO:141, a FR L2 as set forth in SEQ ID NO:142, a FR L3 as set forth in SEQ ID NO:143 and a FR L4 as set forth in SEQ ID NO:144.

Embodiment 208. The recombinant protein of any one of embodiments 205 to 207, further comprising an intracellular co-stimulatory signaling domain.

Embodiment 209. The recombinant protein of any one of embodiments 205 to 208, further comprising an intracellular T-cell signaling domain.

Embodiment 210. The recombinant protein of any one of embodiments 205 to 209, further comprising a self-cleaving peptidyl sequence.

Embodiment 211. An isolated nucleic acid encoding a recombinant protein of any one of embodiments 205 to 210.

Embodiment 212. A pharmaceutical composition comprising a therapeutically effective amount of a recombinant protein of any one of embodiments 205 to 210 and a pharmaceutically acceptable excipient.

Embodiment 213. A method of treating cancer in a subject in need thereof, said method comprising administering to a subject a therapeutically effective amount of a recombinant protein of any one of embodiments 205 to 210, thereby treating cancer in said subject.

Embodiment 214. A recombinant protein comprising:
(i) a first antibody region capable of binding an effector cell ligand; and
(ii) a second antibody region, comprising:
a light chain variable domain comprising a CDR L1 as set forth in SEQ ID NO:46, a CDR L2 as set forth in SEQ ID NO:47, and a CDR L3 as set forth in SEQ ID NO:48.

Embodiment 215. The recombinant protein of embodiment 214, wherein said light chain variable domain comprises the sequence of SEQ ID NO:76.

Embodiment 216. The recombinant protein of embodiment 214 or 215, wherein said light chain variable domain comprises a FR L1 as set forth in SEQ ID NO:141, a FR L2 as set forth in SEQ ID NO:142, a FR L3 as set forth in SEQ ID NO:143 and a FR L4 as set forth in SEQ ID NO:144.

Embodiment 217. The recombinant protein of any one of embodiments 214 to 216, wherein said effector cell ligand is a CD3 protein.

Embodiment 218. A pharmaceutical composition comprising a therapeutically effective amount of a recombinant protein of any one of embodiments 214 to 217 and a pharmaceutically acceptable excipient.

Embodiment 219. A method of treating cancer in a subject in need thereof, said method comprising administering to a subject a therapeutically effective amount of a recombinant protein of any one of embodiments 214 to 217, thereby treating cancer in said subject.

Embodiment 220. An anti-interleukin-1 receptor accessory protein (IL1RAP) antibody comprising a light chain variable domain,
wherein said light chain variable domain comprises:
a CDR L1 as set forth in SEQ ID NO:49, a CDR L2 as set forth in SEQ ID NO:50, and a CDR L3 as set forth in SEQ ID NO:51.

Embodiment 221. The antibody of embodiment 220, wherein said light chain variable domain comprises the sequence of SEQ ID NO:77.

Embodiment 222. The antibody of any one of embodiment 220 or 221, wherein said light chain variable domain comprises a FR L1 as set forth in SEQ ID NO:145, a FR L2 as set forth in SEQ ID NO:146, a FR L3 as set forth in SEQ ID NO:147 and a FR L4 as set forth in SEQ ID NO:148.

Embodiment 223. An isolated nucleic acid encoding an antibody of any one of embodiments 220 to 222.

Embodiment 224. A pharmaceutical composition comprising a therapeutically effective amount of an antibody of any one of embodiments 220 to 222 and a pharmaceutically acceptable excipient.

Embodiment 225. A method of treating cancer in a subject in need thereof, said method comprising administering to a subject a therapeutically effective amount of an antibody of any one of embodiments 220 to 222, thereby treating cancer in said subject.

Embodiment 226. A recombinant protein comprising:
(i) an antibody region comprising:
a light chain variable domain comprising a CDR L1 as set forth in SEQ ID NO:49, a CDR L2 as set forth in SEQ ID NO:50, and a CDR L3 as set forth in SEQ ID NO:51; and
(ii) a transmembrane domain.

Embodiment 227. The recombinant protein of embodiment 226, wherein said light chain variable domain comprises the sequence of SEQ ID NO:77.

Embodiment 228. The recombinant protein of embodiment 226 or 227, wherein said light chain variable domain comprises a FR L1 as set forth in SEQ ID NO:145, a FR L2 as set forth in SEQ ID NO:146, a FR L3 as set forth in SEQ ID NO:147 and a FR L4 as set forth in SEQ ID NO:148.

Embodiment 229. The recombinant protein of any one of embodiments 226 to 228, further comprising an intracellular co-stimulatory signaling domain.

Embodiment 230. The recombinant protein of any one of embodiments 226 to 229, further comprising an intracellular T-cell signaling domain.

Embodiment 231. The recombinant protein of any one of embodiments 226 to 230, further comprising a self-cleaving peptidyl sequence.

Embodiment 232. An isolated nucleic acid encoding a recombinant protein of any one of embodiments 226 to 231.

Embodiment 233. A pharmaceutical composition comprising a therapeutically effective amount of a recombinant protein of any one of embodiments 226 to 231 and a pharmaceutically acceptable excipient.

Embodiment 234. A method of treating cancer in a subject in need thereof, said method comprising administering to a subject a therapeutically effective amount of a recombinant protein of any one of embodiments 226 to 231, thereby treating cancer in said subject.

Embodiment 235. A recombinant protein comprising:
(i) a first antibody region capable of binding an effector cell ligand; and
(ii) a second antibody region, comprising:
(a) a light chain variable domain comprising a CDR L1 as set forth in SEQ ID NO:49, a CDR L2 as set forth in SEQ ID NO:50, and a CDR L3 as set forth in SEQ ID NO:51.

Embodiment 236. The recombinant protein of embodiment 235, wherein said light chain variable domain comprises the sequence of SEQ ID NO:77.

Embodiment 237. The recombinant protein of embodiment 235 or 236, wherein said light chain variable domain comprises a FR L1 as set forth in SEQ ID NO:145, a FR L2 as set forth in SEQ ID NO:146, a FR L3 as set forth in SEQ ID NO:147 and a FR L4 as set forth in SEQ ID NO:148.

Embodiment 238. The recombinant protein of any one of embodiments 235 to 237, wherein said effector cell ligand is a CD3 protein.

Embodiment 239. A pharmaceutical composition comprising a therapeutically effective amount of a recombinant protein of any one of embodiments 235 to 238 and a pharmaceutically acceptable excipient.

Embodiment 240. A method of treating cancer in a subject in need thereof, said method comprising administering to a subject a therapeutically effective amount of a recombinant protein of any one of embodiments 235 to 238, thereby treating cancer in said subject.

Embodiment 241. An anti-interleukin-1 receptor accessory protein (IL1RAP) antibody comprising a light chain variable domain,
wherein said light chain variable domain comprises:
a CDR L1 as set forth in SEQ ID NO:52, a CDR L2 as set forth in SEQ ID NO:53, and a CDR L3 as set forth in SEQ ID NO:54.

Embodiment 242. The antibody of embodiment 241, wherein said light chain variable domain comprises the sequence of SEQ ID NO:78.

Embodiment 243. The antibody of embodiment 241 or 242, wherein said light chain variable domain comprises a FR L1 as set forth in SEQ ID NO:149, a FR L2 as set forth in SEQ ID NO:150, a FR L3 as set forth in SEQ ID NO:151 and a FR L4 as set forth in SEQ ID NO:152.

Embodiment 244. An isolated nucleic acid encoding an antibody of any one of embodiments 241 to 243.

Embodiment 245. A pharmaceutical composition comprising a therapeutically effective amount of an antibody of any one of embodiments 241 to 243 and a pharmaceutically acceptable excipient.

Embodiment 246. A method of treating cancer in a subject in need thereof, said method comprising administering to a subject a therapeutically effective amount of an antibody of any one of embodiments 241 to 243, thereby treating cancer in said subject.

Embodiment 247. A recombinant protein comprising:
(i) an antibody region comprising:
a light chain variable domain comprising a CDR L1 as set forth in SEQ ID NO:52, a CDR L2 as set forth in SEQ ID NO:53, and a CDR L3 as set forth in SEQ ID NO:54; and
(ii) a transmembrane domain.

Embodiment 248. The recombinant protein of embodiment 247, wherein said light chain variable domain comprises the sequence of SEQ ID NO:78.

Embodiment 249. The recombinant protein of embodiment 247 or 248, wherein said light chain variable domain comprises a FR L1 as set forth in SEQ ID NO:149, a FR L2 as set forth in SEQ ID NO:150, a FR L3 as set forth in SEQ ID NO:151 and a FR L4 as set forth in SEQ ID NO:152.

Embodiment 250. The recombinant protein of any one of embodiments 247 to 249, further comprising an intracellular co-stimulatory signaling domain.

Embodiment 251. The recombinant protein of any one of embodiments 247 to 250, further comprising an intracellular T-cell signaling domain.

Embodiment 252. The recombinant protein of any one of embodiments 247 to 251, further comprising a self-cleaving peptidyl sequence.

Embodiment 253. An isolated nucleic acid encoding a recombinant protein of any one of embodiments 247 to 252.

Embodiment 254. A pharmaceutical composition comprising a therapeutically effective amount of a recombinant protein of any one of embodiments 247 to 252 and a pharmaceutically acceptable excipient.

Embodiment 255. A method of treating cancer in a subject in need thereof, said method comprising administering to a subject a therapeutically effective amount of a recombinant protein of any one of embodiments 247 to 252, thereby treating cancer in said subject.

Embodiment 256. A recombinant protein comprising:
(i) a first antibody region capable of binding an effector cell ligand; and
(ii) a second antibody region, comprising:
a light chain variable domain comprising a CDR L1 as set forth in SEQ ID NO:52, a CDR L2 as set forth in SEQ ID NO:53, and a CDR L3 as set forth in SEQ ID NO:54.

Embodiment 257. The recombinant protein of embodiment 256, wherein said light chain variable domain comprises the sequence of SEQ ID NO:78.

Embodiment 258. The recombinant protein of embodiment 256 or 257, wherein said light chain variable domain comprises a FR L1 as set forth in SEQ ID NO:149, a FR L2 as set forth in SEQ ID NO:150, a FR L3 as set forth in SEQ ID NO:151 and a FR L4 as set forth in SEQ ID NO:152.

Embodiment 259. The recombinant protein of any one of embodiments 256 to 258, wherein said effector cell ligand is a CD3 protein.

Embodiment 260. A pharmaceutical composition comprising a therapeutically effective amount of a recombinant protein of any one of embodiments 256 to 259 and a pharmaceutically acceptable excipient.

Embodiment 261. A method of treating cancer in a subject in need thereof, said method comprising administering to a subject a therapeutically effective amount of a recombinant protein of any one of embodiments 256 to 259, thereby treating cancer in said subject.

Embodiment 262. An anti-interleukin-1 receptor accessory protein (IL1RAP) antibody comprising a light chain variable domain,
wherein said light chain variable domain comprises:
a CDR L1 as set forth in SEQ ID NO:55, a CDR L2 as set forth in SEQ ID NO:56, and a CDR L3 as set forth in SEQ ID NO:57.

Embodiment 263. The antibody of embodiment 262, wherein said light chain variable domain comprises the sequence of SEQ ID NO:79.

Embodiment 264. The antibody of embodiment 262 or 263, wherein said light chain variable domain comprises a FR L1 as set forth in SEQ ID NO:153, a FR L2 as set forth in SEQ ID NO:154, a FR L3 as set forth in SEQ ID NO:155 and a FR L4 as set forth in SEQ ID NO:156.

Embodiment 265. An isolated nucleic acid encoding an antibody of any one of embodiments 262 to 264.

Embodiment 266. A pharmaceutical composition comprising a therapeutically effective amount of an antibody of any one of embodiments 262 to 264 and a pharmaceutically acceptable excipient.

Embodiment 267. A method of treating cancer in a subject in need thereof, said method comprising administering to a subject a therapeutically effective amount of an antibody of any one of embodiments 262 to 264, thereby treating cancer in said subject.

Embodiment 268. A recombinant protein comprising:
(i) an antibody region comprising:
a light chain variable domain comprising a CDR L1 as set forth in SEQ ID NO:55, a CDR L2 as set forth in SEQ ID NO:56, and a CDR L3 as set forth in SEQ ID NO:57; and
(ii) a transmembrane domain Embodiment 269. The recombinant protein of embodiment 268, wherein said light chain variable domain comprises the sequence of SEQ ID NO:79.

Embodiment 270. The recombinant protein of embodiment 268 or 269, wherein said light chain variable domain comprises a FR L1 as set forth in SEQ ID NO:153, a FR L2 as set forth in SEQ ID NO:154, a FR L3 as set forth in SEQ ID NO:155 and a FR L4 as set forth in SEQ ID NO:156.

Embodiment 271. The recombinant protein of any one of embodiments 268 to 270, further comprising an intracellular co-stimulatory signaling domain.

Embodiment 272. The recombinant protein of any one of embodiments 268 to 271, further comprising an intracellular T-cell signaling domain.

Embodiment 273. The recombinant protein of any one of embodiments 268 to 272, further comprising a self-cleaving peptidyl sequence.

Embodiment 274. An isolated nucleic acid encoding a recombinant protein of any one of embodiments 268 to 273.

Embodiment 275. A pharmaceutical composition comprising a therapeutically effective amount of a recombinant protein of any one of embodiments 268 to 273 and a pharmaceutically acceptable excipient.

Embodiment 276. A method of treating cancer in a subject in need thereof, said method comprising administering to a subject a therapeutically effective amount of a recombinant protein of any one of embodiments 268 to 273, thereby treating cancer in said subject.

Embodiment 277. A recombinant protein comprising:
(i) a first antibody region capable of binding an effector cell ligand; and
(ii) a second antibody region, comprising:
(a) a light chain variable domain comprising a CDR L1 as set forth in SEQ ID NO:55, a CDR L2 as set forth in SEQ ID NO:56, and a CDR L3 as set forth in SEQ ID NO:57.

Embodiment 278. The recombinant protein of embodiment 277, wherein said light chain variable domain comprises the sequence of SEQ ID NO:79.

Embodiment 279. The recombinant protein of embodiment 277 or 278, wherein said light chain variable domain comprises a FR L1 as set forth in SEQ ID NO:153, a FR L2 as set forth in SEQ ID NO:154, a FR L3 as set forth in SEQ ID NO:155 and a FR L4 as set forth in SEQ ID NO:156.

Embodiment 280. The recombinant protein of any one of embodiments 277 to 279, wherein said effector cell ligand is a CD3 protein.

Embodiment 281. A pharmaceutical composition comprising a therapeutically effective amount of a recombinant protein of any one of embodiments 277 to 280 and a pharmaceutically acceptable excipient.

Embodiment 282. A method of treating cancer in a subject in need thereof, said method comprising administering to a subject a therapeutically effective amount of a recombinant protein of any one of embodiments 277 to 280, thereby treating cancer in said subject.

Embodiment 283. An anti-interleukin-1 receptor accessory protein (IL1RAP) antibody comprising a light chain variable domain,
wherein said light chain variable domain comprises:
a CDR L1 as set forth in SEQ ID NO:58, a CDR L2 as set forth in SEQ ID NO:59, and a CDR L3 as set forth in SEQ ID NO:60.

Embodiment 284. The antibody of embodiment 283, wherein said light chain variable domain comprises the sequence of SEQ ID NO:80.

Embodiment 285. The antibody of embodiment 283 or 284, wherein said light chain variable domain comprises a FR L1 as set forth in SEQ ID NO:157, a FR L2 as set forth in SEQ ID NO:158, a FR L3 as set forth in SEQ ID NO:159 and a FR L4 as set forth in SEQ ID NO:160.

Embodiment 286. An isolated nucleic acid encoding an antibody of any one of embodiments 283 to 285.

Embodiment 287. A pharmaceutical composition comprising a therapeutically effective amount of an antibody of any one of embodiments 283 to 285 and a pharmaceutically acceptable excipient.

Embodiment 288. A method of treating cancer in a subject in need thereof, said method comprising administering to a subject a therapeutically effective amount of an antibody of any one of embodiments 283 to 285, thereby treating cancer in said subject.

Embodiment 289. A recombinant protein comprising:
(i) an antibody region comprising:
a light chain variable domain comprising a CDR L1 as set forth in SEQ ID NO:58, a CDR L2 as set forth in SEQ ID NO:59, and a CDR L3 as set forth in SEQ ID NO:60; and
(ii) a transmembrane domain.

Embodiment 290. The recombinant protein of embodiment 289, wherein said light chain variable domain comprises the sequence of SEQ ID NO:80.

Embodiment 291. The recombinant protein of embodiment 289 or 290, wherein said light chain variable domain comprises a FR L1 as set forth in SEQ ID NO:157, a FR L2 as set forth in SEQ ID NO:158, a FR L3 as set forth in SEQ ID NO:159 and a FR L4 as set forth in SEQ ID NO:160.

Embodiment 292. The recombinant protein of any one of embodiments 289 to 291, further comprising an intracellular co-stimulatory signaling domain.

Embodiment 293. The recombinant protein of any one of embodiments 289 to 292, further comprising an intracellular T-cell signaling domain.

Embodiment 294. The recombinant protein of any one of embodiments 289 to 293, further comprising a self-cleaving peptidyl sequence.

Embodiment 295. An isolated nucleic acid encoding a recombinant protein of any one of embodiments 289 to 294.

Embodiment 296. A pharmaceutical composition comprising a therapeutically effective amount of a recombinant protein of any one of embodiments 289 to 294 and a pharmaceutically acceptable excipient.

Embodiment 297. A method of treating cancer in a subject in need thereof, said method comprising administering to a subject a therapeutically effective amount of a recombinant protein of any one of embodiments 289 to 294, thereby treating cancer in said subject.

Embodiment 298. A recombinant protein comprising:
(i) a first antibody region capable of binding an effector cell ligand; and
(ii) a second antibody region, comprising:
a light chain variable domain comprising a CDR L1 as set forth in SEQ ID NO:58, a CDR L2 as set forth in SEQ ID NO:59, and a CDR L3 as set forth in SEQ ID NO:60.

Embodiment 299. The recombinant protein of embodiment 298, wherein said light chain variable domain comprises the sequence of SEQ ID NO:80.

Embodiment 300. The recombinant protein of embodiment 298 or 299, wherein said light chain variable domain comprises a FR L1 as set forth in SEQ ID NO:157, a FR L2 as set forth in SEQ ID NO:158, a FR L3 as set forth in SEQ ID NO:159 and a FR L4 as set forth in SEQ ID NO:160.

Embodiment 301. The recombinant protein of any one of embodiments 298 to 300, wherein said effector cell ligand is a CD3 protein.

Embodiment 302. A pharmaceutical composition comprising a therapeutically effective amount of a recombinant protein of any one of embodiments 298 to 301 and a pharmaceutically acceptable excipient.

What is claimed is:

1. An anti-interleukin-1 receptor accessory protein (IL1RAP) antibody comprising a heavy chain variable domain and a light chain variable domain,
wherein said heavy chain variable domain comprises:
a CDR H1 as set forth in SEQ ID NO:1, a CDR H2 as set forth in SEQ ID NO:2 and a CDR H3 as set forth in SEQ ID NO:3; and
wherein said light chain variable domain comprises:
a CDR L1 as set forth in SEQ ID NO:4, a CDR L2 as set forth in SEQ ID NO:5, and a CDR L3 as set forth in SEQ ID NO:6.

2. The antibody of claim 1, wherein said heavy chain variable domain comprises the sequence of SEQ ID NO:61 and wherein said light chain variable domain comprises the sequence of SEQ ID NO:62.

3. A pharmaceutical composition comprising a therapeutically effective amount of the antibody of claim 1 and a pharmaceutically acceptable excipient.

4. A method of treating acute myeloid leukemia (AML) in a subject in need thereof, said method comprising administering to a subject a therapeutically effective amount of the antibody of claim 1, thereby treating said AML in said subject.

5. A recombinant protein comprising:
(i) an antibody region comprising:
(a) a heavy chain variable domain comprising a CDR H1 as set forth in SEQ ID NO:1, a CDR H2 as set forth in SEQ ID NO:2 and a CDR H3 as set forth in SEQ ID NO:3; and
(b) a light chain variable domain comprising a CDR L1 as set forth in SEQ ID NO:4, a CDR L2 as set forth in SEQ ID NO:5, and a CDR L3 as set forth in SEQ ID NO:6; and
(ii) a transmembrane domain.

6. The recombinant protein of claim 5, wherein said heavy chain variable domain comprises the sequence of SEQ ID NO: 61 and wherein said light chain variable domain comprises the sequence of SEQ ID NO:62.

7. An anti-interleukin-1 receptor accessory protein (IL1RAP) antibody comprising a heavy chain variable domain and a light chain variable domain,
wherein said heavy chain variable domain comprises:
a CDR H1 as set forth in SEQ ID NO:7, a CDR H2 as set forth in SEQ ID NO:8 and a CDR H3 as set forth in SEQ ID NO:9; and
wherein said light chain variable domain comprises:
a CDR L1 as set forth in SEQ ID NO:10, a CDR L2 as set forth in SEQ ID NO:11, and a CDR L3 as set forth in SEQ ID NO:12.

8. The antibody of claim 7, wherein said heavy chain variable domain comprises the sequence of SEQ ID NO:63 and wherein said light chain variable domain comprises the sequence of SEQ ID NO:64.

9. A recombinant protein comprising:
(i) an antibody region comprising:
(a) a heavy chain variable domain comprising a CDR H1 as set forth in SEQ ID NO:7, a CDR H2 as set forth in SEQ ID NO:8 and a CDR H3 as set forth in SEQ ID NO:9; and
(b) a light chain variable domain comprising a CDR L1 as set forth in SEQ ID NO:10, a CDR L2 as set forth in SEQ ID NO:11, and a CDR L3 as set forth in SEQ ID NO:12; and
(ii) a transmembrane domain.

10. The recombinant protein of claim 9, wherein heavy chain variable domain comprises the sequence of SEQ ID NO: 63 and wherein said light chain variable domain comprises the sequence of SEQ ID NO:64.

11. An anti-interleukin-1 receptor accessory protein (IL1RAP) antibody comprising a heavy chain variable domain and a light chain variable domain,
wherein said heavy chain variable domain comprises:
a CDR H1 as set forth in SEQ ID NO:19, a CDR H2 as set forth in SEQ ID NO:20 and a CDR H3 as set forth in SEQ ID NO:21; and
wherein said light chain variable domain comprises:
a CDR L1 as set forth in SEQ ID NO:22, a CDR L2 as set forth in SEQ ID NO:23, and a CDR L3 as set forth in SEQ ID NO:24.

12. The antibody of claim 11, wherein said heavy chain variable domain comprises the sequence of SEQ ID NO:67 and wherein said light chain variable domain comprises the sequence of SEQ ID NO:68.

13. A pharmaceutical composition comprising a therapeutically effective amount of the antibody of claim 11 and a pharmaceutically acceptable excipient.

14. A method of treating acute myeloid leukemia (AML) in a subject in need thereof, said method comprising administering to a subject a therapeutically effective amount of the antibody of claim 11, thereby treating said AML in said subject.

15. A recombinant protein comprising:
(i) an antibody region comprising:
(a) a heavy chain variable domain comprising a CDR H1 as set forth in SEQ ID NO:19, a CDR H2 as set forth in SEQ ID NO:20 and a CDR H3 as set forth in SEQ ID NO:21; and
(b) a light chain variable domain comprising a CDR L1 as set forth in SEQ ID NO:22, a CDR L2 as set forth in SEQ ID NO:23, and a CDR L3 as set forth in SEQ ID NO:24; and
(ii) a transmembrane domain.

16. The recombinant protein of claim 15, wherein said heavy chain variable domain comprises the sequence of SEQ ID NO: 67 and wherein said light chain variable domain comprises the sequence of SEQ ID NO:68.

17. An anti-interleukin-1 receptor accessory protein (IL1RAP) antibody comprising a heavy chain variable domain and a light chain variable domain,
wherein said heavy chain variable domain comprises:
a CDR H1 as set forth in SEQ ID NO:25, a CDR H2 as set forth in SEQ ID NO:26 and a CDR H3 as set forth in SEQ ID NO:27; and
wherein said light chain variable domain comprises:
a CDR L1 as set forth in SEQ ID NO:28, a CDR L2 as set forth in SEQ ID NO:29, and a CDR L3 as set forth in SEQ ID NO:30.

18. The antibody of claim 17, wherein said heavy chain variable domain comprises the sequence of SEQ ID NO:69 and wherein said light chain variable domain comprises the sequence of SEQ ID NO:70.

19. A recombinant protein comprising:
(i) an antibody region comprising:
(a) a heavy chain variable domain comprising a CDR H1 as set forth in SEQ ID NO:25, a CDR H2 as set forth in SEQ ID NO:26 and a CDR H3 as set forth in SEQ ID NO:27; and
(b) a light chain variable domain comprising a CDR L1 as set forth in SEQ ID NO:28, a CDR L2 as set forth in SEQ ID NO:29, and a CDR L3 as set forth in SEQ ID NO:30; and
(ii) a transmembrane domain.

20. The recombinant protein of claim 19, wherein said heavy chain variable domain comprises the sequence of SEQ ID NO: 69 and wherein said light chain variable domain comprises the sequence of SEQ ID NO:70.

21. An anti-interleukin-1 receptor accessory protein (IL1RAP) antibody comprising a heavy chain variable domain and a light chain variable domain,
   wherein said heavy chain variable domain comprises:
   a CDR H1 as set forth in SEQ ID NO:31, a CDR H2 as set forth in SEQ ID NO:32 and a CDR H3 as set forth in SEQ ID NO:33; and
   wherein said light chain variable domain comprises:
   a CDR L1 as set forth in SEQ ID NO:34, a CDR L2 as set forth in SEQ ID NO:35, and a CDR L3 as set forth in SEQ ID NO:36.

22. The antibody of claim 21, wherein said heavy chain variable domain comprises the sequence of SEQ ID NO:71 and wherein said light chain variable domain comprises the sequence of SEQ ID NO:72.

23. A pharmaceutical composition comprising a therapeutically effective amount of the antibody of claim 21 and a pharmaceutically acceptable excipient.

24. A method of treating acute myeloid leukemia (AML) in a subject in need thereof, said method comprising administering to a subject a therapeutically effective amount of the antibody of claim 21, thereby treating said AML in said subject.

25. A recombinant protein comprising:
   (i) an antibody region comprising:
   (a) a heavy chain variable domain comprising a CDR H1 as set forth in SEQ ID NO:31, a CDR H2 as set forth in SEQ ID NO:32 and a CDR H3 as set forth in SEQ ID NO:33; and
   (b) a light chain variable domain comprising a CDR L1 as set forth in SEQ ID NO:34, a CDR L2 as set forth in SEQ ID NO:35, and a CDR L3 as set forth in SEQ ID NO:36; and
   (ii) a transmembrane domain.

26. The recombinant protein of claim 25, wherein said heavy chain variable domain comprises the sequence of SEQ ID NO: 71 and wherein said light chain variable domain comprises the sequence of SEQ ID NO:72.

* * * * *